US012003562B2

(12) United States Patent
Shribman et al.

(10) Patent No.: US 12,003,562 B2
(45) Date of Patent: *Jun. 4, 2024

(54) SYSTEM AND METHOD FOR STREAMING CONTENT FROM MULTIPLE SERVERS

(71) Applicant: BRIGHT DATA LTD., Netanya (IL)

(72) Inventors: Derry Shribman, Tel Aviv (IL); Ofer Vilenski, Moshav Hadar Am (IL)

(73) Assignee: BRIGHT DATA LTD., Netanya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,958

(22) Filed: Jan. 22, 2023

(65) Prior Publication Data

US 2023/0156060 A1 May 18, 2023

Related U.S. Application Data

(63) Continuation of application No. 17/241,110, filed on Apr. 27, 2021, now Pat. No. 11,770,429, which is a
(Continued)

(51) Int. Cl.
*H04L 65/612* (2022.01)
*H04L 65/65* (2022.01)
(Continued)

(52) U.S. Cl.
CPC ............ *H04L 65/612* (2022.05); *H04L 65/65* (2022.05); *H04L 65/80* (2013.01); *H04L 67/02* (2013.01);
(Continued)

(58) Field of Classification Search
CPC ....... H04L 65/612; H04L 65/65; H04L 65/80; H04L 67/02; H04L 65/752; H04N 21/4622; H04N 21/6125; H04N 21/8456
See application file for complete search history.

(56) References Cited

U.S. PATENT DOCUMENTS

| 3,922,494 | A | 11/1975 | Cooper et al. |
| 4,347,827 | A | 9/1982 | Cascio |

(Continued)

FOREIGN PATENT DOCUMENTS

| CA | 2328548 A1 | 6/2002 |
| CA | 2353623 A1 | 1/2003 |

(Continued)

OTHER PUBLICATIONS

Authors Alain Durand (IMAG) et al., "IPv6 Tunnel Broker <draft-ietf-ngtrans-broker-00.txt>", Internet Society (ISOC), Apr. 2, 1999 (14 pages).

(Continued)

*Primary Examiner* — Michael Won
(74) *Attorney, Agent, or Firm* — May Patents Ltd.

(57) ABSTRACT

A system and a method for media streaming from multiple sources are disclosed. A content requesting client device accesses a server to receive a list of available sources that may include multiple Content Delivery Networks (CDNs) and independent servers. Based on a pre-set criteria, such as the source delivery performance and cost, the client device partitions the content into parts, allocates a source to each part, and simultaneously receives media streams of the content parts from the allocated sources. The server may be a Video-on-Demand (VOD) server, and the content may be a single file of a video data, such as a movie. The delivery performance of the used sources is measured during the streaming for updating the partition or the allocation. The updated measured performance may be stored locally at the client device, or at a server for use by other clients. The client actions may be implemented as a client-side script.

29 Claims, 57 Drawing Sheets

Related U.S. Application Data continuation of application No. 15/089,721, filed on Apr. 4, 2016, now Pat. No. 11,057,446.

(60) Provisional application No. 62/308,291, filed on Mar. 15, 2016, provisional application No. 62/210,081, filed on Aug. 26, 2015, provisional application No. 62/173,411, filed on Jun. 10, 2015, provisional application No. 62/161,553, filed on May 14, 2015.

(51) Int. Cl.
| | |
|---|---|
| *H04L 65/80* | (2022.01) |
| *H04L 67/02* | (2022.01) |
| *H04N 21/462* | (2011.01) |
| *H04N 21/61* | (2011.01) |
| *H04N 21/845* | (2011.01) |

(52) U.S. Cl.
CPC ..... *H04N 21/4622* (2013.01); *H04N 21/6125* (2013.01); *H04N 21/8456* (2013.01)

(56) References Cited

U.S. PATENT DOCUMENTS

| | | |
|---|---|---|
| 4,464,650 A | 7/1984 | Eastman et al. |
| 4,558,302 A | 10/1985 | Welch |
| 4,814,746 A | 3/1989 | Miller et al. |
| 4,855,894 A | 8/1989 | Asahi |
| 4,937,781 A | 6/1990 | Lee et al. |
| 5,572,643 A | 5/1996 | Judson |
| 5,701,451 A | 12/1997 | Rogers et al. |
| 5,734,829 A | 3/1998 | Robinson |
| 5,832,218 A | 3/1998 | Gibbs et al. |
| 5,758,195 A | 5/1998 | Balmer |
| 5,826,014 A | 10/1998 | Coley |
| 5,793,964 A | 11/1998 | Rogers et al. |
| 5,974,566 A | 10/1999 | Ault |
| 6,012,083 A | 1/2000 | Savitzky |
| 6,012,090 A | 1/2000 | Chung |
| 6,061,278 A | 5/2000 | Kato et al. |
| 6,081,832 A | 6/2000 | Gilchrist et al. |
| 6,085,193 A | 7/2000 | Malkin |
| 6,134,584 A | 10/2000 | Chang |
| 6,154,782 A | 11/2000 | Kawaguchi |
| 6,185,625 B1 | 2/2001 | Tso |
| 6,195,680 B1 | 2/2001 | Goldszmidt et al. |
| 6,236,652 B1 | 5/2001 | Preston et al. |
| 6,240,444 B1 | 5/2001 | Fin |
| 6,266,704 B1 | 7/2001 | Reed |
| 6,230,171 B1 | 8/2001 | Pacifici et al. |
| 6,173,330 B1 | 9/2001 | Guo et al. |
| 6,311,216 B1 | 10/2001 | Smith |
| 6,351,775 B1 | 2/2002 | Yu |
| 6,356,934 B1 | 3/2002 | Delph |
| 6,377,996 B1 | 4/2002 | Lumelsky et al. |
| 6,389,422 B1 | 5/2002 | Doi |
| 6,389,462 B1 | 5/2002 | Cohen |
| 6,397,259 B1 | 5/2002 | Lincke et al. |
| 6,412,008 B1 | 6/2002 | Fields et al. |
| 6,421,733 B1 | 7/2002 | Tso |
| 6,449,640 B1 | 9/2002 | Haverstock |
| 6,466,470 B1 | 10/2002 | Chang |
| 6,477,581 B1 | 11/2002 | Carpenter et al. |
| 6,513,061 B1 | 1/2003 | Ebata |
| 6,601,098 B1 | 7/2003 | Case et al. |
| 6,658,463 B1 | 12/2003 | Dillon et al. |
| 6,661,799 B1 | 12/2003 | Molitor |
| 6,665,715 B1 | 12/2003 | Houri |
| 6,687,732 B1 | 2/2004 | Bector |
| 6,701,374 B2 | 3/2004 | Gupta |
| 6,711,526 B2 | 3/2004 | Cooper |
| 6,785,705 B1 | 8/2004 | Kocherlakota |
| 6,792,461 B1 | 9/2004 | Hericourt |
| 6,795,848 B1 | 9/2004 | Border et al. |
| 6,820,133 B1 | 11/2004 | Grove |
| 6,829,638 B1 | 12/2004 | McBrearty |
| 6,842,463 B1 | 1/2005 | Drwiega |
| 6,845,456 B1 | 1/2005 | Menezes et al. |
| 6,868,453 B1 | 3/2005 | Watanabe |
| 6,895,011 B1 | 5/2005 | Lassers |
| 6,912,572 B1 | 6/2005 | Fischer |
| 6,961,783 B1 | 11/2005 | Cook |
| 7,007,228 B1 | 2/2006 | Carro |
| 7,010,526 B2 | 3/2006 | Denesuk et al. |
| 7,020,667 B2 | 3/2006 | Guest et al. |
| 7,047,315 B1 | 5/2006 | Srivastava |
| 7,080,158 B1 | 7/2006 | Squire |
| 7,009,927 B2 | 8/2006 | Cudd |
| 7,120,666 B2 | 10/2006 | McCanne et al. |
| 7,136,901 B2 | 11/2006 | Chung et al. |
| 7,139,557 B2 | 11/2006 | Tang et al. |
| 7,139,579 B2 | 11/2006 | Hatano |
| 7,149,797 B1 | 12/2006 | Weller et al. |
| 7,203,741 B2 | 4/2007 | Marco et al. |
| 7,240,100 B1 | 7/2007 | Wein et al. |
| 7,246,272 B2 | 7/2007 | Cabezas |
| 7,299,291 B1 | 11/2007 | Shaw |
| 7,353,279 B2 | 4/2008 | Durvasula et al. |
| 7,360,152 B2 | 4/2008 | Capps et al. |
| 7,381,366 B2 | 6/2008 | Carter |
| 7,401,115 B1 | 7/2008 | Arsenault |
| 7,412,354 B2 | 12/2008 | Lee et al. |
| 7,464,123 B2 | 12/2008 | Croker |
| 7,509,390 B1 | 3/2009 | Raman et al. |
| 7,543,018 B2 | 6/2009 | Appelman |
| 7,558,942 B1 | 7/2009 | Chen et al. |
| 7,620,703 B1 | 11/2009 | Shteyn |
| 7,639,682 B2 | 12/2009 | Suzuki et al. |
| 7,702,784 B2 | 4/2010 | Berstis |
| 7,706,362 B1 | 4/2010 | Senthilnathan |
| 7,719,971 B1 | 5/2010 | Issa |
| 7,742,485 B2 | 6/2010 | Zhang |
| 7,751,628 B1 | 7/2010 | Reisman |
| 7,761,500 B1 | 7/2010 | Wei et al. |
| 7,734,777 B2 | 8/2010 | Raja |
| 7,788,378 B2 | 8/2010 | Rao |
| 7,801,824 B1 | 9/2010 | Bryar |
| 7,805,517 B2 | 9/2010 | Shim |
| 7,818,383 B2 | 10/2010 | Kodama |
| 7,818,430 B2 | 10/2010 | Zuckerman |
| 7,831,720 B1 | 11/2010 | Noureddine |
| 7,853,472 B2 | 12/2010 | Al-Abdulqader |
| 7,860,988 B2 | 12/2010 | Aoki |
| 7,861,213 B2 | 12/2010 | Wang |
| 7,865,585 B2 | 1/2011 | Samuels et al. |
| 7,877,511 B1 | 1/2011 | Berger |
| 7,890,547 B2 | 2/2011 | Hotti |
| 7,890,624 B2 | 2/2011 | Bivens |
| 7,894,431 B2 | 2/2011 | Goring |
| 7,917,755 B1 | 3/2011 | Giliyaru |
| 7,929,429 B2 | 4/2011 | Bornstein |
| 7,929,535 B2 | 4/2011 | Chen et al. |
| 7,945,853 B2 | 5/2011 | Kothari et al. |
| 7,970,835 B2 | 6/2011 | St. Jacques |
| 7,984,110 B1 | 7/2011 | Raman |
| 7,886,302 B2 | 8/2011 | Kadashevich |
| 8,014,292 B1 | 9/2011 | Breau et al. |
| 8,041,784 B1 | 10/2011 | Amidon |
| 8,037,484 B2 | 11/2011 | Backhouse et al. |
| 8,135,912 B2 | 3/2012 | Shribman et al. |
| 8,144,611 B2 | 3/2012 | Agarwal |
| 8,156,275 B2 | 4/2012 | de Cesare |
| 8,166,179 B2 | 4/2012 | Pickens et al. |
| 8,171,101 B2 | 5/2012 | Gladwin et al. |
| 8,250,585 B2 | 8/2012 | Higgins et al. |
| 8,306,022 B1 | 11/2012 | Cranor |
| 8,375,434 B2 | 2/2013 | Cottrell |
| 8,413,044 B2 | 2/2013 | Mao |
| 8,527,862 B2 | 3/2013 | Scoda et al. |
| 8,370,649 B2 | 5/2013 | Sherer et al. |
| 8,453,227 B2 | 5/2013 | Aiello |
| 8,577,992 B1 | 5/2013 | Richardson et al. |
| 8,458,786 B1 | 6/2013 | Kailash |
| 8,464,350 B2 | 6/2013 | Kanevsky |

(56) References Cited

U.S. PATENT DOCUMENTS

| | | |
|---|---|---|
| 8,473,593 B1 | 6/2013 | Graham et al. |
| 8,438,375 B1 | 7/2013 | Woodward |
| 8,479,251 B2 | 7/2013 | Feinleib et al. |
| 8,489,724 B2 | 7/2013 | Ghosh |
| 8,499,059 B2 | 7/2013 | Stoyanov |
| 8,514,812 B2 | 8/2013 | Tang et al. |
| 8,516,084 B1 | 8/2013 | Grieve |
| 8,527,631 B1 | 9/2013 | Liang |
| 8,533,628 B2 | 9/2013 | Rohrabaugh |
| 8,543,721 B2 | 9/2013 | White et al. |
| 8,560,604 B2 | 10/2013 | Shribman et al. |
| 8,577,724 B1 | 11/2013 | Gandhi |
| 8,595,786 B2 | 11/2013 | Choi |
| 8,612,641 B1 | 12/2013 | Bozarth et al. |
| 8,627,422 B2 | 1/2014 | Hawkes |
| 8,639,630 B2 | 1/2014 | Fomenko et al. |
| 8,639,743 B1 | 1/2014 | Colton et al. |
| 8,769,035 B2 | 1/2014 | Resch et al. |
| 8,655,838 B2 | 2/2014 | Wright |
| 8,655,985 B2 | 2/2014 | De |
| 8,671,221 B2 | 3/2014 | Shribman et al. |
| 8,832,179 B2 | 9/2014 | Owen et al. |
| 8,874,594 B2 | 10/2014 | Want et al. |
| 8,935,798 B1 | 1/2015 | Smith |
| 8,972,602 B2 | 3/2015 | Mithyantha |
| 8,990,357 B2 | 3/2015 | Graham-Cumming |
| 8,996,856 B2 | 3/2015 | Amit |
| 9,015,335 B1 | 4/2015 | Gigliotti |
| 9,049,247 B2 | 6/2015 | Holloway |
| 9,059,938 B1 | 6/2015 | Strand |
| 9,100,320 B2 | 8/2015 | Hsy |
| 9,122,554 B2 | 9/2015 | Callaghan |
| 9,154,557 B2 | 10/2015 | Lev-Ran |
| 9,177,157 B2 | 11/2015 | Binder |
| 9,210,094 B1 | 12/2015 | Warren et al. |
| 9,237,210 B2 | 1/2016 | Liu |
| 9,253,164 B2 | 2/2016 | Gouge |
| 9,313,100 B1 | 4/2016 | Jenkins |
| 9,374,244 B1 | 6/2016 | Reed |
| 9,378,473 B2 | 6/2016 | Wolfe |
| 9,380,028 B2 | 6/2016 | Rizzo |
| 9,418,243 B2 | 8/2016 | Bauer |
| 9,380,523 B1 | 9/2016 | Mijar |
| 9,444,903 B2 | 9/2016 | Nuaimi |
| 9,584,529 B2 | 2/2017 | Su |
| 9,634,994 B2 | 4/2017 | Prince |
| 9,654,581 B2 | 5/2017 | Pollack et al. |
| 9,705,959 B1 | 7/2017 | Strand |
| 9,742,866 B2 | 8/2017 | Shribman |
| 9,769,121 B1 | 9/2017 | Joy et al. |
| 9,838,497 B2 | 12/2017 | Lawrence |
| 9,979,674 B1 | 5/2018 | Kumar |
| 10,069,852 B2 | 9/2018 | Turgeman et al. |
| 10,104,165 B1 | 10/2018 | Killian |
| 10,110,606 B2 | 10/2018 | Mizhar |
| 10,182,466 B2 | 1/2019 | Nirantar |
| 10,277,711 B2 | 4/2019 | Shribman |
| 10,361,911 B2 | 7/2019 | Brandwine |
| 10,404,791 B2 | 9/2019 | Puri |
| 10,410,244 B2 | 9/2019 | Toval |
| 10,484,337 B2 | 11/2019 | Subbarayan |
| 10,484,510 B2 | 11/2019 | Shribman |
| 10,511,630 B1 | 12/2019 | Weiss et al. |
| 10,560,509 B2 | 2/2020 | Lo |
| 10,594,660 B2 | 3/2020 | Smith |
| 10,601,948 B1 | 3/2020 | Juravicius |
| 10,601,984 B2 | 3/2020 | Olligschlaeger |
| 10,637,956 B1 | 4/2020 | Juravicius |
| 10,645,654 B1 | 5/2020 | Backholm |
| 10,650,166 B1 | 5/2020 | Sundberg |
| 10,652,357 B2 | 5/2020 | Shribman et al. |
| 10,743,051 B1 | 8/2020 | Reed |
| 10,749,893 B1 | 8/2020 | Dahlberg |
| 10,771,524 B1 | 9/2020 | Long |
| 10,798,209 B1 | 10/2020 | Juravicius et al. |
| 10,805,181 B2 | 10/2020 | Boutros et al. |
| 10,972,434 B2 | 4/2021 | Kupisiewicz et al. |
| 11,140,235 B1 | 10/2021 | Vilcinskas et al. |
| 11,258,872 B1 | 2/2022 | Gogel |
| 11,469,992 B2 | 10/2022 | Gerstel |
| 11,770,429 B2 * | 9/2023 | Shribman ............ H04L 65/612 709/219 |
| 2001/0011312 A1 | 8/2001 | Chu |
| 2001/0033583 A1 | 10/2001 | Rabenko et al. |
| 2001/0054020 A1 | 12/2001 | Barth |
| 2002/0007413 A1 | 1/2002 | Garcia-Luna-Aceves et al. |
| 2002/0026517 A1 | 2/2002 | Watson |
| 2002/0052947 A1 | 5/2002 | Duimovich et al. |
| 2002/0055956 A1 | 5/2002 | Krasnoiarov et al. |
| 2002/0059371 A1 | 5/2002 | Jamail |
| 2002/0059429 A1 | 5/2002 | Carpenter |
| 2002/0065922 A1 | 5/2002 | Shastri |
| 2002/0065930 A1 | 5/2002 | Rhodes |
| 2002/0069241 A1 | 6/2002 | Narlikar et al. |
| 2002/0073075 A1 | 6/2002 | Dutta |
| 2002/0073232 A1 | 6/2002 | Hong |
| 2002/0103823 A1 | 8/2002 | Jackson |
| 2002/0112036 A1 | 8/2002 | Bohannon |
| 2002/0112152 A1 | 8/2002 | VanHeyningen |
| 2002/0120874 A1 | 8/2002 | Shu et al. |
| 2002/0123895 A1 | 9/2002 | Potekhin |
| 2002/0169818 A1 | 11/2002 | Stewart |
| 2002/0178217 A1 | 11/2002 | Nguyen |
| 2002/0194183 A1 | 12/2002 | Yoakum |
| 2002/0194292 A1 | 12/2002 | King |
| 2003/0009518 A1 | 1/2003 | Harrow et al. |
| 2003/0009583 A1 | 1/2003 | Chan et al. |
| 2003/0018705 A1 | 1/2003 | Chen |
| 2003/0018834 A1 | 1/2003 | Eilers |
| 2003/0061282 A1 | 3/2003 | Ebata et al. |
| 2003/0074403 A1 | 4/2003 | Harrow et al. |
| 2003/0095520 A1 | 5/2003 | Aalbers |
| 2003/0097408 A1 | 5/2003 | Kageyama |
| 2003/0115364 A1 | 6/2003 | Shu et al. |
| 2003/0120805 A1 | 6/2003 | Couts |
| 2003/0149720 A1 | 8/2003 | Goldstein |
| 2003/0163413 A1 | 8/2003 | Wiczkowski |
| 2003/0174648 A1 | 9/2003 | Wang et al. |
| 2003/0187925 A1 | 10/2003 | Inala |
| 2003/0200307 A1 | 10/2003 | Raju et al. |
| 2003/0204602 A1 | 10/2003 | Hudson |
| 2003/0210694 A1 | 11/2003 | Jayaraman et al. |
| 2003/0212648 A1 | 11/2003 | Cunningham et al. |
| 2003/0217144 A1 | 11/2003 | Fu et al. |
| 2003/0229682 A1 | 12/2003 | Day |
| 2003/0229785 A1 | 12/2003 | Daseke |
| 2004/0044731 A1 | 3/2004 | Chen |
| 2004/0052257 A1 | 3/2004 | Abdo |
| 2004/0054748 A1 | 3/2004 | Ackaouy |
| 2004/0054800 A1 | 3/2004 | Shah |
| 2004/0068579 A1 | 4/2004 | Marmigere |
| 2004/0088646 A1 | 5/2004 | Yeager et al. |
| 2004/0111529 A1 | 6/2004 | Parmar |
| 2004/0117455 A1 | 6/2004 | Kaminsky |
| 2004/0133692 A1 | 7/2004 | Blanchet |
| 2004/0136370 A1 | 7/2004 | Moore et al. |
| 2004/0143665 A1 | 7/2004 | Mace |
| 2004/0153473 A1 | 8/2004 | Hutchinson |
| 2004/0199629 A1 | 10/2004 | Bomer |
| 2004/0212490 A1 | 10/2004 | Fredericks |
| 2004/0215717 A1 | 10/2004 | Seifert |
| 2004/0221207 A1 | 11/2004 | Yokota |
| 2004/0230593 A1 | 11/2004 | Rudin |
| 2004/0236962 A1 | 11/2004 | Wong |
| 2004/0257761 A1 | 12/2004 | Park |
| 2004/0263479 A1 | 12/2004 | Shkolnikov |
| 2004/0264506 A1 | 12/2004 | Furukawa |
| 2005/0018645 A1 | 1/2005 | Mustonen et al. |
| 2005/0027782 A1 | 2/2005 | Jalan |
| 2005/0050097 A1 | 3/2005 | Yeh |
| 2005/0060542 A1 | 3/2005 | Risan |
| 2005/0086328 A1 | 4/2005 | Landram et al. |
| 2005/0091540 A1 | 4/2005 | Dick |
| 2005/0096753 A1 | 5/2005 | Arling |

(56) References Cited

U.S. PATENT DOCUMENTS

| | | |
|---|---|---|
| 2005/0097217 A1 | 5/2005 | Val et al. |
| 2005/0097221 A1 | 5/2005 | James |
| 2005/0097441 A1 | 5/2005 | Herbach |
| 2005/0108244 A1 | 5/2005 | Riise |
| 2005/0108551 A1 | 5/2005 | Toomey |
| 2005/0125412 A1 | 6/2005 | Glover |
| 2005/0138426 A1 | 6/2005 | Styslinger |
| 2005/0165903 A1 | 7/2005 | Doan |
| 2005/0180319 A1 | 8/2005 | Hutnik |
| 2005/0198309 A1 | 9/2005 | Li et al. |
| 2005/0235044 A1 | 10/2005 | Tazuma |
| 2005/0289648 A1 | 12/2005 | Grobman et al. |
| 2006/0015545 A1 | 1/2006 | Ezra |
| 2006/0026304 A1 | 2/2006 | Price |
| 2006/0036755 A1 | 2/2006 | Abdullah |
| 2006/0039352 A1 | 2/2006 | Karstens |
| 2006/0059091 A1 | 3/2006 | Wang |
| 2006/0075114 A1 | 4/2006 | Panasyuk |
| 2006/0155995 A1 | 7/2006 | Torvinen |
| 2006/0184647 A1 | 8/2006 | Dixit |
| 2006/0200541 A1 | 9/2006 | Wikman et al. |
| 2006/0206586 A1 | 9/2006 | Ling |
| 2006/0212542 A1 | 9/2006 | Fang |
| 2006/0212584 A1 | 9/2006 | Yu et al. |
| 2006/0236083 A1 | 10/2006 | Fritsch |
| 2006/0242318 A1 | 10/2006 | Nettle |
| 2006/0256772 A1 | 11/2006 | Yarlagadda |
| 2006/0259607 A1 | 11/2006 | O'Neal et al. |
| 2006/0271438 A1 | 11/2006 | Shotland |
| 2006/0280191 A1 | 12/2006 | Nishida |
| 2006/0293052 A1 | 12/2006 | Orler |
| 2007/0011674 A1 | 1/2007 | Joo |
| 2007/0042332 A1 | 2/2007 | Leem |
| 2007/0047452 A1 | 3/2007 | Lohr |
| 2007/0050522 A1 | 3/2007 | Grove |
| 2007/0061440 A1 | 3/2007 | Sundaram |
| 2007/0073878 A1 | 3/2007 | Issa |
| 2007/0088821 A1 | 4/2007 | Sankuratripati |
| 2007/0100839 A1 | 5/2007 | Kim |
| 2007/0142036 A1 | 6/2007 | Wikman |
| 2007/0156855 A1 | 7/2007 | Johnson |
| 2007/0160072 A1 | 7/2007 | Thalanany et al. |
| 2007/0171921 A1 | 7/2007 | Wookey |
| 2007/0174442 A1 | 7/2007 | Sherman et al. |
| 2007/0177513 A1 | 8/2007 | Kuokkanen |
| 2007/0180111 A1 | 8/2007 | Chmaytelli |
| 2007/0226810 A1 | 9/2007 | Hotti |
| 2007/0239655 A1 | 10/2007 | Agetsuma et al. |
| 2007/0283026 A1 | 12/2007 | Lohmar |
| 2007/0299954 A1 | 12/2007 | Fatula |
| 2008/0008089 A1 | 1/2008 | Bornstein et al. |
| 2008/0010365 A1 | 1/2008 | Schneider |
| 2008/0025506 A1 | 1/2008 | Muraoka |
| 2008/0034416 A1 | 2/2008 | Kumar |
| 2008/0037536 A1 | 2/2008 | Padmanabhan |
| 2008/0052156 A1 | 2/2008 | Brenner |
| 2008/0071925 A1 | 3/2008 | Leighton |
| 2008/0072178 A1 | 3/2008 | Budzisch |
| 2008/0091812 A1 | 4/2008 | Lev-Ran |
| 2008/0098101 A1 | 4/2008 | Black |
| 2008/0109446 A1 | 5/2008 | Wang |
| 2008/0120427 A1 | 5/2008 | Ramanathan |
| 2008/0125123 A1 | 5/2008 | Dorenbosch et al. |
| 2008/0134258 A1 | 6/2008 | Goose et al. |
| 2008/0155016 A1 | 6/2008 | Tsai |
| 2008/0162700 A1 | 7/2008 | Aborn |
| 2008/0195712 A1 | 8/2008 | Lin et al. |
| 2008/0196098 A1 | 8/2008 | Cottrell |
| 2008/0201438 A1 | 8/2008 | Mandre |
| 2008/0209028 A1 | 8/2008 | Kurup |
| 2008/0214152 A1 | 9/2008 | Ramer |
| 2008/0222244 A1 | 9/2008 | Huang |
| 2008/0222267 A1 | 9/2008 | Horn |
| 2008/0222291 A1 | 9/2008 | Weller et al. |
| 2008/0225710 A1 | 9/2008 | Raja |
| 2008/0228537 A1 | 9/2008 | Monfried |
| 2008/0228938 A1 | 9/2008 | Plamondon |
| 2008/0235361 A1 | 9/2008 | Crosbie et al. |
| 2008/0235385 A1 | 9/2008 | Li |
| 2008/0235391 A1 | 9/2008 | Painter et al. |
| 2008/0235623 A1 | 9/2008 | Li |
| 2008/0235746 A1 | 9/2008 | Peters |
| 2008/0243735 A1 | 10/2008 | Rish |
| 2008/0256175 A1 | 10/2008 | Lee |
| 2008/0263180 A1 | 10/2008 | Hurst |
| 2008/0282112 A1 | 11/2008 | Bailey |
| 2008/0288973 A1 | 11/2008 | Carson |
| 2008/0298328 A1 | 12/2008 | Sharma |
| 2008/0320151 A1 | 12/2008 | McCanne |
| 2009/0010426 A1 | 1/2009 | Redmond |
| 2009/0016337 A1 | 1/2009 | Jorgensen |
| 2009/0037529 A1 | 2/2009 | Armon-Kest |
| 2009/0037977 A1 | 2/2009 | Gai |
| 2009/0055471 A1 | 2/2009 | Kozat |
| 2009/0055749 A1 | 2/2009 | Chatterjee |
| 2009/0070489 A1 | 3/2009 | Lu |
| 2009/0077233 A1 | 3/2009 | Kurebayashi |
| 2009/0222554 A1 | 3/2009 | Schneider |
| 2009/0100005 A1 | 4/2009 | Guo |
| 2009/0106551 A1 | 4/2009 | Boren |
| 2009/0136219 A1 | 5/2009 | Kikugawa |
| 2009/0138538 A1 | 5/2009 | Klein |
| 2009/0150534 A1 | 6/2009 | Miller |
| 2009/0150930 A1 | 6/2009 | Sherwin |
| 2009/0157850 A1 | 6/2009 | Gagliardi |
| 2009/0161554 A1 | 6/2009 | Agarwal |
| 2009/0177761 A1 | 7/2009 | Meyer |
| 2009/0182843 A1 | 7/2009 | Hluchyj |
| 2009/0187654 A1 | 7/2009 | Raja |
| 2009/0193498 A1 | 7/2009 | Agarwal |
| 2009/0199000 A1 | 8/2009 | Hsu |
| 2009/0204700 A1 | 8/2009 | Sudhaka |
| 2009/0216887 A1 | 8/2009 | Hertle |
| 2009/0217122 A1 | 8/2009 | Yokokawa et al. |
| 2009/0217351 A1 | 8/2009 | Burch |
| 2009/0222515 A1 | 9/2009 | Thompson |
| 2009/0228603 A1 | 9/2009 | Ritzau et al. |
| 2009/0232003 A1 | 9/2009 | Vasseur |
| 2009/0234970 A1 | 9/2009 | Sun |
| 2009/0248793 A1 | 10/2009 | Jacobsson |
| 2009/0262724 A1 | 10/2009 | Suzuki |
| 2009/0278506 A1 | 11/2009 | Winger |
| 2009/0279559 A1 | 11/2009 | Wong et al. |
| 2009/0300208 A1 | 12/2009 | Lepeska |
| 2009/0313318 A1 | 12/2009 | Dye |
| 2009/0319502 A1 | 12/2009 | Chalouhi et al. |
| 2009/0320119 A1 | 12/2009 | Hicks |
| 2009/0327489 A1 | 12/2009 | Swildens |
| 2010/0030839 A1 | 2/2010 | Ceragioli |
| 2010/0031183 A1 | 2/2010 | Kang |
| 2010/0036954 A1 | 2/2010 | Sakata |
| 2010/0042724 A1 | 2/2010 | Jeon |
| 2010/0066808 A1 | 3/2010 | Tucker et al. |
| 2010/0067703 A1 | 3/2010 | Candelore |
| 2010/0082513 A1 | 4/2010 | Liu |
| 2010/0085977 A1 | 4/2010 | Khalid et al. |
| 2010/0094970 A1 | 4/2010 | Zuckerman et al. |
| 2010/0095208 A1 | 4/2010 | White |
| 2010/0100952 A1 | 4/2010 | Sample |
| 2010/0105443 A1 | 4/2010 | Vaisanen |
| 2010/0115613 A1 | 5/2010 | Ramaswami |
| 2010/0125673 A1 | 5/2010 | Richardson |
| 2010/0125675 A1 | 5/2010 | Richardson |
| 2010/0115063 A1 | 6/2010 | Gladwin et al. |
| 2010/0145925 A1 | 6/2010 | Flinta |
| 2010/0146569 A1 | 6/2010 | Janardhan |
| 2010/0154044 A1 | 6/2010 | Manku |
| 2010/0161752 A1 | 6/2010 | Collet |
| 2010/0161756 A1 | 6/2010 | Lewis |
| 2010/0161760 A1 | 6/2010 | Maloo |
| 2010/0161799 A1 | 6/2010 | Maloo |
| 2010/0162126 A1 | 6/2010 | Donaldson |
| 2010/0180082 A1 | 7/2010 | Sebastian |
| 2010/0235438 A1 | 9/2010 | Narayanan et al. |

(56) References Cited

U.S. PATENT DOCUMENTS

| | | |
|---|---|---|
| 2010/0235473 A1 | 9/2010 | Koren |
| 2010/0293555 A1 | 11/2010 | Vepsalainen |
| 2010/0322237 A1 | 12/2010 | Raja |
| 2010/0329270 A1 | 12/2010 | Asati et al. |
| 2011/0007665 A1 | 1/2011 | Dinur |
| 2011/0022582 A1 | 1/2011 | Unnikrishnan |
| 2011/0023125 A1 | 1/2011 | Kim |
| 2011/0035503 A1 | 2/2011 | Zaid |
| 2011/0066924 A1 | 3/2011 | Dorso |
| 2011/0087733 A1 | 4/2011 | Shribman et al. |
| 2011/0106972 A1 | 5/2011 | Grube |
| 2011/0117938 A1 | 5/2011 | Pyo |
| 2011/0128911 A1 | 6/2011 | Shaheen |
| 2011/0137973 A1 | 6/2011 | Wei |
| 2011/0145317 A1 | 6/2011 | Serban et al. |
| 2011/0154477 A1 | 6/2011 | Parla |
| 2011/0173345 A1 | 7/2011 | Knox |
| 2011/0218866 A1 | 9/2011 | Wilson |
| 2011/0282997 A1 | 11/2011 | Prince |
| 2011/0314347 A1 | 12/2011 | Nakano et al. |
| 2011/0320589 A1 | 12/2011 | Hietala |
| 2012/0002815 A1 | 1/2012 | Wei et al. |
| 2012/0023212 A1 | 1/2012 | Roth |
| 2012/0036220 A1 | 2/2012 | Dare |
| 2012/0059934 A1 | 3/2012 | Rafiq et al. |
| 2012/0096116 A1 | 4/2012 | Mislove |
| 2012/0099566 A1 | 4/2012 | Laine et al. |
| 2012/0117641 A1 | 5/2012 | Holloway et al. |
| 2012/0124173 A1 | 5/2012 | De et al. |
| 2012/0124239 A1 | 5/2012 | Shribman et al. |
| 2012/0124384 A1 | 5/2012 | Livni et al. |
| 2012/0136926 A1 | 5/2012 | Dillon |
| 2012/0144047 A1 | 6/2012 | Armstrong |
| 2012/0164980 A1 | 6/2012 | Van Phan |
| 2012/0166582 A1 | 6/2012 | Binder |
| 2012/0166611 A1 | 6/2012 | Kim |
| 2012/0185947 A1 | 7/2012 | Phillips |
| 2012/0198524 A1 | 8/2012 | Celebisoy |
| 2012/0209945 A1 | 8/2012 | Chandrasekhar |
| 2012/0239811 A1 | 9/2012 | Kohli |
| 2012/0246273 A1 | 9/2012 | Bornstein |
| 2012/0254370 A1 | 10/2012 | Bacher |
| 2012/0254456 A1 | 10/2012 | Visharam et al. |
| 2012/0254960 A1 | 10/2012 | Lortz |
| 2012/0264520 A1 | 10/2012 | Marsland |
| 2012/0290717 A1 | 11/2012 | Luna |
| 2012/0297041 A1 | 11/2012 | Momchilov |
| 2012/0310906 A1 | 12/2012 | Miller et al. |
| 2012/0323674 A1 | 12/2012 | Simmons |
| 2013/0007031 A1 | 1/2013 | Makino |
| 2013/0007232 A1 | 1/2013 | Wang |
| 2013/0007253 A1 | 1/2013 | Li |
| 2013/0019258 A1 | 1/2013 | Bhatia |
| 2013/0046817 A1 | 2/2013 | Isbister |
| 2013/0047020 A1 | 2/2013 | Hershko |
| 2013/0067085 A1 | 3/2013 | Hershko et al. |
| 2013/0067086 A1 | 3/2013 | Hershko |
| 2013/0072233 A1 | 3/2013 | Sandholm |
| 2013/0080498 A1 | 3/2013 | Desilva |
| 2013/0080575 A1 | 3/2013 | Prince |
| 2013/0081129 A1 | 3/2013 | Niemelä |
| 2013/0083800 A1 | 4/2013 | Lezama Bounine |
| 2013/0091273 A1 | 4/2013 | Ly |
| 2013/0117413 A1 | 5/2013 | Kaneko |
| 2013/0145017 A1 | 6/2013 | Luna |
| 2013/0151709 A1 | 6/2013 | Luna |
| 2013/0157699 A1 | 6/2013 | Talwar |
| 2013/0166768 A1 | 6/2013 | Gouache et al. |
| 2013/0167045 A1 | 6/2013 | Xu |
| 2013/0173756 A1 | 7/2013 | Luna |
| 2013/0201316 A1 | 8/2013 | Binder et al. |
| 2013/0212462 A1 | 8/2013 | Athas |
| 2013/0219281 A1 | 8/2013 | Trevelyan |
| 2013/0219458 A1 | 8/2013 | Ramanathan |
| 2013/0263280 A1 | 10/2013 | Cote |
| 2013/0268357 A1 | 10/2013 | Heath |
| 2013/0272519 A1 | 10/2013 | Huang |
| 2013/0304796 A1 | 11/2013 | Jackowski |
| 2013/0326607 A1 | 12/2013 | Feng |
| 2013/0339477 A1 | 12/2013 | Majeti |
| 2013/0340031 A1 | 12/2013 | Amit |
| 2014/0013001 A1 | 1/2014 | Cox |
| 2014/0040035 A1 | 2/2014 | Cusack |
| 2014/0078462 A1 | 3/2014 | Abreu |
| 2014/0082260 A1 | 3/2014 | Oh et al. |
| 2014/0122580 A1 | 5/2014 | Nuaimi |
| 2014/0122865 A1 | 5/2014 | Ovsiannikov |
| 2014/0133392 A1 | 5/2014 | Das et al. |
| 2014/0189802 A1 | 7/2014 | Montgomery |
| 2014/0199044 A1 | 7/2014 | Gupta |
| 2014/0201323 A1 | 7/2014 | Fall |
| 2014/0201616 A1 | 7/2014 | Turner et al. |
| 2014/0215391 A1 | 7/2014 | Little et al. |
| 2014/0222798 A1 | 8/2014 | Want et al. |
| 2014/0222963 A1 | 8/2014 | Gangadharan |
| 2014/0222974 A1 | 8/2014 | Liu |
| 2014/0223537 A1 | 8/2014 | Islam |
| 2014/0244727 A1* | 8/2014 | Kang .................. H04L 65/1069 709/203 |
| 2014/0244778 A1 | 8/2014 | Wyatt |
| 2014/0244830 A1 | 8/2014 | Smacinih |
| 2014/0258465 A1 | 9/2014 | Li |
| 2014/0259093 A1 | 9/2014 | Narayanaswamy |
| 2014/0280884 A1 | 9/2014 | Searle et al. |
| 2014/0283068 A1 | 9/2014 | Call et al. |
| 2014/0301334 A1 | 10/2014 | Labranche et al. |
| 2014/0310709 A1 | 10/2014 | Nirantar |
| 2014/0337308 A1 | 11/2014 | De Francisci Morales |
| 2014/0344908 A1 | 11/2014 | Rizzo |
| 2014/0359081 A1 | 12/2014 | Van Deventer |
| 2014/0372624 A1* | 12/2014 | Wang .................. H04L 12/189 709/231 |
| 2014/0372627 A1 | 12/2014 | Axelrod |
| 2014/0376403 A1 | 12/2014 | Shao |
| 2015/0006615 A1 | 1/2015 | Wainner |
| 2015/0016261 A1 | 1/2015 | Backholm |
| 2015/0026239 A1 | 1/2015 | Hofmann |
| 2015/0026341 A1 | 1/2015 | Blacka |
| 2015/0032803 A1 | 1/2015 | Graham-Cumming |
| 2015/0033001 A1 | 1/2015 | Ivanov |
| 2015/0036485 A1 | 2/2015 | Poulson |
| 2015/0039674 A1 | 2/2015 | Agarwal |
| 2015/0067819 A1 | 3/2015 | Shribman et al. |
| 2015/0120863 A1 | 4/2015 | Wu |
| 2015/0135302 A1 | 5/2015 | Cohen |
| 2015/0143456 A1 | 5/2015 | Raleigh et al. |
| 2015/0149431 A1 | 5/2015 | Trevelyan |
| 2015/0153810 A1 | 6/2015 | Sasidharan et al. |
| 2015/0172324 A1 | 6/2015 | Calme |
| 2015/0172406 A1 | 6/2015 | Hansen |
| 2015/0208352 A1 | 7/2015 | Backholm |
| 2015/0215426 A1 | 7/2015 | Torii et al. |
| 2015/0237159 A1 | 8/2015 | Lawrence et al. |
| 2015/0244839 A1 | 8/2015 | Horn |
| 2015/0268905 A1 | 9/2015 | Chakirov |
| 2015/0295988 A1 | 10/2015 | Goodwin |
| 2015/0317218 A1 | 11/2015 | Verde |
| 2015/0347118 A1 | 12/2015 | Yeung |
| 2015/0350362 A1 | 12/2015 | Pollack |
| 2015/0358648 A1 | 12/2015 | Limberg |
| 2015/0372972 A1 | 12/2015 | Kennedy |
| 2016/0021430 A1 | 1/2016 | Labosco et al. |
| 2016/0035019 A1 | 2/2016 | Rosner |
| 2016/0056880 A1 | 2/2016 | Yamasaki et al. |
| 2016/0077547 A1 | 3/2016 | Aimone |
| 2016/0098049 A1 | 4/2016 | Fan |
| 2016/0105530 A1 | 4/2016 | Shribman |
| 2016/0140405 A1 | 5/2016 | Graumann |
| 2016/0170814 A1 | 6/2016 | Li |
| 2016/0173452 A1 | 6/2016 | Seo |
| 2016/0188657 A1 | 6/2016 | Montana |
| 2016/0205028 A1 | 7/2016 | Luna |
| 2016/0205557 A1 | 7/2016 | Tuupola et al. |
| 2016/0232538 A1 | 8/2016 | Papakostas et al. |

(56) References Cited

U.S. PATENT DOCUMENTS

| | | |
|---|---|---|
| 2016/0241664 A1 | 8/2016 | Xia |
| 2016/0162706 A1 | 9/2016 | Famulari |
| 2016/0261688 A1 | 9/2016 | Anand |
| 2016/0269369 A1 | 9/2016 | Thomson |
| 2016/0294956 A1 | 10/2016 | Fix |
| 2016/0323409 A1 | 11/2016 | Kölhi |
| 2016/0337464 A1 | 11/2016 | Eriksson |
| 2016/0352628 A1 | 12/2016 | Reddy et al. |
| 2016/0365989 A1 | 12/2016 | Herrero |
| 2016/0366233 A1 | 12/2016 | Le |
| 2016/0380778 A1 | 12/2016 | Shen et al. |
| 2017/0006075 A1 | 1/2017 | Li |
| 2017/0041416 A1 | 2/2017 | Zhou |
| 2017/0048192 A1 | 2/2017 | Herrero |
| 2017/0094710 A1 | 3/2017 | Nirantar |
| 2017/0118313 A1 | 4/2017 | Aladdin et al. |
| 2017/0155654 A1 | 6/2017 | Burke |
| 2017/0187472 A1 | 6/2017 | Chini et al. |
| 2017/0230434 A1 | 8/2017 | Wang |
| 2017/0250861 A1 | 8/2017 | Gheorghe |
| 2017/0272316 A1 | 9/2017 | Johnson |
| 2017/0331869 A1 | 11/2017 | Bendahan et al. |
| 2017/0339253 A1 | 11/2017 | Pathak |
| 2017/0359349 A1 | 12/2017 | Knecht |
| 2017/0374566 A1 | 12/2017 | Backholm |
| 2018/0019909 A1 | 1/2018 | Tanabe et al. |
| 2018/0020324 A1 | 1/2018 | Beauford |
| 2018/0027112 A1 | 1/2018 | Baldassari et al. |
| 2018/0034766 A1 | 2/2018 | Chiba |
| 2018/0042067 A1 | 2/2018 | Nirantar |
| 2018/0047072 A1 | 2/2018 | Chow |
| 2018/0063228 A1 | 3/2018 | Deen |
| 2018/0077624 A1 | 3/2018 | Jung |
| 2018/0070129 A1 | 5/2018 | Cholas et al. |
| 2018/0124123 A1 | 5/2018 | Moore et al. |
| 2018/0131668 A1 | 5/2018 | Prince |
| 2018/0146378 A1 | 5/2018 | Christmas et al. |
| 2018/0167336 A1 | 6/2018 | Lawrence |
| 2018/0213038 A1 | 7/2018 | Chung |
| 2018/0213060 A1 | 7/2018 | Koonce |
| 2018/0219830 A1 | 8/2018 | O'Brien |
| 2018/0225387 A1 | 8/2018 | Pang |
| 2018/0226760 A1 | 8/2018 | Bolouri-Saransar et al. |
| 2018/0227210 A1 | 8/2018 | Cosgrove |
| 2018/0234364 A1 | 8/2018 | Gong et al. |
| 2018/0262388 A1 | 9/2018 | Johnson |
| 2018/0302292 A1 | 10/2018 | Khurana et al. |
| 2018/0349354 A1 | 12/2018 | Gonzalez |
| 2018/0363572 A1 | 12/2018 | Glugla et al. |
| 2018/0367433 A1 | 12/2018 | Luna |
| 2018/0367560 A1 | 12/2018 | Mahaffey |
| 2018/0375828 A1 | 12/2018 | Rawat |
| 2018/0375896 A1 | 12/2018 | Wang |
| 2018/0375952 A1 | 12/2018 | Knecht |
| 2019/0028548 A1 | 1/2019 | Lauer |
| 2019/0033845 A1 | 1/2019 | Cella |
| 2019/0036777 A1 | 1/2019 | Frizzell |
| 2019/0037047 A1 | 1/2019 | Shribman |
| 2019/0041934 A1 | 2/2019 | Tan et al. |
| 2019/0050164 A1 | 2/2019 | Kotian |
| 2019/0059083 A1 | 2/2019 | Backholm |
| 2019/0068740 A1 | 2/2019 | Graham-Cumming |
| 2019/0098518 A1 | 3/2019 | Luna |
| 2019/0102280 A1 | 4/2019 | Caldato |
| 2019/0110173 A1 | 4/2019 | Collier |
| 2019/0116236 A1 | 4/2019 | He |
| 2019/0124018 A1 | 4/2019 | Zhang |
| 2019/0137594 A1 | 5/2019 | Annamalai et al. |
| 2019/0138560 A1 | 5/2019 | Holloway |
| 2019/0140467 A1 | 5/2019 | Abiri et al. |
| 2019/0155665 A1 | 5/2019 | Bott |
| 2019/0166520 A1 | 5/2019 | Luna |
| 2019/0171474 A1 | 6/2019 | Malboubi |
| 2019/0174449 A1 | 6/2019 | Shan |
| 2019/0180316 A1 | 6/2019 | Toval |
| 2019/0182034 A1 | 6/2019 | McCarthy et al. |
| 2019/0199611 A1 | 6/2019 | Kotadia |
| 2019/0238510 A1 | 8/2019 | Li |
| 2019/0260859 A1 | 8/2019 | Patil |
| 2019/0268308 A1 | 8/2019 | Sinha |
| 2019/0334864 A1 | 10/2019 | Yin et al. |
| 2019/0372878 A1 | 12/2019 | Chakra |
| 2019/0373083 A1 | 12/2019 | Nucci |
| 2019/0379766 A1 | 12/2019 | Decenzo |
| 2019/0385057 A1 | 12/2019 | Litichever et al. |
| 2019/0387430 A1 | 12/2019 | Ingerman |
| 2020/0007494 A1 | 1/2020 | Prince |
| 2020/0083706 A1 | 3/2020 | Paskov et al. |
| 2020/0136911 A1 | 4/2020 | Assali |
| 2020/0159622 A1 | 5/2020 | Chintagunta |
| 2020/0162432 A1 | 5/2020 | Ludin |
| 2020/0169536 A1 | 5/2020 | Santelia |
| 2020/0184035 A1 | 6/2020 | Santelia |
| 2020/0186614 A1 | 6/2020 | Luna |
| 2020/0205058 A1 | 6/2020 | Yoshikawa |
| 2020/0220746 A1 | 7/2020 | Shribman et al. |
| 2020/0259893 A1 | 8/2020 | James |
| 2020/0287867 A1 | 9/2020 | Knecht |
| 2020/0296036 A1 | 9/2020 | Chu |
| 2020/0358858 A1 | 11/2020 | Shribman |
| 2021/0058271 A1 | 2/2021 | Sung |
| 2021/0075860 A1 | 3/2021 | Binder et al. |
| 2021/0159548 A1 | 5/2021 | Deng et al. |
| 2021/0194986 A1 | 6/2021 | Shribman et al. |
| 2021/0234721 A1 | 7/2021 | Shribman et al. |
| 2022/0070216 A1 | 3/2022 | Kohavi |
| 2022/0103523 A1 | 3/2022 | Starr et al. |
| 2022/0164400 A1 | 5/2022 | Holloway |
| 2022/0173924 A1 | 6/2022 | Shribman et al. |

FOREIGN PATENT DOCUMENTS

| | | |
|---|---|---|
| CN | 102314348 | 1/2012 |
| CN | 105245607 B | 1/2016 |
| CN | 106534244 A | 3/2017 |
| CN | 106547793 A | 3/2017 |
| CN | 107832355 A | 3/2018 |
| CN | 107864143 A | 3/2018 |
| CN | 108551452 | 9/2018 |
| CN | 108924199 A | 11/2018 |
| CN | 110062025 A | 7/2019 |
| CN | 110071980 A | 7/2019 |
| CN | 110147271 A | 8/2019 |
| EP | 0948176 A2 | 10/1999 |
| EP | 1672826 | 6/2006 |
| EP | 2597869 A1 | 5/2015 |
| EP | 2922275 B1 | 3/2016 |
| EP | 3272105 | 3/2016 |
| GB | 2418108 A | 3/2006 |
| JP | H11-355302 | 12/1999 |
| JP | 2007280388 | 10/2007 |
| KR | 1020090097034 | 9/2009 |
| WO | 97/42582 A1 | 11/1997 |
| WO | 2000/018078 A1 | 3/2000 |
| WO | 2004094980 A2 | 11/2004 |
| WO | 2007/136665 | 11/2007 |
| WO | 2009/086134 A1 | 7/2009 |
| WO | 2010/014747 A2 | 2/2010 |
| WO | 2010090562 A1 | 8/2010 |
| WO | 2011/005390 A2 | 1/2011 |
| WO | 2011068784 A1 | 9/2011 |
| WO | 2015034752 A1 | 3/2015 |
| WO | 2015/157646 | 10/2015 |
| WO | 2016/123293 A1 | 8/2016 |
| WO | 2016181383 | 11/2016 |
| WO | 2016/198961 A2 | 12/2016 |
| WO | 2019/043687 | 3/2019 |

OTHER PUBLICATIONS

Sophie Gastellier-Prevost et al., "Defeating pharming attacks at the client-side", Network and System Security (NSS), Sep. 6, 2011 (8 pages).

(56) References Cited

OTHER PUBLICATIONS

Bharat K et al. "Mirror, Mirror on the Web: a study of host pairs with replicated content", Computer Networks, Amsterdam, vol. 31, No. 11-16, May 17, 1999 (12 pages).
European Search Report of EP 20190259 dated Dec. 16, 2020.
European Search Report of EP 20195090 dated Dec. 8, 2020.
W3C, Glossary of Terms for Device Independence, Jan. 2005 (12 pages).
RFC 1001: Protocol Standard for a NetBIOS Service on a TCP/UDP Transport: Concepts and Methods, Mar. 1987 (68 pages).
RFC 1630: Universal Resource Identifiers in WWW, Jun. 1994 (28 pages).
RFC 2960: Stream Control Transmission Protocol, Oct. 2000 (134 pages).
RFC 6520: Transport Layer Security (TLS) and Datagram Transport Layer Security (DTLS) Heartbeat Extension, Feb. 2012 (9 pages).
L.L. Peterson, B.S. Davie, Computer Networks: A Systems Approach, 4th ed., San Francisco, CA, 2007 (20 pages).
Mell et al., "Creating a Patch and Vulnerability Management Program", NIST Special Publication 800-40 Version 2.0, 2005 (76 pages).
Rowstron et al., "Pastry: Scalable, Decentralized Object Location, and Routing for Large-Scale Peer-to-Peer Systems", IFIP/ACM International Conference on Distributed Systems Platforms and Open Distributed Processing: Middleware 2001, pp. 329-350 (22 pages).
Ratnasamy, et al., "Topologically aware overlay construction and server selection", Proceedings Twenty-First Annual Joint Conference of the IEEE Computer and Communications Societies, vol. 3, pp. 1190-1199 (2002) (10 pages).
Padmanabhan et al., "An Investigation of Geographic Mapping Techniques for Internet Hosts", ACM SIGCOMM Computer Communication Review, vol. 3, No. 4, pp. 173-185 (2001) (13 pages).
Freedman et al., "OASIS: Anyeast for Any Service", Proceedings of the 3rd Conference on Networked Systems Design & Implementation, vol. 3, pp. 129-142 (2006) (14 pages).
Agarwal et al., "Matchmaking for Online Games and Other Latency-Sensitive P2P Systems", ACM SIGCOMM Computer Communication Review, vol. 39. No. 4, pp. 315-326 (2009) (12 pages).
H. Casanova, "Benefits and Drawbacks of Redundant Batch Requests", Journal of Grid Computing, vol. 5, pp. 235-250 (2007) (16 pages).
S. J. Murdoch, "New Tor distribution for testing: Tor Browser Bundle", Jan. 30, 2008 post to tor-talk mailing list (1 page).
Erich Gamma et al., Design Patterns: Elements of Reusable Object-Oriented Software (1st ed., 1994) (12 pages).
L.J Fogel et al., "Modeling the Human Operator with Finite-State Machines" NASA Contractor Report (Jul. 1968) (238 pages).
MacPherson Decl. Exh. A, IEEE 802.11-2007—Telecommunications and Information Exchange Between Systems—Local and Metropolitan Area Networks—Specific Requirements—Part 11: Wireless LAN Medium Access Control (MAC) and Physical Layer (PHY) Specifications, Revision of ANSI/IEEE Std 802.11, 1999 Edition (R2003) (1236 pages).
W. R. Stevens "TCP/IP Illustrated, vol. I: The Protocols", Addison Wesley Longman, Inc. 1994 (67 pages).
Michael J. Freedman et al., "Democratizing content publication with Coral", In Proc. 1st Symposium, Mar. 2004 (14 pages).
Andy Oram, "Peer-to-Peer: Harnessing the Power of Disruptive Technology", Chapters Accountability and Free Haven, First Edition Mar. 2001 (265 pages).
RFC 2109, HTTP State Management Mechanism, Feb. 1997 (21 pages).
Michael J. Freedman, Princeton University, "Experiences with CoralCDN: a five-year operational view", Proceeding NSDI'10 Proceedings of the 7th USENIX conference on Networked systems design and implementation San Jose, California—Apr. 28-30, 2010 (17 pages).
"The BitTorrent Protocol Specification", Website: https://web.archive.org/web/20120513011037/http:/www.bittorrent.org/beps/bep_0003.html describing BitTorrent dated Jan. 10, 2008 downloaded using web archive on Aug. 16, 2019 (6 pages).
"BitTorrent", Website: https://en.wikipedia.org/w/index.php?title=BitTorrent&oldid=530466721 describing BitTorrent dated Dec. 30, 2012 downloaded using Wikipedia on Aug. 16, 2019 (9 pages).
"VIP SOCKS/VPN Service", Website: http://vip72.com:80/?drgn=1 describing VIP72 proxy service dated Jan. 2010 downloaded using VIP Technologies webpage on Aug. 16, 2019 (3 pages).
"Welcome to Easy Hide IP", Website: https://web.archive.org/web/20130702093456/http://www.easy-hide-ip.com:80/ describing Easy Hide IP dated Jun. 26, 2007 downloaded using web archive on Aug. 16, 2019 (2 pages).
"You make it fun; we'll make it run", Website: https://web.archive.org/web/20130726050810/https://www.coralcdn.org describing CoralCDN dated Jan. 25, 2005 downloaded using web archive on Aug. 16, 2019 (2 pages).
"Net Transport", Website: http://www.xi-soft.com/default.htm describing Net Transport Overview dated 2005 downloaded using Net Transport webpage on Aug. 16, 2019 (2 pages).
Net Transport—Develop History, Website: http://www.xi-soft.com/download.htm describing Net Transport Download dated 2005 downloaded using Net Transport webpage on Aug. 16, 2019 (10 pages).
Net Transport FAQ, Website: http://www.xi-soft.com/faq.htm describing Net Transport FAQ dated 2005 downloaded using Net Transport webpage on Aug. 16, 2019 (4 pages).
Net Transport News, Website: http://www.xi-soft.com/news.htm describing Net Transport News dated 2005 downloaded using Net Transport webpage on Aug. 16, 2019 (5 pages).
Kozierok, The TCP/IP Guide—TCP Connection Preparation, Apr. 6, 2005 (3 pages).
Jovovic, Turning your HD TV into an Android SmartTV is easier than you think!, Feb. 26, 2013 (3 pages).
Allen, A Software Developer's Guide to HTTP Part III—Connections, Jan. 26, 2012 (10 pages).
Google Scholar: MorphMix citation in Alessandro Acquisti, et al., Digital Privacy: Theory, Technologies, and Practices (2007) (2 pages).
RFC 959, File Transfer Protocol (FTP), Oct. 1985 (69 pages).
RFC 821, Jonathan B. Postel, Simple Mail Transfer Protocol, Aug. 1982 (70 pages).
RFC 918, Post Office Protocol, Oct. 1984 (5 pages).
RFC 937, Post Office Protocol—Version 2, Feb. 1985 (24 pages).
Roger Dingledine et al., "The Free Haven Project: Distributed Anonymous Storage Service", Dec. 17, 2000 (23 pages).
Michael Freedman et al., "Tarzan: A Peer-to-Peer Anonymizing Network Layer", Nov. 18-22, 2002 (14 pages).
Michael K. Reiter and Aviel D. Rubin, "Crowds: Anonymity for Web Transactions", ACM Transactions on Information and System Security, Nov. 1998 (27 pages).
Rennhard, Marc, "MorphMix—A Peer-to-Peer based System for Anonymous Internet Access", 2004 (307 pages).
Ari Luotonen, "Web Proxy Servers," ISBN-10: 0136806120, ISBN-13: 978-0136806127, Prentice Hall; 1st Ed. 1998 (452 pages).
RFC 760, DOD Standard Internet Protocol, Jan. 1980 (46 pages).
RFC 2547, BGP/MPLS VPNs, Mar. 1999 (25 pages).
RFC 1180, A TCP/IP Tutorial, Jan. 1991 (28 pages).
RFC 1122, Requirements for Internet Hosts—Communication Layers, Oct. 1989 (116 pages).
Andrei Popescu, Google, Inc, Geolocation API Specification, W3C Working Draft Dec. 22, 2008 (8 pages).
Andrei Popescu, Google, Inc, Geolocation API Specification, W3C Recommendation Oct. 24, 2013 (10 pages).
Yong Wang, et. al., Towards Street-Level Client-Independent IP Geolocation, 2011 (14 pages).
William R. Stanek, Introducing Microsoft Windows Vista 81, 2006 (9 pages).
Gavin Gear, Windows 8 Task Manager In-Depth, Jun. 6, 2013 (32 pages).
Greg Shultz, Windows Vista's Task Manager: The harder-to-detect changes—TechRepublic, Feb. 21, 2007 (16 pages).
Scott Lowe, Use Resource Monitor to monitor network performance—TechRepublic, Jul. 29, 2011 (11 pages).

(56) References Cited

OTHER PUBLICATIONS

IETF RFC 2914, "Congestion Control Principles", Sep. 2000 (17 pages).
IETF RFC 4026, "Provider Provisioned Virtual Private Network (VPN) Terminology", Mar. 2005 (20 pages).
IEEE Std 802-2001, IEEE Standard for Local and Metropolitan Area Networks: Overview and Architecture, Feb. 7, 2002 (47 pages).
"Tunneling for Transparency: A Large-Scale Analysis of End-to-End Violations in the Internet", Taejoong Chung, David Choffnes, and Alan Mislove, all of Northeastern University, IMC 2016, Nov. 14-16, 2016, Santa Monica, CA, USA, [DOI: http://dx.doi.org/10.1145/2987443.2987455] (16 pages).
N. Gautam, "Performance Analysis and Optimization of Web Proxy Servers and Mirror Sites", European Journal Operational Research 142 (2002), 396-418 (23 pages).
Andrew Daviel et al., Geographic extensions for HTTP transactions, Dec. 7, 2007 (15 pages).
HTTPS FAQ, The HTTPS-Only Standard, Jul. 6, 2015 (3 pages).
RFC 2818, "HTTP Over TLS", May 2000 (7 pages).
RFC 1866, "Hypertext Markup Language—2.0", Nov. 1995 (77 pages).
"Slice Embedding Solutions for Distributed Service Architectures"—Esposito et al., Boston University, Computer Science Dept., Oct. 2011 http://www.cs.bu.edu/techreports/pdf/2011-025-slice-embedding.pdf.
Octoparse Blog: "Top 20 Web Crawling Tools to Scrape the Websites Quickly", Aug. 23, 2019 (15 pages).
Berners-Lee et al., RFC 1945, Hypertext Transfer Protocol, HTTP/1.0 (May 1996) (60 pages).
Leech et al., RFC 1928, Socks Protocol, Version 5 (Internet Engineering Task Force, Network Working Group, Mar. 1996) (9 pages).
Wessels, "Squid: The Definitive Guide," ISBN-10: 9780596001629, ISBN-13: 978-0596001629, O'Reilly Media; 1st Ed. (Jan. 1, 2004) (468 pages).
Luotonen, "Web Proxy Servers," ISBN-10: 0136806120, ISBN-13: 978-0136806127, Prentice Hall; 1st Ed. (Dec. 30, 1997) (452 pages).
Loutonen et al., "World-Wide Web proxies," Computer Networks and ISDN Systems 27, 147-154 (Elsevier Science B.V.) (1994) (8 pages).
Cooper et al., RFC 3040, Internet Web Replication and Caching Taxonomy (Jan. 2001) (32 pages).
ISO/IEC 23009-1:2012(E), MPEG-DASH standard, Jan. 5, 2012 (133 pages).
Proxylist.net, as captured by the Wayback Machine (web.archive.org), on Jul. 17, 2011 (1 page).
Printout of VIP72 Youtube web page at https://www.youtube.com/watch?v=L0Hct2kSnn4, retrieved Nov. 21, 2019 (1 page).
VIP72 Scene Images extracted from VIP72.com/nvpnnet, MPEG-4 video recording of "nVPN.net | Double your Safety and use Socks5 +nVpn", accessed from https://www.youtube.com/watch?v=L0Hct2kSnn4, published Sep. 11, 2011 (221 pages).
Certification dated Nov. 8, 2019 of Anjali Shresta of Google, Proof of Date for VIP72 Youtube web page and video (4 pages).
VIP72.com home page as of 2013 from Wayback Machine (3 pages).
R. Fielding et al., RFC 2616: Hypertext Transfer Protocol—HTTP/1.1, Jun. 1999, retrieved from the Internet http://rcf-editor.org [retrieved Apr. 15, 2002] (114 pages).
"On the Leakage of Personally Identifiable Information via Online Social Networks"—Wills et al., AT&T, Apr. 2009 http://www2.research.att.com/~bala/papers/wosn09.pdf.
International Preliminary Report on Patentability of PCT/IL2016/050466 dated Nov. 14, 2017.
"AJAX—asynchronous javascript and XML", by tutorialpoint (downloaded 2015 from www.tutorialspoint.com) (27 pages).
Thomas A. Powell, "Ajax: The Complete reference", by The McGraw-Hill Companies published 2008 (0-07-159662-3) (674 pages).
W3C Recommendation, "Document Object Model (DOM) Level 3 Core Specification—Version 1.0", (Apr. 7, 2004) (216 pages).
W3C Last Call Working Draft, "W3C DOM4", (Apr. 28, 2015) (168 pages).
W3C Working Draft (WD-script-970314), "Client-side scripting and HTML", May 14, 1997 (18 pages).
Chapter 9 of the Brooks/Cole Book, "Client-Side Scripting: Javascript" (Jan. 28, 2003) (52 pages).
The W3C Recommendation for the geolocation API specifications draft dated Oct. 24, 2013, is available from the web-site http://www.w3.org/TR/2013/REC-geolocation-API-20131024.
Ray Rischpater, "Scheme for Client-Side Scripting in Mobile Web Browsing—or AJAX-Like Behavior Without Javascript", published in the 'Proceedings of the 2006 Scheme and Functional Programming Workshop', University of Chicago Technical Report TR-2006-06 (9 pages).
John D. Haney and Craig A. VanLengen, "Server-Side Scripting In JavaScript/Jscript And VBScript", of Northern Arizona University (6 pages).
Macromedia, Inc. tutorial First Edition, "Flash Tutorials—8", (dated Sep. 2005) (290 pages).
IETF RFC 1951 "DEFLATE Compressed Data Format Specification version 1.3", May 1996 (16 pages)I.
ECMA International, Standard ECMA-262, "ECMAScript Language Specification", 5.1 Edition / Jun. 2011 (258 pages).
Martin Baier and KnowWare, "Javascript for beginners" (Feb. 9, 2008) (66 pages).
Adobe document, "Learning ACTIONSCRIPT 3.0" (Last updated May 2, 2011) (125 pages).
James Gosling et al., "The Java® Language Specification—Java SE 8 Edition", Oracle America, Inc. Specification JSR-337 Java® SE 8 Release, Version 8, Mar. 2015 (788 pages).
David J. Eck, "Introduction to Programming Using Java", Hobart and William Smith Colleges, (Version 6.0, Jun. 2011) (751 pages).
Stephen G. Kochan, "Programming in Objective-C, Third Edition", Addison-Wesley published Jun. 2011 (ISBN-13: 978-0-321-71139-7) (537 pages).
Apple Inc. Developer guide, "Programming with Objective-C" (2014-09-17) (128 pages).
Sun Microsystem Inc., "tmpfs: A Virtual Memory File System" by Peter Snyder, downloaded on Jul. 2014 (8 pages).
"Microsoft Windows Driver Model (WDM)", by Mohamad (Hani) Atassy, submitted to Dr. Dennis R. Hafermann dated Jan. 28, 2002 (32 pages).
Melekam Tsegaye and Ricahrd Foss, both from Rhodes University, South-Africa, "A Comparison of the Linux and Windows Device Driver Architecture", downloaded from the Internet on Jul. 2014 (26 pages).
Prof. M. Saeed, "Welcome to Version 2.0 of the Win32 API Tutorial", published by Brook Miles, downloaded from the Internet on Jul. 2014 (108 pages).
IBM Corporation (headquartered in Armonk, New York) publication No. SC34-2597-03, "Device Drivers, Features, and Commands on Red Hat Enterprise Linux 6.3", IBM Corporation 2002, 2012, downloaded from the Internet on Jul. 2014 (580 pages).
Wofgang Mauerer, "Professional Linux Kernel Architecture", Wiley Publishing, Inc., published 2008 (1370 pages).
Peter Jay Salzman, Michael Burian, and Ori Pomerantz, "The Linux Kernel Module Programming Guide" ver. 2.6.4, from Rhodes University, South-Africa, dated May 18, 2007, downloaded from the Internet on Jul. 2014 (82 pages).
Information Systems Audit and Control Association (ISACA) 2011 white paper, "Geolocation: Risk, Issues and Strategies" (13 pages).
Samsung Electronics Co., Ltd. presentation, "Google™ Chrome OS User Guide" published 2011 (41 pages).
"Android Tutorial", downloaded from tutorialspoint.com on Jul. 2014 (216 pages).
"IOS Tutorial", downloaded from tutorialspoint.com on Jul. 2014 (185 pages).
Microsoft publication entitled: "Inside-Out Windows Server 2012", by William R. Stanek, published 2013 by Microsoft Press. (1552 pages).

(56) References Cited

OTHER PUBLICATIONS

"UNIX Tutorial" by tutorialspoint.com, downloaded on Jul. 2014 (152 pages).
IEFT RFC 5598, "Internet Mail Architecture", Jul. 2009 (40 pages).
IETF RFC 5321, "Simple Mail Transfer Protocol", Oct. 2008 (95 pages).
IETF RFC 7504, "SMTP 521 and 556 Reply Codes", Jun. 2015 (7 pages).
IEEE Annals of the History of Computing paper, "The technical Development of Internet Email", by the IEEE Computer Society [1058-6180/08], authored by Craig Partridge of BBN Technologies, 2008 (27 pages).
Pocket Consultant book [ISBN: 978-0-7356-8168-2], "Microsoft Exchange Server 2013—Configuration & Clients", William R. Stanek, by Microsoft Press 2013 (384 pages).
IETF RFC 1939, "Post Office Protocol—Version 3", May 1996 (23 pages).
IETF RFC 2449, "POP3 Extension Mechanism", Nov. 1998 (19 pages).
IETF RFC 1734, "POP3 AUTHentication command", Dec. 1994 (5 pages).
IETF RFC 3501, "Internet Message Access Protocol—Version 4rev1", Mar. 2003 (108 pages).
IETF RFC 4314, "IMAP4 Access Control List (ACL) Extension", Dec. 2005 (27 pages).
IBM guide [SC23-5849-01], "Data Servers, Databases, and Database Objects Guide, Updated Mar. 2008", published 2008 (641 pages).
Technical Overview published by Microsoft Press [ISBN: 978-0-7356-8475-1], "Introducing Microsoft SQL Server 2014—Technical Overview" (144 pages).
"Windows Internals—Part 1" by Mark Russinovich, David A. Solomon, and Alex Ioescu, published by Microsoft Press in 2012 (752 pages).
"Windows Internals—Part 2", by Mark Russinovich, David A. Solomon, and Alex Ioescu, published by Microsoft Press in 2012 (672 pages).
Jerry Honeycutt, "Introducing Windows 8—An Overview for IT Professionals" Microsoft Press 2012 (168 pages).
Alan Grosskurth and Michael W. Godfrey "Architecture and evolution of the modern web browser", the University of Waterloo in Canada, dated Jun. 20, 2006 (24 pages).
Alan Grosskurth and Michael W. Godfrey, "A Reference Architecture for web browsers", the University of Waterloo in Canada (downloaded May 20, 2015) (4 pages).
International Business Machines (IBM) Corporation, 1996 Open Blueprint publication G325-6589-00, "Web Browser Resource Manager" (18 pages).
Adam Barth, Collin Jackson, Charles Reis, and the Google Chrome Team, "The Security Architecture of the Chromium Browser" (downloaded May 20, 2015) (10 pages).
"Keep Alive"—Imperva, 2019 https://www.imperva.com/learn/performance/keep-alive (2019) (3 pages).
Third party observation filed on Jun. 21, 2019 in PCT Application No. PCT/IL2018/050910 (7 pages).
IETF named: IPv6 Tunnel Broker, Apr. 1999—First uploaded document submitted with third party observation dated Jun. 21, 2019 (13 pages).
RFC 3053 (Jan. 2001) named: IPv6 Tunnel Broker—Second uploaded document submitted with third party observation dated Jun. 21, 2019 (13 pages).
International Search Report of PCT/IL2016/050466 dated Oct. 28, 2016.
Written Opinion of ISA/US in PCT/IL2016/050466 dated Oct. 28, 2016.
Ted. D. Monchamp, "Adaptive Bit-Rate Streaming—Minimizing End-User Buffer Times in Real-Time Video Delivery", by Rivier University in 'InSight: Rivier Academic Journal, vol. 9, No. 2, Fall 2013' [ISSN 1559-9388] (12 pages).
C. Müller and C. Timmerer, "A VLC Media Player Plugin enabling Dynamic Adaptive Streaming over HTTP", published in Proceedings of the ACM Multimedia 2011 presented MM'11 (Nov. 28-Dec. 1, 2011) [ACM 978-1-4503-0616—Apr. 11, 2011] pp. 723-726 (4 pages).
S. Lederer, C. Mueller and C. Timmerer, "Dynamic Adaptive Streaming over HTTP Dataset", presented in Proceedings of the ACM Multimedia Systems Conference 2012 (MMSys'12, Feb. 22-24, 2012) [ACM 978-1-4503-1131—Jan. 12, 2002] pp. 89-94 (6 pages).
Iraj Sodagar, "The MPEG-DASH Standard for Multimedia Streaming Over the Internet", an IEEE Computer Society article published 2011 (6 pages).
RGB Networks, "Comparing Adaptive HTTP Streaming Technologies", published Nov. 2011 (20 pages).
Christopher Müller, Stefan Lederer and Christian Timmerer, "An Evaluation of Dynamic Adaptive Streaming over HTTP in Vehicular Environments", presented MoVid'12, Feb. 24, 2012 [ACM 978-1-4503-1166—Mar. 12, 2002] pp. 37-42 (6 pages).
ETSI technical specification ETSI TS 126 247 V13.2.0, "Universal Mobile Telecommunications System (UMTS); LTE; Transparent end-to-end Packet-switched Streaming Service (PSS); Progressive Download and Dynamic Adaptive Streaming over HTTP (3GP-DASH) (3GPP TS 26.247 version 13.2.0 Release 13)" (Jan. 2016) (95 pages).
IETF Informational Internet-Draft, "HTTP Live Streaming—draft-pantos-http-live-streaming-13", by R.P. Pantos, published Apr. 16, 2014 (37 pages).
Andrew Fecheyr-Lippens, "A Review of HTTP Live Streaming", published Jan. 2010 (30 pages).
Apple Inc. Technical Note TN2224 updated May 4, 2015, "Best Practices for Creating and Deploying HTTP Live Streaming Media for the iPhone and iPad" is available from the web-site https://developer.apple.com/library/ios/technotes/tn2224/_index.html.
Hongfeng Xu, Zhen Chen, Rui Chen, and Junwei Cao, "Live Streaming with Content Centric Networking", from Tsinghua University, Beijing, China (downloaded Mar. 2016) (5 pages).
"HTTP Dynamic Streaming Specification—Version 3.0 Final", by Adobe Systems Incorporated 2013 (34 pages).
Adobe Flash Platform Technical White Paper, "HTTP Dynamic Streaming on the Adobe® Flash® Platform—Enabling high-quality, network-efficient HTTP streaming for media delivery", published 2010 [Document 91030544 Sep. 2010] (18 pages).
Adobe Systems Incorporated 2010 user guide, "Using Adobe® HTTP Dynamic Streaming" (23 pages).
Erik Nygren, Tamesh K. Sitaraman, and Jennifer Sun, "The Akamai Network: A Platform for High-Performance Internet Applications" (18 pages).
Al-Mukaddim Khan Pathan and Rajkumar Buyya, "A Taxonomy and Survey of Content Delivery Networks", by Grid Computing and Distributed System (GRIDS) Laboratory of the University of Melbourne, Australia (44 pages).
Vijay Kumar Adhikari and Zhi-Li Zhang of the University of Minnesota, and Yang Guo, Fang Hao, Matteo Varvello, Volker Hilt, and Moritz Steiner of Bell-Labs/Alcatel-Lucent, "Unreeling Netflix: Understanding and Improving Multi-CDN Movie Delivery" (9 pages).
IETF RFC 3568, "Known Content Network (CN) Request-Routing Mechanisms" Jul. 2003 (20 pages).
Kei Suzuki, a study on Cooperative Peer Selection Method in P2P Video Delivery, vol. 109, No. 37, IEICE Technical Engineers Report, The Institute of Electronics, Information and Communication, May 14, 2009.
Dejuan Lukan, "Achieving Anonymity with Tor Part 2: Proxies and DNS Servers", InfoSec Resource, Aug. 16, 2012 (20 pages).
Rajkumar Buyya et al., "Content Delivery Networks" © 2008 Springer-Verlag Berlin Heidelberg (392 pages).
Request for Comments 1123, "Requirements for Internet Hosts—Application and Support", Oct. 1989 (98 pages).
Andrew S. Tanenbaum, "Computer Networks", 4th Edition, 2003 (908 pages).

(56) References Cited

OTHER PUBLICATIONS

Chou Chie Ming et al., "Triggering and Relay Node Selection for Self-User Relaying", IEEE Communications Letters, vol. 19, No. 11, Nov. 1, 2015 pp. 2029-2032 (4 pages).
Request for Comments 2396, "Uniform Resource Identifiers (URI): Generic Syntax", Aug. 1998 (40 pages).
Ashish Mohta, worldproxy202—Proxy that's pretty useful, available at https://web.archive.org/web/20080601050011/ http://www.technospot.net/blogs/worldproxy202-proxy-that's-pretty-useful, Jun. 1, 2006 (6 pages).
Wikipedia article on "Routing", https://en.wikipedia.org/wiki/Routing Jul. 26, 2021 (8 pages).
Li et at, "Toward the Identification of Anonymous Web Proxies", University of Cambridge & University of Genoa, Apr. 3, 2009 (2 pages).
"Anonymizing Proxies: What They Are and who They Work"—Enterprise Services Mar. 2013 (Year: 2012) (2 pages).
Selected pages from the website proxifier.com as of Feb. 2008 (15 pages).
Proxychains source code (Oct. 20, 2004) (53 pages).
RFC 1918, Address Allocation for Private Internets, Feb. 1996 (9 pages).
RFC 2131, Dynamic Host Configuration Protocol, Mar. 1997 (45 pages).
RFC 4388, Dynamic Host Configuration Protocol (DHCP) Leasequery, Feb. 2006 (27 pages).
RFC 2187, "Application of Internet Cache Protocol (ICP), version 2", Sep. 1997 (24 pages).
Duane Wessels, "ICP and the Squid Web Cache", Aug. 13, 1997 (25 pages).
RFC 1738, "Uniform Resource Locators (URL)", Dec. 1994 (25 pages).
European Search Report of EP 20195075 dated Nov. 13, 2020.
David Gourley et al., "HTTP-The-Definitive-Guide", O'Reilly Media, Inc. Sep. 27, 2002 (658 pages).
Floss Manuals, "Circumvention Tools", Free Software Foundation Inc., May 31, 2021 (240 pages).
David Fifield et al., "Blocking resistant communication through domain fronting", Proceeding on Privacy Enhanching Technologies 2015, May 15, 2015 (19 pages).
Wang Qiyan et al., "CensorSpoofer: Asymmetric Communication with IP Spoofing for ensorship-Resistant Web Browsing", Mar. 9, 2012 (16 pages).
Dejan Lukan, Achieving Anonymity with Tor Part 2: Proxies and DNA Servers, INFOSEC Aug. 16, 2012 (17 pages).
Kim et al., "RAD: Recipient Anonymous Data Delivery Based on Public Routing Proxies" Computer Notworks, vol. 55, Issue 15 Elsevier, Science Direct, Oct. 27, 2011 (16 pages).
Rob Thubron, "Opera Builds Free and Unlimited VPN Service Directly Into Its Desktop Browser", Apr. 16, 2016 (6 pages).
Anthony Caruana, "3 Ways To Sneak Past Site Blocks", Mar. 12, 2018 (7 pages).
Jack Schofield, "How Can I Access Restriced UK Sites When I'm Overseas?", Oct. 3, 2014 (6 pages).
Huang, S. et al., "Middleboxes in the Internet: a HTTP perspective", 2017 Network Traffic Conference, IEEE, Jun. 21-23, 2017, pp. 1-9 (9 pages).
Goldbert, I. and Shostack A., "Freedom Network 1.0 Architecture and Protocols", Zero-Knowledge Systems Inc, Nov. 29, 1999 (23 pages).
Screenshot from Internet Archive demonstrating availability of Goldbert, I. and Shostack A., "Freedom Network 1.0 Architecture and Protocols" (1 page).
Fifield David et al., "Evading Censorship with Browser-Based Proxies", Privacy Enhancing Technologies 2012, vol. 7384, Berlin, Springer, 2012, pp. 239-258 (20 pages).
Skvorc, D. et al., "Performance Evaluation of Websocket Protocol for Implementation of Full-Duplex Web Streams", 37th International Convention Mipro, IEEE, May 26-30, 2014, pp. 1003-1008 (6 pages).

Rao A. et al., "Using the Middle to Meddle with Mobile", CCIS, Dec. 2013 (14 pages).
Screenshot from Internet Archive demonstrating availability of Rao A. et al., "Using the Middle to Meddle with Mobile" (1 page).
Netronome Systems, Inc., "Examining SSL-encrypted Communications", White Paper, 2010 (8 pages).
Screenshot from Internet Archive demonstrating availability of Netronome Systems, Inc., "Examining SSL-encrypted Communications" (1 pages).
Peterson, Larry L. and Davie, Bruce S., "Computer Networks. A Systems Approach", 2nd Ed., San Francisco, 2000, p. 610 (18 pages).
Liu, C. et al., "Managing Internet Information Services", Sebastopol, O'Reilly & Associates, 1994, pp. 497-513 (19 pages).
Tanenbaum, Andrew S. and Wetherall, David J., "Computer Networks", 5th Ed., Boston, 2011 pp. 813-822 (12 pages).
Comer, D.E., "Internetworking with TCP/IP—vol. 1: Principles, Protocols and Architectures", 5th Ed., New Jersey, 2006, pp. 249-268 (22 pages).
Krishnamurthy, B. and Rexford, J., "Web Protocols and Practice" HTTP/1.1, networking protocols, caching and traffic measurement, Indianapolis, 2001, pp. 184-203 and 249-254 (29 pages).
Geosurf, "What is IP Rotation—Rotating Proxy Server", Nov. 12, 2017 (4 pages).
Bright Data, "The Ultimate Guide to Buying a Proxy Server", DataCenter Proxies, ProxyCompass Apr. 26, 2022 (23 pages).
Third-party submission under 37 CFR 1.290 filed on Jul. 23, 2019 and entered in U.S. Appl. No. 16/140,749.
Third-party submission under 37 CFR 1.290 filed on Jul. 23, 2019 and entered in U.S. Appl. No. 16/140,785.
Third-party submission under 37 CFR 1.290 filed on Jul. 23, 2019 and entered in U.S. Appl. No. 16/214,433.
Third-party submission under 37 CFR 1.290 filed on Jul. 23, 2019 and entered in U.S. Appl. No. 16/214,451.
Third-party submission under 37 CFR 1.290 filed on Jul. 23, 2019 and entered in U.S. Appl. No. 16/214,476.
Third-party submission under 37 CFR 1.290 filed on Jul. 23, 2019 and entered in U.S. Appl. No. 16/214,496.
Third-party submission under 37 CFR 1.290 filed on Jul. 23, 2019 and entered in U.S. Appl. No. 16/292,363.
Third-party submission under 37 CFR 1.290 filed on Jul. 22, 2019 and entered in U.S. Appl. No. 16/292,364.
Third-party submission under 37 CFR 1.290 filed on Jul. 23, 2019 and entered in U.S. Appl. No. 16/292,374.
Third-party submission under 37 CFR 1.290 filed on Jul. 23, 2019 and entered in U.S. Appl. No. 16/292,382.
Third-party submission under 37 CFR 1.290 filed on Jul. 25, 2019 and entered in U.S. Appl. No. 16/365,250.
Third-party submission under 37 CFR 1.290 filed on Jul. 25, 2019 and entered in U.S. Appl. No. 16/365,315.
"Slice Embedding Solutions for Distributed Service Architectures"—Esposito et al., Boston University, Feb. 12, 2011 http://www.cs.bu.edu/techreports/pdf/2011-025-slice-embedding.pdf (Year 2011) (16 pages).
"Step by Step Tutorials for Microsoft Internet Explorer 8 Accessibility Options" Microsoft 2009 publication (25 pages).
Apple publication entitled: "Safari Web Content Guide", dated Oct. 12, 2011 (118 pages).
"Filter Driver Development Guide" Version 1.0a by Microsoft Corporation, dated 2004 (28 pages).
Brian Mariani, "Userland Hooking in Windows", presentation by High-Tech Bridge SA, dated Aug. 2011 (33 pages).
Brian Mariani, "Inline Hooking in Windows", presentation by High-Tech Bridge SA, dated Sep. 6, 2011 (26 pages).
Marko Vuskovic 1998-2002 publication 'Operating Systems', Chapter 9: "Interprocess Communication" (20 pages).
Amin Tootoonchian, "Tutorial on Socket Programming", University of Toronto, Department of Computer Science, downloaded on Aug. 2014 (27 pages).
SAS Institute Inc. SHARE Session 5958 tutorial 'C Socket Programming Tutorial', "Writing Client / Server Programs in C Using Sockets (A Tutorial) Part I", by Greg Granger, dated Feb. 1998 (31 pages).

(56) References Cited

OTHER PUBLICATIONS

IETF RFC 1323 "TCP Extensions for High Performance", May 1992 (35 pages).
IETF RFC 6323 "Sender RTT Estimate Option for the Datagram Congestion Control Protocol (DCCP)", Jul. 2011 (13 pages).
Karn Phil and Craig Partridge, "Improving Round-Trip Time Estimates in Reliable Transport Protocols", in ACM SIGCOMM '87—Computer Communication Review publication (8 pages).
IETF RFC 792, "Internet Control Message Protocol: DARPA Internet Program Protocol Specification", Sep. 1981 (21 pages).
Whitepaper by SinoCDN Limited, "Request Routing, Load-Balancing and Fault-Tolerance Solution—MediaDNS", published Jun. 2001 (7 pages).
IETF RFC 2463, "Internet Control Message Protocol (ICMPv6) for the Internet Protocol Version 6 (IPv6) Specification", Dec. 1998 (17 pages).
IETF RFC 1885, "Internet Control Message Protocol (ICMPv6) for the Internet Protocol Version 6 (IPv6) Specification" Dec. 1995 (20 pages).
Erwin Harahap, Janaka Wijekoon, Rajitha Tennekoon, and Fumito Yamaguchi, "Modeling of Routing-based Request Redirection for Content Distribution Network", of Keio University, Japan, published in the International Journal of Computer Applications (0975-8887) col. 76—No. 13, Aug. 2013 (10 pages).
Zhifeng Cheny, Yuanyuan Zhouy and Kai Li, "Eviction Based Cache Placement for Storage Caches", (downloaded from the Internet on Feb. 2016) (13 pages).
IEEEE Computer Society [0018-9162/04], Nimrod Megiddo and Dharmendra S. Modha (of IBM Almaden Research Center), "Outperforming LRU with an Adaptive Replacement Cache Algorithm", published 2014 (8 pages).
Mazen Kharbutli and Yan Solihin, "Counter-Based Cache Replacement Algorithms", published in the Proceedings of the International Conference on Computer Design, San Jose, Oct. 2-5, 2005 (9 pages).
Keqiu Li, Takashi Nanya, Hong Shen, Francis Y. L. Chin, and Weishi Zhang, "An Efficient Cache Replacement Algorithm for Multimedia Object Caching" (downloaded Feb. 2016 from the Internet) (19 pages).
Hans-Petter Halvorsen, "Introduction to Database Systems", Telemark University College, dated Mar. 3, 2014 (40 pages).
Tutorial entitled: "Oracle / SQL Tutorial" by Michael Gertz of University of California, revised Version 1.01, Jan. 2000 (66 pages).
Guy E. Bloch, "Introduction to Data Compression", Carnegie Mellon University, dated Jan. 31, 2013 (55 pages).
Md. Humayun Kabir, Eric G. Manning, and Gholamali C. Shoja, "Request-Routing Trends and Techniques in Content Distribution Network", of the University of Victoria, Canada, (6 pages).
Varum Khare and Beichuan Zhang of the University of Arizona, "CDN Request Routing to Reduce Network Access Cost" (8 pages).
IETF RFC 3467, "Role of the Domain Name System (DNS)", Feb. 2003 (31 pages).
IETF RFC 6195, "Domain Name System (DNS) IANA Considerations", Mar. 2011 (17 pages).
IETF RFC 1591, "Domain Name System Structure and Delegation", Mar. 1994 (7 pages).
Adobe Digital Video Group publication, "A Digital Video Primer—An introduction to DV production, post-production, and delivery", updated and enhanced Mar. 2004 (58 pages).
Tektronix®, "A Guide to Standard and High-Definition Digital Video Measurements", published 2009 primer (112 pages).
IETF RFC 3640, "RTP Payload Format for Transport of MPEG-4 Elementary Streams", Nov. 2003 (43 pages).
White paper by the MPEG Industry Forum (Document No. mp-in-40182), "Understanding MPEG-4: Technologies, Advantages, and Markets—An MPEGIF White Paper", published 2005 (51 pages).
Gary J. Sullivan of Microsoft Corporation, "The H.264/MPEG4 Advanced Video Coding Standard and its Applications", Standards Report published in IEEE Communications Magazine, Aug. 2006 (10 pages).

IETF RFC 3984, "RTP Payload Format for H.264 Video", Feb. 2005 (83 pages).
Chapter 8 "Mastering Windows Media Player 11" in a guide "Maximum PC Microsoft Windows Vista Exposed", pp. 175-218 (44 pages).
Apple Computer, Inc. (2005), "QuickTime 7.3—User's Guide", 2007 (63 pages).
VideoLAN project, "VLC user guide" by Henri Fallon et al., 2002-2004 (56 pages).
IETF RFC 3550, "RTP: A Transport Protocol for Real-Time Applications", Jul. 2003 (89 pages).
IETF RFC 4587, "RTP Payload Format for H.261 Video Streams", Aug. 2006 (17 pages).
IETF RFC 2326 entitled: "Real Time Streaming Protocol (RTSP)", Apr. 1998 (92 pages).
John G. Apostolopoulos, Wai-Tian, and Susie J. Wee, "Video Streaming: Concepts, Algorithms, and Systems", by Hewlett-Packard Company (HP®), Sep. 18, 2002 (35 pages).
Netflix® presentation, "A Brief History of Netflix Streaming", by David Ronca dated May 2013 (40 pages).
Alex MacAulay, Boris Felts, and Yuval Fisher, "Whitepaper—IP Streaming of MPEG-4" Native RTP vs MPEG-2 Transport Stream, White paper published by Envivio®, Oct. 2005 (12 pages).
Overview by Apple Inc.—Developer, "HTTP Live Streaming Overview", published 2014 (39 pages).
Thomas Stockhammer of Qualcomm Incorporated entitled: "Dynamic Adaptive Streaming over HTTP—Design Principles and Standards" (3 pages).
Alex Zambelli, "IIS Smooth Streaming Technical Overview", Microsoft Corporation published Mar. 2009 (17 pages).
Liang Chen, Yipeng Zhou, and Dah Ming Chiu, "Smart Streaming for Online Video Services", dated Apr. 10, 2014 (12 pages).
Lauri Lehti et al., "H2B2VS D1.1.1 Report on the state of the art technologies for hybrid distribution of TV services", Celtic-Plus publication (downloaded Feb. 2016 from the Internet) (84 pages).
Technology brief by Apple Computer, Inc., "QuickTime Streaming", published Mar. 2005 (Document No. L308280A) (6 pages).
Saamer Akhshabi et al., "An Experimental Evaluation of rate-Adaptation algorithms in Adaptive Streaming over HTTP", presented MMsys'11 (dated Feb. 23-25, 2011) [ACM 978-1-4503-0517-4/11/02] (12 pages).
Cisco Systems, Inc. publication No. 1-587005-001-3 (Jun. 1999), "Internetworking Technologies Handbook", Chapter 7: "Ethernet Technologies", pp. 7-1 to 7-38 (38 pages).
Standard Microsystems Corporation (SMSC) "LAN91C111 10/100 Non-PCI Ethernet Single Chip MAC + PHY" Data-Sheet, Rev. 15 (Feb. 20, 2004) (127 pages).
Robert D. Doverspike, K.K. Ramakrishnan, and Chris Chase, "Guide to Reliable Internet Services and Applications", Chapter 2: "Structural Overview of ISP Networks", published 2010 (ISBN: 978-1-84882-827-8) (76 pages).
IETF RFC 675 "Specification of Internet Transmission Control Program", Dec. 1974 (70 bages).
IETF RFC 793 "Protocol Specification", Sep. 1981 (90 pages).
IETF RFC 791 "Protocol Specification", Sep. 1981 (50 pages).
IETF RFC 1349 "Type of Service in the Internet Protocol Suite", Jul. 1992 (28 pages).
IETF RFC 2460 "Internet Protocol, Version 6 (IPv6)", Dec. 1998 (39 pages).
IETF RFC 4098 "Terminology for Benchmarking BGP Device Convergence in the Control Plane", Jun. 2005 (36 pages).
Cisco Systems, Inc. (Jul. 1999), publication No. 1-587005-001-3, "Internetworking Technologies Handbook" Chapter 5: "Routing Basics" (pp. 5-1 to 5-10) (5 pages).
IBM Corporation, International Technical Support Organization Redbook Documents No. GG24-4756-00, "Local Area Network Concepts and Products: LAN Operation Systems and Management", 1st Edition May 1996 (216 pages).
Cisco Systems, Inc. (Jul. 1999), publication No. 1-587005-001-3, "Internetworking Technologies Handbook" Chapter 30: "Internet Protocols" (pp. 30-31 to 30-16) (16 pages).

(56) References Cited

OTHER PUBLICATIONS

Cisco Systems, Inc. (Jul. 1999), publication No. 1-587005-001-3, "Internetworking Technologies Handbook" Chapter 32: "IPv6" (pp. 32-1 to 32-6) (6 pages).
Cisco Systems, Inc. (Jul. 1999), publication No. 1-587005-001-3, "Internetworking Technologies Handbook" Chapter 45: "OSI Routing" (pp. 45-1 to 45-8) (8 pages).
Cisco Systems, Inc. (Jul. 1999), publication No. 1-587005-001-3, "Internetworking Technologies Handbook" Chapter 51: "Security" (pp. 51-1 to 51-12) (12 pages).
Redbook Document No. GG24-4338-00, "Introduction to Networking Technologies", 1st Edition Apr. 1994 (222 pages).
Redbook Document No. SG24-2580-01 "IP Network Design Guide", 2nd Edition Jun. 1999 (324 pages).
Redbook Document No. GG24-3376-07 "TCP/IP Tutorial and Technical Overview", ISBN 0738494682 8th Edition Dec. 2006 (1004 pages).
Paul S. Wang and Sanda Katila, "An Introduction to Web Design + Programming" (Brooks / Cole book / Dec. 24, 2003) (717 pages).
IETF RFC 1034 "Domain Names—Concepts and Facilities", Nov. 1987 (52 pages).
IETF RFC 1035 "Domain Names—Implementation and Specification", Nov. 1987 (52 pages).
IETF RFC 2131 "Dynamic Host Configuration Protocol", Mar. 1997 (45 pages).
IETF RFC 3315 "Dynamic Host Configuration Protocol for IPV6 (DHCPv6)", Jul. 2003 (101 pages).
IETF RFC 2616, "Hypertext Transfer Protocol—HTTP/1.1" RFC 2616, Jun. 1999 (114 pages).
EEE Communications Magazine (01630-6804/12) article, "Toward Total Quality of Experience: A QoE Model in a Communication Ecosystem" Apr. 2012 (8 pages).
IETF RFC 7230, "Hypertext Transfer Protocol (HTTP/1.1): Message Syntax and Routing", Jun. 2014 (89 pages).
IETF RFC 7231, "Hypertext Transfer Protocol (HTTP/1.1): Semantics and Content", Jun. 2014 (101 pages).
IETF RFC 7232, "Hypertext Transfer Protocol (HTTP/1.1): Conditional Requests", Jun. 2014 (29 pages).
IETF RFC 7233, "Hypertext Transfer Protocol (HTTP/1.1): Range Requests", Jun. 2014 (25 pages).
IETF RFC 7234, "Hypertext Transfer Protocol (HTTP/1.1): Caching", Jun. 2014 (43 pages).
IETF RFC 7235, "Hypertext Transfer Protocol (HTTP/1.1): Authentication", Jun. 2014 (19 pages).
Dominik Kaspar, Kristian Evensen, Paal Engelstad, Audun F. Hansen, Pal Halvorsen, and Carsten Griwodz, "Enhancing Video-on-Demand Playout over Multiple Heterogeneous Access Networks", of Norway (5 pages).
John Wiley & Sons, Inc. (ISBN-978-1-118-00818-8), "HTML & CSS—Design and Build Websites", by Jon Duckett, 2011 (514 pages).
IETF RFC 1866, "Hypertext Markup Language—2.0", Nov. 1995 (77 pages).
World Wide Web Consortium (W3C) Proposed Recommendation, "HTML 4.01 Specification", Aug. 24, 1999 (389 pages).
W3C Editor's Draft, "HTML5 Reference—The Syntax, Vocabulary, and APIs of HTML5", Aug. 9, 2010 (91 pages).
W3C Editor's Draft, "HTML 5.1 Nightly", (Mar. 23, 2015) (24 pages).
IETF RFC 2318, "The text/css Media Type", Mar. 1998 (5 pages).
W3C recommendation, "Cascading Style Sheets Level 2 Revision 1 (CSS 2.1) Specification", (Jun. 7, 2011) (487 pages).
International Standard ISO 8879-1986 entitled: "Information Processing—Text and Office Systems—Standard Generalized Markup Language (SGML)—First Edition", Dec. 6, 1998 (22 pages).
Yong Wang et al., "Towards Street-Level Client-Independent IP Geolocation", downloaded from the Internet on Jul. 2014 (14 pages).
Michel Goossens and Janne Saarela, "A practical introduction to SGML", CERN, CN Division of Geneva, Switzerland (96 pages).
Diego Calvanese, Giuseppe De Giancomo, and Maurizio Lenzerini, "Representing and Reasoning on SGML Documents", of Universita di Roma, Italy (10 pages).
David Barron published 1989 by John Wiley & Sons, Ltd. (0894-3982/89/010003-22), "Why use SGML?", published Electronic Publishing, vol. 2(1), 3-24 (Apr. 1989) (22 pages).
John Wiley & Sons, Ltd. (0894-3982/89/020065-26), "The implementation of the Amsterdam SGML Parser", by Jos Warmer and Sylvia Van Egmond, published Electronic Publishing, vol. 2(2), 65-90 (Dec. 1989) (26 pages).
W3C Recommendation (REC-xml-19980210), "Extensible Markup Language (XML) 1.0", Feb. 10, 1998 (36 pages).
IETF RFC 7303, "XML Media Types", Jul. 2014 (35 pages).
IETF RFC 3470, "Guidelines for the Use of Extensible Markup Language (XML) within IETF Protocols", Jan. 2003 (28 pages).
Chapter 3: "XMLHttpRequest Object" in a book "Ajax: The Complete Reference", by Thomas Powell published 2008 ISBN: 978-0-07-149216) (54 pages).
W3C Working Draft, "XMLHttpRequest Level 2", (Jan. 17, 2012) (38 pages).
RFC 3022, Traditional IP Network Address Translator (Traditional NAT), Jan. 2001 (16 pages).
RFC 2068, Hypertext Transfer Protocol—HTTP/1.1, Jan. 1997 (162 pages).
RFC 1919, Classical versus Transparent IP Proxies, Mar. 1996 (35 pages).
HAProxy Reference Manual, Version 1.2.18, Willy Tarreau, May 25, 2008 (40 pages).
HAProxy Architecture Guide, Version 1.2.18, Willy Tarreau, May 25, 2008 (23 pages).
RFC 2663 entitled: "IP Network Address Translator (NAT) Terminology and Considerations", Aug. 1999 (30 pages).
Arndt Rachel, "How to get around Country-Specific streaming rules" Jul. 31, 2013 (2 pages)
Anonymous, "Where is located a website? Website location finder : IPVoid", Mar. 20, 2019 (1 page).
Screen captures from YouTube video clip entitle "nVpn.net | Double your Safety and use Socks5 + nVpn" 38 pages, last accessed Nov. 20, 2018 <https://www.youtube.com/watch?v=L0Hct2kSnn4>.
Screen captures from YouTube video clip entitle "Andromeda" 47 pages, publicly known and available as of at least 2011 <https://www.youtube.com/watch?v=yRRYpFLbKNU>.
Spyeye, https://www.symantec.com/security-center/writeup/2010-020216-0135-9; http://securesql.info/riskyclouds/spyeye-user-manual; known as of at least 2010 (13 pages).
Screen captures from YouTube video clip entitle "Change Your Country IP Address & Location with Easy Hide IP Software" 9 pages, publicly known and available as of at least 2011, <https://www.youtube.com/watch?=ulwkf1sOfdA and https://www.youtube.com/watch?v=iFEMT-o9DTc>.
CoralCDN ("CoralCDN"), https://pdos.csail.mit.edu/6.824/papers/freedman-coral.pdf (14 Pages).
YouTube video clip entitled "nVpn.net | Double your Safety and use Socks5 + nVpn" <https://www.youtube.com/watch?v=L0Hct2kSnn4>.
YouTube video clip entitled "Andromeda" <https://www.youtube.com/watch?v=yRRYpFLbKNU>.
YouTube video clip entitled "Change Your Country IP Address & Location with Easy Hide IP Software" <https://www.youtube.com/watch?v=ulwkf1sOfdA and https://www.youtube.com/watch?v=iFEMT-o9DTc>.
Roger Dingledine, Nick Mathewon, and Paul Syverson, Tor: The Second-Generation Onion Router, In Proceedings of the 13th conference on USENIX Security Symposium, vol. 13, 2004 (17 pages).
Goldschlag D.M., Reed M.G., Syverson P.F., Hiding Routing Information, Lecture Notes in Computer Science, vol. 1174, Springer, Berlin, Heidelberg, 1996 (14 pages).
Schneier, Anonymity and Tor Network, Schneier on Security Sep. 20, 2007, https://www.schneier.com/blog/archives/2007/09...html, p. 1-22, accessed Apr. 26, 2020 (22 pages).
Reed M.G., Syverson P.F. Goldschlag D.M., Protocols Using Anonymous Connections: Mobile applications, Lecture Notes in Computer Science, vol. 1361, Springer, Berlin, Heidelberg, 1997 (11 pages).

(56) References Cited

OTHER PUBLICATIONS

Nick Mathewon, and Roger Dingledine, Location Diversity in Anonymity Networks, In Proceedings of the 2004 ACM workshop on Privacy in the electronic society. Association for Computing Machinery, New York, NY, USA 66-67 (11 pages).
Mathew Edman and Paul Syverson, As-Awareness in Tor Path Selection, In Proceedings of the 16th ACM conference on Computer and Communication Security (CCS 09). Association for Computing Machinery, New York, NY, USA 380-389 (10 pages).
Banerjee, Priyanka, Anonymous Routing in Wireless Networks: Onion Routing, Team Project Report 2007, p. 1-16 (16 pages).
McCoy D., Bauer K., Grunwald D., Kohno T., Sicker D., Shining Light in Dark Places: Understandings the Tor Network, Lecture Notes in Computer Science, vol. 5134, Springer, Berlin, Heidelberg, 2008 (14 pages).
Harry Newton, Newton's Telecom Dictionary, Mar. 2004, CNP Books, p. 182, 183, 433, 434, 435, 437, 665, 737 (10 pages).
Chakravarty et al., Identifying Proxy Nodes in a Tor Anonymization Circuit, 2008, IEEE International Conference on Signal Image Technology and Internet Based Systems, Bali, 2008, pp. 633-639 (7 pages).
Orfali et al., Client/Server Survival Guide, 3rd ed., John Wiley and Sons Inc. 1999, p. 15 (3 pages).
Reed M.G., Syverson p. F., Goldschlag D.M., Proxies for Anonymous Routing, In Proceedings 12th Annual Computer Security Applications Conference, 1996, pp. 95-104 (10 pages).
RFC 2186, Internet Cache Protocol (ICP), version 2, Sep. 1997 (9 pages).
RFC 3143, Known HTTP Proxy/Caching Problems, Jun. 2001 (32 pages).
Perspective Access Networks, A dissertation presented by Geoffrey Lewis Goodell, Jul. 2006 (292 pages).
Perspective Access Networks, by Geoffrey Lewis Goodell, 2006 (1 page).
Perspective access networks, by Geoffrey Lewis Goodell, Dissertation Abstracts International. vol. 67, No. 12, 2006 (2 pages).
Dissertation Abstracts International. by ProQuest, vol. 65, No. 05, Nov. 2004 (11 pages).
Roger Dingledine and Nick Mathewson, Design of a blocking-resistant anonymity system, Tor Tech Report Nov. 1, 2006 (25 pages).
Printout of 2006 capture history of afs.eecs.harvard.edu/'goodell/thesis.pdf from Internet Archive's Wayback Machine (2 pages).
Printout of 2007 capture history of afs.eecs.harvard.edu/'goodell/thesis.pdf from Internet Archive's Wayback Machine (2 pages).
Printout of capture of http://serifos.eecs.harvard.edu/cgi-bin/blossom.pl dated Sep. 5, 2006, from Internet Archive's Wayback Machine (1 page).
Printout of https://ethanzuckerman.com/2006/04/06/blossom-tor-and-touring-the-internets/, a blog post entitled: "Blossom, Tor and touring the internets" dated Apr. 6, 2006 (9 pages).
Printout of search on Google Scholar for "Perspective Access Networks", date unknown (1 page).
Printout of capture of http://afs.eecs.harvard.edu/'goodell/blossom/bib/author.html dated Sep. 2, 2006, from Internet Archive's Wayback Machine (45 pages).
Printout of capture history of http://afs.eecs.harvard.edu/'goodell/blossom/bib/author.html from Internet Archive's Wayback Machine, date unknown (2 pages).
Printout of capture of http://afs.eecs.harvard.edu/'goodell/blossom/ dated Sep. 2, 2006, from Internet Archive's Wayback Machine (2 pages).
Printout of capture of http://youtube.com/ dated Aug. 29, 2005, from Internet Archive's Wayback Machine (2 pages).

\* cited by examiner

SYSTEM AND METHOD FOR STREAMING CONTENT FROM MULTIPLE SERVERS

RELATED APPLICATIONS

The present application is a continuation application of U.S. non-provisional patent application Ser. No. 15/089,721, filed Apr. 4, 2016, which claims the benefit of U.S. Provisional Application Ser. No. 62/161,553 that was filed on May 14, 2015, of U.S. Provisional Application Ser. No. 62/173,411 that was filed on Jun. 10, 2015, of U.S. Provisional Application Ser. No. 62/210,081 that was filed on Aug. 26, 2015, and of U.S. Provisional Application Ser. No. 62/308,291 that was filed on Mar. 15, 2016, all of which are hereby incorporated herein by reference.

TECHNICAL FIELD

This disclosure relates generally to an apparatus and method for streaming content from multiple servers, and, in particular, to concurrently streaming video content from multiple sources, such as from multiple Content Distribution Networks (CDNs).

BACKGROUND

Unless otherwise indicated herein, the materials described in this section are not prior art to the claims in this application and are not admitted to be prior art by inclusion in this section.

FIG. 1 shows a block diagram that illustrates a system 10 including a computer system 11, and an associated Internet 22 connection. Such configuration is typically used for computers (hosts) connected to the Internet 22 and executing a server, or a client (or a combination) software. The computer system 11 may be used as a portable electronic device such as a notebook/laptop computer, a media player (e.g., MP3 based or video player), a desktop computer, a laptop computer, a cellular phone, a Personal Digital Assistant (PDA), an image processing device (e.g., a digital camera or video recorder), any other handheld or fixed location computing devices, or a combination of any of these devices.

Note that while FIG. 1 illustrates various components of the computer system 11, it is not intended to represent any particular architecture or manner of interconnecting the components.

Network computers, handheld computers, cell phones and other data processing systems that have fewer or more components, may also be used. For example, the computer of FIG. 1 may be an Apple Macintosh computer, or a Power Book, or an IBM compatible PC. The computer system 11 may include a bus 13, an interconnect, or other communication mechanism for communicating information, and a processor 12, commonly in the form of an integrated circuit, coupled to the bus 13 for processing information, and for executing the computer executable instructions. The computer system 11 may also include a main memory 15a, such as a Random Access Memory (RAM), or other dynamic storage device, coupled to the bus 13 for storing information and instructions to be executed by the processor 12. The main memory 15a also may be used for storing temporary variables or other intermediate information during execution of instructions to be executed by the processor 12.

The computer system 11 further includes a Read Only Memory (ROM) 15b (or other non-volatile memory) or other static storage device coupled to the bus 13 for storing static information and instructions for the processor 12. A storage device 15c, that may be a magnetic disk or optical disk, such as a hard disk drive (HDD) for reading from and writing to a hard disk, a magnetic disk drive for reading from and writing to a magnetic disk, and/or an optical disk drive (such as DVD) for reading from and writing to a removable optical disk, is coupled to the bus 13 for storing information and instructions. The hard disk drive, magnetic disk drive, and optical disk drive may be connected to the system bus 13 by a hard disk drive interface, a magnetic disk drive interface, and an optical disk drive interface, respectively. The drives and their associated computer-readable media provide non-volatile storage of computer readable instructions, data structures, program modules and other data for the general-purpose computing devices.

Typically, the computer system 11 includes an Operating System (OS) stored in a non-volatile storage 15b for managing the computer resources and provides the applications and programs with access to the computer resources and interfaces. An operating system commonly processes system data and user input, and responds by allocating and managing tasks and internal system resources, such as controlling and allocating memory, prioritizing system requests, controlling input and output devices, facilitating networking and managing files. Non-limiting examples of operating systems are Microsoft Windows, Mac OS X, and Linux.

The computer system 11 may be coupled via the bus 13 to a display 17, such as a Cathode Ray Tube (CRT), a Liquid Crystal Display (LCD), a flat screen monitor, a touch screen monitor or similar means for displaying text and graphical data to a user. The display 17 may be connected via a video adapter for supporting the display. The display 17 allows a user to view, enter, and/or edit information that is relevant to the operation of the system 10. An input device 18, including alphanumeric and other keys, is coupled to the bus 13 for communicating information and command selections to the processor 12. Another type of user input device is a cursor control 18a, such as a mouse, a trackball, or cursor direction keys for communicating direction information and command selections to the processor 12 and for controlling cursor movement on the display 17. This cursor control 18a typically has two degrees of freedom in two axes, a first axis (e.g., x) and a second axis (e.g., y), that allows the device to specify positions in a plane.

The computer system 11 may be used for implementing the methods and techniques described herein. According to one embodiment, these methods and techniques are performed by the computer system 11 in response to the processor 12 executing one or more sequences of one or more instructions contained in the main memory 15a. Such instructions may be read into the main memory 15a from another computer-readable medium, such as the storage device 15c. Execution of the sequences of instructions contained in the main memory 15a causes the processor 12 to perform the process steps described herein. In alternative embodiments, hard-wired circuitry may be used in place of or in combination with software instructions to implement the arrangement. Thus, embodiments of the invention are not limited to any specific combination of hardware circuitry and software.

The term "processor" is used herein to include, but not limited to, any integrated circuit or any other electronic device (or collection of electronic devices) capable of performing an operation on at least one instruction, including, without limitation, a microprocessor (µP), a microcontroller (µC), a Digital Signal Processor (DSP), or any combination thereof. A processor, such as the processor 12, may further be a Reduced Instruction Set Core (RISC) processor, a Complex Instruction Set Computing (CISC) microprocessor, a Microcontroller Unit (MCU), or a CISC-based Central Processing Unit (CPU). The hardware of the processor 12 may be integrated onto a single substrate (e.g., silicon "die"), or distributed among two or more substrates. Furthermore, various functional aspects of the processor 12 may be implemented solely as a software (or firmware) associated with the processor 12.

A memory can store computer programs or any other sequence of computer readable instructions, or data, such as files, text, numbers, audio and video, as well as any other form of information represented as a string or structure of bits or bytes. The physical means of storing information may be electrostatic, ferroelectric, magnetic, acoustic, optical, chemical, electronic, electrical, or mechanical. A memory may be in the form of an Integrated Circuit (IC, a.k.a. chip or microchip). Alternatively or in addition, a memory may be in the form of a packaged functional assembly of electronic components (module). Such module may be based on a Printed Circuit Board (PCB) such as PC Card according to Personal Computer Memory Card International Association (PCMCIA) PCMCIA 2.0 standard, or a Single In-line Memory Module (SIMM) or a Dual In-line Memory Module (DIMM), standardized under the JEDEC JESD-21C standard. Further, a memory may be in the form of a separately rigidly enclosed box such as an external Hard-Disk Drive (HDD). A capacity of a memory is commonly featured in bytes (B), where the prefix 'K' is used to denote kilo=$2^{10}$=$1024^1$=1024, the prefix 'M' is used to denote mega=$2^{30}$=$1024^2$=1,048,576, the prefix 'G' is used to denote Giga=$2^{30}$=$1024^3$=1,073,741,824, and the prefix 'T' is used to denote tera=$2^{40}$=$1024^4$=1,099,511,627,776.

Various forms of computer-readable media may be involved in carrying one or more sequences of one or more instructions to the processor 12 for execution. For example, the instructions may initially be carried on a magnetic disk of a remote computer. The remote computer can load the instructions into its dynamic memory and send the instructions over a telephone line using a modem. A modem local to the computer system 11 can receive the data on the telephone line and use an infrared transmitter to convert the data to an infrared signal. An infrared detector can receive the data carried in the infrared signal, and appropriate circuitry may place the data on the bus 13. The bus 13 carries the data to the main memory 15*a*, from which the processor 12 retrieves and executes the instructions. The instructions received by the main memory 15*a* may optionally be stored on the storage device 15*c* either before or after execution by the processor 12.

The computer system 11 commonly includes a communication interface 9 coupled to the bus 13. The communication interface 9 provides a two-way data communication coupling to a network link 8 that is connected to a Local Area Network (LAN) 14. For example, the communication interface 9 may be an Integrated Services Digital Network (ISDN) card or a modem to provide a data communication connection to a corresponding type of telephone line. As another non-limiting example, the communication interface 9 may be a Local Area Network (LAN) card to provide a data communication connection to a compatible LAN. For example, Ethernet-based connection based on IEEE802.3 standard may be used, such as 10/100BaseT, 1000BaseT (gigabit Ethernet), 10 gigabit Ethernet (10 GE or 10 GbE or 10 GigE per IEEE Std. 802.3ae-2002as standard), 40 Gigabit Ethernet (40 GbE), or 100 Gigabit Ethernet (100 GbE as per Ethernet standard IEEE P802.3ba). These technologies are described in Cisco Systems, Inc. Publication number 1-587005-001-3 (6/99), "*Internetworking Technologies Handbook*", Chapter 7: "Ethernet Technologies", pages 7-1 to 7-38, which is incorporated in its entirety for all purposes as if fully set forth herein. In such a case, the communication interface 9 typically includes a LAN transceiver or a modem, such as a Standard Microsystems Corporation (SMSC) LAN91C111 10/100 Ethernet transceiver, described in the Standard Microsystems Corporation (SMSC) data-sheet "LAN91C111 10/100 Non-PCI Ethernet Single Chip MAC+PHY" Data-Sheet, Rev. 15 (Feb. 20, 2004), which is incorporated in its entirety for all purposes as if fully set forth herein.

An Internet Service Provider (ISP) 16 is an organization that provides services for accessing, using, or participating in the Internet 22. The Internet Service Provider 16 may be organized in various forms, such as commercial, community-owned, non-profit, or otherwise privately owned. Internet services, typically provided by ISPs, include Internet access, Internet transit, domain name registration, web hosting, and collocation. Various ISP Structures are described in Chapter 2: "Structural Overview of ISP Networks" of the book entitled: "*Guide to Reliable Internet Services and Applications*", by Robert D. Doverspike, K. K. Ramakrishnan, and Chris Chase, published 2010 (ISBN: 978-1-84882-827-8), which is incorporated in its entirety for all purposes as if fully set forth herein.

A mailbox provider is an organization that provides services for hosting electronic mail domains with access to storage for mailboxes. It allows email servers to send, receive, accept, and store email for end users or other organizations. Internet hosting services provide email, web-hosting, or online storage services. Other services include virtual server, cloud services, or physical server operation. A virtual ISP (VISP) is an ISP that purchases services from another ISP, sometimes called a wholesale ISP in this context, which allows the VISP's customers to access the Internet using services and infrastructure owned and operated by the wholesale ISP. It is akin to mobile virtual network operators and competitive local exchange carriers for voice communications. A Wireless Internet Service Provider (WISP) is an Internet service provider with a network based on wireless networking. Technology may include commonplace Wi-Fi wireless mesh networking, or proprietary equipment designed to operate over open 900 MHz, 2.4 GHz, 4.9, 5.2, 5.4, 5.7, and 5.8 GHz bands or licensed frequencies in the UHF band (including the MMDS frequency band) and LMDS.

ISPs may engage in peering, where multiple ISPs interconnect at peering points or Internet exchange points (IXs), allowing routing of data between each network, without charging one another for the data transmitted—data that would otherwise have passed through a third upstream ISP, incurring charges from the upstream ISP. ISPs requiring no upstream and having only customers (end customers and/or peer ISPs) are referred to as Tier 1 ISPs.

An arrangement 10*a* of a computer system connected to the Internet 22 is shown in FIG. 2. A computer system or a workstation 7 includes a main unit box 6 with an enclosed motherboard that has the processor 12 and the memories 15*a*, 15*b*, and 15*c* are mounted. The workstation 7 may include a keyboard 2 (corresponding to the input device 18), a printer 4, a computer mouse 3 (corresponding to the cursor control 18*a*), and a display 5 (corresponding to the display 17). FIG. 2 further illustrates various devices connected via the Internet 22, such as a client device #1 24, a client device #2 24*a*, a data server #1 23*a*, a data server #2 23*b*, and the workstation 7, connected to the Internet 22 over a LAN 14 and via the router or gateway 19 and the ISP 16.

The client device #1 24 and the client device #2 24a may communicate over the Internet 22 for exchanging or obtaining data from the data server #1 23a and the data server #2 23b. In one example, the servers are HTTP servers, sometimes known as web servers. A method describing a more efficient communication over the Internet is described in U.S. Pat. No. 8,560,604 to Shribman et al., entitled: "System and Method for Providing Faster and More Efficient Data Communication" (hereinafter the '604 Patent'), which is incorporated in its entirety for all purposes as if fully set forth herein. A splitting of a message or a content into slices, and transferring each of the slices over a distinct data path are described in U.S. Patent Application No. 2012/0166582 to Binder entitled: "System and Method for Routing-Based Internet Security", which is incorporated in its entirety for all purposes as if fully set forth herein.

The term "computer-readable medium" (or "machine-readable medium") is used herein to include, but not limited to, any medium or any memory, that participates in providing instructions to a processor, (such as the processor 12) for execution, or any mechanism for storing or transmitting information in a form readable by a machine (e.g., a computer). Such a medium may store computer-executable instructions to be executed by a processing element and/or control logic and data, which is manipulated by a processing element and/or control logic, and may take many forms, including but not limited to, non-volatile medium, volatile medium, and transmission medium. Transmission media includes coaxial cables, copper wire, and fiber optics, including the wires that comprise the bus 13. Transmission media may also take the form of acoustic or light waves, such as those generated during radio-wave and infra-red data communications, or other form of propagating signals (e.g., carrier waves, infrared signals, digital signals, etc.). Common forms of computer-readable media include a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer may read.

Various forms of computer-readable media may be involved in carrying one or more sequences of one or more instructions to the processor 12 for execution. For example, the instructions may initially be carried on a magnetic disk of a remote computer. The remote computer may load the instructions into its dynamic memory and send the instructions over a telephone line using a modem. A modem local to the computer system 11 can receive the data on the telephone line, using an infrared transmitter to convert the data to an infrared signal. An infrared detector can receive the data carried in the infrared signal and appropriate circuitry may place the data on the bus 13. The bus 13 carries the data to the main memory 15a, from which the processor 12 retrieves and executes the instructions. The instructions received by the main memory 15a may optionally be stored on the storage device 15c either before or after execution by the processor 12.

The Internet is a global system of interconnected computer networks that use the standardized Internet Protocol Suite (TCP/IP), including Transmission Control Protocol (TCP) and the Internet Protocol (IP), to serve billions of users worldwide. It is a network of networks that consists of millions of private, public, academic, business, and government networks, of local to global scope, that are linked by a broad array of electronic and optical networking technologies. The Internet carries a vast range of information resources and services, such as the interlinked hypertext documents on the World Wide Web (WWW) and the infrastructure to support electronic mail. The Internet backbone refers to the principal data routes between large, strategically interconnected networks and core routers on the Internet. These data routers are hosted by commercial, government, academic, and other high-capacity network centers, the Internet exchange points and network access points that interchange Internet traffic between the countries, continents and across the oceans of the world. Traffic interchange between Internet service providers (often Tier 1 networks) participating in the Internet backbone exchange traffic by privately negotiated interconnection agreements, primarily governed by the principle of settlement-free peering.

The Transmission Control Protocol (TCP) is one of the core protocols of the Internet Protocol suite (IP) described in RFC 675 and RFC 793, and the entire suite is often referred to as TCP/IP. TCP provides reliable, ordered and error-checked delivery of a stream of octets between programs running on computers connected to a local area network, intranet or the public Internet. It resides at the transport layer. Web browsers typically use TCP when they connect to servers on the World Wide Web, and is used to deliver email and transfer files from one location to another. HTTP, HTTPS, SMTP, POP3, IMAP, SSH, FTP, Telnet and a variety of other protocols are encapsulated in TCP. As the transport layer of TCP/IP suite, the TCP provides a communication service at an intermediate level between an application program and the Internet Protocol (IP). Due to network congestion, traffic load balancing, or other unpredictable network behavior, IP packets may be lost, duplicated, or delivered out-of-order. TCP detects these problems, requests retransmission of lost data, rearranges out-of-order data, and even helps minimize network congestion to reduce the occurrence of the other problems. Once the TCP receiver has reassembled the sequence of octets originally transmitted, it passes them to the receiving application. Thus, TCP abstracts the application's communication from the underlying networking details. The TCP is utilized extensively by many of the Internet's most popular applications, including the World Wide Web (WWW), E-mail, File Transfer Protocol, Secure Shell, peer-to-peer file sharing, and some streaming media applications.

While IP layer handles actual delivery of the data, TCP keeps track of the individual units of data transmission, called segments, which are divided smaller pieces of a message, or data for efficient routing through the network. For example, when an HTML file is sent from a web server, the TCP software layer of that server divides the sequence of octets of the file into segments and forwards them individually to the IP software layer (Internet Layer). The Internet Layer encapsulates each TCP segment into an IP packet by adding a header that includes (among other data) the destination IP address. When the client program on the destination computer receives them, the TCP layer (Transport Layer) reassembles the individual segments and ensures they are correctly ordered and error-free as it streams them to an application.

The TCP protocol operations may be divided into three phases. First, the connections must be properly established in a multi-step handshake process (connection establishment) before entering the data transfer phase. After data transmission is completed, the connection termination closes established virtual circuits and releases all allocated resources. A TCP connection is typically managed by an operating system through a programming interface that represents the local end-point for communications, the Internet socket. The local end-point undergoes a series of state changes throughout the duration of a TCP connection.

The Internet Protocol (IP) is the principal communications protocol used for relaying datagrams (packets) across a network using the Internet Protocol Suite. It is considered as the primary protocol that establishes the Internet, and is responsible for routing packets across the network boundaries. IP is the primary protocol in the Internet Layer of the Internet Protocol Suite and has the task of delivering datagrams from the source host to the destination host based on their addresses. For this purpose, IP defines addressing methods and structures for datagram encapsulation. Internet Protocol Version 4 (IPv4) is the dominant protocol of the Internet. IPv4 is described in Internet Engineering Task Force (IETF) Request for Comments (RFC) 791 and RFC 1349, and the successor, Internet Protocol Version 6 (IPv6), is currently active and in growing deployment worldwide. IPv4 uses 32-bit addresses (providing 4 billion: $4.3 \times 10^9$ addresses), while IPv6 uses 128-bit addresses (providing 340 undecillion or $3.4 \times 10^{38}$ addresses), as described in RFC 2460.

An overview of an IP-based packet 25 is shown in FIG. 2a. The packet 25 may be generally segmented into an IP data 26b to be carried as a payload, and an IP header 26f. The IP header 26f contains an IP address of the source as a Source IP Address field 26d and a Destination IP Address field 26c. In most cases, the IP header 26f and the payload 26b are further encapsulated by adding a Frame Header 26e and a Frame Footer 26a used by higher layer protocols.

The Internet Protocol is responsible for addressing hosts and routing datagrams (packets) from a source host to the destination host across one or more IP networks. For this purpose, the Internet Protocol defines an addressing system that has two functions: Identifying hosts addresses and providing a logical location service. Each packet is tagged with a header that contains the meta-data for the purpose of delivery. This process of tagging is also called encapsulation. IP is a connectionless protocol for use in a packet-switched Link Layer network, and does not need circuit setup prior to transmission. The aspects of guaranteeing delivery, proper sequencing, avoidance of duplicate delivery, and data integrity are addressed by an upper transport layer protocol (e.g., TCP—Transmission Control Protocol and UDP—User Datagram Protocol).

The main aspects of the IP technology are IP addressing and routing. Addressing refers to how IP addresses are assigned to end hosts and how sub-networks of IP host addresses are divided and grouped together. IP routing is performed by all hosts, but most importantly by internetwork routers, which typically use either Interior Gateway Protocols (IGPs) or External Gateway Protocols (EGPs) to help make IP datagram forwarding decisions across IP connected networks. Core routers that are serving in the Internet backbone commonly use the Border Gateway Protocol (BGP) as per RFC 4098 or Multi-Protocol Label Switching (MPLS). Other prior art publications relating to Internet related protocols and routing include the following chapters of the publication number 1-587005-001-3 by Cisco Systems, Inc. (7/99) entitled: "*Internetworking Technologies Handbook*", which are all incorporated in their entirety for all purposes as if fully set forth herein: Chapter 5: "Routing Basics" (pages 5-1 to 5-10), Chapter 30: "Internet Protocols" (pages 30-1 to 30-16), Chapter 32: "IPv6" (pages 32-1 to 32-6), Chapter 45: "OSI Routing" (pages 45-1 to 45-8) and Chapter 51: "Security" (pages 51-1 to 51-12), as well as in a IBM Corporation, International Technical Support Organization Redbook Documents No. GG24-4756-00 entitled: "*Local Area Network Concepts and Products: LAN Operation Systems and Management*", $1^{st}$ Edition May 1996, Redbook Document No. GG24-4338-00, entitled: "*Introduction to Networking Technologies*", $1^{st}$ Edition April 1994, Redbook Document No. GG24-2580-01 "*IP Network Design Guide*", $2^{nd}$ Edition June 1999, and Redbook Document No. GG24-3376-07 "*TCP/IP Tutorial and Technical Overview*", ISBN 0738494682 $8^{th}$ Edition December 2006, which are incorporated in their entirety for all purposes as if fully set forth herein. Programming, designing, and using the Internet is described in a book by Paul S. Wang and Sanda Katila entitled: "*An Introduction to Web Design+Programming*" (Brooks/Cole book/Dec. 24, 2003), which is incorporated in its entirety for all purposes as if fully set forth herein.

The Internet architecture employs a client-server model, among other arrangements. The terms 'server' or 'server computer' relates herein to a device or computer (or a plurality of computers) connected to the Internet and is used for providing facilities or services to other computers or other devices (referred to in this context as 'clients') connected to the Internet. A server is commonly a host with an IP address that executes a 'server program', and typically operates as a socket listener. Many servers have dedicated functionalities such as web server, Domain Name System (DNS) server (described in RFC 1034 and RFC 1035), Dynamic Host Configuration Protocol (DHCP) server (described in RFC 2131 and RFC 3315), mail server, File Transfer Protocol (FTP) server and database server. Similarly, the term 'client' is used herein to include, but not limited to, a program or to a device or a computer (or a series of computers) executing this program, which accesses a server over the Internet for a service or a resource. Clients commonly initiate connections that a server may accept. For non-limiting example, web browsers are clients that connect to web servers for retrieving web pages and email clients connect to mail storage servers for retrieving mails.

The Hypertext Transfer Protocol (HTTP) is an application protocol for distributed, collaborative, hypermedia information systems, commonly used for communication over the Internet. HTTP is the protocol to exchange or transfer hypertext, which is a structured text that uses logical links (hyperlinks) between nodes containing text. HTTP version 1.1 was standardized as RFC 2616 (June 1999), which was replaced by a set of standards (obsoleting RFC 2616), including RFC 7230—HTTP/1.1: Message Syntax and Routing, RFC 7231—HTTP/1.1: Semantics and Content, RFC 7232-HTTP/1.1: Conditional Requests, RFC 7233-HTTP/1.1: Range Requests, RFC 7234-HTTP/1.1: Caching, and RFC 7235-HTTP/1.1: Authentication. HTTP functions as a request-response protocol in the client-server computing model. A web browser, for example, may be the client and an application running on a computer hosting a website may be the server. The client submits an HTTP request message to the server. The server, which provides resources such as HTML files and other content, or performs other functions on behalf of the client, returns a response message to the client. The response contains completion status information about the request and may further contain a requested content in its message body. A web browser is an example of a User Agent (UA). Other types of user agent include the indexing software used by search providers (web crawlers), voice browsers, mobile apps and other software that accesses, consumes, or displays web content.

HTTP is a protocol designed to permit intermediate network elements to improve or enable communications between clients and servers. High-traffic websites often benefit from web cache servers that deliver content on behalf of upstream servers to improve response time. In order to reduce network traffic, web browsers cache previously accessed web resources and reuse them when possible. HTTP proxy servers at private network boundaries may facilitate communication for clients without a globally routable address, by relaying messages with external servers. HTTP is an application layer protocol designed within the framework of the Internet Protocol Suite. Typically, HTTP uses an underlying and a reliable transport layer protocol, referred to as Transmission Control Protocol (TCP). However, it may also use unreliable protocols such as the User Datagram Protocol (UDP), for example, in the Simple Service Discovery Protocol (SSDP). HTTP resources are identified and located on the network by Uniform Resource Identifiers (URIs) or, more specifically, Uniform Resource Locators (URLs), using the http or https URI schemes. URIs and hyperlinks in Hypertext Markup Language (HTML) documents form webs of interlinked hypertext documents. An HTTP session is a sequence of network request-response transactions. The HTTP client initiates a request by establishing a Transmission Control Protocol (TCP) connection to a particular port on a server. An HTTP server listening on that port waits for a client's request message. Upon receiving the request, the server sends back a status line, such as "HTTP/1.1 200 OK", and a message of its own. The body of this message is typically the requested resource, although an error message or other information may also be returned. HTTP is a stateless protocol. A stateless protocol does not require the HTTP server to retain information or status.

HTTP persistent connection, also called HTTP keep-alive, or HTTP connection reuse, refers to using a single TCP connection to send and receive multiple HTTP requests/responses, as opposed to opening a new connection for every single request/response pair. Persistent connections provide a mechanism by which a client and a server can signal the close of a TCP connection. This signaling takes place using the Connection header field. The HTTP persistent connection is described in IETF RFC 2616, entitled: "*Hypertext Transfer Protocol—HTTP/1.1*". In HTTP 1.1, all connections are considered persistent unless declared otherwise. The HTTP persistent connections do not use separate 'keepalive' messages, but they allow multiple requests to use a single connection. The advantages of using persistent connections involve lower CPU and memory usage (because fewer connections are open simultaneously), enabling HTTP pipelining of requests and responses, reduced network congestion (due to fewer TCP connections), and reduced latency in subsequent requests (due to minimal handshaking). Any connection herein may use, or be based on an HTTP persistent connection.

The HTTP protocol allows for byte serving (a.k.a. 'Byte Range Serving' and 'range request'), pertaining to the process of sending only a portion of an HTTP/1.1 message or a content from a server to a client, as described in section 14.35.2 of IETF RFC 2616 stating that the client may make 'Range Retrieval Requests' for partial content request. Byte serving begins when an HTTP server advertises its willingness to serve partial requests using the Accept-Ranges response header. A client then requests a specific part of a file from the server using the Range request header, and if the range is valid, the server sends it to the client with a 206 Partial Content status code and a Content-Range header listing the range sent. If the range is invalid, the server responds with a 416 'Requested Range Not Satisfiable' status code. Alternatively or in addition, byte or range serving may be according to, compatible with, or based on IETF RFC 7233 entitled: "*Hypertext Transfer Protocol (HTTP/1.1): Range Requests*", defining range requests and the rules for constructing and combining responses to those requests, which is incorporated in its entirety for all purposes as if fully set forth herein.

Byte Serving may be used for bandwidth optimization, where Clients request byte-serving in cases in which a large file has been only partially delivered, or where a limited portion of the file is needed in a particular range. By allowing byte serving, clients may choose to request any portion of the resource, so when a large media file is being requested, that media file may be properly formatted, so that the client may request just the portions of the file known to be of interest. Using range request in a Video-on-Demand scheme is described in an article by Dominik Kaspar, Kristian Evensen, Paal Engelstad, Audun F. Hansen, Pal Halvorsen, and Carsten Griwodz of Norway, entitled: "*Enhancing Video-on-Demand Playout over Multiple Heterogeneous Access Networks*", which is incorporated in its entirety for all purposes as if fully set forth herein.

User. The term "user" is used herein to include, but not limited to, the principal using a client to interactively retrieve and render resources or resource manifestation, such as a person using a web browser, a person using an e-mail reader, or a person using a display such as the display 17.

Object. The term 'object' is used herein to include, but not limited to, a collection of data and operations, such as text, images, sound files, video data, documents, or any other of information that is presentable to a user of a computer system, and further include the case wherein the data and operations are arranged as object code or an object file. An object code (a.k.a, object module) is a compiled sequence of statements or instructions in a computer language, usually a machine code language or an intermediate language such as RTL. Object code is typically a portion of machine code that yet to be linked into a complete program in order to make up the completed product. It may also contain placeholders or offsets not found in the machine code of a completed program that the linker uses to connect everything together. An assembler is commonly used to convert assembly code into machine code (object code). A linker may link several object (and library) files to generate an executable program. Object files can in turn be linked to form an executable file or library file. In order to be used, object code must be placed in an executable file, a library file, or an object file. An object file is a file containing object code that is usually not directly executable. Object files are produced by an assembler, compiler, or other language translator, and used as input to the linker, which in turn typically generates an executable or library by combining parts of object files. In addition to the object code itself, object files contain metadata used for linking or debugging information to resolve symbolic cross-references between different modules, relocation information, stack unwinding information, comments, program symbols, debugging, or profiling information.

Markup Language. A markup language is a set of tags and/or a set of rules for creating tags that can be embedded in digital text to provide additional information about the text in order to facilitate automated processing of it, including editing and formatting for display or printing. A markup language is typically used for annotating a document in a way that is syntactically distinguishable from the text. Instructions are expressed directly by tags or "instruction text encapsulated by tags". Examples include typesetting instructions such as those found in troff, TeX and LaTeX, or structural markers such as XML tags. A Markup code instructs the software displaying the text to carry out appropriate actions, but the actions are usually omitted from the version of the text visible to the users. Some markup languages, such as the widely used HTML, have pre-defined presentation semantics. It means that their specification prescribes how to present the structured data. Others, such as XML, do not. HyperText Markup Language (HTML), one of the document formats of the World Wide Web, is an instance of SGML, and follows many of the markup conventions used in the publishing industry in the communication of printed work between authors, editors, and printers.

Descriptive markup is commonly used to label parts of the document rather than to provide specific instructions as to how they should be processed. The objective is to decouple the inherent structure of the document from any particular treatment or rendition of it, and such markup is often described as 'semantic'. An example of descriptive markup would be HTML<cite> tag, which is used to label a citation. Descriptive markup, sometimes called logical markup or conceptual markup, enables authors to write in a way that describes the material conceptually, rather than visually.

A common feature of many markup languages is that they intermix the text of a document with markup instructions in the same data stream or file. This is not necessary; it is possible to isolate markup from text content, using pointers, offsets, IDs, or other methods to co-ordinate the two. Such "standoff markup" is typical for the internal representations that programs use to work with marked-up documents. Example of markup languages commonly used in Internet browsing include Hypertext Markup Language (HTML), Extensible Hypertext Markup Language (XHTML), Scalable Vector Graphics (SVG), Cascading Style Sheets (CSS), and Extensible Markup Language (XML).

HTML. HyperText Markup Language, commonly referred to as HTML, is the standard markup language used to create web pages. It is written in the form of HTML elements consisting of tags enclosed in angle brackets (like <html>). HTML tags most commonly come in pairs like <h1> and </h1>, although some represent empty elements, and so are unpaired, for example <img>. The first tag in such a pair is the start tag, and the second is the end tag (they are also called opening tags and closing tags). Web browsers can read HTML files and render them into visible or audible web pages; using HTML elements form the building blocks of all websites. Browsers do not display the HTML tags and scripts but use them to interpret the content of the page. HTML describes the structure of a website semantically along with cues for presentation, making it a markup language, rather than a programming language. HTML allows images and objects to be embedded and can be used to create interactive forms. It provides a means to create structured documents by denoting structural semantics for text such as headings, paragraphs, lists, links, quotes and other items. It can embed scripts written in languages such as JavaScript, which affects the behavior of HTML web pages. HTML markup consists of several key components, including tags (and their attributes), character-based data types, character references and entity references. Another important component is the Document Type Declaration (DTD), which triggers standards mode rendering.

In the case of HTML type program file, the objects may be HTML elements. An HTML element is an individual component of an HTML document or web page, once parsed into the Document Object Model (DOM). HTML is composed of a tree of HTML elements and other nodes, such as text nodes. Each element can have HTML attributes specified. Elements can also have content, including other elements and text. HTML elements represent semantics or meaning, for example, the title element represents the title of the document. HTML documents are delivered as "documents" that are parsed and turned into the Document Object Model (DOM) internal representation, within the web browser. Presentation by the web browser, such as screen rendering or access by JavaScript, is then performed on this internal model, not the original document.

There are multiple kinds of HTML elements: void elements, raw text elements, and normal elements. Void elements only have a start tags and may contain any HTML attributes. They may not contain any children, such as text or other elements. Often they are placeholders for elements that reference external files, such as the image (<img/>) element. Raw text elements are constructed with: a start tag (<tag>) marking the beginning of an element, which may incorporate any number of HTML attributes, some amount of text content, but no elements (all tags, apart from the applicable end tag, will be interpreted as content), and an end tag in which the element name is prefixed with a slash: </tag>. In some versions of HTML, the end tag is optional for some elements. Normal elements usually have both a start tag and an end tag, but for some elements, the end tag, or both tags may be omitted. It is constructed in a similar way: a start tag (<tag>) marking the beginning of an element, which may incorporate any number of HTML attributes, content such as text and other elements, and an end tag, in which the element name is prefixed with a slash: </tag>. HTML attributes define desired behavior or indicate additional element properties. Most attributes require a value. In HTML, the value can be left unquoted if it does not include spaces (name=value), or it can be quoted with single or double quotes (name='value' or name="value"). HTML is described in a book published by John Wiley & Sons, Inc. 2011 (ISBN—978-1-118-00818-8) authored by Jon Duckett entitled: "*HTML & CSS—Design and Build Websites*", HTML 2.0 is described in IETF RFC 1866 entitled: "*Hypertext Markup Language—2.0*", HTML 4.01 (standardized as ISO/IEC 15445:200) is described in the World Wide Web Consortium (W3C) Proposed Recommendation (24 Aug. 1999) entitled: "*HTML 4.01 Specification*", HTML 5 is described in the W3C Editor's Draft (9 Aug. 2010) entitled: "*HTML5 Reference—The Syntax, Vocabulary, and APIs of HTML5*", and HTML 5.1 is described in W3C Editor's Draft (23 Mar. 2015) entitled: "*HTML 5.1 Nightly*", which are all incorporated in their entirety for all purposes as if fully set forth herein.

CSS. Cascading Style Sheets (CSS) is a style sheet language used for describing the look and formatting of a document written in a markup language. While most often used to change the style of web pages and user interfaces written in HTML and XHTML, the language can be applied to any kind of XML document, including plain XML, SVG and XUL. Along with HTML and JavaScript, CSS is a technology used by many websites to create visually engaging webpages, user interfaces for web applications, and user interfaces for many mobile applications. CSS makes it possible to separate presentation instructions from the HTML content in a separate file, or style section of the HTML file. For each matching HTML element, it provides a list of formatting instructions. For example, a CSS rule might specify that "all heading 1 elements should be bold," leaving pure semantic HTML markup that asserts "this text is a level 1 heading" without formatting code such as a <bold> tag indicating how such text should be displayed.

CSS is designed primarily to enable the separation of document content from document presentation, including elements such as the layout, colors, and fonts. This separation of formatting and content makes it possible to present the same markup page in different styles for different rendering methods, such as on-screen, in print, by voice (when read out by a speech-based browser or screen reader) and on Braille-based tactile devices. It can also be used to display the web page differently depending on the screen size or device on which it is being viewed. While the author of a web page typically links to a CSS file within the markup file, readers can specify a different style sheet, such as a CSS file stored on their own computer, to override the one the author has specified. If the author or the reader did not link the document to a style sheet, the default style of the browser will be applied. Another advantage of CSS is that aesthetic changes to the graphic design of a document (or hundreds of documents) can be applied quickly and easily by editing a few lines in one file, rather than by a laborious (and thus expensive) process of crawling over every document line-by-line, changing markup.

The CSS specification describes a priority scheme to determine which style rules apply if more than one rule matches against a particular element. In this so-called cascade, priorities or weights are calculated and assigned to rules, so that the results are predictable. The CSS specifications are maintained by the World Wide Web Consortium (W3C), and Internet media type (MIME type) text/css is registered for use with CSS by RFC 2318 (March 1998). CSS is further described in a book published by John Wiley & Sons, Inc. 2011 (ISBN—978-1-118-00818-8) authored by Jon Duckett entitled: "*HTML & CSS—Design and Build Websites*", CSS 2.1 is described in W3C recommendation (7 Jun. 2011) entitled: "*Cascading Style Sheets Level 2 Revision 1 (CSS 2.1) Specification*", IETF RFC 2318 entitled: "*The text/css Media Type*", which are all incorporated in their entirety for all purposes as if fully set forth herein.

SGML. The Standard Generalized Markup Language (SGML) is a standard for defining generalized markup languages for documents. Generalized markup is based on two postulates: Markup should be declarative, and it should describe a document's structure and other attributes, rather than specify the processing to be performed on it. Declarative markup is less likely to conflict with unforeseen future processing needs and techniques. Markup should be rigorous so that the techniques available for processing precisely defined objects, like programs and databases, may be used for processing documents as well. The SGML is standardized as International Standard ISO 8879-1986 entitled: "*Information Processing—Text and Office Systems—Standard Generalized Markup Language (SGML)—First Edition*" where ISO 8879 Annex A.1 defines generalized markup, and is further described in ISO/IEC TR 9573, entitled: "*Information processing—SGML support facilities—Techniques for using SGML*". SGML is further described in a paper by Michel Goossens and Janne Saarela of CERN, CN Division of Geneva, Switzerland, entitled: "A practical introduction to SGML", in a paper by Diego Calvanese, Giuseppe De Giancomo, and Maurizio Lenzerini of Universita di Roma, Italy, entitled: "*Representing and Reasoning on SGML Documents*", in a paper by David Barron published 1989 by John Wiley & Sons, Ltd. (0894-3982/89/010003-22)—published Electronic Publishing, Vol. 2(1), 3-24 (April 1989), entitled: "*Why use SGML?*", and in a paper by Jos Warmer and Sylvia Van Egmond published 1989 by John Wiley & Sons, Ltd. (0894-3982/89/020065-26)—published Electronic Publishing, Vol. 2(2), 65-90 (December 1989), entitled: "*The implementation of the Amsterdam SGML Parser*", which are all incorporated in their entirety for all purposes as if fully set forth herein.

XML. Extensible Markup Language (XML) is a markup language that defines a set of rules for encoding documents in a format which is both human-readable and machine-readable. The design goals of XML emphasize simplicity, generality and usability across the Internet. It is a textual data format with strong support via Unicode for different human languages. While the design of XML focuses on documents, it is commonly used for the representation of arbitrary data structures such as those used in web services. XML is described in W3C Recommendation 10 Feb. 1998 (REC-xml-19980210) entitled: "*Extensible Markup Language (XML) 1.0*", rules for the construction of Internet Media Types for use when sending XML are described in IETF RFC 7303 entitled: "*XML Media Types*", and various aspects of designing and deploying an XML-based language are detailed in IETF RFC 3470 entitled: "*Guidelines for the Use of Extensible Markup Language (XML) within IETF Protocols*", which are all incorporated in their entirety for all purposes as if fully set forth herein.

XHTML. Extensible Hypertext Markup Language (XHTML) is a family of XML markup languages that mirror or extend versions of the widely used Hypertext Markup Language (HTML), the language in which Web pages are formulated. XHTML is an application of XML that is a more restrictive subset of SGML, where the documents are well formed and may, therefore, be parsed using standard XML parsers.

XMLHttpRequest (XHR) is an API available to web browser scripting languages such as JavaScript, and is used to send HTTP or HTTPS requests to a web server and load the server response data back into the script. Data from the response can be used to alter the current document in the browser window without loading a new web page, and despite the name of the API, this data can be in the form of not only XML, but also JSON, HTML, or plain text.

The Ajax web development technique used by many websites to implement responsive and dynamic web applications depends on XMLHttpRequest. For security reasons, XMLHttpRequest requests follow the browser same-origin policy, and will therefore only succeed if they are made to the host that served the original web page. The XMLHttpRequest is described in Chapter 3 named: "XMLHttpRequest Object" in a book by Thomas Powell published 2008 (ISBN: 978-0-07-149216) entitled: "*Ajax: The Complete Reference*", and in W3C Working Draft (17 Jan. 2012) entitled: "XMLHttpRequest Level 2", which are both incorporated in their entirety for all purposes as if fully set forth herein. Examples of using XMLHttpRequest are described in U.S. Pat. No. 8,473,593 to Graham et al. entitled: "Method for Dynamically Generating Information Objects Based on a Restful Subscription request", in U.S. Patent Application No. 2009/0222554 to Schneider entitled: "Statistics for Online Advertising", and in U.S. Patent Application No. 2014/0244830 to Smacinih entitled: "Web Application Monitoring", which are all incorporated in their entirety for all purposes as if fully set forth herein.

AJAX. Ajax (short for 'Asynchronous JavaScript and XML') is a group of interrelated Web development techniques used on the client-side to create asynchronous Web applications. With Ajax, web applications can send data to and retrieve from a server asynchronously (in the background) without interfering with the display and behavior of the existing page. Data can be retrieved using the XMLHttpRequest object, but despite the name, the use of XML is not required (JSON is often used in the AJAJ variant), and the requests do not need to be asynchronous. Ajax is not a single technology, but a group of technologies, and HTML and CSS can be used in combination to markup and style information. The DOM is accessed with JavaScript to dynamically display and allow the user to interact with the information presented. JavaScript and the XMLHttpRequest object provide a method for exchanging data asynchronously between a browser and a server to avoid full page reloads. Asynchronous HTML and HTTP (AHAH) involves using XMLHttpRequest to retrieve (X)HTML fragments, which are then inserted directly into the web page.

AJAX is described in a tutorial from tutorialpoint (downloaded 2015 from www.tutorialspoint.com) entitled: "*AJAX—asynchronous javascript and xml*", and in a book authored by Thomas A. Powell published 2008 by The McGraw-Hill Companies (0-07-159662-3) entitled: "*Ajax: The Complete reference*", which are both incorporated in their entirety for all purposes as if fully set forth herein. Examples of using AJAX are described in U.S. Pat. No. 7,861,213 to Wang entitled: "Mechanism for Developing AJAX Applications Using Java Swing Framework and Method for Using the Same", in U.S. Pat. No. 8,037,484 to Backhouse et al. entitled: "Building Compound Extensible Ajax Applications", in U.S. Pat. No. 8,250,585 to Higgins et al. entitled: "Extensible Framework for Managing UI State in a Composite AJAX Application", in U.S. Pat. No. 8,413,044 to Mao entitled: "Method and System of Retrieving AJAX Web Page Content", and in U.S. Pat. No. 8,527,862 to Scoda et al. entitled: "Methods for Making AJAX Web Applications Bookmarkable and Crawlable and Devices Thereof", which are all incorporated in their entirety for all purposes as if fully set forth herein.

DOM. The Document Object Model (DOM) is an Application Programming Interface (API) for valid HTML and well-formed XML documents, and defines the logical structure of documents and the way a document is accessed and manipulated. In the DOM specification, the term "document" is used in the broad sense; increasingly, XML is being used as a way of representing many different kinds of information that may be stored in diverse systems, and much of this would traditionally be seen as data rather than as documents. The Document Object Model (DOM) is a cross-platform and language-independent convention for representing and interacting with objects in HTML, XHTML, and XML documents. The nodes of every document are organized in a tree structure, called the DOM tree, and the objects in the DOM tree may be addressed and manipulated by using methods on the objects. To render a document such as an HTML page, most web browsers use an internal model similar to the DOM. The nodes of every document are organized in a tree structure, called the DOM tree, with topmost node named 'Document object'. When an HTML page is rendered in browsers, the browser downloads the HTML into local memory and automatically parses it to display the page on the screen. The DOM is also the way JavaScript transmits the state of the browser in HTML pages. The DOM is described in a W3C Recommendation (7 Apr. 2004) entitled: "*Document Object Model (DOM) Level 3 Core Specification—Version 1.0*", and in a W3C Last Call Working Draft (28 Apr. 2015) entitled: "W3C DOM4", which are both incorporated in their entirety for all purposes as if fully set forth herein.

Script. A script is a program or sequence of instructions that may be interpreted or carried out by another program rather than by the computer processor (as a compiled program is). Scripts are programs typically written for a special run-time environment that can interpret (rather than compile) and automate the execution of tasks. Environments that can be automated through scripting include software applications, web pages within a web browser, the shells of Operating Systems (OS), and embedded systems.

A scripting language or script language is a programming language that supports scripts, programs written for a special run-time environment that can interpret (rather than compile) and automate the execution of tasks that could alternatively be executed one-by-one by a human operator. Environments that can be automated through scripting include software applications, web pages within a web browser, the shells of operating systems (OS), and embedded systems. A scripting language can be viewed as a domain-specific language for a particular environment; in the case of scripting an application, this is also known as an extension language. Scripting languages are also sometimes referred to as very high-level programming languages, as they operate at a high level of abstraction, or as control languages, particularly for job control languages on mainframes. Some languages have been conceived expressly as script languages, such as Perl, REXX (on IBM mainframes), JavaScript, and Tcl/Tk. In the context of the World Wide Web, Perl, VBScript, and similar script languages are commonly written to handle forms input or other services for a Web site and are processed on the Web server. A JavaScript script in a Web page runs "client-side" on the Web browser. Using a script markup language is described for example in a U.S. Pat. No. 7,945,853 to Kothari et al. entitled: "Script Markup", which is incorporated in its entirety for all purposes as if fully set forth herein.

Client/Server-Side Scripting. Client-side scripting generally refers to the class of computer programs on the web that are executed on the client-side, by the user's web browser, instead of server-side (on the web server). This type of computer programming is an important part of the Dynamic HTML (DHTML) concept, enabling web pages to be scripted; that is, to have different and changing content depending on user input, environmental conditions (such as the time of day), or other variables. Client-side scripts are often embedded within an HTML or XHTML document (hence known as an "embedded script"), but they may also be contained in a separate file, to which the document (or documents) that use it make reference (hence known as an "external script"). Upon request, the necessary files are sent to the user's computer by the web server (or servers) on which they reside. The user web browser executes the script, and then displays the document, including any visible output from the script. Client-side scripts may also contain instructions for the browser to follow in response to certain user actions, (e.g., clicking a button). Often, these instructions may be followed without further communication with the server. In contrast, server-side scripts, written in languages such as PHP, ASP.NET, Java, ColdFusion, Perl, Ruby, Go, Python, and server-side JavaScript, are executed by the web server when the user requests a document, and produce output in a format understandable by web browsers (usually HTML), which is then sent to the user's computer. The user cannot see the script's source code (unless the author publishes the code separately), and may not even be aware that a script was executed. Client side scripting is described in W3C Working Draft 14 May 1997 (WD-script-970314) entitled: "*Client-side scripting and HTML*", in Chapter 9 of the Brooks/Cole Book (Jan. 28, 2003) entitled: "*Client-Side Scripting: Javascript*", by Paul S. Wang and Sanda Katila entitled: "*An Introduction to Web Design+Programming*" (Brooks/Cole book/Dec. 24, 2003), and in an article by Ray Rischpater published in the 'Proceedings of the 2006 Scheme and Functional Programming Workshop', University of Chicago Technical Report TR-2006-06 entitled: "*Scheme for Client-Side Scripting in Mobile Web Browsing—or AJAX-Like Behavior Without Javascript*", which are all incorporated in their entirety for all purposes as if fully set forth herein.

Server-side scripting is a technique used in web development that involves employing scripts on a web server to produce a response customized for each user (client) request to the website. The alternative is for the web server itself to deliver a static web page. Scripts may be written in any server-side scripting languages that are available. Server-side scripting is distinguished from client-side scripting where embedded scripts, such as JavaScript, are run client-side in a web browser. However, both techniques are often used together. Server-side scripting is often used to provide a customized interface for the user. These scripts may assemble client characteristics for use in customizing the response based on those characteristics, the user's requirements, access rights, etc. Server-side scripting also enables the website owner to hide the source code that generates the interface, whereas with client-side scripting, the user has access to all the code received by the client. Server-side scripting is described in an article by John D. Haney and Craig A. VanLengen of Northern Arizona University entitled: "*Server-Side Scripting In JavaScript/Jscript And VBScript*", which is incorporated in its entirety for all purposes as if fully set forth herein.

XML. Extensible Markup Language (XML) is a markup language that defines a set of rules for encoding documents in a format which is both human-readable and machine-readable. The design goals of XML emphasize simplicity, generality and usability across the Internet. It is a textual data format with strong support via Unicode for different human languages. The design of XML focuses on documents, however it is commonly used for the representation of arbitrary data structures such as those used in web services. Rules for the construction of Internet Media Types for use when sending XML are described in IETF RFC 7303 entitled: "*XML Media Types*", and various aspects of designing and deploying an XML-based language are detailed in IETF RFC 3470 entitled: "*Guidelines for the Use of Extensible Markup Language (XML) within IETF Protocols*".

Flash. Adobe Flash (formerly called Macromedia Flash and Shockwave Flash), also known as Flash, is a multimedia and software platform used for creating vector graphics, animation, games, and Rich Internet Applications (RIAs) that can be viewed, played, and executed in Adobe Flash Player. Flash is frequently used to add streamed video or audio players, advertisement and interactive multimedia content to web pages. The usage of Flash, however on websites is declining.

Flash manipulates vector and raster graphics to provide animation of text, drawings, and still images, allows bidirectional streaming of audio and video, and it can capture user input via mouse, keyboard, microphone and camera. Flash applications and animations can be programmed using the object-oriented language referred to as ActionScript. Adobe Flash Player makes the Flash content accessible on various operating systems such as Windows, OS X and Linux, and is available for web browsers (as a plug-in) under a few of the major operating systems, some smartphones and tablets, and a few other electronic devices using Flash Lite. Flash is further described in Macromedia, Inc. tutorial First Edition (dated September 2005) entitled: "*Flash Tutorials—8*", which is incorporated in its entirety for all purposes as if fully set forth herein.

JavaScript. JavaScript (also known as ECMAScript) is a dynamic programming language, classified as a prototype-based scripting language with dynamic typing and first-class functions that provides a multi-paradigm language, supporting object-oriented, imperative, and functional programming styles. It is commonly used as part of web browsers, allowing client-side scripts to interact with the user, control the browser, communicate asynchronously, and alter the displayed content. It may also be used in server-side network programming with runtime environments such as Node.js, game development, and the creation of desktop and mobile applications. The JavaScript language is standardized in ISO/IEC 16262:2011, entitled: "*Information technology—Programming languages, their environments and system software interfaces—ECMAScript language specification*". The ECMAScript language is supported by many applications, especially Web browsers, where it is implemented by JavaScript, or, in the case of Internet Explorer, JScript. Implementations sometimes include extensions to the language, or to the standard library and related application programming interfaces (API) such as the World Wide Web Consortium (W3C) specified Document Object Model (DOM). This means that applications written in one implementation may be incompatible with another, unless written to use only as a common subset of supported features and APIs.

The JavaScript is further described in ECMA International Standard ECMA-262, 5.1 Edition/June 2011 entitled: "*ECMAScript Language Specification*", and in the document by Martin Baier and KnowWare (Feb. 9, 2008) entitled: "*Javascript for beginners*", which are both incorporated in their entirety for all purposes as if fully set forth herein. An example of using JavaScript is described in a U.S. Pat. No. 8,639,743 to Colton et al. entitled: "System and Method for On-The-Fly Rewriting of Javascript", which is incorporated in its entirety for all purposes as if fully set forth herein.

ActionScript. ActionScript is an Object-Oriented Programming (OOP) language, designed specifically for Website animation and derived from HyperTalk, the scripting language for HyperCard, and is a dialect of ECMAScript, offering a superset of the syntax and semantics of JavaScript. ActionScript is used primarily for the development of websites and software targeting the Adobe Flash Player platform, used on Web pages in the form of embedded SWF files. ActionScript code is free form and thus may be created with whichever amount or style of whitespace that the author desires, and its basic syntax is derived from ECMAScript. ActionScript 3.0 is described in Adobe document (Last updated May 2, 2011) entitled: "*Learning ACTIONSCRIPT 3.0*", which is incorporated in its entirety for all purposes as if fully set forth herein.

Java. Java is a general-purpose computer programming language that is concurrent, class-based, object-oriented, and specifically designed to have as few implementation dependencies as possible. It is intended to let application developers "write once, run anywhere" (WORA), meaning that compiled Java code can run on all platforms that support Java without the need for recompilation. Java applications are typically compiled to bytecode that can run on any Java Virtual Machine (JVM) regardless of computer architecture, and is commonly used for client-server web applications. The Java language is described in the Oracle America, Inc. Specification JSR-337 Java® SE 8 Release, Version 8, March 2015 entitled: "*The Java® Language Specification—*

*Java SE 8 Edition*", and in an on-line book by David J. Eck (Version 6.0, June 2011) entitled: "*Introduction to Programming Using Java*", which are both incorporated in their entirety for all purposes as if fully set forth herein.

Objective-C. Objective-C is a general-purpose, object-oriented programming language that adds Smalltalk-style messaging to the C programming language, and usually have .m filename extensions for Objective-C source code program files. Objective-C is a thin layer on top of C, and derives its object syntax from Smalltalk. All of the syntax for non-object-oriented operations (including primitive variables, pre-processing, expressions, function declarations, and function calls) is identical to that of C, while the syntax for object-oriented features is an implementation of Smalltalk-style messaging. The Objective-C model of object-oriented programming is based on message passing to object instances, where the target of a message is resolved at runtime, with the receiving object itself interpreting the message. Objective-C implementations typically use a thin runtime system that is written in C, which adds little to the size of the application. The Objective-C language is described in an Addison-Wesley published June 2011 book by Stephen G. Kochan (ISBN-13: 978-0-321-71139-7) entitled: "*Programming in Objective-C, Third Edition*", and in an Apple Inc. Developer guide (2014 Sep. 17) entitled: "*Programming with Objective-C*", which are both incorporated in their entirety for all purposes as if fully set forth herein.

Resource. The term 'resource' or 'web resource' is used herein to include, but not limited to, any addressable unit of information or service or any content, in whole or in part, and may be an object code or object file, such as XML element or object or an HTML element or object. A resource may be abstract or physical, and is typically identified by a URI and has the property that all of its essential characteristics can be conveyed in a message that can be transferred across a network, and may be available in multiple representations (e.g. multiple languages, data formats, size, and resolutions) or vary in other ways. Examples of resources include an electronic document, an image, a service, a web page, a collection of web pages, a service that provides information from a database, e-mail message, and a Java class. One or more (explicit or implicit) relationships between two or more resources are referred to as a 'link'. An area within a resource that can be the source or destination of zero, one, or more links is referred to as an 'anchor'. An anchor may refer to the whole resource, particular parts of the resource, or to particular manifestations of the resource.

Resource manifestation. A resource manifestation refers to a rendition of a resource, typically at a specific point in time and space. The manifestation is commonly tailored to the resource properties, and may vary according to the accessing time or to the environment in which it is displayed.

Operating systems. An Operating System (OS) is software that manages computer hardware resources and provides common services for computer programs. The operating system is an essential component of any system software in a computer system, and most application programs usually require an operating system to function. For hardware functions such as input and output and memory allocation, the operating system acts as an intermediary between programs and the computer hardware, although the application code is usually executed directly by the hardware and will frequently make a system call to an OS function or be interrupted by it. Common features typically supported by operating systems include process management, interrupts handling, memory management, file system, device drivers, networking (such as TCP/IP and UDP), and Input/Output (I/O) handling. Examples of popular modern operating systems include Android, BSD, iOS, Linux, OS X, QNX, Microsoft Windows, Windows Phone, and IBM z/OS.

Process management: The operating system provides an interface between an application program and the computer hardware, so that an application program can interact with the hardware only by obeying rules and procedures programmed into the operating system. The operating system is also a set of services that simplify development and execution of application programs. Executing an application program involves the creation of a process by the operating system kernel that assigns memory space and other resources, establishes a priority for the process in multi-tasking systems, loads program binary code into memory, and initiates execution of the application program that then interacts with the user and with hardware devices. The OS must allocate resources to processes, enable processes to share and exchange information, protect the resources of each process from other processes, and enable synchronization among processes. The OS maintains a data structure for each process, which describes the state and resource ownership of that process, enabling the OS to exert control over each process.

In many modern operating systems, there can be more than one instance of a program loaded in memory at the same time. For example, more than one user could be executing the same program with each user having separate copies of the program loaded into memory. With some programs, known as re-entrant type, it is possible to have one copy loaded into memory, while several users have shared access to it so that they each can execute the same program-code. The processor (such as the processor 12) at any instant can only be executing one instruction from one program but several processes can be sustained over a period of time by assigning each process to the processor at intervals, while the remainder becomes temporarily inactive. A number of processes being executed over a period instead of at the same time, is referred to as concurrent execution. A multiprogramming or multitasking OS is a system executing many processes concurrently. A multiprogramming requires that the processor to be allocated to each process for a period, and de-allocated at an appropriate moment. If the processor is de-allocated during the execution of a process, it must be done in such a way that it can be restarted later as easily as possible.

There are two typical ways for an OS to regain control of the processor during a program's execution in order for the OS to perform de-allocation or allocation. First, the process issues a system call (sometimes called a software interrupt); for example, an I/O request occurs requesting to access a file on hard disk. Alternatively, a hardware interrupt occurs; for example, a key was pressed on the keyboard, or a timer runs out (used in pre-emptive multitasking). The stopping of one process and starting (or restarting) another process is called a context switch, or context change. In many modern operating systems, processes can consist of many sub-processes. This introduces the concept of a thread. A thread may be viewed as a sub-process; that is, a separate, independent sequence of execution within the code of one process. Threads are becoming increasingly important in the design of distributed and client-server systems and in software running on multi-processor systems.

Modes: Many contemporary processors incorporate a mode bit to define the execution capability of a program in the processor. This bit can be set to a kernel mode, or a user mode. A kernel mode is also commonly referred to as supervisor mode, monitor mode, or ring 0. In kernel mode, the processor can execute every instruction in its hardware repertoire, whereas in user mode, it can only execute a subset of the instructions. Instructions that can be executed only in kernel mode are called kernel, privileged, or protected instructions to distinguish them from the user mode instructions. For example, I/O instructions are privileged. Therefore, if an application program executes in user mode, it cannot perform its own I/O, and must request the OS to perform I/O on its behalf. The system may logically extend the mode bit to define areas of memory to be used when the processor is in kernel mode versus user mode. If the mode bit is set to kernel mode, the process executing in the processor can access either the kernel or the user partition of the memory. However, if user mode is set, the process can reference only the user memory space, hence two classes of memory are defined: the user space and the system space (or kernel, supervisor or protected space). In general, the mode bit extends the operating system protection rights, and is set by the user-mode trap instruction, also known as a supervisor call instruction. This instruction sets the mode bit, and branches to a fixed location in the system space. Since only the system code is loaded in the system space, only the system code can be invoked via a trap. When the OS has completed the supervisor call, it resets the mode bit to user mode prior to the return.

Computer operating systems provide different levels of access to resources, and these hierarchical protection domains are often referred to as 'protection rings', and are used to protect data and functionality from faults (by improving fault tolerance) and malicious behavior (by providing computer security). A protection ring is one of two or more hierarchical levels or layers of privilege within the architecture of a computer system. These levels may be hardware-enforced by some CPU architectures that provide different CPU modes at the hardware or microcode level. Rings are arranged in a hierarchy from most privileged (most trusted, usually numbered zero) to least privileged (least trusted, usually with the highest ring number). On most operating systems, kernel mode or 'Ring 0' is the level with the most privileges, and interacts most directly with the physical hardware such as the CPU and memory. Special gates between rings are provided to allow an outer ring to access an inner ring's resources in a predefined manner, as opposed to allowing arbitrary usage. Correctly gating access between rings can improve security by preventing programs from one ring or privilege level from misusing resources intended for programs in another. For example, spyware running as a user program in Ring 3 should be prevented from turning on a web camera without informing the user, since hardware access should be a Ring 1 function reserved for device drivers. Programs such as web browsers running in higher numbered rings, must request access to the network, a resource restricted to a lower numbered ring.

Kernel. With the aid of the firmware and device drivers, the kernel provides the most basic level of control over all of the computer's hardware devices. It manages memory access for programs in the RAM, it determines which programs get access to which hardware resources, sets up or resets the CPU operating states for optimal operation at all times, and organizes the data for long-term non-volatile storage with file systems on media such as disks, tapes, and flash memory. The part of the system executing in kernel supervisor state is called the kernel, or nucleus, of the operating system. The kernel operates as trusted software, meaning that when it was designed and implemented, it was intended to implement protection mechanisms that could not be covertly changed through the actions of untrusted software executing in user space. Extensions to the OS execute in user mode, so the OS does not rely on the correctness of those parts of the system software for correct operation of the OS. Hence, a fundamental design decision for any function to be incorporated into the OS is whether or not it needs to be implemented in the kernel. If it is implemented in the kernel, it will execute in kernel (supervisor) space, and have access to other parts of the kernel. It will also be trusted software by the other parts of the kernel. If the function is implemented to execute in user mode, it will have no access to kernel data structures.

A program executing in user-mode may request the kernel services using two techniques, namely a 'System call' and a 'Message passing'. Operating systems are typically associated with one or the other of these two facilities, but commonly not both. Assuming that a user process wishes to invoke a particular target system function in the system call approach, using the trap instruction, so the system call should appear to be an ordinary procedure call to the application program: the OS provides a library of user functions with names corresponding to each actual system call. Each of these stub functions contains a trap to the OS function, and when the application program calls the stub, it executes the trap instruction, which switches the CPU to kernel mode, and then branches (indirectly through an OS table) to the entry point of the function being invoked. When the function completes, it switches the processor to user mode and then returns control to the user process; thus simulating a normal procedure return. In the message passing approach, the user process constructs a message, that describes the desired service, and then it uses a trusted send function to pass the message to a trusted OS process. The send function serves the same purpose as the trap; that is, it carefully checks the message, switches the processor to kernel mode, and then delivers the message to a process that implements the target functions. Meanwhile, the user process waits for the result of the service request with a message receive operation. When the OS process completes the operation, it sends a message back to the user process.

Interrupts handling. Interrupts are central to operating systems, as they provide an efficient way for the operating system to interact with and react to its environment. Interrupts are typically handled by the operating system kernel for providing a way of automatically saving local register contexts and running specific code in response to events. When an interrupt is received, the computer's hardware automatically suspends whatever program is currently running, saves its status, and runs computer code previously associated with the interrupt. When a hardware device triggers an interrupt, the operating system's kernel decides how to deal with this event, generally by running some processing code. The amount of code being run depends on the priority of the interrupt, and the processing of hardware interrupts is executed by a device driver, which may be either part of the operating system kernel, part of another program, or both. Device drivers may then relay information to a running program by various means. A program may also trigger an interrupt to the operating system. For example, if a program wishes to access hardware (such as a peripheral), it may interrupt the operating system's kernel, which causes control to be passed back to the kernel. The kernel will then process the request. If a program wishes additional resources (or wishes to shed resources) such as memory, it will trigger an interrupt to get the kernel's attention. Each interrupt has its own interrupt handler. The number of hardware interrupts is limited by the number of interrupt request (IRQ) lines to the processor, but there may be hundreds of different software interrupts. Interrupts are a commonly-used technique for computer multitasking, especially in real-time computing systems, which are commonly referred to as interrupt-driven systems.

Memory management: A multiprogramming operating system kernel is responsible for managing all system memory that is currently in use by programs, ensuring that a program does not interfere with memory already in use by another program. Since programs share time, each program must have independent access to memory. Memory protection enables the kernel to limit the access of the process to the computer's memory. Various methods of memory protection exist, including memory segmentation and paging. In both segmentation and paging, certain protected mode registers specify to the CPU what memory address it should allow a running program to access. Attempts to access other addresses will trigger an interrupt that will cause the CPU to re-enter supervisor mode, placing the kernel in charge. This is called a segmentation violation (or Seg-V), and the kernel will generally resort to terminating the offending program, and will report the error.

Memory management further provides ways to dynamically allocate portions of memory to programs at their request, and frees it for reuse when no longer needed. This is critical for any advanced computer system, where more than a single process might be underway at any time. Virtual memory systems separate the memory addresses used by a process from actual physical addresses, allowing separation of processes and increasing the effectively available amount of RAM using paging or swapping to secondary storage. The quality of the virtual memory manager can have an extensive effect on overall system performance.

File system. Commonly a file system (or filesystem) is used to control how data is stored and retrieved. By separating the data into individual pieces, and giving each piece a name, the information is easily separated and identified, where each piece of data is referred to as a "file". The structure and logic rules used to manage the groups of information and their names is collectively referred to as a "file system". There are many different kinds of file systems, each one with a different structure and logic, properties of speed, flexibility, security, size, and more. Some file systems have been designed to be used for specific applications. For example, the ISO 9660 file system is designed specifically for optical discs. File systems can be used on many different kinds of storage devices. Some file systems are used on local data storage devices; others provide file access via a network protocol (for example, NFS, SMB, or 9P clients). Some file systems are "virtual", in that the "files" supplied are computed on request (e.g., procfs), or are merely a mapping into a different file system used as a backing store. The file system manages access to both the content of files and the metadata about those files. It is responsible for arranging storage space, and reliability, efficiency, and tuning with regard to the physical storage medium are important design considerations.

A disk file system takes advantage of the ability of a disk storage media to randomly address data in a short amount of time. Additional considerations include the speed of accessing data, following that initially requested, and the anticipation that the following data may also be requested. This permits multiple users (or processes) access to various data on the disk without regard to the sequential location of the data. Examples include FAT (FAT12, FAT16, FAT32), exFAT, NTFS, HFS and HFS+, HPFS, UFS, ext2, ext3, ext4, XFS, btrfs, ISO 9660, Files-11, Veritas File System, VMFS, ZFS, ReiserFS, and UDF. Some disk file systems are journaling file systems or versioning file systems.

TMPFS. TMPFS (or tmpfs) is a common name for a temporary file storage facility on many Unix-like operating systems. While intended to appear as a mounted file system, it is stored in volatile memory instead of a non-volatile storage device. A similar construction is a RAM disk, which appears as a virtual disk drive, and hosts a disk file system. The tmpfs is typically a file system based on SunOS virtual memory resources, which does not use traditional non-volatile media to store file data; instead, tmpfs files exist solely in virtual memory maintained by the UNIX kernel. Because tmpfs file systems do not use dedicated physical memory for file data, but instead use VM system resources and facilities, they can take advantage of kernel resource management policies. Tmpfs is designed primarily as a performance enhancement to allow short-lived files to be written and accessed without generating disk or network I/O. Tmpfs maximizes file manipulation speed while preserving UNIX file semantics. It does not require dedicated disk space for files, and has no negative performance impact. The tmpfs is described in a Sun Microsystem Inc. paper entitled: "*tmpfs: A Virtual Memory File System*" by Peter Snyder, downloaded on July/2014, which is incorporated in its entirety for all purposes as if fully set forth herein.

Device drivers. A device driver is a specific type of computer software developed to allow interaction with hardware devices. Typically, this constitutes an interface for communicating with the device, through the specific computer bus or communications subsystem that the hardware is connected to, providing commands to and/or receiving data from the device, and on the other end, the requisite interfaces to the operating system and software applications. It is a specialized hardware-dependent computer program (that is also operating system specific) that enables another program such as an operating system, an applications software package, or a computer program running under the operating system kernel, to interact transparently with a hardware device, and usually provides the requisite interrupt handling necessary for any necessary asynchronous time-dependent hardware interfacing needs.

Networking: Most operating systems support a variety of networking protocols, hardware, and applications for using them, allowing computers running dissimilar operating systems to participate in a common network for sharing resources such as computing, files, printers, and scanners, using either wired or wireless connections. Networking can essentially allow a computer's operating system to access the resources of a remote computer, to support the same functions as it could if those resources were connected directly to the local computer. This includes everything from simple communication to using networked file systems, or sharing another computer's graphics or sound hardware. Some network services allow the resources of a computer to be accessed transparently, such as SSH, which allows networked users direct access to a computer's command line interface. A client/server networking allows a program on a computer, called a client, to connect via a network to another computer, called a server.

The term 'client' typically refers to an application (or a device executing the application) used for retrieving or rendering resources, or resource manifestations, such as a web browser, an e-mail reader, or a Usenet reader, while the term 'server' typically refers to an application (or a device executing the application) used for supplying resources or resource manifestations, and typically offers (or hosts) various services to other network computers and users. These services are usually provided through ports or numbered access points beyond the server's network address. Each port number is usually associated with a maximum of one running program, which is responsible for handling requests to that port. A daemon, being a user program, can in turn access the local hardware resources of that computer by passing requests to the operating system kernel.

Input/Output (I/O) handling: An input/output (or I/O) is the communication between an information processing system (such as a computer) and the outside world, possibly a human or other information processing system. The inputs are typically the signals or data received by the system, and the outputs are the signals or data sent from it. I/O devices may be used by a person (or another system) to communicate with a computer. For instance, a keyboard or a mouse may be an input device for a computer, while monitors and printers are considered output devices for a computer. Devices for communication between computers, such as modems and network cards, typically serve for both input and output.

User interface. Every computer that is to be operated by a human being (user) requires a user interface, usually referred to as a 'shell', and is essential if human interaction is to be supported. The user interface views the directory structure and requests services from the operating system that will acquire data from input hardware devices, such as a keyboard, mouse, or credit card reader, and requests operating system services to display prompts and status messages and such on output hardware devices, such as a video monitor or printer. The two most common forms of a user interface have historically been the command-line interface, where computer commands are typed out line-by-line, and the Graphical User Interface (GUI), where a visual environment (most commonly a WIMP) is present. Typically, the GUI is integrated into the kernel, allowing the GUI to be more responsive by reducing the number of context switches required for the GUI to perform its output functions.

WDM. The Windows Driver Model (WDM), also known as the Win32 Driver Model, is a standard model defining a framework for device drivers specified by Microsoft, providing unified driver models. The WDM model is based on using WDM drivers that are layered in a complex hierarchy and communicate with each other via I/O Request Packets (IRPs). The WDM is described in the publication entitled: "*Microsoft Windows Driver Model (WDM)*", by Mohamad (Hani) Atassy, submitted to Dr. Dennis R. Hafermann dated Jan. 28, 2002, and in publication entitled: "*A Comparison of the Linux and Windows Device Driver Architecture*", by Melekam Tsegaye and Ricahrd Foss, both from Rhodes University, South-Africa, downloaded from the Internet on July/2014, both are incorporated in their entirety for all purposes as if fully set forth herein.

A general schematic view of the WDM architecture 30 is shown on FIG. 3. In the example shown, three applications designated as an application #1 31a, an application #2 31b, and a web browser application #3 31c, are accessing three peripheral hardware devices, designated as peripheral #1 39a, peripheral #2 39b, and peripheral #3 39c. The model involves three layers. The lower layer is the hardware layer 34c, which includes the hardware devices and peripherals, accessed by the processor (such as the processor 12) via a hardware bus 13, which may correspond to internal bus 13, shown in FIG. 1. The top layer is a 'user space' layer 34a, corresponding to the user mode and to the higher 'ring' layers, such as Ring 3, and is relating to the space is the memory area where application software and some drivers execute. The kernel of the operating system provides the services as part of a 'kernel space' layer 34b, serving as an intermediate layer between the user space layer 34a and the hardware layer 34c. The kernel space 34b operates in a highly privileged hierarchical protection domain, and is strictly reserved for running privileged kernel, kernel extensions, and most device drivers, and is typically corresponding to the kernel mode and to the 'ring-0' layer (in x86 processors). The kernel mode may be supported by the processor hardware, or may be supported by a code segment level.

The user mode applications (such as the application #1 31a, the application #2 31b, and the (web browser) application #3 31c exampled as a web browser application) access the kernel space 34b by the invoking the system calls respectively denoted as connections 32a, 32b, and 32c. Typically, such system calls are processed via intermediating entity known as Windows API, such as a Win32 API 33, which accesses the kernel space 34b via a standard messaging. The Win32 API 33 is an example of a Windows API (informally WinAPI), which is Microsoft's core set of Application Programming Interfaces (APIs) available in the Microsoft Windows operating systems. Almost all Windows programs interact with the Windows API. On the Windows NT line of operating systems, a small number (such as programs started early in the Windows startup process) uses the Native API. Supporting for developers is in the form of the Windows Software Development Kit (SDK), providing documentation and tools necessary to build software based upon the Windows API, and associated Windows interfaces. The Win32 API 33 is the 32-bit API for modern versions of Windows, and consists of functions implemented, as with Win16, in system DLLs. The core DLLs of the Win32 include the kernel32.dll, user32.dll, and gdi32.dll. The Win32 API is described in the tutorial entitled: "*Welcome to Version 2.0 of the Win32 API Tutorial*" by Prof. M. Saeed, published by Brook Miles, downloaded from the Internet on July/2014, which is incorporated in its entirety for all purposes as if fully set forth herein.

System calls provide an essential interface between a process and the operating system. A system call is how a program requests a service from an operating system's kernel. This may include hardware related services (e.g., accessing the hard disk), creating and executing new processes, and communicating with integral kernel services (such as scheduling). A system call is typically processed in the kernel mode, which is accomplished by changing the processor execution mode to a more privileged one. The hardware sees the world in terms of the execution mode according to the processor status register, and processes are an abstraction provided by the operating system. A system call does not require a context switch to another process; it is processed in the context of whichever process invoked it. The system calls are often executed via traps or interrupts that automatically puts the CPU into some required privilege level, and then pass control to the kernel, which determines whether the calling program should be granted the requested service. If the service is granted, the kernel executes a specific set of instructions over which the calling program has no direct control. It then returns the privilege level to that of the calling program, and turns over control to the calling program. Implementing system calls requires a control transfer, which involves some sort of architecture-specific feature.

System calls can be roughly grouped into five major categories: process control, such as load, execute, create/ terminate process, get/set process attributes, wait for time, wait event, and signal event; file management, such as request/release device, create/delete file, open/close file, read/write/reposition file, and get/set file attributes; device management, such as read/write/reposition device, get/set device attributes, and logically attach/detach devices; information maintenance, such as get/set time or date, get/set system data, and get/set process, file, or device attributes; and communication such as create, delete communication connection, transfer status information, and attach or detach remote devices.

The system calls are commonly handled by an I/O manager 35b, which allows devices to communicate with user-mode subsystems. It translates user-mode read and write commands into read or write IRPs, which it passes to device drivers. It accepts file system I/O requests, translates them into device specific calls, and can incorporates low-level device drivers that directly manipulate hardware to either read input, or write output. It also includes a cache manager to improve disk performance by caching read requests and write to the disk in the background. The I/O manager 35b may interface a power manager 35c, which deals with power events (power-off, stand-by, hibernate, etc.), and notifies affected drivers with special IRPs (Power IRPs).

A PnP manager 35a handles 'Plug and Play' and supports device detection and installation at boot time. It also has the responsibility to stop and start devices on demand such as, when a bus (such as USB or FireWire) gains a new device and needs to have a device driver loaded to support it. The PnP manager 35a may be partly implemented in user mode, in the Plug and Play Service, which handles the complex tasks of installing the appropriate drivers, notifying services and applications of the arrival of new devices, and displaying GUI to the user.

I/O Request Packets (IRPs) are kernel mode structures that are used to communicate with each other and with the operating system. They are data structures that describe I/O requests to a driver, and parameters such as buffer address, buffer size, and I/O function type are passed via a single pointer to this persistent data structure. The IRP with all of its parameters can be put on a queue if the I/O request cannot be performed immediately. I/O completion is reported back to the I/O manager by passing its address to a routine for the purpose, IoCompleteRequest. The IRP may be repurposed as a special kernel APC object if such is required to report completion of the I/O to the requesting thread. IRPs are typically created by the I/O Manager in response to I/O requests from user mode. However, IRPs are sometimes created by the plug-and-play manager, power manager, and other system components, and can further be created by drivers, and then passed to other drivers.

The WDM uses kernel-mode device drivers to enable it to interact with hardware devices, where each of the drivers has well-defined system routines and internal routines that it exports to the rest of the operating system. DriverEntry is the first routine called after a driver is loaded, and is responsible for initializing the driver. All devices are seen by the user mode code as a file object in the I/O manager. In the I/O manager itself, the devices are seen as device objects, which can be defined as either file, device, or driver objects. The drivers may be aggregated as a driver stack 36, including kernel-mode drivers in three levels: high-level drivers 36a, intermediate-level drivers 36b, and low-level drivers 36c. The high-level drivers 36a, such as file system drivers for FAT and NTFS, rely on the intermediate-level drivers 36b, which consist of function drivers or main driver for a device that are optionally sandwiched between lower and higher-level filter drivers. The high-level drivers 36a typically know how files are represented on disk, but not the details of how to actually fetch the data.

The intermediate level drivers 36b process the requests from the highest-level driver by breaking down a large request into a series of small chunks. The function driver typically contains the details on how the hardware of the peripheral works, relies on a bus driver, or a driver that services a bus controller, adapter, or a bridge with an optional bus filter driver that sits between itself and the function driver. For example, a PCI bus driver detects the PCI-slot plugged card or hardware, and determines the I/O-mapped or the memory-mapped connection with the host. The intermediate drivers 36b rely on the low-level drivers 36c to function, and the lowest level drivers 36c are either legacy device drivers that control a device directly, or a PnP hardware bus. These lower level drivers 36c directly control hardware and do not rely on any other drivers. The I/O manager 35b communicates with the high-level driver 36a using IRP 37a, the high-level driver 36a communicates with the intermediate level driver 36b using IRP 37b, the intermediate-level driver 36b communicates with the low-level driver 36c using IRP 37c, and the low-level driver 37c communicates with the HAL 38 using IRP 37d.

WDM drivers can be classified into the following types and sub-types: device function drivers, bus drivers, and filter drivers. A function driver is a main driver for a device, and is typically written by the device vendor, and is required (unless the device is being used in raw mode). A function driver can service one or more devices. Miniport drivers are a type of function drivers for interfaces such as USB, audio, SCSI and network adapters. They are hardware specific, but the control access to the hardware is through a specific bus class driver. Class drivers are a type of function drivers and can be thought of as built-in framework drivers for supporting miniport and other class drivers. The class drivers provide interfaces between different levels of the WDM architecture.

Common functionalities between different classes of drivers can be written into the class driver and be used by other class and miniport drivers. The lower edge of the class driver will have its interface exposed to the miniport driver, while the upper edge of the top-level class drivers is operating system specific. Class drivers can be dynamically loaded and unloaded at-will. They can do class specific functions that are not hardware or bus-specific (with the exception of bus-type class drivers), and in fact, sometimes only do class specific functions such as an enumeration.

A bus driver services a bus controller, adapter, or bridge. Microsoft provides bus drivers for most common buses, such as Advanced configuration and Power Interface (ACPI), Peripheral Component Interconnect (PCI), PnPISA, SCSI, Universal Serial Bus (USB), and FireWire. A bus driver can service more than one bus if there is more than one bus of the same type on the machine. The ACPI bus driver interacts with the ACPI BIOS to enumerate the devices in the system and control their power use, the PCI bus driver (such as pci.sys) enumerates and configures devices connected via the PCI bus, the FireWire and the USB bus driver respectively enumerates and controls devices connected via the IEEE 1394 high-speed bus and the USB. The stream class driver provides a basic processing supporting high bandwidth, time critical, and audio/video data related hardware, and uses minidrivers for interfacing the actual hardware. Hard-disk, floppies, CDs, and DVDs are interfaces that use SCSI and CDROM/DVD class driver. The Human Input Device (HID) provides an abstract view of input devices, and the Still Image Architecture (SIA) class driver is used to obtain content from a scanner and a still camera, using minidrivers. For example, accessing a hard disk (such as the storage 15a or the HDD 15C) may involve a file system driver as high-level driver, a volume manager driver as intermediate-level driver, and a disk driver as low-level driver.

Filter drivers are optional drivers that add value to, or modify the behavior of a device and may be non-device drivers. A filter driver can also service one or more devices. Upper-level filter drivers sit above the primary driver for the device (the function driver), while lower-level filter drivers sit below the function driver and above the bus driver. A driver service is a type of kernel-level filter driver implemented as a Windows service that enables applications to work with devices.

The Hardware Abstraction Layer 38, or HAL, is a layer between the physical hardware layer 34c of the computer and the rest of the operating system. It was designed to hide differences in hardware, and therefore provides a consistent platform on which the kernel is run. The HAL 38 includes hardware-specific code that controls I/O interfaces, and interrupts controllers and multiple processors. Typically, the particular hardware abstraction does not involve abstracting the instruction set, which generally falls under the wider concept of portability. Abstracting the instruction set, when necessary (such as for handling the several revisions to the x86 instruction set, or emulating a missing math coprocessor), is performed by the kernel, or conducted via platform virtualization.

Linux is a Unix-like and mostly POSIX-compliant computer operating system assembled under the model of free and open source software development and distribution. The defining component of Linux is the Linux kernel, an operating system kernel first released on 5 Oct. 1991 by Linus Torvalds. Linux was originally developed as a free operating system for Intel x86-based personal computers, but has since been ported to more computer hardware platforms than any other operating system. Linux also runs on embedded systems such as mobile phones, tablet computers, network routers, facility automation controls, televisions, and video game consoles. Android, which is a widely used operating system for mobile devices, is built on top of the Linux kernel. Typically, Linux is packaged in a format known as a Linux distribution for desktop and server use.

Linux distributions include the Linux kernel, supporting utilities and libraries and usually a large amount of application software to fulfill the distribution's intended use. A Linux-based system is a modular Unix-like operating system. Such a system uses a monolithic kernel, the Linux kernel, which handles process control, networking, and peripheral and file system access. Device drivers are either integrated directly with the kernel or added as modules loaded while the system is running. Some components of an installed Linux system are a bootloader, for example GNU GRUB or LILO, which is executed by the computer when it is first turned on, and loads the Linux kernel into memory, an init program. Init is the first process launched by the Linux kernel, and is at the root of the process tree, and it starts processes such as system services and login prompts (whether graphical or in terminal mode), software libraries containing code that can be used by running processes, and user interface programs such as command shells or windowing environments. A version of Linux is described, for example, in IBM Corporation (headquartered in Armonk, New York) publication No. SC34-2597-03 entitled: "*Device Drivers, Features, and Commands on Red Hat Enterprise Linux 6.3*", downloaded from the Internet on July/2014, which is incorporated in its entirety for all purposes as if fully set forth herein.

The general schematic Linux driver architecture 30a is shown in FIG. 3a, and the Linux kernel is further described in Wiley Publishing, Inc. publication entitled: "*Professional Linux Kernel Architecture*", by Wofgang Mauerer published 2008, and Linux programming is described in the book entitled: "*The Linux Kernel Module Programming Guide*" ver. 2.6.4 by Peter Jay Salzman, Michael Burian, and Ori Pomerantz, dated May 18, 2007, and in the publication entitled: "*A Comparison of the Linux and Windows Device Driver Architecture*", by Melekam Tsegaye and Richard Foss, both from Rhodes University, South-Africa, downloaded from the Internet on July/2014, which are all incorporated in their entirety for all purposes as if fully set forth herein.

Similar to the WDM 30 shown in FIG. 3, the Linux kernel involves a 'System Call Interface' 33a, receiving system calls 32d, 32e, and 32f from the respective applications such as an application #1 31a, an application #2 31b, and an application #3 31c, and serves as the denomination for the entirety of all implemented and available system calls in a kernel. The Linux kernel is based on a layered modules stack 36a which may include three levels of modules, such as module #1 36d, module #2 36e, and module #3 36f, where the module #1 36d communicate over connection 37e with the system call interface 33a, the module #2 36e communicates with the module #1 36d over connection 37f, and the module #3 36f communicates over the connection 37g with the module #2 36e and over a connection 37h with the HAL 38.

Similar to the WDM 30 shown in FIG. 3, the Linux kernel, shown as the arrangement 30a in FIG. 3a, is using the concept of layered architecture of a modules stack 36a, which may comprise module #1 36d, module #2 36e, and module #3 36f, communicating using messaging mechanism, such as a connection 37e between the system call interface 33a and the module #1 36d, a connection 37f between the module #1 36d and the module #2 36e, a connection 37g between the module #2 36e and the module #3 36f, and a connection 37h between the module #3 36f and the HAL 38.

The modules in the modules stack 36a, typically referred to as Loadable Kernel Modules (or LKM), are object files that contain code to extend the running Linux kernel, or so-called base kernel. LKMs are typically used to add support for new hardware and/or filesystems, or for adding system calls. When the functionality provided by an LKM is no longer required, it can be unloaded in order to free memory and other resources. Loadable kernel modules in Linux are located in /lib/modules and have had the extension '.ko' ("kernel object") since version 2.6 (previous versions used the .o extension), and are loaded (and unloaded) by the modprobe command. The lsmod command lists the loaded kernel modules. In emergency cases, when the system fails to boot (due to broken modules for example), specific modules can be enabled or disabled by modifying the kernel boot parameters list (for example, if using GRUB, by pressing 'e' in the GRUB start menu, then editing the kernel parameter line). Linux allows disabling module loading via sysctl option /proc/sys/kernel/modules_disabled. An initramfs system may load specific modules needed for a machine at boot, and then disable module loading.

Chrome OS is a Linux kernel-based operating system designed by Google Inc., Mountain View, California, U.S.A., to work primarily with web applications. The user interface takes a minimalist approach and consists almost entirely of just the Google Chrome web browser. Since the operating system is aimed at users who spend most of their computer time on the Web, the only "native" applications on Chrome OS are a browser, media player and file manager, making it almost a pure web thin client OS.

The Chrome OS includes a three-tier architecture with firmware, browser, and window manager, and a system-level software and Userland services. The firmware contributes to fast boot time by not probing for hardware, such as floppy disk drives that are no longer common on computers, especially netbooks. The firmware also contributes to security by verifying each step in the boot process and incorporating system recovery. The system-level software includes the Linux kernel that has been patched to improve boot performance. The Userland software has been trimmed to essentials, with management by Upstart, which can launch services in parallel, re-spawn crashed jobs, and defer services in the interest of faster booting. The Chrome OS user guide is described in the Samsung Electronics Co., Ltd. presentation entitled: "Google™ Chrome OS USER GUIDE" published 2011, which is incorporated in its entirety for all purposes as if fully set forth herein.

A mobile operating system (also referred to as mobile OS), is an operating system that operates a smartphone, tablet, PDA, or another mobile device. Modern mobile operating systems combine the features of a personal computer operating system with other features, including a touchscreen, cellular, Bluetooth, Wi-Fi, GPS mobile navigation, camera, video camera, speech recognition, voice recorder, music player, near field communication and infrared blaster. Currently, the popular mobile OSs include Android, Symbian, Apple iOS, BlackBerry, MeeGo, Windows Phone, and Bada. Mobile devices with mobile communications capabilities (e.g. smartphones) typically contain two mobile operating systems: a main user-facing software platform is supplemented by a second low-level proprietary real-time operating system that operates the radio and other hardware.

Android is a Linux-based, open source mobile operating system (OS) based on the Linux kernel that is currently offered by Google. With a user interface based on direct manipulation, Android is designed primarily for touchscreen mobile devices such as smartphones and tablet computers with specialized user interfaces for televisions (Android TV), cars (Android Auto), and wrist watches (Android Wear). The OS uses touch inputs that loosely correspond to real-world actions, such as swiping, tapping, pinching, and reverse pinching to manipulate on-screen objects, and a virtual keyboard. Despite being primarily designed for touchscreen input, it also has been used in game consoles, digital cameras, and other electronics. The response to user input is designed to be immediate and provides a fluid touch interface, often using the vibration capabilities of the device to provide haptic feedback to the user. Internal hardware such as accelerometers, gyroscopes and proximity sensors are used by some applications to respond to additional user actions. For example, adjusting the screen from portrait to landscape depending on the device orientation, or allowing the user to steer a vehicle in a racing game by rotating the device, a process that simulates control of a steering wheel.

Android devices boot to the homescreen, the primary navigation and information point on the device, which is similar to the desktop found on PCs. The homescreens on Android are typically made up of app icons and widgets. App icons launch the associated app, whereas widgets display live, auto-updating content such as the weather forecast, the user's email inbox, or a news ticker directly on the homescreen. A homescreen may be made up of several pages that the user can swipe back and forth between pages. A heavily-customizable Android homescreen interface allows the user to adjust the look and feel of the device to their liking. Third-party apps available on Google Play and other app stores can extensively re-theme the homescreen, and even mimic the look of other operating systems, such as Windows Phone. The Android OS is described in a publication entitled: "Android Tutorial", downloaded from tutorialspoint.com on July 2014, which is incorporated in its entirety for all purposes as if fully set forth herein.

iOS (previously iPhone OS) from Apple Inc. (headquartered in Cupertino, California, U.S.A.) is a mobile operating system distributed exclusively for Apple hardware. The user interface of the iOS is based on the concept of direct manipulation, using multi-touch gestures. Interface control elements consist of sliders, switches, and buttons. Interaction with the OS includes gestures such as swipe, tap, pinch, and reverse pinch, all of which have specific definitions within the context of the iOS operating system and its multi-touch interface. Internal accelerometers are used by some applications to respond to shaking the device (one common result is the undo command), or rotating it in three dimensions (one common result is switching from portrait to landscape mode). The iOS is described in a publication entitled: "IOS Tutorial", downloaded from tutorialspoint.com on July 2014, which is incorporated in its entirety for all purposes as if fully set forth herein.

A server device (in server/client architecture) typically offers information resources, services, and applications to clients, using a server dedicated or oriented operating system. A server device may consist of, be based on, include, or be included in the work-station 7, the computer system 10, or the computer 11. Current popular server operating systems are based on Microsoft Windows (by Microsoft Corporation, headquartered in Redmond, Washington, U.S.A.), Unix, and Linux-based solutions, such as the 'Windows Server 2012' server operating system, which is a part of the Microsoft 'Windows Server' OS family, that was released by Microsoft in 2012. 'Windows Server 2012' provides enterprise-class datacenter and hybrid cloud solutions that are simple to deploy, cost-effective, application-specific, and user-centric, and is described in Microsoft publication entitled: "Inside-Out Windows Server 2012", by William R. Stanek, published 2013 by Microsoft Press, which is incorporated in its entirety for all purposes as if fully set forth herein.

Unix operating system is widely used in servers. It is a multitasking, multiuser computer operating system that exists in many variants, and is characterized by a modular design that is sometimes called the "Unix philosophy", meaning the OS provides a set of simple tools, which each performs a limited, well-defined function, with a unified filesystem as the primary means of communication, and a shell scripting and command language to combine the tools to perform complex workflows. Unix was designed to be portable, multi-tasking and multi-user in a time-sharing configuration, and Unix systems are characterized by various concepts: the use of plain text for storing data, a hierarchical file system, treating devices and certain types of Inter-Process Communication (IPC) as files, the use of a large number of software tools, and small programs that can be strung together through a command line interpreter using pipes, as opposed to using a single monolithic program that includes all of the same functionality. Unix operating system consists of many utilities along with the master control program, the kernel. The kernel provides services to start and stop programs, handles the file system and other common "low level" tasks that most programs share, and schedules access to avoid conflicts when programs try to access the same resource, or device simultaneously. To mediate such access, the kernel has special rights, reflected in the division between user-space and kernel-space. Unix is described in a publication entitled: "*UNIX Tutorial*" by tutorialspoint.com, downloaded on July 2014, which is incorporated in its entirety for all purposes as if fully set forth herein.

Mail server. Mail server (a.k.a. Email server, Electronic Mail server, Mail Exchanger—MX) refer to a server operating as an electronic post office for email exchanging across networks, commonly performing the server-side of an MTA function. A Message Transfer Agent (or Mail Transfer Agent—MTA), or mail relay is a software that transfers electronic mail messages from one computer to another using a client-server application architecture. An MTA typically implements both the client (sending) and server (receiving) portions of the Simple Mail Transfer Protocol (SMTP). The Internet mail architecture is described in IETF RFC 5598 entitled: "*Internet Mail Architecture*", and the SMTP protocol is described in IETF RFC 5321 entitled: "*Simple Mail Transfer Protocol*" and in IETF RFC 7504 entitled: "*SMTP 521 and 556 Reply Codes*", which are all incorporated in their entirety for all purposes as if fully set forth herein.

The Domain Name System (DNS) typically associates a mail server to a domain with mail exchanger (MX) resource records, containing the domain name of a host providing MTA services. A message transfer agent receives mail from either another MTA, a Mail Submission Agent (MSA), or a Mail User Agent (MUA). The transmission details are specified by the Simple Mail Transfer Protocol (SMTP). When a recipient mailbox of a message is not hosted locally, the message is relayed, that is, forwarded to another MTA. Every time an MTA receives an email message, it adds a 'Received' trace header field to the top of the header of the message, thereby building a sequential record of MTAs handling the message. The process of choosing a target MTA for the next hop is also described in SMTP, but can usually be overridden by configuring the MTA software with specific routes. Internet mail schemes are described in IEEE Annals of the History of Computing paper published 2008 by the IEEE Computer Society [1058-6180/08], authored by Craig Partridge of BBN Technologies entitled: "*The technical Development of Internet Email*", which is incorporated in its entirety for all purposes as if fully set forth herein.

A mail server infrastructure consists of several components that work together to send, relay, receive, store, and deliver email, and typically uses various Internet standard protocols for sending and retrieving email, such as the Internet standard protocol Simple Mail Transfer Protocol (SMTP) for sending email, the Internet standard protocols for retrieving email Post Office Protocol (POP), and Internet Message Access Protocol version 4 (IMAPv4). An example of a mail server software is 'Microsoft Exchange Server 2013' (available from Microsoft Corporation, headquartered in Redmond, Washington, U.S.A.), described in 'Pocket Consultant' book [ISBN: 978-0-7356-8168-2] published 2013 by Microsoft Press and entitled: "*Microsoft Exchange Server 2013—Configuration & Clients*", which is incorporated in its entirety for all purposes as if fully set forth herein.

The POP is specified in IETF RFC 1939 entitled: "*Post Office Protocol*", and updated specification with an extension mechanism is described in IETF RFC 2449 entitled: "*POP3 Extension Mechanism*", and an authentication mechanism is described in IETF RFC 1734 entitled: "*POP3 AUTHentication command*", which are all incorporated in their entirety for all purposes as if fully set forth herein. IMAP4 clients can create, rename, and/or delete mailboxes (usually presented to the user as folders) on the mail server, and copy messages between mailboxes, and this multiple mailbox support also allows servers to access shared and public folders. IMAP4 is described in IETF RFC 3501 entitled: "*INTERNET MESSAGE ACCESS PROTOCOL—VERSION 4rev1*", and the IMAP4 Access Control List (ACL) Extension may be used to regulate access rights, and is described in IETF RFC 4314 entitled: "*IMAP4 Access Control List (ACL) Extension*", which are both incorporated in their entirety for all purposes as if fully set forth herein.

Mail servers may be operated, or used by mailbox providers, and mail servers are described in U.S. Pat. No. 5,832,218 to Gibbs et al. entitled: "Client/server Electronic Mail System for Providing Off-Line Client Utilization and Seamless Server Resynchronization", in U.S. Pat. No. 6,081,832 to Gilchrist et al. entitled: "Object Oriented Mail Server Framework Mechanism", in U.S. Pat. No. 7,136,901 to Chung et al. entitled: "Electronic Mail Server", and in U.S. Pat. No. 7,818,383 to Kodama entitled: "E-Mail Server", which are all incorporated in their entirety for all purposes as if fully set forth herein.

Database server. A database server is a server or computer program that is executed on a server device that provides database services to clients using a client-server model. Database management systems frequently provide database server functionality, and some DBMSs (e.g., MySQL) rely exclusively on the client-server model for database access. Most of the Database servers work with the base of Query language. Each Database understands its query language, converts it to Server readable form, and executes it to retrieve the results. Some examples of proprietary database servers are Oracle, DB2, Informix, and Microsoft SQL Server. The database software DB2 Version 9.5 (for Linux, UNIX, and Windows) is available from International Business Machines (IBM) Corporation and is described in an IBM published 2008 guide [SC23-5849-01] entitled: "*Data Servers, Databases, and Database Objects Guide, Updated March,* 2008", which is incorporated in its entirety for all purposes as if fully set forth herein. The database software Microsoft SQL Server 2014 is available from Microsoft Corporation and is described in a Technical Overview published by Microsoft Press [ISBN: 978-0-7356-8475-1], entitled: "*Introducing Microsoft SQL Server* 2014*—Technical Overview*", which is incorporated in its entirety for all purposes as if fully set forth herein.

A client device (in server/client architecture) typically receives information resources, services, and applications from servers, and is using a client dedicated or oriented operating system. The client device may consist of, be based on, include, or be included in, the workstation 7, the computer system 10 or the computer 11. Current popular client operating systems are based on Microsoft Windows (by Microsoft Corporation, headquartered in Redmond, Washington, U.S.A.), which is a series of graphical interface operating systems developed, marketed, and sold by Microsoft. Microsoft Windows is described in Microsoft publications entitled: "*Windows Internals—Part* 1" and "*Windows Internals—Part* 2", by Mark Russinovich, David A. Solomon, and Alex Ioescu, published by Microsoft Press in 2012, which are both incorporated in their entirety for all purposes as if fully set forth herein. Windows 8 is a personal computer operating system developed by Microsoft as part of Windows NT family of operating systems, that was released for general availability on October 2012, and is described in Microsoft Press 2012 publication entitled: "*Introducing Windows 8—An Overview for IT Professionals*" by Jerry Honeycutt, which is incorporated in its entirety for all purposes as if fully set forth herein.

Web browser. A web browser 31c (commonly referred to as a browser) is a software application for retrieving, presenting, and traversing information resources on the World Wide Web. An information resource is identified by a Uniform Resource Identifier (URI/URL) and may be part of a web page, an image, a video, or any other piece of content. Hyperlinks present in resources enable users easily to easily navigate their browsers to related resources. Although browsers are primarily intended to use the World Wide Web, they can also be used to access information provided by web servers in private networks or files in file systems. The primary purpose of a web browser is to bring information resources to the user ("retrieval" or "fetching"), allowing them to view the information ("display", "rendering"), and then access other information ("navigation", "following links"). Currently the major web browsers are: Firefox, Internet Explorer, Google Chrome, Opera, and Safari.

The process begins when the user inputs a Uniform Resource Locator (URL), for example 'http://en.wikipedia.org/', into the browser. The prefix of the URL, the Uniform Resource Identifier (URI), determines how the URL will be interpreted. The most commonly used type of URI starts with 'http:', and identifies a resource to be retrieved over the Hypertext Transfer Protocol (HTTP). Many browsers also support a variety of other prefixes, such as 'https:' for HTTP Secure (HTTPS), 'ftp:' for the File Transfer Protocol (FTP), and 'file:' for local files. Prefixes that the web browser cannot directly handle are often handed off to another application entirely. For example, 'mailto:' URIs are usually passed to the user's default e-mail application, and 'news:' URIs are passed to the user's default newsgroup reader. In the case of http, https, file, and others, once the resource has been retrieved, the web browser will display it. HTML and associated content (image files, formatting information such as CSS, etc.) is passed to the browser's layout engine to be transformed from markup to an interactive document, a process known as "rendering". Aside from HTML, web browsers can generally display any kind of content that can be part of a web page. Most browsers can display images, audio, video, and XML files, and often have plug-ins to support Flash applications and Java applets. Upon encountering a file of an unsupported type, or a file that is set up to be downloaded rather than displayed, the browser prompts the user to save the file to disk. Information resources may contain hyperlinks to other information resources. Each link contains the URI of a resource to go to. When a link is clicked, the browser navigates to the resource indicated by the link's target URI, and the process of bringing content to the user begins again.

Examples of web browsers functionalities and structures are described in U.S. Pat. No. 5,572,643 to Judson entitled: "Web Browser with Dynamic Display of Information Objects During Linking", in U.S. Pat. No. 5,701,451 to Rogers et al. entitled: "A Method for Fulfilling Requests of a Web Server", in U.S. Pat. No. 5,793,964 to Rogers et al. entitled: "Web Browser System", and in U.S. Pat. No. 6,230,171 to Pacifici et al. entitled: "Markup System for Shared HTML Documents", which are all incorporated in their entirety for all purposes as if fully set forth herein. The architecture and functionalities of a web browser are further described in a publication entitled: "*Architecture and evolution of the modern web browser*" by Alan Grosskurth and Michael W. Godfrey of the University of Waterloo in Canada, dated Jun. 20, 2006, in a publication by Alan Grosskurth and Michael W. Godfrey of the University of Waterloo in Canada entitled: "*A Reference Architecture for web browsers*" (downloaded May 20, 2015), in an International Business Machines (IBM) Corporation 1996 Open Blueprint publication G325-6589-00 entitled: "*Web Browser Resource Manager*", and in a paper by Adam Barth, Collin Jackson, Charles Reis, and the Google Chrome Team (downloaded May 20, 2015) entitled: "*The Security Architecture of the Chromium Browser*", which are all incorporated in their entirety for all purposes as if fully set forth herein.

A currently popular web browser is the Internet Explorer (formerly Microsoft Internet Explorer and Windows Internet Explorer, commonly abbreviated IE or MSIE) from Microsoft Corporation, headquartered in Redmond, Washington, U.S.A., which is a series of graphical web browsers developed by Microsoft and included as part of the Microsoft Windows line of operating systems. The Internet Explorer 8 is described, for example, in Microsoft 2009 publication entitled: "*Step by Step Tutorials for Microsoft Internet Explorer 8 Accessibility Options*", which is incorporated in its entirety for all purposes as if fully set forth herein. Another popular web browser is the Google Chrome which is a freeware web browser developed by Google, headquartered in Googleplex, Mountain View, California, U.S.A. Google Chrome aims to be secure, fast, simple, and stable, providing strong application performance and JavaScript processing speed.

A mobile browser, also called a microbrowser, minibrowser, or Wireless Internet Browser (WIB), is a web browser designed for use on a mobile device such as a mobile phone or PDA. Mobile browsers are optimized to display Web content most effectively for small screens on portable devices. Mobile browser software must be small and efficient to accommodate the low memory capacity and low-bandwidth of wireless handheld devices. Some mobile browsers can handle more recent technologies like CSS 2.1, JavaScript, and Ajax. Websites designed for access from these browsers are referred to as wireless portals, or collectively as the Mobile Web.

The mobile browser typically connects via cellular network, Wireless LAN, or via other wireless networks using standard HTTP over TCP/IP, and displays web pages written in HTML, XHTML Mobile Profile (WAP 2.0), or WML (which evolved from HDML). WML and HDML are stripped-down formats suitable for transmission across limited bandwidth, and wireless data connection called WAP. WAP 2.0 specifies XHTML Mobile Profile plus WAP CSS, subsets of the W3C's standard XHTML and CSS with minor mobile extensions. Some mobile browsers are full-featured Web browsers capable of HTML, CSS, ECMAScript, as well as mobile technologies such as WML, i-mode HTML, or cHTML. To accommodate small screens, some mobile browsers use Post-WIMP interfaces. An example of a mobile browser is Safari, which is a mobile web browser developed by Apple Inc. (headquartered in Apple Campus, Cupertino, California, U.S.A), included with the OS X and iOS operating systems, and described in Apple publication entitled: "*Safari Web Content Guide*", dated March 2014, which is incorporated in its entirety for all purposes as if fully set forth herein.

A multitasking is a method where multiple tasks (also known as processes or programs) are performed during the same period of time, and executed concurrently (in overlapping time periods, new tasks starting before others have ended) instead of sequentially (one completing before the next starts). The tasks share common processing resources, such as a CPU and main memory. Multitasking does not necessarily mean that multiple tasks are being executed, exactly at the same instant. In other words, multitasking does not imply parallelism, but it does mean that more than one task can be part-way through execution at the same time, and more than one task is advancing over a given period of time.

In the case of a computer with a single CPU, only one task is said to be running at any point in time, meaning that the CPU is actively executing instructions for that task. Multitasking solves the problem by scheduling which task may be the one running at any given time, and when another waiting task gets its turn. The act of reassigning a CPU from one task to another one is called a context switch. When context switches occur frequently enough, the illusion of parallelism is achieved. Even on computers with more than one CPU (called multiprocessor machines) or more than one core in a given CPU (called multicore machines), where more than one task can be executed at a given instant (one per CPU or core), multitasking allows many more tasks to be run than the number of available CPUs.

Operating systems may adopt one of many different scheduling strategies. In multiprogramming systems, the running task keeps running until it performs an operation that requires waiting for an external event (e.g. reading from a tape) or until the computer's scheduler forcibly swaps the running task out of the CPU. Multiprogramming systems are designed to maximize CPU usage. In time-sharing systems, the running task is required to relinquish the CPU, either voluntarily or by an external event such as a hardware interrupt. Time sharing systems are designed to allow several programs to execute simultaneously. In real-time systems, some waiting tasks are guaranteed to the CPU when an external event occurs. Real time systems are designed to control mechanical devices such as industrial robots, which require timely processing.

Multiprocessing is the use of two or more processors or Central Processing Units (CPUs) within a single computer system, typically combined with the ability to allocate tasks between them. In order to process programs simultaneously, the multiple processors commonly share main memory and peripherals. In a multiprocessing system, all CPUs may be equal, or some may be reserved for special purposes. A combination of hardware and operating system software design considerations determine the symmetry (or lack thereof) in a given system. For example, hardware or software considerations may require that only one particular CPU respond to all hardware interrupts, whereas all other work in the system may be distributed equally among CPUs; or execution of kernel-mode code may be restricted to only one particular CPU, whereas user-mode code may be executed in any combination of processors. Systems that treat all CPUs equally are called symmetric multiprocessing (SMP) systems. In systems where all CPUs are not equal, system resources may be divided in a number of ways, including Asymmetric Multiprocessing (ASMP), Non-Uniform Memory Access (NUMA) multiprocessing, and clustered multiprocessing.

In multiprocessing, the processors are typically used to execute a single sequence of instructions in multiple contexts (single-instruction, multiple-data or SIMD, often used in vector processing), multiple sequences of instructions in a single context (multiple-instruction, single-data or MISD, used for redundancy in fail-safe systems and sometimes applied to describe pipelined processors or hyper-threading), or multiple sequences of instructions in multiple contexts (multiple-instruction, multiple-data or MIMD). Tightly coupled multiprocessor systems contain multiple CPUs that are connected at the bus level, and may have access to a central shared memory (SMP or UMA), or may participate in a memory hierarchy with both local and shared memory (NUMA). Chip multiprocessors, also known as multi-core computing, involves more than one processor placed on a single chip and can be thought of the most extreme form of tightly-coupled multiprocessing. Loosely coupled multiprocessor systems (often referred to as clusters) are based on multiple standalone single, or dual processor commodity computers interconnected via a high-speed communication system (Gigabit Ethernet is common). Tightly-coupled systems perform better and are physically smaller than loosely-coupled systems, but have historically required greater initial investments and may depreciate rapidly. Nodes in a loosely-coupled system are usually inexpensive commodity computers and can be recycled as independent machines upon retirement from the cluster.

Filter driver. A filter driver is a Microsoft Windows compatible driver that extends or modifies the function of peripheral devices, or supports a specialized device in a personal computer, and commonly relates to a driver, program, or module that is inserted into the existing driver stack to perform some specific function, while not affecting the normal working of the existing driver stack in any major way. Any number of filter drivers can be added to Windows, where upper-level filter drivers sit above the primary driver for the device (the function driver), while lower level filter drivers sit below the function driver and above a bus driver. Filter drivers may work on a certain brand of devices such as a mouse or keyboard, or they may perform some operation on a class of devices, such as any mouse or any keyboard. A filter driver may be developed using the guide entitled: "*Filter Driver Development Guide*" Version 1.0a by Microsoft Corporation, dated 2004, which is incorporated in its entirety for all purposes as if fully set forth herein.

Hook. A hook (also known as a hook procedure or hook function) is a mechanism by which an application can intercept events, such as messages, mouse actions, and keystrokes, and generally refers to a function provided by a software application that receives certain data before the normal or intended recipient of the data. The hook function can thus examine or modify certain data before passing on the data. The hook function allows a software application to examine, or modify data before the data is passed to the intended recipient. A function that intercepts a particular type of event is known as a hook procedure. The hook procedure can act on each event it receives, and then modify or discard the event. The term 'hooking' is used herein to include, but not limited to, a range of techniques used to alter or augment the behavior of an operating system, applications, or other software components by intercepting function calls, messages, or events passed between software components. A code that handles such intercepted function calls, events or messages is called a "hook". Hooking is used for many purposes, including debugging and extending functionality.

Examples may include intercepting keyboard or mouse event messages before they reach an application, or intercepting operating system calls in order to monitor behavior, or modify the function of an application or another component. It is also widely used in benchmarking programs, for example frame rate measuring in 3D games, where the output and input are done through hooking. Hooking is described in the presentations by High-Tech Bridge SA and titled: "*Userland Hooking in Windows*" dated August 2011, and "*Inline Hooking in Windows*" dated September 2011, both by Brian Mariani, and both incorporated in their entirety for all purposes as if fully set forth herein.

Physical modification. A hooking may be achieved by physically modifying an executable or library before an application is run through techniques of reverse engineering. This is typically used to intercept function calls to either monitor or replace them entirely. For example, by using a disassembler, the entry point of a function within a module can be found. It can then be altered to dynamically load some other library module and then have it execute desired methods within that loaded library. If applicable, altering an import table of an executable is another related approach by which hooking can be achieved. This table can be modified to load any additional library modules as well as changing what external code is invoked when a function is called by an application. An alternate method for achieving the function of hooking is by intercepting function calls through a wrapper library. When creating a wrapper, you make your own version of a library that an application loads, with all the same functionality of the original library that it will replace, so all the functions that are accessible, are essentially the same between the original and the replacement. This wrapper library can be designed to call any of the functionality from the original library, or replace it with an entirely new set of logic.

Runtime modification. Operating systems and software may provide the means to easily insert event hooks at runtime, as long as the process inserting the hook is granted enough permission to do so. Microsoft Windows allows inserting hooks that can be used to process or modify system events and application events for dialogs, scrollbars, and menus, as well as other items. It also allows a hook to insert, remove, process, or modify keyboard and mouse events. Linux provides another example where hooks can be used in a similar manner to process network events within the kernel through NetFilter. When such functionality is not provided, a special form of hooking employs intercepting library function calls that are made by a process. Function hooking is implemented by changing the very first few code instructions of the target function to jump to an injected code. Alternatively, on systems using the shared library concept, the interrupt vector table or the import descriptor table can be modified in memory.

A hook chain is a list of pointers to special, application-defined callback functions called hook procedures. When a message occurs that is associated with a particular type of hook, the operating system passes the message to each hook procedure referenced in the hook chain, one after the other. The action of a hook procedure can depend on the type of hook involved. For example, the hook procedures for some types of hooks can only monitor messages, while others can modify the messages, or stop their progress through the chain, restricting them from reaching the next hook procedure, or a destination window.

Plug-in. A plug-in (or 'plugin', 'extension', or 'add-on'/ 'addon') is a software component that adds a specific feature to an existing software application, such as enabling customization. The common examples are the plug-ins used in web browsers to add new features such as search-engines or virus scanners, or the ability to utilize a new file type such as a new video format. An 'Add-on' (or 'addon') is the general term for what enhances an application, and comprises snap-in, plug-in, theme, and skin. An extension add-on tailors the core features of an application by adding an optional module, whereas a plug-in add-on would tailor the outer layers of an application to personalize functionality. A theme or a skin add-on is a preset package containing additional or changed graphical appearance details, achieved by the use of a Graphical User Interface (GUI) that can be applied to a specific software and websites to suit the purpose, topic, or tastes of different users to customize the look and feel of a piece of computer software or an operating system front-end GUI (and window managers).

Typically, the host application provides services which the plug-in can use, including a way for plug-ins to register themselves with the host application, and protocol for the exchange of data with plug-ins. Plug-ins depend on the services provided by the host application and do not usually work by themselves. Conversely, the host application operates independently of the plug-ins, making it possible for end-users to add and update plug-ins dynamically without needing to make changes to the host application. The term 'plug-in' is used herein to include, but not limited to, a software extension, which is software that serves to extend the capabilities of, or data available to existing software application; it becomes included in the program. Therefore, after integration, extensions can be seen as part of the browser itself, tailored from a set of optional modules.

IPC. An Inter-Process Communication (IPC) (also be referred to as inter-thread communication and inter-application communication) is a set of methods for the exchange of data between multiple threads, in one or more processes. IPC methods may use message passing, synchronization, shared memory, and Remote Procedure Calls (RPC). It provides an environment that allows process cooperation, and may be used for providing information sharing, computational speedup, modularity, convenience, and privilege separation. In the Windows operating system environment, the IPC provides mechanisms for facilitating communications and data sharing between processes or applications.

Common IPC methods include file sharing, where a record (or any other information) stored on disk (or any other memory) can be accessed by name by any process; a signal which is an asynchronous notification sent to a process, or to a specific thread within the same process in order to notify it of an event that occurred; a socket which is a data stream sent over a network interface, either to a different process on the same computer or on another computer, such as Internet sockets; a pipe (or pipeline) which is a two-way data stream interfaced through standard input and output and is read character by character, commonly used in Unix-like computer operating systems; message queues which are anonymous data stream similar to the pipe that stores and retrieves information in packets, providing an asynchronous communications protocol; a semaphore which is a variable or abstract data type that is used for controlling access to a common resource; a shared memory which is a memory that may be simultaneously accessed by multiple programs with an intent to provide communication among them, or avoid redundant copies, such as where one process creates an area in RAM which other processes can access; and memory mapped file, where a file that is physically present on-disk, but can also be a device, shared memory object, or other resource that the operating system can reference through a file descriptor. Few IPC mechanisms are described in Chapter 9 of the Marko Vuskovic publication 'Operating Systems', entitled: "*INTERPROCESS COMMUNICATION*", which is incorporated in its entirety for all purposes as if fully set forth herein.

The Windows operating system supports IPC mechanisms such as a clipboard, where the clipboard acts as a central depository for data sharing among applications, so when a user performs a cut or copy operation in an application, the application puts the selected data on the clipboard in one or more standard, or application-defined formats, and any other application can then retrieve the data from the clipboard, choosing from the available formats that it understands; using Component Object Model (COM), where applications that use Object Linking and Embedding OLE) manage compound documents can be used to call on other applications for data editing; Using Data Copy enabling an application to send information to another application using the WM_COPYDATA message; DDE protocol that enables applications to exchange data in a variety of formats; and mailslots providing one-way communication where processes write messages to their mailslot.

Browser extension. A browser extension is a computer program that extends the functionality of a web browser in some way. Extensions can be created through the use of web technologies such as HTML, JavaScript, and CSS. Browser extensions can also improve the user interface of the web browser without directly affecting the viewable content of a web page, which can be achieved through a variety of add-ons, such as toolbars and plug-ins. The syntax for extensions may differ from browser to browser, or at least enough different that an extension working on a browser does not work on another one.

Plug-ins add specific abilities into browsers using Application Programming Interfaces (APIs) allowing third parties to create plug-ins that interact with the browser. The original API was NPAPI, but subsequently Google introduced the PPAPI interface in Chrome. In addition, plug-ins allow browser extensions to perform tasks such as blocking ads, creating a secure online connection, and adding applications to a browser. Common browser plug-ins include the Adobe Flash Player, the QuickTime Player, and the Java plug-in, which can launch a user-activated Java applet on a web page, and the applet is then executed within a Java Virtual Machine (JVM) in a process separate from the web browser itself.

Sockets. A socket (a.k.a. 'network socket') is an endpoint of an IPC flow across a computer network. In the case the communication is based on IP (Internet Protocol), the network sockets are referred to as Internet sockets. A socket API is an application programming interface (API), usually provided by the operating system that allows application programs to control and use network sockets. Internet socket APIs are usually based on the Berkeley sockets standard. A socket address is the combination of an IP address and a port number, similar to one end of a telephone connection in the combination of a phone number and a particular extension. Based on this address, internet sockets deliver incoming data packets to the appropriate application process or thread. Sockets are further described in a University of Toronto, Department of Computer Science presentation entitled: "*Tutorial on Socket Programming*" by Amin Tootoonchian, downloaded on August 2014, and in the SAS Institute Inc. SHARE Session 5958 tutorial 'C Socket Programming Tutorial' entitled: "*Writing Client/Server Programs in C Using Sockets (A Tutorial) Part 1*", by Greg Granger, dated February of 1998, which are both incorporated in their entirety for all purposes as if fully set forth herein.

An Internet socket is characterized by a unique combination of a Local socket address (Local IP address and port number), remote socket address (used for established TCP sockets), and the used Protocol, typically a transport protocol (e.g., TCP, UDP, raw IP, or others). Within the operating system and the application that created a socket, a socket is referred to by a unique integer value called a socket descriptor. The operating system forwards the payload of incoming IP packets to the corresponding application by extracting the socket address information from the IP and transport protocol headers, and stripping the headers from the application data.

Several Internet socket types are available, such as Datagram sockets, also known as connectionless sockets, which use User Datagram Protocol (UDP), Stream sockets, also known as connection-oriented sockets, which use Transmission Control Protocol (TCP) or Stream Control Transmission Protocol (SCTP), and Raw sockets (or Raw IP sockets), typically available in routers and other network equipment. Here the transport layer is bypassed, and the packet headers are made accessible to the application. Other socket types are implemented over other transport protocols, such as Systems Network Architecture (SNA). Communicating local and remote sockets are called socket pairs. Each socket pair is described by a unique 4-tuple consisting of source and destination IP addresses and port numbers, i.e. of local and remote socket addresses. In the TCP case, each unique socket pair 4-tuple is assigned a socket number, while in the UDP case each unique local socket address is assigned a socket number.

The socket is primarily a concept used in the Transport Layer of the Internet model. Networking equipment such as routers and switches, do not require implementations of the Transport Layer, as they operate on the Link Layer level (switches) or at the Internet Layer (routers). However, stateful network firewalls, network address translators, and proxy servers keep track of active socket pairs. Also in fair queuing, layer 3 switching and quality of service (QoS) support in routers, packet flows may be identified by extracting information about the socket pairs. Raw sockets are typically available in network equipment and are used for routing protocols such as IGRP and OSPF, and in Internet Control Message Protocol (ICMP).

The amount of data transferred during a given period in commonly referred to as 'bandwidth' (BW) or 'bit-rate', which is the number of bits that are conveyed or processed per unit of time. The bit rate is quantified using the bits per second unit (symbol bit/s or b/s), often in conjunction with an SI prefix such as kilo—(1 Kbit/s=1000 bit/s), mega—(1 Mbit/s=1000 Kbit/s), giga—(1 Gbit/s=1000 Mbit/s) or tera—(1 Tbit/s=1000 Gbit/s). The non-standard abbreviation bps is often used to replace the standard symbol bit/s, so that, for example, "1 Mbps" (or 1 Mb/s) is used to mean one million bits per second. One byte per second (1 B/s) corresponds to 8 bit/s.

Latency is typically defined as a time interval between the stimulation and the response, or from a more general point of view, as a time delay between the cause and the effect of some physical change in the system being observed. Network-related latency, such as in a packet-switched network, is measured either one-way (the time from the source sending a packet to the destination receiving it), or Round-Trip delay Time (RTT), referring to the one-way latency from source to destination plus the one-way latency from the destination back to the source, plus any delays at the destination, such as processing or other delays. Round-trip latency can be measured from a single point. Latency limits total bandwidth in reliable two-way communication systems as described by the bandwidth-delay product, which refers to the product of a data link's capacity (in bits per second) and its end-to-end delay (in seconds). The result, an amount of data measured in bits (or bytes), is equivalent to the maximum amount of data on the network circuit at any given time, i.e., data that has been transmitted but not yet acknowledged. Sometimes it is calculated as the data link's capacity multiplied by its round trip time. A network with a large bandwidth-delay product is commonly known as a Long Fat Network (LFN). As defined in IETF RFC 1072, a network is considered an LFN if its bandwidth-delay product is significantly larger than 105 bits (12500 bytes).

The Round-trip Delay Time (RTD) or Round-Trip Time (RTT) is the length of time it takes for a signal to be sent and to be received and processed at the destination node, plus the length of time it takes for an acknowledgment of that signal to be received. This time delay therefore, includes the propagation times between the two points of a signal. The signal is generally a data packet, and the RTT is also known as the ping time, where an internet user can determine the RTT by using the ping command. Network links with both a high bandwidth and a high RTT can have a very large amount of data (the bandwidth-delay product) "in flight" at any given time. Such "long fat pipes" require a special protocol design. One example is the TCP window scale option. The RTT was originally estimated in TCP by: RTT=($\alpha$·Old_RTT)+((1−$\alpha$)·New_Round_Trip_Sample), where a is a constant weighting factor (0≤$\alpha$<1). Choosing a value $\alpha$ close to 1 makes the weighted average immune to changes that last a short time (e.g., a single segment that encounters long delay). Choosing a value for $\alpha$ close to 0 makes the weighted average response to changes in delay very quickly. Once a new RTT is calculated, it is entered into the above equation to obtain an average RTT for that connection, and the procedure continues with every new calculation. The RTT may be measured as described in IETF 1323, and may be estimated by using a method described in IETF RFC 6323, which are both incorporated in their entirety for all purposes as if fully set forth herein.

An estimation of RTT for messages using TCP may use Karn's Algorithm, described by Karn Phil and Craig Partridge in ACM SIGCOMM '87—Computer Communication Review publication, entitled: "*Improving Round-Trip Time Estimates in Reliable Transport Protocols*", which is incorporated in its entirety for all purposes as if fully set forth herein. The round trip time is estimated as the difference between the time that a segment was sent and the time that its acknowledgment was returned to the sender, but when packets are re-transmitted, there is an ambiguity: the acknowledgment may be a response to the first transmission of the segment or to a subsequent re-transmission. Karn's Algorithm ignores re-transmitted segments when updating the round-trip time estimate. Round trip time estimation is based only on unambiguous acknowledgments, which are acknowledgments for segments that were sent only once.

Many software platforms provide a service called 'ping' that can be used to measure round-trip latency. Ping performs no packet processing; it merely sends a response back when it receives a packet (i.e., performs a no-op), thus it is a first rough way of measuring latency. Ping operates by sending Internet Control Message Protocol (ICMP) echo requesting packets to the target host, and waiting for an ICMP response. During this process it measures the time from transmission to reception (round-trip time), and records any packet loss. The results of the test are printed in a form of a statistical summary of the response packets received, including the minimum, maximum, and the mean round-trip times, and sometimes the standard deviation of the mean.

The Transmission Control Protocol/Internet Protocol (TCP/IP) suite normally used on the Internet has included an Internet Message Control Protocol (ICMP) that is commonly used in echo testing or ping and trace route applications. In general, the Internet standard 'ping' or 'ICMP echo' has a request/response format, wherein one device sends an ICMP echo request and another device responds to a received ICMP echo request with a transmitted ICMP echo response. Normally, IP devices are expected to implement the ICMP as part of the support for IP, to be able to use ICMP for testing. Internet RFC 792, entitled "*Internet Control Message Protocol. DARPA Internet Program Protocol Specification*", which is incorporated in its entirety for all purposes as if fully set forth herein, at least partially describes the behavior of ICMP. The ICMP echo message has a type field, a code field, a checksum field, an identifier field, a sequence number field, and a data field. According to RFC 792: "The data received in the echo message must be returned in the echo reply message". Thus, an RFC compliant ping responders or an ICMP echo reply message responders are supposed to copy the received data field in an echo request message directly into the data field of the transmitted echo response message.

A newer version of ICMP known as ICMP version 6 or ICMPv6 as described at least partially in RFCs 1885 and 2463, which are both entitled "*Internet Control Message Protocol (ICMPv6) for the Internet Protocol Version 6 (IPv6) Specification*", which are both incorporated in their entirety for all purposes as if fully set forth herein. According to RFC 2463, "Every [IPv6] node MUST implement an ICMPv6 Echo responder function that receives Echo Requests and sends corresponding Echo Replies. An IPv6 node SHOULD also implement an application-layer interface for sending Echo Requests and receiving Echo Replies, for diagnostic purposes.". Thus, responding to ICMP echo requests normally is a necessary function in supporting IPv4 and/or IPv6 standards. The ICMPv6 RFCs 1885 and 2463 goes on to specify that the data field of an ICMP echo response contains the "data from the invoking Echo Request message." Therefore, both ICMP and ICMP v6 associated with IPv4 and IPv6, respectively, specify that the data field in an ICMP echo reply message is to essentially contain a copy of the data received in the corresponding ICMP echo request message.

Moreover, the ICMP echo protocol is basically a two-way echo in which one initiating device and/or process starts the communication by transmitting an echo request message, which may be then received by an echo responder process. The echo responder process, generally located on another device, receives the echo request message and responds with an echo reply back to the initiating process. Once the initiating device and/or process receives the response or times out waiting for the response, the two-way echo exchange of messages is complete. Although the echo request and echo response normally are performed between processes on two different devices, one skilled in the art will be aware that a device can ping its own IP address implying that the echo request and echo responder reply processes are on the same device. In addition, the loopback address of network 127.0.0.0 in IPv4 can be used to allow a device to the loopback outbound echo request messages back into the device incoming echo request responder processes. IPv6 has a loopback functionality as well.

This copying of data exactly in the ICMP echo response is somewhat wasteful because the responder generally does not convey that much (if any) information back to the ICMP echo request initiating device. The initiating device can compute bit error rate (BER) statistics on the transmitted versus the received data field in ICMP echo packets. However, such physical layer related issues such as BER statistics normally are not as relevant for network layer IP datagrams that already include various error control code mechanisms. The device running the responding process may communicate information to the device running the initiating process by having the device running the original responding process initiate its own echo request and waiting for an echo response from the original initiating device. Such a solution results in four packets, with a first echo request from a local device responded to by a first echo response from a remote device, and with a second echo request from the remote device responded to by a second echo response from the local device.

An identifier and/or sequence number in ping packets generally has allowed the ping to be used by a device to determine the round-trip delay from the time an ICMP echo request packet is sent to the time corresponding to when an associated received ICMP echo request is received back at an initiating device. Furthermore, ping packets generally convey little or no information about the type of the device that initiated the ping. Although IPv4 has Type of Service (ToS) fields in the IP datagram, these fields have become more important as the services used over the Internet, and networks using Internet technology have grown from basic computer data communication to further include real-time applications such as voice and/or video. Various Type of Service (ToS) in IPv4 and IPv6 have been used in implementing various (Quality of Service) QoS characteristics that are defined for different classes of service and/or Service Level Agreements (SLAs).

Caching. A system and method for increasing cache size by performing the steps of: categorizing storage blocks within a storage device as within a first category of storage blocks if the storage blocks that are available to the system for storing data when needed; categorizing storage blocks within the storage device as within a second category of storage blocks if the storage blocks contain application data therein; and categorizing storage blocks within the storage device as within a third category of storage blocks if the storage blocks are storing cached data and are available for storing application data if no first category of storage blocks are available to the system, is described in U.S. Pat. No. 8,135,912 to Shribman et al. entitled: "System and Method of Increasing Cache Size", which is incorporated in its entirety for all purposes as if fully set forth herein. A system for resolving Domain Name System (DNS) queries that contains a communication device for resolving DNS queries, wherein the communication device further contains a memory and a processor that is configured by the memory, a cache storage for use by the communication device, and a network of authoritative domain name servers, where in a process of the communication device looking up a DNS request within the cache storage, if the communication device views an expired DNS entry within the cache storage, the communication device continues the process of looking up the DNS request in the cache storage while, in parallel, sending out a concurrent DNS request to an authoritative domain name server that the expired DNS entry belongs to, is described in U.S. Pat. No. 8,671,221 to the same inventors as this application, entitled: "Method and System for Increasing Speed of Domain Name System Resolution within a Computing Device", which is incorporated in its entirety for all purposes as if fully set forth herein.

Systems and methods of storing previously transmitted data and using it to reduce bandwidth usage and accelerate future communications, and using algorithms to identify long compression history matches. A network device that may improve compression efficiency and speed is described in U.S. Pat. No. 7,865,585 to Samuels et al., entitled: "Systems and Methods for Providing Dynamic Ad Hok Proxy-Cache Hierarchies", which is incorporated in its entirety for all purposes as if fully set forth herein. Further, a method and system for accelerating the receipt of data in a client-to-client network described in U.S. Pat. No. 7,203,741 to Marco et al., entitled: "Method and System for Accelerating Receipt of Data in a Client-to-Client Network", which is incorporated in its entirety for all purposes as if fully set forth herein.

Cache eviction schemes. Cache eviction schemes, also known as cache algorithms, cache replacement algorithms, or cache replacement policies, are optimizing instructions or algorithms that a computer program or a hardware-maintained structure can follow in order to optimally manage a cache of information stored on the computer. In particular, when the cache is full, the algorithm must choose which items to discard to make room for the new ones. Memories inherently provide finite and limited storage space, so when the storage becomes full, stored elements are evicted according to an eviction scheme in order to avoid overflow. The eviction scheme is usually serving two primary figures of merit of a cache: The latency, and the hit rate. The "hit ratio" of a cache describes how often a searched-for item is actually found in the cache, and more efficient replacement policies keep track of more usage information in order to improve the hit rate (for a given cache size). The "latency" of a cache describes how long after requesting a desired item the cache can return that item (when there is a hit). Faster replacement strategies typically keep track of less usage information or, in the case of direct-mapped cache, no information—to reduce the amount of time required to update that information. Commonly an eviction scheme strategy is a compromise between hit rate and latency.

Cache eviction schemes are described in a paper by Zhifeng Cheny, Yuanyuan Zhouy, (of Department of Computer Science, University of Illinois at Urbana-Champaign) and Kai Li (of Department of Computer Science, Princeton University) (downloaded from the Internet on 2-2016) entitled: "*Eviction Based Cache Placement for Storage Caches*", in an article published 2014 by the IEEE Computer Society [0018-9162/04] authored by Nimrod Megiddo and Dharmendra S. Modha (of IBM Almaden Research Center) entitled: "*Outperforming LRU with an Adaptive Replacement Cache Algorithm*", in an article published in the Proceedings of the International Conference on Computer Design, San Jose, Oct. 2-5, 2005 by Mazen Kharbutli and Yan Solihin (both of Department of Electrical and Computer Engineering, North Carolina State University) entitled: "*Counter-Based Cache Replacement Algorithms*", and in a paper (downloaded 2-2016 from the Internet) by Keqiu Li, Takashi Nanya, Hong Shen, Francis Y. L. Chin, and Weishi Zhang entitled: "*An Efficient Cache Replacement Algorithm for Multimedia Object Caching*", which are all incorporated in their entirety for all purposes as if fully set forth herein. Examples of cache eviction schemes include Beladys algorithm, Least Recently Used (LRU), Most Recently Used (MRU), Pseudo-LRU (PLRU), Random Replacement (RR), Least Frequently Used (LFU), and First-In-First-Out (FIFO).

Beladys algorithm. The most efficient caching algorithm would be to always discard the information that will not be needed for the longest time in the future. This optimal result is referred to as Bélády's optimal algorithm or the clairvoyant algorithm. Since it is generally impossible to predict how far in the future information will be needed, this is generally not implementable in practice. The practical minimum can be calculated only after experimentation, and one can compare the effectiveness of the actually chosen cache algorithm.

Least Recently Used (LRU). This scheme involves discarding the least recently used items first. This algorithm requires keeping track of what was used and when, which is expensive if one wants to make sure the algorithm always discards the least recently used item. General implementations of this technique require keeping "age bits" for cache-lines and track the "Least Recently Used" cache-line based on age-bits. In such an implementation, every time a cache-line is used, the age of all other cache-lines changes. This is the default and is a variation on Least Frequently Used, where the oldest element is the Less Recently Used (LRU) element. The last used timestamp is updated when an element is put into the cache or an element is retrieved from the cache with a get call.

Most Recently Used (MRU). This scheme involves discarding the most recently used items first. MRU cache algorithms may have more hits than LRU due to their tendency to retain older data. MRU algorithms are most useful in situations where the older an item is, the more likely it is to be accessed.

Random Replacement (RR). Randomly selects a candidate item and discards it to make space when necessary. This algorithm does not require keeping any information about the access history.

Least Frequently Used (LFU). For each call on an element, the number of hits is updated. When a put call is made for a new element (and assuming that the max limit is reached) the element with least number of hits, the Least Frequently Used element, is evicted. If cache element use follows a Pareto distribution, this algorithm may give better results than LRU. LFU takes a random sample of the elements and evicts the smallest.

First-In-First-Out (FIFO). In this scheme, elements are evicted in the same order as they come in. When a put call is made for a new element (and assuming that the max limit is reached for the memory store) the element that was placed first (First-In) in the store is the candidate for eviction (First-Out). This algorithm is typically used if the use of an element makes it less likely to be used in the future.

Database. A database is an organized collection of data, typically managed by a DataBase Management System (DBMS) that organizes the storage of data and performs other functions such as the creation, maintenance, and usage of the database storage structures. The data is typically organized to model aspects of reality in a way that supports processes requiring information. Databases commonly also provide users with a user interface and front-end that enables the users to query the database, often in complex manners that require processing and organization of the data. The term "database" is used herein to refer to a database, or to both a database and the DBMS used to manipulate it. Database management systems (DBMS) are typically computer software applications that interact with the user, other applications, and the database itself to capture and analyze data, typically providing various functions that allow entry, storage and retrieval of large quantities of information, as well as providing ways to manage how that information is organized. A general-purpose DBMS is designed to allow the definition, creation, querying, update, and administration of databases. Examples of DBMSs include MySQL, PostgreSQL, Microsoft SQL Server, Oracle, Sybase and IBM DB2. Database technology and application is described in a document published by Telemark University College entitled" Introduction to Database Systems", authored by Hans-Petter Halvorsen (dated 2014 Mar. 3), which is incorporated in its entirety for all purposes as if fully set forth herein.

SQL. Structured Query Language (SQL) is a widely-used programming language for working with relational databases, designed for managing data held in a relational database management system (RDBMS), or for stream processing in a relational data stream management system (RDSMS). SQL consists of a data definition language and a data manipulation language. The scope of SQL includes data insert, query, update and delete, schema creation and modification, and data access control. Although SQL is often described as, and largely is, a declarative language (4GL), it also includes procedural elements. SQL is designed for querying data contained in a relational database, and is a set-based, declarative query language. The SQL is standardized as ISO/IEC 9075:2011 standard: "*Information technology—Database languages—SQL*". The ISO/IEC 9075 standard is complemented by ISO/IEC 13249 standard: "*SQL Multimedia and Application Packages*" that defines interfaces and packages based on SQL. The aim is a unified access to typical database applications like text, pictures, data mining or spatial data. SQL is described in the tutorial entitled: "*Oracle/SQL Tutorial*" by Michael Gertz of the University of California, which is incorporated in its entirety for all purposes as if fully set forth herein.

Compression. Data compression, also known as source coding and bit-rate reduction, involves encoding information using fewer bits than the original representation. Compression can be either lossy, or lossless. Lossless compression reduces bits by identifying and eliminating statistical redundancy, so that no information is lost in lossless compression. Lossy compression reduces bits by identifying unnecessary information and removing it. The process of reducing the size of a data file is commonly referred to as a data compression. A compression is used to reduce resource usage, such as data storage space, or transmission capacity. Data compression is further described in a Carnegie Mellon University chapter entitled: "*Introduction to Data Compression*" by Guy E. Blelloch, dated Jan. 31, 2013, which is incorporated in its entirety for all purposes as if fully set forth herein.

In a scheme involving lossy data compression, some loss of information is acceptable. For example, dropping of a nonessential detail from a data can save storage space. Lossy data compression schemes may be informed by research on how people perceive the data involved. For example, the human eye is more sensitive to subtle variations in luminance than it is to variations in color. JPEG image compression works in part by rounding off nonessential bits of information. There is a corresponding trade-off between preserving information and reducing size. A number of popular compression formats exploit these perceptual differences, including those used in music files, images, and video.

Lossy image compression is commonly used in digital cameras, to increase storage capacities with minimal degradation of picture quality. Similarly, DVDs use the lossy MPEG-2 Video codec for video compression. In lossy audio compression, methods of psychoacoustics are used to remove non-audible (or less audible) components of the audio signal. Compression of human speech is often performed with even more specialized techniques, speech coding, or voice coding, is sometimes distinguished as a separate discipline from audio compression. Different audio and speech compression standards are listed under audio codecs. Voice compression is used in Internet telephony, for example, and audio compression is used for CD ripping and is decoded by audio player.

Lossless data compression algorithms usually exploit statistical redundancy to represent data more concisely without losing information, so that the process is reversible. Lossless compression is possible because most real-world data has statistical redundancy. The Lempel-Ziv (LZ) compression methods are among the most popular algorithms for lossless storage. DEFLATE is a variation on LZ optimized for decompression speed and compression ratio, and is used in PKZIP, Gzip and PNG. The LZW (Lempel-Ziv-Welch) method is commonly used in GIF images, and is described in IETF RFC 1951. The LZ methods use a table-based compression model where table entries are substituted for repeated strings of data. For most LZ methods, this table is generated dynamically from earlier data in the input. The table itself is often Huffman encoded (e.g., SHRI, LZX). Typical modern lossless compressors use probabilistic models, such as prediction by partial matching.

Lempel-Ziv-Welch (LZW) is an example of lossless data compression algorithm created by Abraham Lempel, Jacob Ziv, and Terry Welch. The algorithm is simple to implement, and has the potential for very high throughput in hardware implementations. It was the algorithm of the widely used Unix file compression utility compress, and is used in the GIF image format. The LZW and similar algorithms are described in U.S. Pat. No. 4,464,650 to Eastman et al. entitled: "Apparatus and Method for Compressing Data Signals and Restoring the Compressed Data Signals", in U.S. Pat. No. 4,814,746 to Miller et al. entitled: "Data Compression Method", and in U.S. Pat. No. 4,558,302 to Welch entitled: "High Speed Data Compression and Decompression Apparatus and Method", which are all incorporated in their entirety for all purposes as if fully set forth herein.

Image/video. Any content herein may consist of, be part of, or include, an image or a video content. A video content may be in a digital video format that may be based on one out of: TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), and DPOF (Digital Print Order Format) standards. An intraframe or interframe compression may be used, and the compression may be a lossy or a non-lossy (lossless) compression, that may be based on a standard compression algorithm, which may be one or more out of JPEG (Joint Photographic Experts Group) and MPEG (Moving Picture Experts Group), ITU-T H.261, ITU-T H.263, ITU-T H.264 and ITU-T CCIR 601.

DHCP. The Dynamic Host Configuration Protocol (DHCP) is a standardized networking protocol used on Internet Protocol (IP) networks for dynamically distributing network configuration parameters, such as IP addresses for interfaces and services. With DHCP, network elements request IP addresses and networking parameters automatically from a DHCP server, reducing the need for a network administrator or a user to configure these settings manually.

DHCP is typically used by network elements for requesting Internet Protocol parameters, such as an IP address from a network server, and is based on the client-server model. When a network element connects to a network, its DHCP client software in the operating system sends a broadcast query requesting necessary information. Any DHCP server on the network may service the request. The DHCP server manages a pool of IP addresses and information about client configuration parameters such as default gateway, domain name, the name servers, and time servers. On receiving a request, the server may respond with specific information for each client, as previously configured by an administrator, or with a specific address and any other information valid for the entire network, and the period for which the allocation (lease) is valid. A host typically queries for this information immediately after booting, and periodically thereafter before the expiration of the information. When an assignment is refreshed by the client computer, it initially requests the same parameter values, and may be assigned a new address by the server, based on the assignment policies set by administrators.

Depending on implementation, the DHCP server may have three methods of allocating IP-addresses: (a) Dynamic allocation, where a network administrator reserves a range of IP addresses for DHCP, and each client computer on the LAN is configured to request an IP address from the DHCP server during network initialization. The request-and-grant process uses a lease concept with a controllable period, allowing the DHCP server to reclaim (and then reallocate) IP addresses that are not renewed. (b) Automatic allocation, where the DHCP server permanently assigns an IP address to a requesting client from the range defined by the administrator. This is similar to dynamic allocation, but the DHCP server keeps a table of past IP address assignments, so that it can preferentially assign to a client the same IP address that the client previously had. (c) Static allocation, where the DHCP server allocates an IP address based on a preconfigured mapping to each client's MAC address.

DHCP used for Internet Protocol version 4 (IPv4) is described in IETF RFC 2131, entitled "*Dynamic Host Configuration Protocol*", and DHCP for IPv6 is described IETF RFC 3315, entitled: "*Dynamic Host Configuration Protocol for IPv6 (DHCPv6)*", both incorporated in their entirety for all purposes as if fully set forth herein. While both versions serve the same purpose, the details of the protocol for IPv4 and IPv6 are sufficiently different that they may be considered separate protocols. For IPv6 operation, devices may alternatively use stateless address autoconfiguration. IPv4 hosts may also use link-local addressing to achieve operation restricted to the local network link.

The DHCP protocol employs a connectionless service model, using the User Datagram Protocol (UDP). It is implemented with two UDP port numbers for its operations, which are the same as for the BOOTP protocol. The UDP port number 67 is the destination port of a server, and the UDP port number 68 is used by the client. DHCP operations fall into four phases: server discovery, IP lease offer, IP request, and IP lease acknowledgment. These stages are often abbreviated as DORA for discovery, offer, request, and acknowledgment. The DHCP protocol operation begins with clients broadcasting a request. If the client and server are on different subnets, a DHCP Helper or DHCP Relay Agent may be used. Clients requesting renewal of an existing lease may communicate directly via a UDP unicast, since the client already has an established IP address at that point.

Domain Name System (DNS) is a hierarchical distributed naming system for computers, services, or any resource connected to the Internet or a private network. It associates various information with domain names assigned to each of the participating entities, and translates easily memorized domain names to the numerical IP addresses needed for locating computer services and devices worldwide. The DNS is described, for example, in the IETF RFC 3467 entitled: "*Role of the Domain Name System (DNS)*", in the IETF RFC 6195 entitled: "*Domain Name System (DNS) IANA Considerations*", and in the IETF RFC 1591 entitled: "*Domain Name System Structure and Delegation*", which are incorporated in their entirety for all purposes as if fully set forth herein.

Video. The term 'video' typically pertains to numerical or electrical representation or moving visual images, commonly referring to recording, reproducing, displaying, or broadcasting the moving visual images. Video, or a moving image in general, is created from a sequence of still images called frames, and by recording and then playing back frames in quick succession, an illusion of movement is created. Video can be edited by removing some frames and combining sequences of frames, called clips, together in a timeline. A Codec, short for 'coder-decoder', describes the method in which video data is encoded into a file and decoded when the file is played back. Most video is compressed during encoding, and so the terms codec and compressor are often used interchangeably. Codecs can be lossless or lossy, where lossless codecs are higher quality than lossy codecs, but produce larger file sizes. Transcoding is the process of converting from one codec to another. Common codecs include DV-PAL, HDV, H.264, MPEG-2, and MPEG-4. Digital video is further described in Adobe Digital Video Group publication updated and enhanced March 2004, entitled: "*A Digital Video Primer—An introduction to DV production, post-production, and delivery*", which is incorporated in its entirety for all purposes as if fully set forth herein.

Digital video data typically comprises a series of frames, including orthogonal bitmap digital images displayed in rapid succession at a constant rate, measured in Frames-Per-Second (FPS). In interlaced video each frame is composed of two halves of an image (referred to individually as fields, two consecutive fields compose a full frame), where the first half contains only the odd-numbered lines of a full frame, and the second half contains only the even-numbered lines.

Many types of video compression exist for serving digital video over the internet, and on optical disks. The file sizes of digital video used for professional editing are generally not practical for these purposes, and the video requires further compression with codecs such as Sorenson, H.264, and more recently, Apple ProRes especially for HD. Currently widely used formats for delivering video over the internet are MPEG-4, Quicktime, Flash, and Windows Media. Other PCM based formats include CCIR 601 commonly used for broadcast stations, MPEG-4 popular for online distribution of large videos and video recorded to flash memory, MPEG-2 used for DVDs, Super-VCDs, and many broadcast television formats, MPEG-1 typically used for video CDs, and H.264 (also known as MPEG-4 Part 10 or AVC) commonly used for Blu-ray Discs and some broadcast television formats.

The term 'Standard Definition' (SD) describes the frame size of a video, typically having either a 4:3 or 16:9 frame aspect ratio. The SD PAL standard defines 4:3 frame size and 720×576 pixels, (or 768×576 if using square pixels), while SD web video commonly uses a frame size of 640×480 pixels. Standard-Definition Television (SDTV) refers to a television system that uses a resolution that is not considered to be either high-definition television (1080i, 1080p, 1440p, 4K UHDTV, and 8K UHD) or enhanced-definition television (EDTV 480p). The two common SDTV signal types are 576i, with 576 interlaced lines of resolution, derived from the European-developed PAL and SECAM systems, and 480i based on the American National Television System Committee NTSC system. In North America, digital SDTV is broadcast in the same 4:3 aspect ratio as NTSC signals with widescreen content being center cut. However, in other parts of the world that used the PAL or SECAM color systems, standard-definition television is now usually shown with a 16:9 aspect ratio. Standards that support digital SDTV broadcast include DVB, ATSC, and ISDB.

The term 'High-Definition' (HD) refers multiple video formats, which use different frame sizes, frame rates and scanning methods, offering higher resolution and quality than standard-definition. Generally, any video image with considerably more than 480 horizontal lines (North America) or 576 horizontal lines (Europe) is considered high-definition, where 720 scan lines is commonly the minimum. HD video uses a 16:9 frame aspect ratio and frame sizes that are 1280×720 pixels (used for HD television and HD web video), 1920×1080 pixels (referred to as full-HD or full-raster), or 1440×1080 pixels (full-HD with non-square pixels).

High definition video (prerecorded and broadcast) is defined by the number of lines in the vertical display resolution, such as 1,080 or 720 lines, in contrast to regular digital television (DTV) using 480 lines (upon which NTSC is based, 480 visible scanlines out of 525) or 576 lines (upon which PAL/SECAM are based, 576 visible scanlines out of 625). HD is further defined by the scanning system being progressive scanning (p) or interlaced scanning (i). Progressive scanning (p) redraws an image frame (all of its lines) when refreshing each image, for example 720p/1080p. Interlaced scanning (i) draws the image field every other line or "odd numbered" lines during the first image refresh operation, and then draws the remaining "even numbered" lines during a second refreshing, for example 1080i. Interlaced scanning yields greater image resolution if a subject is not moving, but loses up to half of the resolution, and suffers "combing" artifacts when a subject is moving. HD video is further defined by the number of frames (or fields) per second (Hz), where in Europe 50 Hz (60 Hz in the USA) television broadcasting system is common. The 720p60 format is 1,280×720 pixels, progressive encoding with 60 frames per second (60 Hz). The 1080i50/1080i60 format is 1920×1080 pixels, interlaced encoding with 50/60 fields, (50/60 Hz) per second.

Currently common HD modes are defined as 720p, 1080i, 1080p, and 1440p. Video mode 720p relates to frame size of 1,280×720 (W×H) pixels, 921,600 pixels per image, progressive scanning, and frame rates of 23.976, 24, 25, 29.97, 30, 50, 59.94, 60, or 72 Hz. Video mode 1080i relates to frame size of 1,920×1,080 (W×H) pixels, 2,073,600 pixels per image, interlaced scanning, and frame rates of 25 (50 fields/s), 29.97 (59.94 fields/s), or 30 (60 fields/s) Hz. Video mode 1080p relates to frame size of 1,920×1,080 (W×H) pixels, 2,073,600 pixels per image, progressive scanning, and frame rates of 24 (23.976), 25, 30 (29.97), 50, or 60 (59.94) Hz. Similarly, video mode 1440p relates to frame size of 2,560×1,440 (W×H) pixels, 3,686,400 pixels per image, progressive scanning, and frame rates of 24 (23.976), 25, 30 (29.97), 50, or 60 (59.94) Hz. Digital video standards are further described in a published 2009 primer by Tektronix® entitled: "*A Guide to Standard and High-Definition Digital Video Measurements*", which is incorporated in its entirety for all purposes as if fully set forth herein.

MPEG-4. MPEG-4 is a method of defining compression of audio and visual (AV) digital data, designated as a standard for a group of audio and video coding formats, and related technology by the ISO/IEC Moving Picture Experts Group (MPEG) (ISO/IEC JTC1/SC29/WG11) under the formal standard ISO/IEC 14496—'Coding of audio-visual objects'. Typical uses of MPEG-4 include compression of AV data for the web (streaming media) and CD distribution, voice (telephone, videophone) and broadcast television applications. MPEG-4 provides a series of technologies for developers, for various service-providers and for end users, as well as enabling developers to create multimedia objects possessing better abilities of adaptability and flexibility to improve the quality of such services and technologies as digital television, animation graphics, the World Wide Web and their extensions. Transporting of MPEG-4 is described in IETF RFC 3640, entitled: "*RTP Payload Format for Transport of MPEG-4 Elementary Streams*", which is incorporated in its entirety for all purposes as if fully set forth herein. The MPEG-4 format can perform various functions such as multiplexing and synchronizing data, associating with media objects for efficiently transporting via various network channels. MPEG-4 is further described in a white paper published 2005 by The MPEG Industry Forum (Document Number mp-in-40182), entitled: "*Understanding MPEG-4: Technologies, Advantages, and Markets—An MPEGIF White Paper*", which is incorporated in its entirety for all purposes as if fully set forth herein.

H.264. H.264 (a.k.a. MPEG-4 Part 10, or Advanced Video Coding (MPEG-4 AVC)) is a commonly used video compression format for the recording, compression, and distribution of video content. H.264/MPEG-4 AVC is a block-oriented motion-compensation-based video compression standard ITU-T H.264, developed by the ITU-T Video Coding Experts Group (VCEG) together with the ISO/IEC JTC1 Moving Picture Experts Group (MPEG), defined in the ISO/IEC MPEG-4 AVC standard ISO/IEC 14496-10—MPEG-4 Part 10—'Advanced Video Coding'. H.264 is widely used by streaming internet sources, such as videos from Vimeo, YouTube, and the iTunes Store, web software such as the Adobe Flash Player and Microsoft Silverlight, and also various HDTV broadcasts over terrestrial (ATSC, ISDB-T, DVB-T or DVB-T2), cable (DVB-C), and satellite (DVB-S and DVB-S2). H.264 is further described in a Standards Report published in IEEE Communications Magazine, August 2006, by Gary J. Sullivan of Microsoft Corporation, entitled: "*The H.264/MPEG4 Advanced Video Coding Standard and its Applications*", and further in IETF RFC 3984 entitled: "*RTP Payload Format for H.264 Video*", which are both incorporated in their entirety for all purposes as if fully set forth herein.

Media Player. A media player is a computer program for playing multimedia files, and typically display standard media control icons (e.g., Play, Pause, and Stop buttons) known from physical devices such as tape recorders and CD players. Most operating systems embed a built-in media player. For example, Windows OS includes Windows Media Player, such as the Windows Media Player 11 described in Chapter 8 of the guide entitled: "MAXIMUM PC MICROSOFT WINDOWS VISTA EXPOSED" named "*Mastering Windows Media Player* 11", which is incorporated in its entirety for all purposes as if fully set forth herein. Windows Media Player supports playback of audio, video and pictures, along with fast forward, reverse, file markers (if present), and variable playback speed (seek & time compression/dilation). It supports local playback, streaming playback with multicast streams, and progressive downloads, while items in a playlist can be skipped over temporarily at playback time without removing them from the playlist. The full keyboard-based operation is possible in the player. OS X includes QuickTime Player, such as Quick-Time 7.3 described in a guide by Apple Computer, Inc. (2005) entitled: "*QuickTime 7.3—User's Guide*", which is incorporated in its entirety for all purposes as if fully set forth herein. QuickTime is commonly bundled with OS X, and provides encoding and transcoding video and audio from one format to another, decoding video and audio, then sending the decoded stream to the graphics or audio subsystem for playback, and a "component" plug-in architecture for supporting additional 3rd-party codecs (such as DivX). Linux distributions include media players such as SMPlayer, Amarok, Audacious, Banshee, MPlayer, Rhythmbox, Totem, VLC, and xine. The VLC is described in a guide by the VideoLAN project entitled: "VLC user guide" by Henri Fallon et al., which is incorporated in its entirety for all purposes as if fully set forth herein. Media players are further described in U.S. Patent Application No. 2014/0201616 to Turner et al. entitled: "Cross-Platform Embeddable Media Player", in U.S. Pat. No. 7,360,152 to Capps et al. entitled: "Universal Media Player", and in U.S. Pat. No. 8,438,375 to Woodward entitled: "Configuring Media Player", which are all incorporated in their entirety for all purposes as if fully set forth herein.

Streaming. Streaming media is multimedia that is constantly received by and presented to an end-user while being delivered by a provider. A client media player can begin playing the data (such as a movie) before the entire file has been transmitted. Distinguishing delivery method from the media distributed applies specifically to telecommunications networks, as most of the delivery systems are either inherently streaming (e.g., radio, television), or inherently non-streaming (e.g., books, video cassettes, audio CDs). Live streaming refers to content delivered live over the Internet, and requires a form of source media (e.g. a video camera, an audio interface, screen capture software), an encoder to digitize the content, a media publisher, and a content delivery network to distribute and deliver the content. Streaming content may be according to, compatible with, or based on, IETF RFC 3550 entitled: "*RTP: A Transport Protocol for Real-Time Applications*", IETF RFC 4587 entitled: "RTP Payload Format for H.261 Video Streams", or IETF RFC 2326 entitled: "*Real Time Streaming Protocol (RTSP)*", which are all incorporated in their entirety for all purposes as if fully set forth herein. Video streaming is further described in a published 2002 paper by Hewlett-Packard Company (HP®) authored by John G. Apostolopoulos, Wai-Tian, and Susie J. Wee and entitled: "*Video Streaming: Concepts, Algorithms, and Systems*", which is incorporated in its entirety for all purposes as if fully set forth herein.

An audio stream may be compressed using an audio codec such as MP3, Vorbis or AAC, and a video stream may be compressed using a video codec such as H.264 or VP8. Encoded audio and video streams may be assembled in a container bitstream such as MP4, FLV, WebM, ASF or ISMA. The bitstream is typically delivered from a streaming server to a streaming client using a transport protocol, such as MMS or RTP. Newer technologies such as HLS, Microsoft's Smooth Streaming, Adobe's HDS and finally MPEG-DASH have emerged to enable adaptive bitrate (ABR) streaming over HTTP as an alternative to using proprietary transport protocols. The streaming client may interact with the streaming server using a control protocol, such as MMS or RTSP.

Streaming media may use Datagram protocols, such as the User Datagram Protocol (UDP), where the media stream is sent as a series of small packets. However, there is no mechanism within the protocol to guarantee delivery, so if data is lost, the stream may suffer a dropout. Other protocols may be used, such as the Real-time Streaming Protocol (RTSP), Real-time Transport Protocol (RTP) and the Real-time Transport Control Protocol (RTCP). RTSP runs over a variety of transport protocols, while the latter two typically use UDP. Another approach is HTTP adaptive bitrate streaming that is based on HTTP progressive download, designed to incorporate both the advantages of using a standard web protocol, and the ability to be used for streaming even live content is adaptive bitrate streaming. Reliable protocols, such as the Transmission Control Protocol (TCP), guarantee correct delivery of each bit in the media stream, using a system of timeouts and retries, which makes them more complex to implement. Unicast protocols send a separate copy of the media stream from the server to each recipient, and are commonly used for most Internet connections.

Multicasting broadcasts the same copy of the multimedia over the entire network to a group of clients, and may use multicast protocols that were developed to reduce the server/network loads resulting from duplicate data streams that occur when many recipients receive unicast content streams, independently. These protocols send a single stream from the source to a group of recipients, and depending on the network infrastructure and type, the multicast transmission may or may not be feasible. IP Multicast provides the capability to send a single media stream to a group of recipients on a computer network, and a multicast protocol, usually Internet Group Management Protocol, is used to manage delivery of multicast streams to the groups of recipients on a LAN. Peer-to-peer (P2P) protocols arrange for prerecorded streams to be sent between computers, thus preventing the server and its network connections from becoming a bottleneck. HTTP Streaming—(a.k.a. Progressive Download; Streaming) allows for that while streaming content is being downloaded, users can interact with, and/or view it. VOD streaming is further described in a NETFLIX® presentation dated May 2013 by David Ronca, entitled: "*A Brief History of Netflix Streaming*", which is incorporated in its entirety for all purposes as if fully set forth herein.

Media streaming techniques are further described in a white paper published October 2005 by Envivio® and authored by Alex MacAulay, Boris Felts, and Yuval Fisher, entitled: "*WHITEPAPER—IP Streaming of MPEG-4" Native RTP vs MPEG-2 Transport Stream*", in an overview published 2014 by Apple Inc.—Developer, entitled: "*HttP Live Streaming Overview*", and in a paper by Thomas Stockhammer of Qualcomm Incorporated entitled: "*Dynamic Adaptive Streaming over HTTP—Design Principles and Standards*", in a Microsoft Corporation published March 2009 paper authored by Alex Zambelli and entitled: "*IIS Smooth Streaming Technical Overview*", in an article by Liang Chen, Yipeng Zhou, and Dah Ming Chiu dated 10 Apr. 2014 entitled: "*Smart Streaming for Online Video Services*", in Celtic-Plus publication (downloaded 2-2016 from the Internet) referred to as 'H2B2VS D1 1 1 State-of-the-art V2.0.docx' entitled: "*H2B2VS D1.1.1 Report on the state of the art technologies for hybrid distribution of TV services*", and in a technology brief by Apple Computer, Inc. published March 2005 (Document No. L308280A) entitled: "*QuickTime Streaming*", which are all incorporated in their entirety for all purposes as if fully set forth herein.

Progressive download. A progressive download is the transfer of digital media files from a server to a client, typically using the HTTP protocol when initiated from a computer, where the user may begin playback of the media before the download is complete. Regular streaming media and progressive download may differ in how the digital media data is received and stored by the end user device that is accessing the digital media. A media player that is capable of progressive download playback relies on meta-data located in the header of the file to be intact and a local buffer of the digital media file as it is downloaded from a web server, and at the point in which a specified amount of data becomes available to the local playback device, the media will begin to play. This specified amount of buffer is embedded into the file by the producer of the content in the encoder settings and is reinforced by additional buffer settings imposed by the media player.

Using progressive download, the end user experience is similar to streaming media, however the digital file is typically downloaded and stored in a physical drive on the end user device, typically in the temp folder of the associated web browser (if the digital media was embedded into a web page), or is diverted to a storage directory that is set in the preferences of the media player used for playback. The digital media file stutters or stops playback if the rate of playback exceeds the rate at which the file is downloaded, and the file will begin to play again after further download.

This fast start playback is the result of moving the meta data from the end of the digital media file to the front, this move of the meta-data gave the media player all the information it required to begin playback as the file was still being downloaded. Prior to that change, the meta data summary was located at the end of a digital media file and the entire file would need to be downloaded in order for the meta data to be read and the player begin playback. Initially, the file is played from the beginning. For Flash video seeking requires a list of seek points in the media file metadata, where these points are offsets in the video (both in seconds and bytes) at which a new key frame starts. A web server or a media server that handles the download, must support seek points in query string of requests for downloading data. For other types of media files such as MP4 or MKV, web servers must be capable of handling a special offset parameter, which name differs for various servers and is specified in the player settings.

Adaptive BitRate (ABR) streaming. Adaptive bitrate (ABR) streaming is a technique used in streaming multimedia over computer networks typically based on HTTP and designed to work efficiently over large distributed HTTP networks such as the Internet. It works by detecting a user bandwidth and CPU capacity in real time and adjusting the quality of a video stream accordingly. It requires the use of an encoder that can encode a single source video at multiple bit rates. The player client switches between streaming the different encodings depending on available resources. Typically, adaptive bitrate streaming is a method of video streaming over HTTP where the source content is encoded at multiple bit rates, then each of the different bit rate streams are segmented into small multi-second parts. The streaming client is made aware of the available streams at differing bit rates, and segments of the streams by a manifest file. When starting, the client requests the segments from the lowest bit rate stream. If the client finds the download speed is greater than the bit rate of the segment downloaded, then it will request the next higher bit rate segments. Later, if the client finds the download speed for a segment is lower than the bit rate for the segment, and therefore the network throughput has deteriorated, then it will request a lower bit rate segment. The segment size can vary depending on the particular implementation, but they are typically between one (1) and ten (10) seconds. While adaptive bitrate technology requires additional encoding, but simplifies the overall workflow and creates better results. Adaptive bitrate streaming over HTTP is described in an article by Saamer Akhshabi et al. presented MMsys '11 (dated February 23-25, 2011) [ACM 978-1-4503-0517-4/11/02] entitled: "*An Experimental Evaluation of rate-Adaptation algorithms in Adaptive Streaming over HTTP*", and in an article published by Rivier University in 'InSight: Rivier Academic Journal, Volume 9, Number 2, Fall 2013' [ISSN 1559-9388] by Ted. D. Monchamp entitled: "*Adaptive Bit-Rate Streaming—Minimizing End-User Buffer Times in Real-Time Video Delivery*", which are both incorporated in their entirety for all purposes as if fully set forth herein.

DASH. Dynamic Adaptive Streaming over HTTP (DASH), also known as MPEG-DASH, is an adaptive bitrate streaming technique that enables high quality streaming of media content over the Internet delivered from conventional HTTP web servers. MPEG-DASH works by breaking the content into a sequence of small HTTP-based file segments, each segment containing a short interval of playback time of content that is potentially many hours in duration, such as a movie or the live broadcast of a sports event. The content is made available at a variety of different bit rates, i.e., alternative segments encoded at different bit rates covering aligned short intervals of play back time are made available. While the content is being played back by an MPEG-DASH client, the client automatically selects from the alternatives the next segment to download and play back based on current network conditions. The client selects the segment with the highest bit rate possible that can be downloaded in time for play back without causing stalls or re-buffering events in the playback. Thus, an MPEG-DASH client can seamlessly adapt to changing network conditions, and provide high quality play back with fewer stalls or re-buffering events. MPEG-DASH is standardized as an international standard ISO/IEC 23009-1:2012 entitled: "*Information technology—Dynamic adaptive streaming over HTTP (DASH)—Part 1: Media presentation description and segment formats*".

DASH is an adaptive bitrate streaming technology where a multimedia file is partitioned into one or more segments and delivered to a client using HTTP. A media presentation description (MPD) describes segment information (timing, URL, media characteristics like video resolution and bit rates), and can be organized in different ways such as SegmentList, SegmentTemplate, SegmentBase and SegmentTimeline, depending on the use case. Segments can contain any media data, however the specification provides specific guidance and formats for use with two types of containers: ISO base media file format (e.g. MP4 file format) or MPEG-2 Transport Stream. DASH is audio/video codec agnostic. One or more representations (i.e., versions at different resolutions or bit rates) of multimedia files are typically available, and selection can be made based on network conditions, device capabilities and user preferences, enabling adaptive bitrate streaming and QoE (Quality of Experience) fairness. DASH is also agnostic to the underlying application layer protocol.

DASH is described in an article by C. Müller and C. Timmerer published in Proceedings of the ACM Multimedia 2011 presented MM '11 (Nov. 28-Dec. 1, 2011) [ACM 978-1-4503-0616-4/11/11] entitled: "*A VLC Media Player Plugin enabling Dynamic Adaptive Streaming over HTTP*", in an article by S. Lederer, C. Mueller and C. Timmerer, presented in Proceedings of the ACM Multimedia Systems Conference 2012 (MMSys '12, February 22-24, 2012) [ACM 978-1-4503-1131-1/12/02] entitled: "*Dynamic Adaptive Streaming over HTTP Dataset*", in an IEEE Computer Society article published 2011 by Iraj Sodagar entitled: "*The MPEG-DASH Standard for Multimedia Streaming Over the Internet*", in a paper published November 2011 by RGB Networks entitled: "*Comparing Adaptive HTTP Streaming Technologies*", in an article by Christopher Müller, Stefan Lederer and Christian Timmerer presented MoVid '12, Feb. 24, 2012 [ACM 978-1-4503-1166-3/12/02] entitled: "*An Evaluation of Dynamic Adaptive Streaming over HTTP in Vehicular Environments*", and in ETSI technical specification ETSI TS 126 247 V13.2.0 (2016-01) entitled: "*Universal Mobile Telecommunications System (UMTS); LTE; Transparent end-to-end Packet-switched Streaming Service (PSS); Progressive Download and Dynamic Adaptive Streaming over HTTP (3GP-DASH) (3GPP TS 26.247 version 13.2.0 Release 13)*", which are all incorporated in their entirety for all purposes as if fully set forth herein.

HLS. HTTP Live Streaming (HLS) is an HTTP-based media streaming communications protocol implemented by Apple Inc. as part of its QuickTime, Safari, OS X, and iOS software. It works by breaking the overall stream into a sequence of small HTTP-based file downloads, each download loading one short chunk of an overall potentially unbounded transport stream. As the stream is played, the client may select from a number of different alternate streams containing the same material encoded at a variety of data rates, allowing the streaming session to adapt to the available data rate. At the start of the streaming session, it downloads an extended M3U playlist containing the metadata for the various sub-streams which are available. Since its requests use only standard HTTP transactions, HTTP Live Streaming is capable of traversing any firewall or proxy server that lets through standard HTTP traffic, unlike UDP-based protocols such as RTP. This also allows content to be offered from conventional HTTP servers as origin and delivered over widely available HTTP-based content delivery networks. HLS also specifies a standard encryption mechanism using AES and a method of secure key distribution using HTTPS with either a device specific realm login or HTTP cookie which together provide a simple DRM system. Later versions of the protocol also provide for trick mode fast-forward and rewind and integration of subtitles. upLynk has also added the AES scrambling and base-64 encoding of the DRM content key with a 128-bit device specific key for registered commercial SWF applications together with a sequential initialization Vector for each chunk to its implementation of the standard.

HTTP Live Streaming uses a conventional web server to distribute audiovisual content and requires specific software to fit into the proper format transmission in real time. In HLS, the server codify and encapsulate the input video flow in a proper format for the delivery. Then, it is prepared for distribution by segmenting it into different files. In the process of intake, the video is coded and segmented to generate video fragments and index file. An encoder codifies video files in H.264 format and audio in MP3, HE-AAC or AC-3, later encapsulated by MPEG-2 Transport Stream to carry it. A segmenter divides the MPEG-2 TS file into fragments of equal length, kept as .ts files, and also creates an index file that contains references of the fragmented files, saved as .m3u8. A distributor, formed by standard web Server, accepts requests from clients and delivery all the resources needed for streaming. The client requests and downloads all the files and resources, assembling them so that they can be presented to the user as a continuous flow video. The client software downloads first the index file through a URL and then the several media files available. The playback software assembles the sequence to allow continued display to the user. HTTP Live Streaming provides mechanisms to provide a scalable and adaptable to network, allowing playback quality in wireless networks with high bandwidth and low quality playback on 3G networks, where the bandwidth is reduced. HTTP Live Streaming also provides protection against errors, generating alternative different flows video to use them if there are any errors in segment.

To make the system scalable and adaptable to the bandwidth of the network, the video flow is coded in different qualities. Thus, depending on the bandwidth and transfer network speed, the video will play at different qualities. To implement this, the system must encode the video in different qualities and generate an index file that contains the locations of the different quality levels. The client software internally manages the different qualities, making requests to the highest possible quality within the bandwidth of the network. Thus always play the video the highest possible quality, viewing lower quality on 3G networks and highest quality in Wi-Fi broadband. To keep a stream available HLS includes features to recover from outages, so multiple flows are listed in the index file for the same quality level. If the client can't load a flow it tries the next, repeating until either a working flow is found or all flows fail. This can be combined with scalability by listing multiple flows for each separate quality.

HLS is described in IETF Informational Internet-Draft published Apr. 16, 2014 by R. P. Pantos entitled: "*HTTP Live Streaming—draft-pantos-http-live-streaming*-13", in a paper published January 2010 by Andrew Fecheyr-Lippens entitled: "*A Review of HTTP Live Streaming*", in Apple Inc. Technical Note TN2224 updated 2015 May 4 entitled: "*Best Practices for Creating and Deploying HTTP Live Streaming Media for the iPhone and iPad*", and in a paper by Hongfeng Xu, Then Chen, Rui Chen, and Junwei Cao from Tsinghua University, Beijing, China (downloaded 3-2016) entitled: "*Live Streaming with Content Centric Networking*", which are all incorporated in their entirety for all purposes as if fully set forth herein.

HDS. Adobe HTTP Dynamic Streaming (HDS) is the process of efficiently delivering streaming video to users by dynamically switching among different streams of varying quality and size during playback. This provides users with the best possible viewing experience their bandwidth and local computer hardware (CPU) can support. Another major goal of dynamic streaming is to make this process smooth and seamless to users, so that if up-scaling or down-scaling the quality of the stream is necessary, it is a smooth and nearly unnoticeable switch without disrupting the continuous playback. HDS is described in Adobe Systems Incorporated 2013 published specifications entitled: "*HTTP Dynamic Streaming Specification—Version 3.0 FINAL*", in an Adobe Flash Platform Technical White Paper published 2010 entitled: "*HTTP Dynamic Streaming on the Adobe® Flash® Platform—Enabling high-quality, network-efficient HTTP streaming for media delivery*" [Document 91030544 9/10], and in Adobe Systems Incorporated 2010 user guide entitled: "*Using Adobe® HTTP Dynamic Streaming*", which are all incorporated in their entirety for all purposes as if fully set forth herein.

Buffer. A buffer (or 'data buffer') is a region of a physical memory storage used to temporarily store data, typically while it is being moved from one place to another. Typically, the data is stored in a buffer as it is retrieved from an input device, or just before it is sent to an output device; however, a buffer may be used for moving data between processes within a computer. The data stored in a data buffer is commonly stored on a physical storage medium (volatile or non-volatile memory), such as the main memory 15*a* or the storage device 15*c*, and may be implemented as buffer mechanism in software using a fixed memory location in hardware, or by using a virtual data buffer in software, pointing to a location in the physical memory. Buffers are used when there is a difference between the rate at which data is received, and the rate at which it can be processed, or in the case that these rates are variable, for example, in a printer spooler or in online video streaming. Buffers normally use an FIFO (First In, First Out) scheme, outputting data in the order it arrived. A buffer may further be used for adjusting timing by implementing a queue (or FIFO) algorithm in a memory, simultaneously writing data into the queue at one rate, and reading it at another rate.

An example of buffer operation in content streaming context is shown as a graph 80 in FIG. 8. A horizontal axis 't' 82 represents the passing time, while a vertical axis 81 'Mbits' represents the amount of content received or consumed/processed. A diagonal line 84 represents the rate of the media player consuming data from the buffer, allowing de-compression (in case of compressed data, such as MPEG-4), preparing for presentation, and displaying the content on a display (such as the display 17) to a user. The buffer receiving operation, such as from an external server over the Internet, is shown as a 'staircase' line 83. The streaming process starts at time point t=0, which may correspond to a "Content Request" step 61 in the flow-chart 60 as shown in FIG. 6. After the overhead associated with a "Request Routing" step 62, an "Identify Replica Server" step 63, and a "Streaming Request" step 64, the streaming starts as part of a "Content Streaming" step 65, the buffer starts loading the content data at a time point t1 86*a*. The buffer starts receiving and loading content data, as shown by a slope line 83*a*, and upon reaching a pre-set threshold L1 81*a* (which may correspond to user content displaying time, such as 5 or 10 seconds) at a time point t2 86*b*, the media player starts consuming data from the buffer and presenting it to the user at a rate corresponding to the slope of the line 84. The time interval t2 86*b* is known as 'start-up' time, and reducing this time allows for better user experience due to the shorter waiting time for the content playing start.

After the time point t2 86*b* and during a time interval t2-t3 82*a*, the buffer continues to receive and load content in parallel with the media player consuming content from the buffer, until the buffer reaches a maximum level or a maximum defined capacity L2 81*b* at a time point t3 86*c*. At this time point t3 86*c*, the receiving process is stopped as represented by a horizontal line 83*b*, in order to avoid buffer overflow, while the media player continues to consume content from the buffer. After a time interval t3-t4 82*b*, at a time point t4 86*d*, the buffer content level reaches a minimum pre-set threshold, and thus starts again to receive and store content from the content source as shown by a slope line 83*c*, until a time point t5 86*e* (during a t4-t5 time interval 82*c*). The process is repeated until the buffer reaches a maximum level or a maximum defined capacity where the total received content level is L3 81*c*, at a time point t5 86*e*. At this time point t5 86*e*, the receiving process is stopped as represented by a horizontal line 83*d*, in order to avoid buffer overflow, while the media player continues to consume content from the buffer. After a time interval t5-t6 82*d*, at a time point t6 86*f*, the buffer content level again reaches a minimum pre-set threshold, and thus starts again to receive and store content from the content source as shown by a slope line 83*e*, until time point t7 86*g* (during a t6-t7 time interval 82*e*), where the total content received level is L4 81*d*. Again, at this time point t7 86*g*, the receiving process is stopped as represented by a horizontal line 83*f*, in order to avoid buffer overflow, while the media player continue to consume content from the buffer. After a time interval t7-t8 82*f*, at a time point t8 86*h*, the buffer content level again reaches a minimum pre-set threshold, and thus starts again to receive and store content from the content source as shown by a slope line 83*g*, until time point t9 86*i* (during a t8-t9 time interval 82*g*), where the total content received level is L5 81*e*. At this time point t9 86*i*, the receiving process is stopped as represented by a horizontal line 83*h*, in order to avoid buffer overflow, while the media player continue to consume content from the buffer, until a time point t10 86*j*, during a time interval t9-t10 82*h*.

The quantity of data in the buffer is repeatedly growing or falling, according to the system states, shown as a dashed line 85. When no content is received, such as in the t5-t6 time interval 82*d*, the buffer is being emptied by the media player, thus the content level is reduced (negative slope 85*a*) at the rate of the media player data consumption, until reaching a minimum level 116*a*. However, when the content is received, such as in the t6-t7 time interval 82*e*, the net content rate (the received rate minus the media player consuming rate) in the buffer increases (positive slope 85*b*) at the rate of the media player data consumption, until reaching a maximum level 116*b*.

The playing rate (designated as PLAYER_RATE), which is the average rate the media player consumes the data from the buffer, represented as the slope of line 84 in the graph 80, may be calculated by PLATER_RATE=(L3−L2)/(t6−t4) or by PLAYER_RATE=(L4−L3)/(t8−t6), and is typically constant throughout the content playing. Similarly, the content receiving rate (designated as RECEIVING_RATE), represented as the slope of the line 83 in the graph 80 when data is received and loaded into the buffer, may be calculated to be RECEIVING_RATE=L2/(t3−t1) at the t2−t3 time interval 82*a* (represented as the slope of the line 83*a* in the graph 80), and RECEIVING_RATE=(L3−L2)/(t5−t4) at the t5−t4 time interval 82*c* (represented as the slope of the line 83*c* in the graph 80). The receiving rate may change over time due to various changes in the content providing server, communication problems, and other changes in the system providing the content from the server to the client device. The total content size of the content to be played may be designated as CONTENT_SIZE, thus the playing time may be calculated to be CONTENT_SIZE/PLAYER_RATE. A playing time of T seconds requires a content of T*PLAYER_RATE.

In one example, the content to be received and played is a video content, such as a movie. The size of the movie content (CONTENT_SIZE) may be 900 MB (MB=MegaBytes) (=0.9 GB—GigaBytes), and the PLAYER_RATE may be 200 KB/s (200 KiloBytes per second, =1.6 Mb/s—MegaBits per second), resulting a total playing time of 4,500 second (75 Minutes). In a case where the buffer is designed to store 10 seconds of playing time, the buffer minimum storage size should be 2000 KB (2 MB—MegaBytes). Similarly, buffering a playing time of 20 seconds requires a storage of 4000 KB (4 MB), and 30 seconds playing time requires 6000 KB (6 MB).

In order to allow for minimum start-up time and guaranteeing continuous operation, the receiving rate (RECEIVING_RATE) should be at least equal to the PLAYER_RATE. Preferably and practically, in order to allow efficient buffering to overcome various fluctuations in the system operations such as variations in the receiving rate, the receiving rate should be substantially higher than the playing rate, such as at least 50% above the playing rate (RECEIVING_RATE>1.5*PLAYER_RATE), or twice the playing rate (RECEIVING_RATE>2*PLAYER_RATE). Hence, in the above example, the RECEIVING_RATE should be at least 300 KB/s (1.5*200 KB/s=2.4 Mb/s), or preferably above 400 KB/s (2*200 KB/s=3.2 Mb/s).

VOD. Video-On-Demand (VOD) or Audio and Video On Demand (AVOD) are systems that allow users to select and watch/listen to video or audio content any time, rather than having to watch at a specific broadcast time. For example, IPTV technology is often used to bring video on demand to televisions and personal computers.

Television VOD systems can either stream content through a set-top box, a computer, or other device, allowing viewing in real time, or download it to a device such as a computer, digital video recorder (also called a personal video recorder), or portable media player for viewing at any time. The majority of cable- and telco-based television providers offer both VOD streaming, including pay-per-view and free content, whereby a user buys or selects a movie or television program and it begins to play on the television set almost instantaneously, or downloading to a DVR rented from the provider, or downloaded onto a PC, for viewing in the future.

Other forms of video on demand include "Subscription Video On Demand" (SVOD), which includes services such as Netflix that require users to pay a monthly fee to access a bundled set of content. Another subset of video on demand is "Advertising Video On Demand" (another kind of AVOD), which includes services such as Hulu or Sony's Crackle. This AVOD is often free for users, and the platforms rely on selling advertisements as a main revenue stream.

Downloading and streaming video on demand systems provide the user with a large subset of VCR functionality including pause, fast forward, fast rewind, slow forward, slow rewind, jump to previous/future frame, etc. Interactive Video On Demand (IVOD) is a common version of video on demand where people have the following features at their disposal: Play/Resume—Start a program/movie from the beginning or resume after temporarily stopping the show; Stop—Temporarily or permanently stop the presentation of the show; Pause—Freeze the picture; Jump forward—Jump to a particular time in the presentation (movie) in a forward direction; Jump backward—Jump to a particular time in the presentation (movie) in a backward direction; Fast Forward (FF)—Browse through the movie in the forward direction with picture and sound on; Slow Down—Going forward at a lower rate than normal but with picture and sound; Reverse—Playing the movie in the reversed direction with picture and sound; Fast Reverse—Browse the presentation in the backward direction with picture and sound at a faster speed than standard reverse; and Slow Reverse: Go backward at a slower speed, with picture and sound. Other interactive features include the ability to avoid or select advertisements, to investigate additional details about news events and to browse, select, and purchase goods.

Two common major types of VOD are streaming video and non-streaming video. Streaming video (sometimes known as HTTP Streaming video or Progressive Download) is when the video is compressed and sent over a network, such as the Internet, and then decompressed by the receiver (such as set-top box) for displaying on your screen. Typically, the file begins displaying before it has completely been delivered to the set-top box (to save transmission time and bandwidth). The non-streaming variety of video needs the downloaded files to be completely sent before they can be played.

An arrangement 40 for providing a VOD streaming service is shown in FIG. 4. A VOD Service provider employs a network or system 49, typically including a VOD Service Server 48 for handling the customer access, authorization, billing, and general management, which is connected (or part of) to an Origin Server 41, which stores (or communicates with) a content to be streamed in a memory 46, such as a movie #1 47a and a movie #2 47b. The VOD service provider system 49 is communicating with the client #1 device 24 via the Internet 22. The client #1 24 sends to the VOD service server 48 (shown as dashed line 44a) a request for a content, such as for the movie #1 47a, and upon approval by the VOD provider, the requested content is streamed from the VOD service server 48 (or the origin server 41) to the client #1 24 (shown as dashed line 44b).

CDN. A Content Delivery Network or Content Distribution Network (CDN) is a large distributed system of servers deployed in multiple data centers across the Internet, deployed in order to serve content to end-users with high availability and high performance. CDNs serve a large fraction of the Internet content today, including web objects (text, graphics and scripts), downloadable objects (media files, software, and documents), applications (e-commerce, portals), live streaming media, on-demand streaming media, and social networks. Content providers such as media companies and e-commerce vendors pay CDN operators to deliver their content to their audience of end-users. In turn, a CDN pays ISPs, carriers, and network operators for hosting its servers in their data centers.

Besides better performance and availability, CDNs also offload the traffic served directly from the content provider's origin infrastructure, resulting in possible cost savings for the content provider. In addition, CDNs provide the content provider a degree of protection from DoS attacks by using their large distributed server infrastructure to absorb the attack traffic. Most CDNs are operated as an Application Service Provider (ASP) on the Internet (also known as on-demand-software or software-as-a-service). An increasing number of Internet network owners have built their own CDNs to improve on-net content delivery, reduce demand on their own telecommunications infrastructure, and generate revenues from content customers, such as by offering access to media streaming to Internet service subscribers. An example of a CDN is the Akamai Network, operated by Akamai Technologies headquartered in Cambridge, Ma, U.S.A., and described in an article entitled: "*The Akamai Network: A Platform for High-Performance Internet Applications*" by Erik Nygren, Tamesh K. Sitaraman, and Jennifer Sun, which is incorporated in its entirety for all purposes as if fully set forth herein. CDN technologies and concepts are further described in an article published by Grid Computing and Distributed System (GRIDS) Laboratory of the University of Melbourne, Australia, authored by Al-Mukaddim Khan Pathan and Rajkumar Buyya entitled: "*A Taxonomy and Survey of Content Delivery Networks*", and in an article by Vijay Kumar Adhikari and Zhi-Li Zhang of the University of Minnesota, and Yang Guo, Fang Hao, Matteo Varvello, Volker Hilt, and Moritz Steiner of Bell-Labs/Alcatel-Lucent, entitled: "*Unreeling Netflix. Understanding and Improving Multi-CDN Movie Delivery*", which are all incorporated in their entirety for all purposes as if fully set forth herein.

In one CDN scheme, the content (potentially multiple copies) may exist on several servers, and when a user makes a request to a CDN hostname, DNS will resolve to an optimized server (based on location, availability, cost, and other metrics) and that server will handle the request. CDN nodes are typically deployed in multiple locations, often over multiple backbones, thus allowing benefits such as reducing bandwidth costs, improving page load times, or increasing global availability of content. The number of nodes and servers making up a CDN varies, depending on the architecture, some reaching thousands of nodes with tens of thousands of servers on many remote Points of Presence (PoPs), while others build a global network and have a small number of geographical PoPs.

Most CDN providers will provide their services over a varying, defined, set of PoPs, depending on the geographic coverage desired, such as the United States, International or Global, or Asia-Pacific. These sets of PoPs are referred to as "edges" or "edge networks" as they are the closest edge of CDN assets to the end user. The CDN's Edge Network grows outward from the origin(s) through further acquisitions (via purchase, peering, or exchange) of co-locations facilities, bandwidth, and servers. Content Delivery Networks augment the end-to-end transport network by distributing on it a variety of intelligent applications employing techniques designed to optimize content delivery. The resulting tightly-integrated overlay uses web caching, server-load balancing, request routing, and content services. CDNs use a variety of methods of content delivery including, but not limited to, manual asset copying, active web caches, and global hardware load balancers. Several protocol suites are designed to provide access to a wide variety of content services distributed throughout a content network. The Internet Content Adaptation Protocol (ICAP) and the Open Pluggable Edge Services (OPES) protocols are open standards for connecting application servers.

A CDN typically employs multiple replicas, or point of presence of content, in different locations that are geographically far apart from the origin server and from each other, but closer to the clients. A CDN directs the client's request to a good replica, which in turn serves the items on behalf of the origin server. A good replica means that the item is served to the client quickly, compared to the time it would take to serve the same item from the origin server, with essential quality, integrity, and consistency. A network service provider can build and operate a CDN to offer content distribution service to a number of content providers. This helps content providers to outsource the network infrastructure, and to focus their resources on developing high-value content, not on managing the network. For example, Akamai, Sandpipper/Digital Island, and Adero are content distribution service providers that provide content publishers such as CNN, Disney, AOL, Viacom, and content aggregators such as Broadcast.com and Spinner, with the means to deliver content distribution and delivery.

A CDN maintains a large number of replicas or surrogate servers in proximity to the end users, to act on behalf of the origin severs owned by different content providers. The CDN removes the delivery of content from a centralized site to multiple and highly distributed sites, and overcomes the issues of network size, congestion, and failures, and establishes business relationships with the content providers to act on behalf of them. A typical CDN consists of several surrogate servers, a distribution system, a request-routing system, and an accounting system. An example of a CDN 49 is shown as part of arrangement 40a in FIG. 4a. A CDN #1 45a is shown, including a CDN manager server 43 that manages the CDN #1 45a, and three exemplary replica servers, designated as a Replica Server #1 42a, Replica Server #2 42b, and Replica Server #3 42c. The replica servers 42a, 42b, and 42c include, or are connected to, a respective storage 46a, 46b, and 46c, each of the storages include copies of the movie #1 47a and movie #2 47b, being copies of the original content stored in the origin server 41 memory 46.

A replica/surrogate server receives a mapped request, and delivers the corresponding content to the client. The CDN consists of a collection of network elements called content-distributor, to support the activity of moving a publisher's content from the origin server to one or more surrogate servers. Distribution can happen when a surrogate server either anticipates or receives a client request ('push'), or in response to a surrogate server receiving a client request ('pull'). The CDN also propagates content signals that specify information, such as validation and expiration about the content, and uses these content signals to maintain the integrity and consistency of the content in its surrogate servers. The Distribution system interacts with the request-routing system to inform the content availability in different surrogate servers. It also interacts with the accounting system to inform the content distribution activity so that the later can measure the volume of content distribution.

Request-Routing. Requests for content are typically algorithmically directed to nodes that are optimal in some way. When optimizing for performance, locations that are best for serving content to the user, may be chosen. This may be measured by choosing locations that are the fewest hops, the least number of network seconds away from the requesting client, or the highest availability in terms of server performance (both current and historical), so as to optimize delivery across local networks. When optimizing for cost, locations that are least expensive, may be chosen instead. In an optimal scenario, these two goals tend to align, as servers that are close to the end-user at the edge of the network may have an advantage in performance or cost.

Request routing directs client requests to the content source best able to serve the request. This may involve directing a client request to the service node that is closest to the client, or to the one with the most capacity. A variety of algorithms are used to route the request, such as Global Server Load Balancing, DNS-based request-routing, Dynamic metafile generation, HTML rewriting/redirecting, and anycasting. Proximity—choosing the closest service node, is estimated using a variety of techniques, including reactive probing, proactive probing, and connection monitoring.

A request-routing system enables the activity of directing a client request to a suitable surrogate server. It consists of a set of network elements called request routers that work in cooperation to direct a request. They also use dynamic information about network conditions and load on the surrogate servers to balance the load while directing requests. The Request-routing system interacts with the accounting system to inform the content delivery to the clients, and interacts with the distribution system to inform the demand of content.

In general, Request-Routing techniques may be classified under DNS Request-Routing, Transport-layer Request-Routing, and Application-layer Request-Routing, as described in IETF RFC 3568 entitled: "*Known Content Network (CN) Request-Routing Mechanisms*", which is incorporated in its entirety for all purposes as if fully set forth herein. Various request routing techniques are described in an article by Varum Khare and Beichuan Zhang of the University of Arizona entitled: "*CDN Request Routing to Reduce Network Access Cost*", in an article by Md. Humayun Kabir, Eric G. Manning, and Gholamali C. Shoja of the University of Victoria, Canada, entitled: "*Request-Routing Trends and Techniques in Content Distribution Network*", in a paper published in the International Journal of Computer Applications (0975-8887) Col. 76-No. 13, August 2013 authored by Erwin Harahap, Janaka Wijekoon, Rajitha Tennekoon, and Fumito Yamaguchi of Keio University, Japan, entitled: "*Modeling of Routing-based Request Redirection for Content Distribution Network*", and in a paper published June 2001 by SinoCDN Limited entitled: "*Request Routing, Load-Balancing and Fault-Tolerance Solution—MediaDNS*", which are all incorporated in their entirety for all purposes as if fully set forth herein. An example of a Request-Routing technique is described in a U.S. Pat. No. 8,577,992 to Richardson et al. entitled: "Request Routing Management Based on Network Components", which is incorporated in its entirety for all purposes as if fully set forth herein.

The system operation is described in a flow chart 60 in FIG. 6, corresponding to the exemplary arrangement 50 shown in FIG. 5. In the "Content Request" step 61, corresponding to dashed-line message 51*a* in FIG. 5, the client device #1 24 send a request to the VOD service server 48 for a specific video content, such as the movie #1 47*a*. The VOD service provider 49 uses the CDN #1 45*a* for the actual content delivery, and thus after appropriate authentication and billing procedures, the VOD service provider 49 ask the CDN provider, such as via a request to CDN manager 43 to forward the requested content to the client device #1 24. A request-routing scheme is performed as part of the "Request Routing" step 62, where the optimal replica server is selected according to pre-set criteria, for example selecting the replica server #1 42*a*. The optimal replica server is identified and the client device #1 24 is notified in the "Identify Replica Server" step 63. For example, the client device #1 24 may be notified by the VOD service server 48, as illustrated by a message 51*b* in FIG. 5. The client device #1 24 then sends the content request to the identified optimal replica server #1 42*a* as part of the "Streaming Request" step 64, corresponding to a message 51*c* in FIG. 5. The request is followed by the replica server #1 42*a* starting to stream the requested content to the client device #1 24 as part of the "Content Streaming" step 65, corresponding to the dashed line 51*d* shown in FIG. 5. Once the optimal replica server (such as the replica server #1 42*a*) is selected as part of the request routing algorithm in the "Request Routing" step 62 and identified by the client device #1 24 as part of the "Identify Replica Server" step 63, the content is continuously streamed in full from the selected replica server (the replica server #1 42*a*) to the client device #1 24, until the whole content has been streamed (e.g., the selected movie #1 47*a* is streamed in full until completed).

A popular request-routing method is known as 'HTTP-Redirect' and is based on using an HTTP response status code '302 Found' for performing URL redirection. An HTTP response with this status code additionally provides a URL in the Location header field, and the user agent (e.g. a web browser) is invited by a response with this code to make a second, otherwise identical, request to the new URL specified in the Location field. The HTTP/1.0 specification (RFC 1945) initially defined this code, and gives it the description phrase "Moved Temporarily".

An HTTP-Redirect based arrangement 70 is shown in FIG. 7. Similar to message 51*a* above, the process starts with the "Content Request" step 61 where a content request is sent, shown as dashed line 71*a*, from the client device #1 24 to the VOD service provider 49. The response from the VOD service server 48 comprises an identification of the CDN #1 45*a* manager server 43. The client device #1 24 then directs its request for content to the CDN manager 43, shown as message 71*c*. The CDN manager server 43 uses the HTTP '302 Found' mechanism to notify the client device #1 24 (shown as dashed line 71*d*) that the request should be redirected to the Replica Server #1 42*a*, identified as the replica server to be used as part of the "Identify Replica Server" step 63. The request is then redirected by the client device #1 24 to the identified replica server #1 42*a* (message 71*e*), and the streaming process starts (dashed line 71*f*) from the replica server #1 42*a* to the client device #1 24. Typically, the same identified replica server, such as the replica server #1 42*a* in this example), is used throughout the total streaming of the content until whole of the requested content is received at the client device #1 24.

Another commonly used request-routing method referred herein is 'CDN-Redirect', and is based on the CDN Manager Server 43 providing the identification of the replica server to the VOD Service server 48, which in turn, provides it to the client #1 device 24. Such a 'CDN-Redirect' based arrangement 70*a* is shown in FIG. 7*a*. Similar to message 51*a* above, the process starts with the "Content Request" step 61 where a content request is sent, shown as dashed line 71*a*, from the client device #1 24 to the VOD service provider 49. Upon receiving the content request, the VOD Service Server 48 decides to use CDN #1 45*a*, and sends a request for replica server to the CDN Manager server 43, shown as dashed line 72*a*. The CDN Manager server 43 then select an appropriate replica server (according to availability and pre-set criteria), and sends the selected replica server identification (Replica Server #1 42*a* in this example) back to the VOD Service Server 48 (dashed line 72*b*). Then the identification of the selected replica server is sent to the content requesting client #1 device 24 (dashed line 72*c*). The request is then redirected by the client device #1 24 to the identified replica server #1 42*a* (message 71*e*), then the streaming process starts (dashed line 71*f*) from the replica server #1 42*a* to the client device #1 24.

Another commonly used request-routing method is referred herein as 'DNS-Based' or 'DNS-Redirect', and is based on the DNS scheme for resolving the identity of the selected replica server. Such a 'DNS-Redirect' based arrangement 70*b* is shown in FIG. 7*b*. Similar to message 51*a* above, the process starts with the "Content Request" step 61 where a content request is sent, shown as a dashed line 71*a*, from the client device #1 24 to the VOD service provider 49. Upon receiving the content request, the VOD Service Server 48 sends a domain name (rather than IP address or any other server identification), shown as dashed line 71*b*. As part of a normal DNS scheme, the requested domain name is sent to a DNS server 74 (may be part of the ISP 26 or communicating with it), shown as dashed line 73*d*. The DNS resolution scheme involves the DNS server 74 communicating with a domain-name directed DNS server, which may be the CDN Manager Server 43 shown as dashed line 73*c*, which in turn returns the identification (typically IP address) of the selected replica server (such as the replica server #1 42*a* as part of CDN #1 45*a*). The resolved IP address is then returned by the DNS server 74 to the client #1 device 24 (shown as a dashed line 73*a*) followed by a standard streaming process as described herein.

The states, and messages associated with using the HTTP-Redirect Request-Routing scheme, shown as the arrangement 70 in FIG. 7, are further described in a timing, states, and messaging chart 90 shown in FIG. 9. The chart 90 shows the messaging and related timing associated with the operation of the client #1 device 24 (corresponding to a dashed line 92*a*), the VOD Service server 48 (corresponding to a dashed line 92*b*), the CDN #1 45*a* Manager Server 43 (corresponding to a dashed line 92*c*), and the resolved Replica Server #1 42*a* (corresponding to a dashed line 92*d*). The requested content is identified in the client #1 device 24 in the 'Start' state 93*a*, and the request for the content is sent as a 'Content Request' message 94*a* to the VOD Service Server 48 (corresponding to the "Content Request" step 61 in the flow-chart 60, and to the dashed line 71*a* in the arrangement 70). The VOD service provider 49 selects CDN #1 as the medium for content delivery in a 'Select CDN #1' state 93*b*, and send back the CDN #1 45*a* Manager Server 43 identification to the client #1 device 24 as a 'Send Manager' message 94*b* (corresponding to the dashed line 71*b* in the arrangement 70). After receiving the message 94*b* at a 'Send to CDN #1' state 93*c*, the client #1 device 24 sends a 'Content Request' message 94*c* (corresponding to the dashed line 71*c* in the arrangement 70) to the CDN Manager Server 43. After selecting the replica device to use, a 'HTTP-Redirect' state 93*d* is used to notify the client #1 device 24 of the identification of the selected replica server using a 'Notify Replica' message 94*d* (corresponding to the dashed line 71*d* in the arrangement 70). The steps starting at the 'Content Request' message 94*a* until the client #1 device 24 is notified of the Replica Server to use (in this example the replica server #1 42*a*), are part of the Request-Routing scheme, corresponding to the "Request Routing" step 63 of the flow chart 60. Once the replica server to be used in identified by the client #1 device 24 (corresponding to the "Identify Replica Server" step 63 in the flow chart 60), a 'Content Request' message 94*e* is sent to the selected replica server #1 42*a* (corresponding to the "Streaming Request" step 64 in the flow chart 60 and to the dashed line 71*e* in the arrangement 70), which in turn prepares the requested content in a 'Prepare Content' state 93*e*, followed by streaming the content to the requesting client #1 device 24 as a 'Content Streaming' message 94*f* (corresponding to the "Content Streaming" step 65 in the flow chart 60 and to the dashed line 71*f* in the arrangement 70). While the states and messaging chart 90 described an HTTP-Redirect scheme, any other Request-Routing scheme may be equally employed.

A timing, states, and messaging chart 90 shown in FIG. 9 schematically describes the activities of the various entities shown in arrangement 70 in FIG. 7 and described in flow chart 60 in FIG. 6. The entities involved are a client device, such as the client device #1 24 (associated with a vertical dashed line 92*a*), a VOD service server, such as the VOD Service Server 48 (associated with a vertical dashed line 92*b*), a CDN #1 manager server, such as the CDN Manager Server 43 (associated with a vertical dashed line 92*c*), and a selected CDN #1 replica server, such as the replica server #1 42*a* (associated with a vertical dashed line 92*d*). The process starts at a "Start" state 83*a* with the client device #1 24 determining that a content is required, such as a content selected to be played by the user. The client device #1 24 then send a "Content Request" message 94*a* to the VOD service server 48 (corresponding to the request 71*a* in the arrangement 70 and to the "Content Request" step 61 in the flow chart 60). Upon receiving the request, the VOD service server 48 selects a CDN to be used to deliver the requested content as part of a "Select CDN #1" state 93*b*, and replies with the identification of the appropriate CDN manager identification as part of a "Send Manager" message 94*b* (corresponding to the reply 71*b* in the arrangement 70). At a "send to CDN #1" state 93*c* the client device #1 24 receives the server identification, and sends a new "Content Request" message 94*c* to the identified CDN manager server 43 (corresponding to the request 71*c* in the arrangement 70). Using the HTTP-Redirect mechanism in a "HTTP Redirect" state 93*d*, the CDN Manager server 43 returns to the client device #1 24 a "Notify Replica" message 94*d*, identifying the selected replica server, such as the Replica Server #1 42*a* (corresponding to the reply 71*d* in the arrangement 70 and to the "Identify Replica Server" step 63 in the flow-chart 60). While using the HTTP-Redirect mechanism as an example, any other Request-Routing scheme may be equally used for identifying a replica server.

The client device then sends a "Content Request" message 94*e* to the selected replica server 42*a* (corresponding to the request 71*e* in the arrangement 70 and to the "Streaming Request" step 64 in the flow-chart 60), which in turn prepares the content to be sent as part of a "Prepare Content" state 93*e*, followed by providing the content to the client device #1 24 as part of a "Content Streaming" message 94*f* (corresponding to the reply 71*f* in the arrangement 70 and to the "Content Streaming" step 65 in the flow-chart 60), preferably using HTTP streaming, and using a buffering scheme as described regarding the graph 80 in FIG. 8 above.

A method and system for managing media streaming between clients on a client side of a network and stream servers on a stream server side of the network, and communications between the client-side and the stream server side requiring a network address translation (NAT), are described in U.S. Pat. No. 8,166,179 to Pickens et al., entitled: "Media Streaming Through a Network Address Translation (NAT) Device", which is incorporated in its entirety for all purposes as if fully set forth herein. The method and system involve allowing the same stream server side IP address to be shared amongst multiple stream servers, so that the stream servers can simultaneously use the same IP address to source different media sessions. Because the stream servers can simultaneously use the same IP address to source different media sessions, a media session can be switched from one stream server to a different stream server without triggering STUN signaling, or a change in the NAT mapping.

A technique for managing the streaming of digital video content to multiple clients involves identifying an attribute of a content element that is streamed to a client and selecting a protection mechanism for the content element as a function of the attribute, and is described in U.S. Pat. No. 8,370,649 to Sherer et al., entitled: "Stream Control Failover Utilizing an Attribute-Dependent Protection Mechanism", which is incorporated in its entirety for all purposes as if fully set forth herein. The protection mechanism enables streaming of the content element to the clients in the event of a resource failure. In an example, the identified attribute is an indication of the popularity of the content element (e.g., as measured by the number of active streams), such that the protection mechanism is selected as a function of the popularity of the content element. In an embodiment, protection mechanisms that offer a higher level of protection are selected for the more popular content elements, and protection mechanisms that offer a lower level of protection are selected for the less popular content elements.

Mechanisms and techniques that provide a system that provides stream data to a client by monitoring operation of a stream control protocol such as RTSP associated with stream data transmitted between a client and a first stream server are described in U.S. Pat. No. 7,509,390 to Raman et al., entitled: "Methods and Apparatus for Controlling the Transmission of Data", which is incorporated in its entirety for all purposes as if fully set forth herein. The system detects a stream change event related to transmission of the stream data between the client and the first stream server, and identifies a relative position within the stream data based on the operation of the stream control protocol. The system then establishes transmission of the stream data between the client and a second stream server starting at the relative position in the stream data. The system provides for mid-stream failover for the transmission of stream data, such as real-time data with minimal perceptible loss of stream data by the client.

A client player that performs a query to a nameserver against a network map of Internet traffic conditions is described in U.S. Pat. No. 7,299,291 to Shaw entitled: "Client-Side Method for Identifying an Optimum Server", which is incorporated in its entirety for all purposes as if fully set forth herein. The query is made, asking for a particular service (e.g., RTSP) via a particular protocol (TCP) in a particular domain. In response, the nameserver returns a set of one or more tokens, with each token defining a machine or, in the preferred embodiment, a group of machines, from which the player should seek to obtain the stream. The player may then optionally perform one or more tests to determine which of the set of servers provides the best quality of service for the stream. That server is then used to retrieve the stream. Periodically, the client player code repeats the query during stream playback to determine whether there is a better source for the stream. If a better source exists, the player performs a switch to the better stream source "on the fly" if appropriate, to maintain and/or enhance the quality of service.

A system for affecting a dynamic switch from an existing client-server connection established between a client node and a server node on a Data-Packet-Network (DPN) to an alternate server-node, connected to the network, and accessible to the client node is described in U.S. Patent Application Publication No. 2002/065922 to Shastri entitled: "Method and Apparatus for Selection and Redirection of an Existing Client-Server Connection to an Alternate Data Server Hosted on a Data Packet Network (DPN) Based on Performance Comparisons", which is incorporated in its entirety for all purposes as if fully set forth herein. In a preferred embodiment, the system utilizes a unique software module residing on and executing from a client-node, which functions to monitor current Quality of Service (QoS) data relative to existing client-server connections. The module opens temporary client-server connections to alternate servers while a user is connected to an existing server for the purpose of sampling QoS characteristics of the alternate servers and associated network paths, and generating estimations of total value of services. The module compares actual QoS values with estimated values, and selects an alternate server based on results of the comparison. A dynamic switch of server connection may be automatically achieved, which is largely transparent to a user operating the client node.

An invention that switches a source of a streaming session between a primary server and its client, from the primary server to another server at arbitrary points during the progress of the streaming session, is described in U.S. Pat. No. 6,377,996 to Lumelsky et al., entitled: "System for Seamless Streaming of Data Stored on a Network of Distributed Primary and Target Servers Using Segmentation Information Exchanged Among All Servers During Streaming", which is incorporated in its entirety for all purposes as if fully set forth herein. The switching of the source is accomplished by using a virtual socket capable of simultaneously phasing in a new streaming connection, while phasing out an old streaming connection during a streaming session that preserves the temporal progress of the session. The virtual socket acts as a client-based intermediary between the client and one or more streaming servers, thus enabling a client application to establish a streaming connection with respect to content and not to the end-party, i.e., server.

A client-based system for the fault-tolerant delivery of real-time or continuous data streams, such as real-time multimedia streams, e.g., live audio and video clips, is described in in U.S. Pat. No. 6,195,680 to Goldszmidt et al., entitled: "Client-Based Dynamic Switching of Streaming Servers for Fault-Tolerance and Load Balancing", which is incorporated in its entirety for all purposes as if fully set forth herein. Multimedia servers are grouped into two or more sets. For example, a first set may include one or more primary servers using odd-numbered ports and a second set may include one or more secondary servers using even-numbered ports. The client requests a multimedia stream through a control server or gateway, which routes requests to the multimedia servers, and the client receives the stream directly from a selected (primary) server. The client automatically detects load imbalances and/or failures (complete or partial) and dynamically switches to a secondary server in order to continue receiving the real-time multimedia stream with minimal disruption, while maintaining a balanced load across multiple servers in a distributed network environment. The determination can be made based on: the received bit or frame rate (for video); a bit rate or sample rate (for audio); monitoring a delivery rate or for packets arriving out of order: for example, using packet numbering mechanisms available in TCP; sequence numbering or time stamp capabilities of RTP (in combination with the User Datagram Protocol (UDP)). In any case, the determination could be based on the rate measurement or monitoring mechanism falling below (or exceeding) some threshold. Alternately, the primary server or the control server could send an explicit distress, or switch signal to the client. An explicit signal can be used, for example, to switch clients in phases with minimal disruption.

Various systems and methods for communication over the Internet, such as by using intermediate nodes, are described in U.S. Patent Application Publication No. 2015/0067819 to Shribman et al., entitled: "System and Method for Improving Internet Communication by Using Intermediate Nodes", which is incorporated in its entirety for all purposes as if fully set forth herein.

QoE. Quality of Experience (QoE, QoX or simply QX) is a measure of a customer experiences with a service (web browsing, phone call, TV broadcast, call to a Call Center), which focuses on the entire service experience, and is a more holistic evaluation than the more narrowly focused user experience (focused on a software interface) and customer-support experience (support focused). QoE looks at a vendor or purveyor offering from the standpoint of the customer or end user, and provides an assessment of human expectations, feelings, perceptions, cognition and satisfaction with respect to a particular product, service or application. The QoE metric is often measured at the end devices and can conceptually be seen as the remaining quality after the distortion introduced during the preparation of the content and the delivery through the network until it reaches the decoder at the end device. There are several elements in the video preparation and delivery chain, where some of them may introduce distortion that cause the degradation of the content, and several elements in this chain can be considered as "QoE relevant" for video services. These are the encoding system, transport network, access network, home network, and end device.

The concept of QoE in engineering is also known as Perceived Quality of Service (PQoS), in the sense of the QoS as it is finally perceived by the end-user. The evaluation of the PQoS for audiovisual content will provide a user with a range of potential choices, covering the possibilities of low, medium or high-quality levels. Moreover, the PQoS evaluation gives the service provider and network operator the capability to minimize the storage and network resources by allocating only the resources that are sufficient to maintain a specific level of user satisfaction. Another approach for measuring QoE for a video content is using a reference-less analysis where the QoE is not measured comparing an original video to a delivered one, but by trying to detect artifacts such as blockiness, blur, or jerkiness directly in the video. QoE is further described in an April 2012 IEEE Communications Magazine (01630-6804/12) article entitled: "*Toward Total Quality of Experience: A QoE Model in a Communication Ecosystem*", which is incorporated in its entirety for all purposes as if fully set forth herein.

Timestamp. A timestamp is a sequence of characters or encoded information identifying when a certain event occurred, usually giving date and time of day, sometimes accurate to a small fraction of a second, and also refers to digital date and time information attached to the digital data. For example, computer files contain timestamps that tell when the file was last modified, and digital cameras add timestamps to the pictures they take, recording the date and time the picture was taken. A timestamp is typically the time at which an event is recorded by a computer, not the time of the event itself. In many cases, the difference may be inconsequential—the time at which an event is recorded by a timestamp (e.g., entered into a log file) should be close to the time of the event. Timestamps are typically used for logging events or in a Sequence of Events (SOE), in which case, each event in the log or SOE is marked with a timestamp. In a file system such as a database, timestamp commonly mean the stored date/time of creation or modification of a file or a record. The ISO 8601 standard standardizes the representation of dates and times which are often used to construct timestamp values, and IETF RFC 3339 defines a date and time format for use in Internet protocols using the ISO 8601 standard representation.

Geolocation. IP-based geolocation (commonly known as geolocation) is a mapping of an IP address (or MAC address) to the real-world geographic location of a computing device or a mobile device connected to the Internet. The IP address based location data may include information such as country, region, city, postal/zip code, latitude, longitude, or Timezone. Deeper data sets can determine other parameters such as domain name, connection speed, ISP, Language, proxies, company name, US DMA/MSA, NAICS codes, and home/business classification. The geolocation is further described in the publication entitled: "*Towards Street-Level Client-Independent IP Geolocation*" by Yong Wang et al., downloaded from the Internet on July 2014, and in an Information Systems Audit and Control Association (ISACA) 2011 white paper entitled: "*Geolocation: Risk, Issues and Strategies*", which are both incorporated in their entirety for all purposes as if fully set forth herein. There are a number of commercially available geolocation databases, such as a web-site http://www.ip2location.com operated by Ip2location.com headquartered in Penang, Malaysia, offering IP geolocation software applications, and geolocation databases may be obtained from IpInfoDB operating website http://ipinfodb.com, and by Max Mind, Inc., based in Waltham, Massachusetts, U.S.A, operating the web-site www.maxmind.com/en/home.

Further, the W3C Geolocation API is an effort by the World Wide Web Consortium (W3C) to standardize an interface to retrieve the geographical location information for a client-side device. It defines a set of objects, ECMA Script standard compliant, executing in the client application, give the client's device location through the consulting of Location Information Servers, which are transparent for the Application Programming Interface (API). The most common sources of location information are IP address, Wi-Fi and Bluetooth MAC address, radio-frequency identification (RFID), Wi-Fi connection location, or device Global Positioning System (GPS) and GSM/CDMA cell IDs. The location is returned with a given accuracy depending on the best location information source available. The W3C Recommendation for the geolocation API specifications draft dated Oct. 24, 2013, is available from the web-site http://www.w3.org/TR/2013/REC-geolocation-API-20131024. Geolocation-based addressing is described in U.S. Pat. No. 7,929,535 to Chen et al., entitled: "Geolocation-based Addressing Method for IPv6 Addresses", and in U.S. Pat. No. 6,236,652 to Preston et al., entitled: "Geo-spacial Internet Protocol Addressing", and in U.S. Patent Application Publication No. 2005/0018645 to Mustonen et al., entitled: "Utilization of Geographic Location Information in IP Addressing", which are all incorporated in their entirety for all purposes as if fully set forth herein.

In consideration of the foregoing, it would be an advancement in the art to provide an improved functionality method and system that is simple, secure, anonymous, and cost-effective, providing improved CAPEX (Capital Expenditure) or OPEX (Operational Expenditures) savings, load-balanced, redundant, reliable, provide lower CPU and/or memory usage, enable pipelining of requests and responses, reduce network congestion, using low delivery rate sources or servers, lower start-up time, easy to use, reduce latency, faster, has a minimum part count, minimum hardware, and/or uses existing and available components, protocols, programs and applications for providing better quality of service, overload avoidance, better or optimal resources allocation, better communication and additional functionalities, a better user experience, or improved QoE.

SUMMARY

A method for streaming content to a client device over the Internet, the content may be identified by a content identifier, may comprise first and second distinct content parts, and may be associated with a provider server. The method may be used with a first content server storing a first copy of the content and identified by a first server identifier, and a second content server storing a second copy of the content and identified by a second server identifier. The method may comprise the steps of sending, by the client device, a request for the content to the provider server using the content identifier; sending, by the provider server, a list to the client device, the list comprises a first and second sources identifiers respectively associated with the first and second content servers; sending, by the client device, a request for the first content part to the first content server using the first server identifier; streaming, to the client device, the first content part from the first content server; sending, by the client device, a request for the second content part to the second content server using the second server identifier; streaming, to the client device, the second content part from the second content server; and playing, by a media player at the client device, the first and second content parts, the content may consist of a single file that may comprises a streaming media data.

Alternatively or in addition, the method by the client device may comprise the steps of sending, to the provider server, a request for the content using the content identifier; receiving, from the provider server, a list to the client device, the list comprises a first and second sources identifiers respectively associated with the first and second content servers; sending, to the first content server using the first server identifier, a request for the first content part; streaming, from the first content server, the first content part; sending, to the second content server using the second server identifier, a request for the second content part; streaming, from the second content server, the second content part; and playing, by a media player, the first and second content parts, and the content may consist of a single file that comprises a streaming media data.

Alternatively or in addition, the method by the provider server may comprise the steps of receiving, from the client device, a request for the content using the content identifier; and sending, to the client device, a list that comprises a first and second sources identifiers respectively associated with the first and second content servers, and the content may consist of a single file that comprises a streaming media data.

Any one or more non-transitory computer readable mediums herein may contain computer instructions using one or more programming languages, that when executed or interpreted by one or more processors, cause the processors to perform part or all of the steps, the steps of the client device, or the steps of the provider server. A programming language used may be an Object-Oriented Programming (OOP) language that supports scripting, and may be based on, may be compatible with, or may be according to, C, C++, Objective-C, Perl, REXX, VBScript, JavaScript, or Java. The client device may further comprise a web browser that may consist of, may comprise of, or may be based on, Microsoft Internet Explorer, Google Chrome, Opera™, or Mozilla Firefox®. The web browser may be a mobile web browser that may consist of, may comprise of, or may be based on, Safari, Opera Mini™, or Android web browser. The media player may be part of the web browser.

The instructions may include, or may be based on, client-side scripting, and the scripting may be using a dynamic programming language that supports dynamic typing, first-class functions, and functional programming, and may be based on, may be compatible with, or may be according to, ECMA-262 5.1 Edition or ISO/IEC 16262:2011 standards, such as Adobe Flash player, JavaScript, or ActionScript. The client device may be storing, operating, or using, a client operating system, that may consist of, may comprise of, or may be based on, one out of Microsoft Windows 7, Microsoft Windows XP, Microsoft Windows 8, Microsoft Windows 8.1, Linux, and Google Chrome OS. The client operating system may be a mobile operating system, that may be one out of Android version 2.2 (Froyo), Android version 2.3 (Gingerbread), Android version 4.0 (Ice Cream Sandwich), Android Version 4.2 (Jelly Bean), Android version 4.4 (KitKat), Apple iOS version 3, Apple iOS version 4, Apple iOS version 5, Apple iOS version 6, Apple iOS version 7, Microsoft Windows® Phone version 7, Microsoft Windows® Phone version 8, Microsoft Windows® Phone version 9, and Blackberry® operating system.

Any one of the servers herein may be storing, operating, or using a server operating system, that may consist of, may comprise of, or may be based on, one out of Microsoft Windows Server®, Linux, or UNIX, and may consist or, may comprise of, or may be based on, Microsoft Windows Server® 2003 R2, 2008, 2008 R2, 2012, or 2012 R2 variant, Linux™ or GNU/Linux-based Debian GNU/Linux, Debian GNU/kFreeBSD, Debian GNU/Hurd, Fedora™, Gentoo™

Linspire™, Mandriva, Red Hat® Linux, SuSE, and Ubuntu®, UNIX® variant Solaris™, AIX®, Mac™ OS X, FreeBSD®, OpenBSD, or NetBSD®.

At least one of the steps herein, performed by the client device or by one of the servers, may be performed integrated with an application in a form of a plug-in or an extension, and the application may be a web-browser or a communication application such as a TCP/IP or HTTP handling application. The integration may be by hooking to the application, or may be in a filter driver form, or the application and the steps may be communicating using an Inter-Process Communication (IPC).

The IPC may be using a file sharing, a signal, a socket, a pipe, a message queue, a shared memory, a semaphore; a memory mapped file, a clipboard, a Component Object Model (COM), a data copy, a DDE protocol, or mailslots. The provider server or any one of the content servers may be a web server. The streaming may be based on, may be using, may be compatible with, or may be according to, Hypertext Transfer Protocol (HTTP), Real-time Transport Protocol (RTP), Real Time Streaming Protocol (RTSP), Real-Time Transport Control Protocol (RTCP), User Datagram Protocol (UDP), or Transmission Control Protocol (TCP). One of, or all of the identifiers may be an IP address (in IPv4 or IPv6 form) or a URL. At least one of the servers may be a web server that may use HyperText Transfer Protocol (HTTP) that responds to HTTP requests via the Internet, and at least one of the requests may be an HTTP request. The communication of the client device with at least one server may be based on, or may be using, an HTTP persistent connection. Alternatively or in addition, the communication of the client device with at least one server may be based on, or may be using, a TCP/IP protocol or connection.

Any two or more steps herein by the client device or by the provider server may be concurrently executed using multitasking, multiprogramming, or multiprocessing. The steps of sending, by the client device, the request for the first and second content parts may be concurrently executed. Alternatively or in addition, the steps of streaming to the client device the first and second content parts, respectively from the first and second content servers, may be concurrently executed. Alternatively or in addition, the step of streaming, to the client device, the first content part from the first content server, and the step of sending, by the client device, a request for the second content part, may be concurrently executed. Alternatively or in addition, the step of playing, by the media player at the client device, the first content part, and the step of sending, by the client device, a request for the second content part, may be concurrently executed. Alternatively or in addition, the step of playing, by the media player at the client device, the first content part, and the step of streaming, to the client device, the second content part from the second content server, may be concurrently executed.

Any requests herein for the first and the second content parts may be based on, or may be according to byte or range serving, that may be based on, or may use, the HTTP/1.1 range request scheme, that may be based on, may be compatible with, or may be according to, Internet Engineering Task Force (IETF) Request for Comments (RFC) 2616 or RFC 7233. The single file may comprise a compressed media data according to a compression scheme, and the step of playing may include de-compressing of the media data. The compression scheme may use lossy or lossless compression, and may use intraframe or interframe compression. The compression scheme may use a standard compression scheme that may be based on, may be compatible with, or may be according to, JPEG (Joint Photographic Experts Group), MPEG (Moving Picture Experts Group), ITU-T H.261, ITU-T H.263, ITU-T H.264, or ITU-T CCIR 601. The streaming media data may include digital multimedia, digital audio, or digital video data, and the digital video may be in a format that may be based on, may be compatible with, or may be according to, TIFF (Tagged Image File Format), RAW, AVI, DV, DV-PAL, HDV, MOV, WMV, MPEG-2, MPEG-4, DCF (Design Rule for Camera Format), ITU-T H.261, ITU-T H.263, ITU-T H.264, ITU-T CCIR 601, ASF, Exif (Exchangeable Image File Format), or DPOF (Digital Print Order Format) standard.

Any digital video data herein may be in a High-Definition (HD) or Standard-Definition (SD) format, and may be based on, may be compatible with, or may be according to, ISO/IEC 14496 standard, MPEG-4 standard, or ITU-T H.264 standard. Alternatively or in addition, the digital video data may include, or may be part of a movie. As part of a Video-on-Demand (VOD) scheme, a VOD service provider may be operating, managing, or controlling a network of servers that may include the provider server, and may further include or use an origin server that may be operated, managed, or controlled by the VOD service provider, and may be storing the content. The method may further be preceded by the steps of receiving, by the first content server, the content from the origin server; storing, by the first content server, the received content as the first copy of the content; receiving, by the second content server, the content from the origin server; and storing, by the second content server, the received content as the second copy of the content.

The first or second content part may consist of data size that may be played by the media player for less than 10 seconds or for less than 1 second. Alternatively or in addition, the first or second content part may consist of less than 5%, or less than 1%, of the whole content size. Alternatively or in addition, the first or second content part may consist less than of the whole content size, such as less than 0.1% of the whole content size.

The method may further be used with first and second buffers in the client device respectively associated with the first and second content parts. The method may further comprise the steps of storing in the first buffer the first content part, when received as part of the streaming from the first content server; and storing in the second buffer the second content part, when received as part of the streaming from the second content server. The step of playing the first content part may include reading the data of the first content part from the first buffer, and the step of playing the second content part may include reading the data of the second content part from the second buffer.

The reading of the data of the second content part from the second buffer may be performed by the media player at a constant playing rate, and the storing in the second buffer the second content part, when received, may be performed at an average receiving rate. The average receiving rate may be lower than the playing rate, such as lower than half, third, quarter, or a tenth of the playing rate. The method may further comprise the step of monitoring the size of the first buffer data in the first buffer by checking the size of the data of the first content part that was received but was not read. The method may be used with a minimum value, and may further comprise the step of comparing the size of the first buffer data in the first buffer to the minimum value, and determining if the size of the first buffer data is below the minimum value. The method may be used with an additional source identifier associated with an additional content server that may be distinct from the first content server, and upon determining that the size of the first buffer data is below the minimum value, the method may further comprise the steps of sending, by the client device, a request for at least part of the first content part to the additional server using the additional source identifier; and streaming, to the client device, at least part of the first content part from the additional content server.

The first server identifier or the second server identifier may be a URL, an HTTP header, or an IP address of the respective content server. The first source identifier may include, or may consist of, the first server identifier, and the second source identifier may include, or may consist of the second server identifier. Alternatively or in addition, the first content server may be a replica server that may be part of a first Content Distribution Network (CDN) that may be operated, controlled, or managed by a first CDN operator, and the first source identifier may include, or consists of, an identifier of a resolved server. The method may further comprise the steps of sending, by the client device, a message to the resolving server by using the first source identifier; and in response, receiving, by the client device, the first server identifier. The first server identifier may be resolved from the first source identifier using a Request-Routing scheme, that may be based on, may be compatible with, or according to, DNS Request-Routing, Transport-Layer Request-Routing, or Application-Layer Request-Routing technique. Further, the Request-Routing scheme may be based on, may be compatible with, or may be according to, an HTTP-Redirect, CDN-Redirect, DNS-Redirect, Dynamic Metafile Generation, Global Server Load Balancing, or anycasting algorithm.

The second content server may be a replica server that may be part of a second CDN that may be operated, controlled, or managed by the first or a second CDN operator, and the request for the first or second content part, may include, or may consist of a URL that comprises an identification of the respective first or second CDN. The URL may be in a format of XXX.YYY.com/ZZZ/UUU.mp4, so that the XXX may identify the CDN, the YYY may identify the CDN operator, the ZZZ may identify a directory including the requested content, and the UUU.mp4 may identify the requested file in the directory. The method may further be used for measuring a content delivery performance of each of the content servers.

The delivery performance may include a Round Trip Time (RTT) or a Bandwidth (BW). The method may further comprise measuring of the RTT of each of the content servers by measuring a time interval starting upon sending a request for the respective content part to the respective content server, and ending upon starting the streaming of the respective content part from the respective content server. Alternatively or in addition, the method may further comprise measuring of the BW of each of the content servers by dividing a size of the respective part of the content received during the respective streaming step by the measured streaming time interval during which, the size of the respective part of the content was received. The method may further comprise the step of storing the measured content delivery performance of each of the content servers. A performance server that may be the provider server, may be used, and the method may further comprise the step of sending, by the client device, the content delivery performance of each of the content servers to the performance server; and receiving and storing by the performance server, the content delivery performance.

The method may further comprise the step of partitioning the content into at least the distinct first and second content parts, such as 3, 4, 5, 6, 7, 8, 9 or 10 distinct content parts. Any byte of the content may be included in at least in one of the distinct content parts, or only in one of the distinct content parts. Alternatively or in addition, at least one byte of the content may be included in two or more of the distinct content parts, and at least two of the content parts may be of equal size. The partitioning may be sequential or non-sequential in the content. The number of content parts may be equal to, more than, or less than the number of sources in the list.

Three or more multiple content servers may be used, each storing a copy of the content or any part thereof, the list may comprise the three or more sources identifiers associated with the three or more multiple content servers, and each of the three or more sources identifiers may be associated with a value. The method may further comprise the step of selecting the first and second sources identifiers from the list, and may further comprise the step of obtaining the values associated with the three or more sources identifiers. The values may be fetched from a memory or may be received from a server, such as the provider server, over the Internet. The first and second sources identifiers may be selected from the list based on their associated values, such as being associated with the lowest or highest values.

The values may be associated with costs for using the respective source identified by the respective source identifier, and the first and second sources identifiers may be selected from the list based on the lowest costs. The values may be associated with a content delivery performance of the respective source identified by the respective source identifier, and the first and second sources identifiers may be selected from the list based on the respective content delivery performances.

Any content delivery performance herein may be based on, or consists of a Round Trip Time (RTT) of the respective content server identified by the respective source identifier, the RTT may be defined as a time interval starting upon sending a request for the respective content part to the respective source, and ending upon starting the streaming of the respective content part from the respective source. Alternatively or in addition, the content delivery performance may be based on, or consists of, a Bandwidth (BW) of the respective content server identified by the respective source identifier, the BW may be defined by dividing a size of the respective part of the content received during the respective streaming step from the respective server identified by the respective source identifier by the measured streaming time interval during which the size of the respective part of the content was received.

Any non-transitory tangible computer-readable storage medium herein may store a data structure that may comprise multiple records for collecting and storing communication performance data, for use with a plurality of servers that store, control, or may be capable of providing multiple files. Multiple copies of each file may be stored on two or more servers out of the plurality of servers, each of the records may be associated with obtaining, by a client device out of a group of client devices, an entire of, or part of, a copy of a file out of the multiple files, from a server out of the plurality of servers. Each record may comprise an identifier in the Internet of the client device associated with the record out of the group of client devices; an identifier of the file copy associated with the record out of the multiple files; an identifier in the Internet of the server associated with the record out of the plurality of servers; a time of the obtaining by the client device associated with the record the part or whole of the file copy associated with the record from the server associated with the record; and one or more measured file delivery performance data of the obtaining by the client device the part or the whole of the file copy from the server. The non-transitory computer readable medium may further comprise computer instructions that, when executed or interpreted by a processor, may cause the processor to receive and add a record to the data structure, and may be operative to receive a request, such as from a requesting client device (that may be selected from the group of client devices) or from a requesting server (that may be selected from the plurality of servers), for the entire or part of the data structure, in response to send the entire data structure or part thereof to the requesting client device or to the requesting server. Any database or data structure may be arranged as a relational database system that may be Structured Query Language (SQL) based.

Any server device herein may comprise a processor and the non-transitory computer readable medium, which may contain computer instructions to be executed or interpreted by the processor. The computer instructions may be using a programming language such as an Object-Oriented Programming (OOP) language that supports scripting. Alternatively or in addition, the programming language may be based on, may be compatible with, or may be according to, C, C++, Objective-C, Perl, REXX, VBScript, JavaScript, or Java. The server device may be a web server, and may further be configured for storing, operating, or using, a server operating system that may consist of, may comprise, or may be based on, Microsoft Windows Server®, Linux, or UNIX.

Each of the multiple files may comprise a streaming media data, and the obtaining of the entire, or part of a file out of the multiple files may include streaming the file or part thereof. Any streaming herein may be based on, may use, may be compatible with, or may be according to, Hypertext Transfer Protocol (HTTP), Real-time Transport Protocol (RTP), Real Time Streaming Protocol (RTSP), Real-Time Transport Control Protocol (RTCP), User Datagram Protocol (UDP), or Transmission Control Protocol (TCP). The streaming media data includes digital multimedia, digital audio, or digital video data, in a format that may be based on, may be compatible with, or may be according to, TIFF (Tagged Image File Format), RAW, AVI, DV, DV-PAL, HDV, MOV, WMV, MPEG-2, MPEG-4, DCF (Design Rule for Camera Format), ITU-T H.261, ITU-T H.263, ITU-T H.264, ITU-T CCIR 601, ASF, Exif (Exchangeable Image File Format), or DPOF (Digital Print Order Format) standard. The digital video data may be in a High-Definition (HD) or Standard-Definition (SD) format and may be based on, may be compatible with, or may be according to, ISO/IEC 14496 standard, MPEG-4 standard, or ITU-T H.264 standard. The digital video data may include, or may be part of a movie. At least one or all of the identifiers may be an IP address (such as an IPv4 or IPv6 form), or a URL. The obtaining of the part of the copy of a file may be based on, may be compatible with, or may be according to, byte or range serving that may be based on, or may use, the HTTP/1.1 range request scheme that may be based on, may be compatible with, or may be according to, Internet Engineering Task Force (IETF) Request for Comments (RFC) 2616 or RFC 7233.

Any delivery performance data herein may include a Round Trip Time (RTT) that may be obtained for each record by measuring a time interval starting upon sending a request for the respective file or part thereof to the respective server, and ending upon starting the streaming of the respective file or part thereof from the respective server. Alternatively or in addition, the delivery performance may include Bandwidth (BW) that may be obtained for each record by measuring the BW of the respective server by dividing a size of the respective part of the file received during the respective obtaining by the measured obtaining time interval during which the size of the respective part of the file was received.

Any record herein may further comprise a time associated with the obtaining of the entire of, or part of, the copy of the file by the respective client device. The time may be based on, or may consist of, the time of the start of the obtaining of the file or part thereof by the respective client device, the time of the end of the obtaining of the file or part thereof by the respective client device, the time of start of playing of the file or part thereof by the respective client device, the time of end of playing the file or part thereof by the respective client device, or the time of creating the respective record in the data structure. The time may be based on, or may use, the respective year, the respective month, the respective day of the month, the respective hour in the day, or the respective minutes after the hour, and the time format may be according to, may be compatible with, or may be based on, the ISO 8601 or the IETF RFC 3339 standard. The time may be associated with the time zone of the respective client device location, the respective server location, or the time zone associated with the location of the non-transitory computer readable medium. Alternatively or in addition, the time may use the Coordinated Universal Time (UTC). Each record may further comprise a geographical location of the respective client device or of the respective server, and the geographical location may consist of, or may comprise, one out of a continent, a country, a region, a city, a street, a ZIP code, or a timezone. Alternatively or in addition, the geographical location may be based on geolocation, such as by using W3C Geolocation API. Alternatively or in addition, the geolocation may be based on the identifier (such as the IP address) of the respective client device or of the respective server.

A method may be for creating the data structure, and each of the records may be created by the respective client device steps of sending, to the respective server, a request for the entire or part of the respective file copy; receiving, from the respective server, the entire or part of the respective file; measuring, the file delivery performance data associated with the receiving; and forming the record. The method may further comprise providing the server device that may comprise the non-transitory computer readable medium, and sending, by the respective client device the formed respective record to the server device. The method may further comprise adding the respective record to the data structure in the server device, and playing, by a media player, the received entire or part of the respective file. The respective file copy may comprise a streaming media data, and the receiving may comprise streaming.

An additional non-transitory computer readable medium may contain computer instructions using a programming language that, when executed or interpreted by a processor, may cause the processor in the respective client device to perform at least part of the steps. The programming language may be an Object-Oriented Programming (OOP) language that supports scripting, and may be based on, may be compatible with, or may be according to, C, C++, Objective-C, Perl, REXX, VBScript, JavaScript, or Java. Alternatively or in addition, the instructions may include, or may be based on, client-side scripting that may use a dynamic programming language that supports dynamic typing, first-class functions, and functional programming. The method may further comprise storing, operating, or using, a client operating system that may be a mobile operating system.

A method may use the non-transitory computer readable medium and may comprise providing a performance server including the non-transitory computer readable medium; receiving a request at the performance server; and analyzing the records in the data structure in response to the request for producing an analysis result. The request may be received from a requesting client device (that may be included in the group of client devices) over the Internet, and the method may further comprise sending the analysis result by the performance server to the requesting client device over the Internet. Alternatively or in addition, the request may be received from a requesting server device (that may be included in the plurality of servers) over the Internet, and the method may further comprise sending the analysis result by the performance server to the requesting server device over the Internet. The analyzing may comprise selecting records from the data structure according to a criterion, and the criterion may be based on, may be compatible with, may be according to, or may be included in, the received request.

Any record herein may further comprise a time, the method may further be used with a time threshold, and the analyzing may comprise selecting only records associated with a time that may be later than the time threshold. The time threshold may be at least 1, 2, 3, 5, 10, 12, 15, 20, 25, 30, 50, or 100 periods before the request receiving time, and the periods may be seconds, minutes, hours, or days. Alternatively or in addition, each record may further comprise a geographical location, the request may comprise a request location, the method may further be used with a geographical or distance threshold, and the analyzing may comprise selecting only records associated with a record location that may be in the same geography or closer than the distance threshold from the request location. The method may be used with a geographical threshold, and the analyzing may comprise selecting only records associated with the same continent, a country, a region, a city, a street, a ZIP code, or a timezone, as the request location. Alternatively or in addition, the method may be used with a distance threshold, and the analyzing may comprise selecting only records associated with a record location having a distance to the request location that may be less than 100, 120, 150, 200, 250, 300, 500, 1,000, 1,200, 1,300, 2,000, 2,500, 3,000, or 5,000 Kilometer. The record geographical location may be based on a geolocation using the identifier of the respective client device, or using the identifier of the respective server. The record geographical location may be based on geolocation. Alternatively or in addition, the request may comprise IP address of a requesting device, and the request geographical location may be based on a geolocation using the IP address of the requesting device. The method may further comprise estimating the geographical location of the record or the request location using W3C Geolocation API.

Any analyzing herein may comprise selecting records from the data structure according to a criterion, and the analysis result may comprise part or all of the selected records or may be based on part or all of the selected records. The criterion may be based on, may be according to, or may be included in, the received request. The received request may comprise a first client device identifier, and the analyzing may comprise selecting records from the data structure that comprise the first client device identifier. Alternatively or in addition, the received request may comprise a first server identifier, and the analyzing may comprise selecting records from the data structure that comprise the first server identifier. Alternatively or in addition, the received request may comprise a requested file out of the multiple files, and the analyzing may comprise selecting records from the data structure that may comprise identifiers of file copies of the requested file.

The method may be used with a first server, and the analyzing may further comprise identifying all the selected records that comprise an identifier of the first server, and estimating a first server delivery performance based on the measured file delivery performance in the identified records, and the analysis result may comprise the estimated first server delivery performance. The file delivery performance may comprise an RTT, and the analyzing may further comprise estimating a first server RTT based on the measured RTT in the identified records, and the analysis result may comprise the estimated first server RTT. The estimating of the first server RTT may comprise calculating a simple average, a weighted arithmetic average, weighted geometric average, or weighted harmonic average, of the measured RTT in the identified records, and the estimated first server RTT may be based on, or equal to, the calculated simple or weighted average. The weighted average may use weighting factors that may be based on the respective records time or on a geographical location associated with the respective client device or with the request. Alternatively or in addition, the estimating of the first server RTT may comprise calculating a standard deviation of the measured RTT in the identified records, and the estimated first server RTT may be based on, or may be equal to, the calculated standard deviation.

Alternatively or in addition, the file delivery performance may comprise a BW and the analyzing may further comprise estimating a first server BW based on the measured RTT in the identified records, and the analysis result may comprise the estimated first server BW. The estimating of the first server BW may comprise calculating a simple average, a weighted arithmetic average, weighted geometric average, or weighted harmonic average, of the measured BW in the identified records, and the estimated first server BW may be based on, or may be equal to, the calculated simple or weighted average. The weighted average may use weighting factors that may be based on the respective records time or on a geographical location associated with the respective client device or with the request. Alternatively or in addition, the estimating of the first server BW may comprise calculating a standard deviation of the measured BW in the identified records, and the estimated first server BW may be based on, or may be equal to, the calculated standard deviation.

A method may be used by a server for providing over the Internet, a primary service to a first client device and a content delivery service to a second client device. The method may comprise providing the primary service to the first client device; determining an availability of a resource for content delivery service; and providing, in response to determining the availability of the resource, the content delivery service to the second client device, concurrently with the providing of the primary service. The server may be any server herein and may further be primarily installed, operated, used, designed, or configured for optimally providing the primary service to client devices using server/client scheme, and may be an VOD service provider server, an DNS server, an DHCP server, a web server, an FTP server, a mail server, or a database server, and the primary service may be respectively a VOD provider service, an DNS service, an DHCP service, a web service, an FTP service, an electronic mail service, or a database service. The method may be used with a content identified by a content identifier, and the providing of the content delivery service to the second client device may comprise streaming the content to the second client device over the Internet using the steps by the server of receiving a request for the content using the content identifier; and streaming, to the second client device in response to the request, the content; and the content may be a part of, or an entire of, a single file that may comprise a streaming media data.

The method may be used with an origin server operated, managed, or controlled by a VOD service provider and storing the content, and the method may further comprise receiving the content from the origin server, and storing the received content in a memory. The content delivery service and the primary service may be concurrently provided using multitasking, multiprogramming, or multiprocessing. The method may further comprise sending, in response to determining the availability of the resource, a notification to a device, such as another second server or a third client device, and the notification may comprise an identification of the server in the Internet, identification of a content stored on the server for the content delivery service, or a geographic location of the server.

Determining the availability of the resource may be repeatedly executed continuously or periodically, and the method may further comprise sending a notification, in response to determining the availability or a non-availability of the resource, to a device, such as a second server or the second client device, over the Internet. The determining of the availability of the resource for content delivery service may comprise averaging the resource availability or utilization over a time period. The method may be used with a utilization threshold, and the availability of the resource may be determined by measuring or detecting a utilization below the threshold, and the method may further comprise measuring or detecting the utilization of the resource that may be below the utilization threshold.

A method may be used by a content delivery server for providing over the Internet, a content delivery service to first and second client devices, for use with first and second prices per amount of content delivered, where the second price may be lower than the first price. The method may comprise providing the content delivery service to the first client device; measuring or estimating the amount of content delivered to the first client device; calculating a first client charge by multiplying the measured or estimated amount of delivered content to the first client device by the first price; determining an availability of a resource for content delivery service; and in response to determining the availability of the resource, the method may further comprise providing, the content delivery service to the second client device; measuring or estimating the amount of content delivered to the second client device; and calculating a second client charge by multiplying the measured or estimated amount of delivered content to the second client device by the second price. The second price may be based on an amount of the resource that may be available for content delivery service. The determining the availability of the resource may be repeatedly executed continuously or periodically, and the determining of the availability of the resource for content delivery service may comprise averaging the resource availability or utilization over a time period. The method may be used with a utilization threshold, the availability of the resource may be determined by measuring or detecting a utilization below the threshold, and the method may further comprise measuring or detecting the utilization of the resource that may be below the utilization threshold.

Any resource herein may be an available CPU time or CPU utilization of one or more processors in the server, and the method may be used with a CPU utilization threshold that may be defined at or below 20%, 25%, 30%, 35%, 40%, 45%, 50%, 55%, 60%, 65%, or 70%, and the availability of the resource may be determined by measuring or detecting a CPU utilization below the CPU utilization threshold. Alternatively or in addition, any resource herein may be an available volatile or non-volatile memory space on the server, and the method may be used with a memory space threshold, and the availability of the resource may be determined by measuring or detecting an available memory space that may be above the memory space threshold, that may be at or above 100 MB, 200 MB, 500 MB, 1 GB, 2 GB, 5 GB, 10 GB, 20 GB, 50 GB, 100 GB, 200 GB, 500 GB, 1 TB, 2 TB, 5 TB, 10 TB, 20 TB, 50 TB, 100 TB, 200 TB, or 500 TB. Alternatively or in addition, the method may be used with a memory utilization threshold, and the availability of the resource may be determined by measuring or detecting a ratio of available memory space relating to a total available memory, that may be below the memory utilization threshold, that may be at or below 20%, 25%, 30%, 35%, 40%, 45%, 50%, 55%, 60%, or 70%.

Alternatively or in addition, any resource herein may be an available bandwidth for Internet connection in the server, and the method may be used with a minimum bandwidth threshold, and the availability of the resource may be determined by measuring or detecting an available bandwidth threshold that may be above the minimum bandwidth threshold that may be at or above 10 Mb/s, 20 Mb/s, 50 Mb/s, 100 Mb/s, 200 Mb/s, 500 Mb/s, 1 Gb/s, 2 Gb/s, 5 Gb/s, 10 Gb/s, 20 Gb/s, 50 Gb/s, 100 Gb/s, 200 Gb/s, 500 Gb/s, 1 Tb/s, 2 Tb/s, 5 Tb/s, or 10 Tb/s. Alternatively or in addition, the method may be used with a bandwidth utilization threshold, and the availability of the resource may be determined by measuring or detecting a ratio of the available connection bandwidth relating to a total connection bandwidth, that may be below the bandwidth utilization threshold, that may be equal to or lower than 20%, 25%, 30%, 35%, 40%, 45%, 50%, 55%, 60%, or 70%.

A method for delivering a content identified by a content identifier to a client device identified by a client identifier over the Internet is disclosed. The method may be used with a group of sources capable of delivering the content to the client device over the Internet, and each source may be identified by a respective source identifier. The method may be executed by a server and may comprise receiving, from the client device, a first request for the content, using the content identifier; sending, to a part of, or all of, the sources in the group over the Internet, the content identifier and the client identifier; receiving, from each of the part or all of the sources in the group, a price associated with delivering of the content to the client device; selecting a first source from the group based on the received prices; and sending, to the client device in response to the first request, the first source identifier. The method may further comprise delivering the content over the Internet from the first source to the client device, and the delivering of the content over the Internet from the first source to the client device may comprise sending, by the client device, a second request for the content to the first source using the content identifier and the first source identifier; streaming, to the client device in response to the second request, the content from the first source; and playing, by a media player at the client device, the content. The streaming may be based on, may use, may be compatible with, or may be according to, Hypertext Transfer Protocol (HTTP), Real-time Transport Protocol (RTP), Real Time Streaming Protocol (RTSP), Real-Time Transport Control Protocol (RTCP), User Datagram Protocol (UDP), or Transmission Control Protocol (TCP). Each of the client identifier and the source identifiers may be an IP address in IPv4 or IPv6 form or a URL. Any two or more steps may be concurrently executed using multitasking, multiprogramming, or multiprocessing. A non-transitory computer readable medium may contain computer instructions that, when executed or interpreted by a processor, may cause the processor to perform at least part of the steps. A server device may comprise the non-transitory computer readable medium, and may further be store, operate, or use a server operating system.

The method may further comprise selecting a second source from the group based on the prices received; and sending, to the client device in response to the first request, the second source identifier, and the content may consist of a single file that may comprise a streaming media data. The content may comprise first and second distinct content parts, and the method may further comprise streaming the first content part over the Internet from the first source to the client device, and streaming the second content part over the Internet from the second source to the client device. The streaming of each of the first and the second content parts may be based on, may be compatible with, or may be according to, byte or range serving, that may be based on, or may be using, the HTTP/1.1 range request scheme that may be based on, may be compatible with, or may be according to, Internet Engineering Task Force (IETF) Request for Comments (RFC) 2616 or RFC 7233. The content may consist of a single file that may comprise a streaming media data that may include digital multimedia, digital audio, or digital video data. The digital video data may include, or may be part of, a movie, and the method may be used in a Video-on-Demand (VOD) scheme and executed by a VOD service provider that may be operating, managing, or controlling an origin server storing the content.

The source associated with the lowest price may be selected as the first source. Alternatively or in addition, the method may further comprise sending, to a part of, or all of, the sources in the group over the Internet, a client device location, and the price may be based on the client device location. Each of the sources in the group may be associated with a respective distinct value, and the selecting of the first source may be based on the first source associated value. The method may be preceded by obtaining the values associated with the sources in the group by receiving the values from a server over the Internet. The values may be associated with a content delivery performance of the respective source. The content delivery performance may be based on, or may consist of, an estimated Round Trip Time (RTT) of the respective source, defined as a time interval starting upon sending a request for the content to the source, and ending upon starting a streaming of the content from the source. Alternatively or in addition, the content delivery performance may be based on, or may consist of, an estimated Bandwidth (BW) of the respective source, defined by dividing a size of the respective part of the content received during a respective streaming step from the respective source by a measured streaming time interval during which the size of the respective part of the content was received.

A method for obtaining by a client device, a resource that may be identified by a resource identifier and stored in a first server may be used with a second server storing the resource identifier, and identified by a second server identifier. The client device may include a first memory and a second memory and may be operating a web browser that executes a first set of instructions and a second set of instructions that use the first and the second memories. The first set of computer instructions may direct the web browser of the client device to execute the steps of sending a first request to the second server using the second server identifier; receiving the resource identifier from the second server in response to the first request; sending a second request for the resource to the first server using the resource identifier; receiving the resource from the first server in response to the second request, storing the resource in the first and second memories; and embedding the resource identifier in the second set of instructions. The second set of computer instructions may direct the web browser of the client device to execute the steps of checking the first memory to ascertain whether the resource is stored in the first memory using the embedded resource identifier; responsive to the resource being stored in the first memory, fetching the resource from the first memory using the embedded resource identifier; and rendering the resource to a user. The receiving of the resource identifier or the resource may be using, or may be based on, XMLHttpRequest (XHR) or Asynchronous JavaScript and XML (AJAX).

Any memory herein may be a cache memory. The first memory may be a cache memory, that may be a volatile memory, and the second memory may be a non-volatile memory. The first and second memories may be distinct memory locations in a memory device that may be a Hard Disk Drive (HDD). The web browser may comprise a media player, and the resource may consist of, or may include, streaming media data that includes digital multimedia, digital audio, or digital video data. The rendering of the resource to the user may include playing the streaming media data by the media player. Any client device herein may be storing, operating, or using, a client operating system. The resource may consist of, or may include, streaming media data that may include digital multimedia, digital audio, or digital video data, and the receiving of the resource may include streaming the resource to the client device, and the streaming may be based on, may be using, may be compatible with, or may be according to, Hypertext Transfer Protocol (HTTP), Real-time Transport Protocol (RTP), Real Time Streaming Protocol (RTSP), Real-Time Transport Control Protocol (RTCP), User Datagram Protocol (UDP), or Transmission Control Protocol (TCP).

The method may further be used with a copy of the resource that may be identified by a resource copy identifier, and stored in a third server distinct from the first server, and the client device may further include a third memory. The method by the first set of computer instructions may further comprise the steps of sending a third request for the resource copy to the third server using the resource copy identifier; receiving the resource copy from the third server in response to the third request; and storing the resource in the first and third memories. The receiving of the resource and the receiving of the resource copy may be concurrently executed using multitasking, multiprogramming, or multiprocessing. The embedding step may include embedding the resource identifier or the resource copy identifier in the second set of instructions, and the step of checking may include checking the first memory to ascertain whether the resource or the resource copy may be stored in the first memory respectively using the embedded resource identifier or the resource copy identifier. The method may further comprise the step of selecting whether to render to the user the resource or the resource copy, and the selecting may be according to, or may be based on, the first to be fully received out of the resource and the resource copy by the client device.

A method for obtaining, by a client device, a resource having a first and second resource copies may be used with a first resource copy identified by a first identifier, and stored in a first server, and a second resource copy identified by a second identifier and stored in a second server distinct from the first server. The client device may include a first, a second, and a third memories and may be operating a web browser that executes a first set of instruction and a second set of instructions that may use the memories. The client device may be directed by the first set of computer instructions to perform the steps of sending a first request for the first resource to the first server using the first identifier; sending a second request for the second resource to the second server using the second identifier; concurrently receiving the first resource from the first server in response to the first request and receiving the second resource from the second server in response to the second request; storing the first resource in the first and third memories; storing the second resource in the second and third memories; checking to ascertain which may be the first to be fully loaded from the first and second resources; responsive to the first resource being first loaded, stopping the receiving of the second response and embedding the first identifier in the second set of instructions; and responsive to the second resource being first loaded, stopping the receiving of the first request and embedding the second identifier in the second set of instructions. The client device may further be directed by the second set of computer instructions to perform the step of fetching the first loaded resource from the third memory using the first loaded identifier, and rendering the first loaded resource to a user. The method may be used with a third server storing the first and second identifiers and identified using a third server identifier, and the method may be further preceded by the steps of sending a third request to the third server using the third server identifier; and receiving the first and second identifiers from the third server in response to the third request. The receiving steps may be concurrently executed using multitasking, multiprogramming, or multiprocessing. The receiving of the resource identifiers or each of the first or second resources may be using, or may be based on, XMLHttpRequest (XHR) or Asynchronous JavaScript and XML (AJAX).

Any rendering herein of one of the resources to a user may include executing tags according to a markup language, and the embedding of one of the resource identifiers may include forming and embedding a tag that includes the respective resource identifier, and the executing of a tag may include the fetching of the respective resource from the third memory. The markup language may be based on, may be compatible with, or may be according to, Standard Generalized Markup Language (SGML), Extensible Hypertext Markup Language (XHTML), Scalable Vector Graphics (SVG), Cascading Style Sheets (CSS), or Extensible Markup Language (XML). The markup language may be based on, may be compatible with, or according to, Hypertext Markup Language (HTML), and the tag may be in the form of <xxx SRC=S1>, so that xxx represents the resource type, and S1 represents one of the resource identifiers. The rendering of one of the resources to a user may include parsing the resource into the Document Object Model (DOM). The third memory may be a volatile or non-volatile cache memory, and each of the first and second memory may be a non-volatile memory. The first and third memories may be distinct memory locations in a memory device that may be a Hard Disk Drive (HDD).

Any computer, any client device, and any server herein may comprise a non-transitory computer-readable medium. Any non-transitory computer-readable medium herein may contain instructions that, when executed or interpreted by a processor, cause the processor to perform the steps of the first set of computer instructions. The first set of computer instructions may be formed by compilation or interpretation of a programming language that may be an Object-Oriented Programming (OOP) language that supports scripting, or may be based on, may be compatible with, or according to, C, C++, Objective-C, Perl, REXX, VBScript, JavaScript, or Java. The embedding of the resource identifier in the second set of instructions may comprise forming a script that includes the resource identifier. The instructions may include, or may be based on, client-side scripting, and the scripting may be using a dynamic programming language that supports dynamic typing, first-class functions, and functional programming. The dynamic programming language may be based on, may be compatible with, or may be according to, ECMA-262 5.1 Edition or ISO/IEC 16262: 2011 standards, JavaScript, ActionScript, or Adobe Flash player.

The non-transitory computer-readable medium may contain instructions that, when executed or interpreted by a processor, cause the processor to perform the steps of the second set of computer instructions. The second set of computer instructions may be based on, may be according to, may be compatible with, or may be using, a markup language, that may be based on, may be compatible with, or may be according to, Hypertext Markup Language (HTML), Standard Generalized Markup Language (SGML), Extensible Hypertext Markup Language (XHTML), Scalable Vector Graphics (SVG), Cascading Style Sheets (CSS), or Extensible Markup Language (XML). The rendering of the resource to a user may include executing tags according to a markup language, and the embedding of the resource identifier may include forming and embedding a tag that includes the resource identifier. The executing of the tag may include the fetching of the resource from the first memory. The markup language may be based on, may be compatible with, or may be according to, Hypertext Markup Language (HTML), and the tag may be in the form of <xxx SRC=S1>, and the xxx may represent the resource type, and S1 may represent the resource identifier. The rendering of the resource to a user may include parsing the resource into the Document Object Model (DOM) form.

Any resource identifier herein may be a Uniform Resource Identifier (URI), Uniform Resource Locator (URL), Uniform Resource Number (URN), or an IP address, and the resource may be whole of, or part of, an object code, an object file, an XML element, an HTML element, an HTML object, a file, or multiple files. The resource may consist of a single file that comprises a streaming media data. The streaming media data may include digital multimedia, digital audio, or digital video data that may be in a format that may be based on, may be compatible with, or may be according to, TIFF (Tagged Image File Format), RAW, AVI, DV, DV-PAL, HDV, MOV, WMV, MPEG-2, MPEG-4, DCF (Design Rule for Camera Format), ITU-T H.261, ITU-T H.263, ITU-T H.264, ITU-T CCIR 601, ASF, Exif (Exchangeable Image File Format), or DPOF (Digital Print Order Format) standard. The digital video data may be in a High-Definition (HD) or Standard-Definition (SD) format, and may be based on, may be compatible with, or may be according to, ISO/IEC 14496 standard, MPEG-4 standard, or ITU-T H.264 standard. The digital video data may include, or may be part of, a movie, and the method may be used with a Video-on-Demand (VOD) scheme, and the first server may be part of a Content Delivery Network (CDN).

Any resource herein may consist of, or may include, digital video data that may include, or may be part of, a movie. The method may be used in a Video-on-Demand (VOD) scheme, and the second server may be a VOD service provider that may be operating, managing, or controlling a network of servers that include the resource, and the first server may be a replica server that may be part of a Content Distribution Network (CDN) that may be operated, controlled, or managed by a CDN operator. The resource identifier may include, or may consist of, an identifier of a resolved server, and the resolved server identifier may be resolved using a Request-Routing scheme. The Request-Routing scheme may be based on, may be compatible with, or may be according to, DNS Request-Routing, Transport-Layer Request-Routing, Application-Layer Request-Routing technique, a HTTP-Redirect, CDN-Redirect, DNS-Redirect, Dynamic Metafile Generation, Global Server Load Balancing, or anycasting algorithm.

A method for obtaining and using, by a web browser, a resource that may be identified by a resource identifier and stored in a first server, the web browser may be adapted for executing instructions in a markup language form and for storing in a cache memory received data. The method may comprise the steps of sending a request for the resource to the first server using the resource identifier; receiving the resource from the first server in response to the request, so that a copy of the resource may be stored by the web browser in the cache memory; and embedding the resource identifier in the markup language instructions; whereby the web browser fetches the resource from the cache memory using the resource identifier upon rendering the resource to a user. The step of the web browser checking the cache memory may use the resource identifier to ascertain the resource availability in the cache memory. The method may further comprise the step of the web browser fetching the resource from the cache memory using the resource identifier, or the step of the web browser rendering the resource to a user. The method may be used with a second server storing the resource identifier and identified by a second server identifier, the method may be preceded by the steps of sending a first request to the second server using the second server identifier; and receiving the resource identifier from the second server in response to the first request.

The method may further comprise the step of storing the resource in a first memory other than the cache memory, the cache memory may be a volatile memory, and the first memory may be a non-volatile memory. The first and cache memories may be distinct memory locations in a memory device that may be a Hard Disk Drive (HDD).

The method may further be used with a copy of the resource that may be identified by a resource copy identifier, and stored in a second server distinct from the first server, the method may further comprise the steps of sending a second request for the resource copy to the second server using the resource copy identifier; and receiving the resource copy from the second server in response to the second request, so that a copy of the resource copy may be stored by the web browser in the cache memory. The receiving of the resource and the receiving of the resource copy may be concurrently executed, using multitasking, multiprogramming, or multiprocessing. The embedding step includes embedding the resource identifier or the resource copy identifier. The method may further include the step of checking the cache memory to ascertain whether the resource or the resource copy may be stored in the cache memory respectively using the embedded resource identifier or the resource copy identifier. The method may further comprise the step of selecting whether to render to the user the resource or the resource copy, and the selecting may be according to, or may be based on, the first to be fully received out of the resource and the resource copy by the client device. The step of checking may include checking the first memory to ascertain whether the selected resource or resource copy may be stored in the first memory. The method may further include responsive to the selected resource or resource copy being stored in the first memory, the fetching step may include fetching the selected resource or resource copy from the first memory, using the respective embedded resource identifier or resource copy identifier.

Any server herein may be a replica server, and may be part of a CDN. A server may be for streaming multiple content items to a client device over the Internet, each content item may comprise a streaming media data and may be identified by a content item identifier and composed of first and second distinct content parts. The first part may comprise the beginning of the respective content playing data, and the server may comprise a memory storing only the first parts of the multiple content items, and may be operative to receive, from the client device, a first request for a first content of one of the multiple content items using the respective content item identifier; and to stream, to the client device in response to the first request, the first part of the first content.

The size of each of the first part of each of the multiple content items may be less than 0.01%, 0.02%, 0.03%, 0.05%, 0.07%, 0.1%, 0.2%, 0.3%, 0.5%, 0.7%, 1%, 2%, 5%, 7%, or 10% of the respective content size, alternatively or in addition, the size of each of the first part of each of the multiple content items may be more than 0.01%, 0.02%, 0.03%, 0.05%, 0.07%, 0.1%, 0.2%, 0.3%, 0.5%, 0.7%, 1%, 2%, 5%, 7%, or 10% of the respective content size. The playing time of each of the first part of each of the multiple content items may be less than 0.1, 0.2, 0.5, 0.7, 1, 2, 5, 7, 10, 15, 20, 25, 30, 35, or 50 seconds, alternatively or in addition, the playing time of each of the first part of each of the multiple content items may be more than 0.1, 0.2, 0.5, 0.7, 1, 2, 5, 7, 10, 15, 20, 25, 30, 35, or 50 seconds. The size of each of the first part of each of the multiple content items may be less than 100 KB, 200 KB, 300 KB, 500 KB, 1 MB, 1.5 MB, 2 MB, 3 MB, 4 MB, or 5 MB, alternatively or in addition, the size of each of the first part of each of the multiple content items may be more than 100 KB, 200 KB, 300 KB, 500 KB, 1 MB, 1.5 MB, 2 MB, 3 MB, 4 MB, or 5 MB.

Any server herein may be used with additional multiple content items, each content of the additional multiple content items comprises a streaming media data and may be identified by a content item identifier and composed of first and second distinct content parts, and the memory may be composed of first and second memory parts, the first memory part stores the first part of the multiple content items and the second memory part stores the first and second parts of the additional multiple content items. The server may further receive, from the client device, a second request for a second content of one of the additional multiple content items using the respective content item identifier; and may stream, to the client device in response to the second request, the first and second parts of the second content.

The size of the first memory part may be at least 1%, 5%, 10%, 15%, 20%, 25%, 30%, 35%, 40%, 45%, 50%, 55%, 65%, 70%, 75%, 80%, 85%, 90%, or 95% of the total memory size. Alternatively or in addition, the size of the first memory part may be less than 1%, 5%, 10%, 15%, 20%, 25%, 30%, 35%, 40%, 45%, 50%, 55%, 65%, 70%, 75%, 80%, 85%, 90%, or 95% of the total memory size. The size of the first memory part may be more than 5%, 10%, 15%, 20%, 25%, 30%, 35%, 40%, 50%, 55%, 60%, 65%, 70%, 75%, 80%, 85%, 90%, 95%, 100%, 150%, 200%, 250%, 300%, 350%, 400%, 450%, 500%, 550%, 600% of the size of the second memory part. Alternatively or in addition, the size of the first memory part may be less than 5%, 10%, 15%, 20%, 25%, 30%, 35%, 40%, 50%, 55%, 60%, 65%, 70%, 75%, 80%, 85%, 90%, 95%, 100%, 150%, 200%, 250%, 300%, 350%, 400%, 450%, 500%, 550%, 600% of the size of the second memory part. The number of distinct content items in the multiple content items may be more than the number of distinct content items in the additional multiple content items, such as more than 2, 5, 10, 20, 50, 100, 200, 500, 800, 1,000, 2,000, 5,000, 8,000, 10,000 the number of distinct content items in the additional multiple content items. Alternatively or in addition, the number of the distinct content items in the multiple content items may be less than 2, 5, 10, 20, 50, 100, 200, 500, 800, 1,000, 2,000, 5,000, 8,000, 10,000 the number of the distinct content items in the additional multiple content items.

Any system herein may comprise multiple servers that may be coupled over the Internet, and the servers may further cooperative to form a Content Delivery Network (CDN), and each server of the multiple servers may serve as a replica server in the CDN. The system may further be operative to stream to the client device the second content item of the one of the multiple content items identified by the content item identifier from a distinct server from the multiple servers.

Any server herein may be a web server. Any streaming herein may be based on, may be using, may be compatible with, or may be according to, Hypertext Transfer Protocol (HTTP), Real-time Transport Protocol (RTP), Real Time Streaming Protocol (RTSP), Real-Time Transport Control Protocol (RTCP), User Datagram Protocol (UDP), or Transmission Control Protocol (TCP). Alternatively or in addition, any streaming herein may be based on, may be using, or may be according to, progressive download. Alternatively or in addition, any streaming herein may be based on, may be using, or may be according to, adaptive bit-rate streaming that may be based on, may be using, may be compatible with, or may be according to, Dynamic Adaptive Streaming over HTTP (DASH), HTTP Live Streaming (HLS), or HTTP Dynamic Streaming (HDS).

Any server herein may comprise a non-transitory computer readable medium that may contain computer instructions that, when executed or interpreted by a processor, may cause the processor to perform at least the receiving from the client device and the streaming to the client device. The computer instructions may be using a programming language, such as an Object-Oriented Programming (OOP) language that supports scripting. Any programming language may be based on, may be compatible with, or may be according to, C, C++, Objective-C, Perl, REXX, VBScript, JavaScript, or Java.

A method for streaming content to client devices over the Internet may be used with multiple content items, each of the content items may comprise a streaming media data, may be identified by a content item identifier, and may be composed of first and second distinct content parts. The first part may comprise the beginning of the respective content item playing data, and may be used with a server device having a memory that may store the first part of each of the multiple content items, and the second part of each of part of the multiple content items. The method by the server device may comprise the steps of receiving, from a first client device, a first request for a first part of a first content item using the content item identifier; checking, by the server device, if the first part of a first content item may be stored in the server device; and in response to the first part of the first content item being stored in the server device, streaming the first part of the first content item to the first client device. The method may further comprise the steps of receiving, from a second client device, a second request for a second content item, or a part thereof, using a second content item identifier; checking, by the server device, if the second content item, or the part thereof, may be stored in the server device; and in response to the second content item, or the part thereof, being stored in the server device, streaming, to the second client device, the second content item, or the part thereof. The method may be used with an origin server storing the second content item, or the part thereof, and the method may further comprise the steps of in response to the second content item, or the part thereof, not being stored in the server device: obtaining, from the origin server, the second content item, or the part thereof; and streaming, to the second client device, the obtained second content item, or the part thereof.

The method may further comprise the steps of receiving, from a second client device, an indicator; in response to the second content item, or the part thereof, not being stored in the server device, and in response to the received indicator: obtaining, from the origin server, the second content item, or the part thereof; storing, in the server device memory, the received second content item, or the part thereof; and streaming, to the second client device, the obtained second content item, or the part thereof. The indicator may be associated with first and second values, and the steps of obtaining and streaming may be performed only upon received indicator having the first value. Alternatively or in addition, in response to the second content item, or the part thereof, not being stored in the server device, and in response to the received indicator, the obtaining step may be preceded by the step of evicting one or more content items, or one or more parts thereof, from the memory. Any evicting herein may be an eviction scheme that may be based on, or may be using, Beladys algorithm, Least Recently Used (LRU), Most Recently Used (MRU), Pseudo-LRU (PLRU), Random Replacement (RR), Least Frequently Used (LFU), First-In-First-Out (FIFO), or any combination thereof. Alternatively or in addition, in response to the second content item, or the part thereof, not being stored in the server device, and in response to the received indicator, the obtaining step may be preceded by the step of evicting one or more second parts of the part of the multiple content items from the memory.

The method may be used with a database stored in the server device, and may further comprise the steps of in response to the second content item, or the part thereof, not being stored in the server device, and in response to the received indicator: storing, in a record in the database, the second content item identifier, an identifier of the second client device, the time of receiving the second request, or any combination thereof. The indicator may be associated with first and second values, and the step of storing in the database may be performed only upon received indicator having the second value. Alternatively or in addition, the method may further comprise the step of fetching, from the database, one or more records associated with the second content item identifier, and the steps of sending, to the second client device, identifiers of client devices or time of receiving requests included in the fetched records.

The method may be used with a time period, and only records associated with time of receiving requests in the time period may be fetched. The time period may be less than 1, 5, 10, 50, 100, 150, 200, 250, 300, 350, 400, 450, or 500 seconds, 1, 5, 10, 50, 100, 150, 200, 250, 300, 350, 400, 450, or 500 minutes, 1, 5, 10, 50, 100, 150, 200, 250, 300, 350, 400, 450, or 500 hours, 1, 5, 10, 50, 100, 150, 200, 250, 300, 350, 400, 450, or 500 days, or 1, 5, 10, 50, or 100 weeks before the time of receiving the second request. The method may be used with a minimum threshold, and may further comprise the step of comparing the number of fetched records to the minimum threshold. Further, the method may comprise the step of in response to the number of fetched records being above the minimum threshold: obtaining, from the origin server, the second content item, or the part thereof; storing, in the server device memory, the received second content item, or the part thereof; and streaming, to the second client device, the obtained second content item, or the part thereof. The method may further comprise the step of in response to the number of fetched records being above the minimum threshold, deleting the fetched records from the database.

Any application herein may be a web browser that may consist of, may comprise, or may be based on, Microsoft Internet Explorer, Google Chrome, Opera™, or Mozilla Firefox®. The web browser may be a mobile web browser, which consists of, comprises, or may be based on, Safari, Opera Mini™, or Android web browser. The identifiers may be an IP address (in IPv4 or IPv6 form), or a URL. Each of the identifiers herein may be an IP address (in IPv4 or IPv6 form) or a URL. Each of the servers may be a web server using HyperText Transfer Protocol (HTTP) that responds to HTTP requests via the Internet, and the first and second requests may be HTTP requests. Each communication with a server may be based on, or using HTTP persistent connection.

Any communication with a network element, such as with the first device, the second device, the first server, or the second server, may be based on, may be compatible with, or be according to, TCP/IP protocol or connection, and may be preceded by the step of establishing a connection. Further, communication between any two network elements, such as between the first device and the second device, may be over the established connection. Any communication between any two network elements may use TCP, and the connection may be established by performing 'Active OPEN' or 'Passive OPEN', may use a VPN, or may use a tunneling protocol. Any content herein may include, consist of, or comprise, a single file, a part or whole of multiple files, that may comprise text, numbers, audio, voice, multimedia, video, images, music, web-site page, or computer program.

Each of the network elements herein, such as the each of the servers, may store, operate, or use, a server operating system, that may be based on, comprise, or use, Microsoft Windows Server®, Linux, or UNIX, such as Microsoft Windows Server® 2003 R2, 2008, 2008 R2, 2012, or 2012 R2 variant, Linux™ or GNU/Linux-based Debian GNU/Linux, Debian GNU/kFreeBSD, Debian GNU/Hurd, Fedora™, Gentoo™, Linspire™, Mandriva, Red Hat® Linux, SuSE, and Ubuntu®, UNIX® variant Solaris™, AIX®, Mac™ OS X, FreeBSD®, OpenBSD, and NetBSD®. Each of the network elements herein, such as the first, second, and third devices, may store, operate, or use, a client operating system, that may consist or, comprise of, or may be based on, Microsoft Windows 7, Microsoft Windows XP, Microsoft Windows 8, Microsoft Windows 8.1, Linux, or Google Chrome OS. The client operating system may be a mobile operating system, such as Android version 2.2 (Froyo), Android version 2.3 (Gingerbread), Android version 4.0 (Ice Cream Sandwich), Android Version 4.2 (Jelly Bean), Android version 4.4 (KitKat), Apple iOS version 3, Apple iOS version 4, Apple iOS version 5, Apple iOS version 6, Apple iOS version 7, Microsoft Windows® Phone version 7, Microsoft Windows® Phone version 8, Microsoft Windows® Phone version 9, or Blackberry® operating system.

The steps described herein may be sequential, and performed in the described order. For example, in a case where a step is performed in response to another step, or upon completion of another step, the steps are executed one after the other. However, in a case where two or more steps are not explicitly described as being sequentially executed, these steps may be executed in any order, or may be simultaneously performed. Two or more steps may be executed by two different network elements, or in the same network element, and may be executed in parallel using multiprocessing or multitasking.

Any streaming herein may be based on, may be using, or may be according to, progressive download or adaptive bit-rate streaming that may be based on, may be using, or may be according to, Dynamic Adaptive Streaming over HTTP (DASH), HTTP Live Streaming (HLS), or HTTP Dynamic Streaming (HDS).

The size of any content part herein may be less than 0.01%, 0.02%, 0.03%, 0.05%, 0.07%, 0.1%, 0.2%, 0.3%, 0.5%, 0.7%, 1%, 2%, 5%, 7%, or 10% of the respective total content size. Alternatively or in addition, the size of any content part herein may be more than 0.01%, 0.02%, 0.03%, 0.05%, 0.07%, 0.1%, 0.2%, 0.3%, 0.5%, 0.7%, 1%, 2%, 5%, 7%, or 10% of the respective total content size. The playing time of the any content part herein may be less than 0.1, 0.2, 0.5, 0.7, 1, 2, 5, 7, 10, 15, 20, 25, 30, 35, or 50 seconds. Alternatively or in addition, the playing time of the any content part herein may be more than 0.1, 0.2, 0.5, 0.7, 1, 2, 5, 7, 10, 15, 20, 25, 30, 35, or 50 seconds. The size of any content part herein may be less than 100 KB, 200 KB, 300 KB, 500 KB, 1 MB, 1.5 MB, 2 MB, 3 MB, 4 MB, or 5 MB. Alternatively or in addition, the size of any content part herein may be more than 100 KB, 200 KB, 300 KB, 500 KB, 1 MB, 1.5 MB, 2 MB, 3 MB, 4 MB, or 5 MB.

A tangible machine-readable medium (such as a storage) may have a set of instructions detailing part (or all) of the methods and steps described herein stored thereon, so that when executed by one or more processors, may cause the one or more processors to perform part of, or all of, the methods and steps described herein. Any of the network elements may be a computing device that comprises a processor and a computer-readable memory (or any other tangible machine-readable medium), and the computer-readable memory may comprise computer-readable instructions such that, when read by the processor, the instructions causes the processor to perform the one or more of the methods or steps described herein.

Any communication or connection herein, such as the connection of peripherals in general, and memories in particular to a processor, and between any two network elements, may use a bus. A communication link (such as Ethernet, or any other LAN, PAN or WAN communication links may also be regarded as buses herein. A bus may be an internal bus, an external bus or both. A bus may be a parallel or a bit-serial bus. A bus may be based on a single or on multiple serial links or lanes. A bus medium may be electrical conductors based such as wires or cables, or may be based on a fiber-optic cable. A bus topology may use point-to-point, multi-drop (electrical parallel) and daisy-chain, and may be based on hubs or switches. A point-to-point bus may be full-duplex, or half-duplex. Further, a bus may use proprietary specifications, or may be based on, similar to, substantially or fully compliant with an industry standard (or any variant thereof), and may be hot-pluggable. A bus may be defined to carry only digital data signals, or may also defined to carry a power signal (commonly DC voltages), either by using separate and dedicated cables and connectors, or may carry the power and digital data together over the same cable. A bus may support master/slave configuration. A bus may carry a separate and dedicated timing signal or may use self-clocking line-code.

The above summary is not an exhaustive list of all aspects of the present invention, rather it is contemplated that the invention includes all systems and methods that can be practiced from all suitable combinations and derivatives of the various aspects summarized above, as well as those disclosed in the detailed description below and particularly pointed out in the claims filed with the application. Such combinations have particular advantages not specifically recited in the above summary.

BRIEF DESCRIPTION OF THE DRAWINGS

The invention is herein described, by way of non-limiting only examples, with reference to the accompanying drawings, wherein like designations denote like elements. Understanding that these drawings only provide information concerning typical embodiments of the invention and are not therefore to be considered limiting in scope.

DETAILED DESCRIPTION

Figure 1:
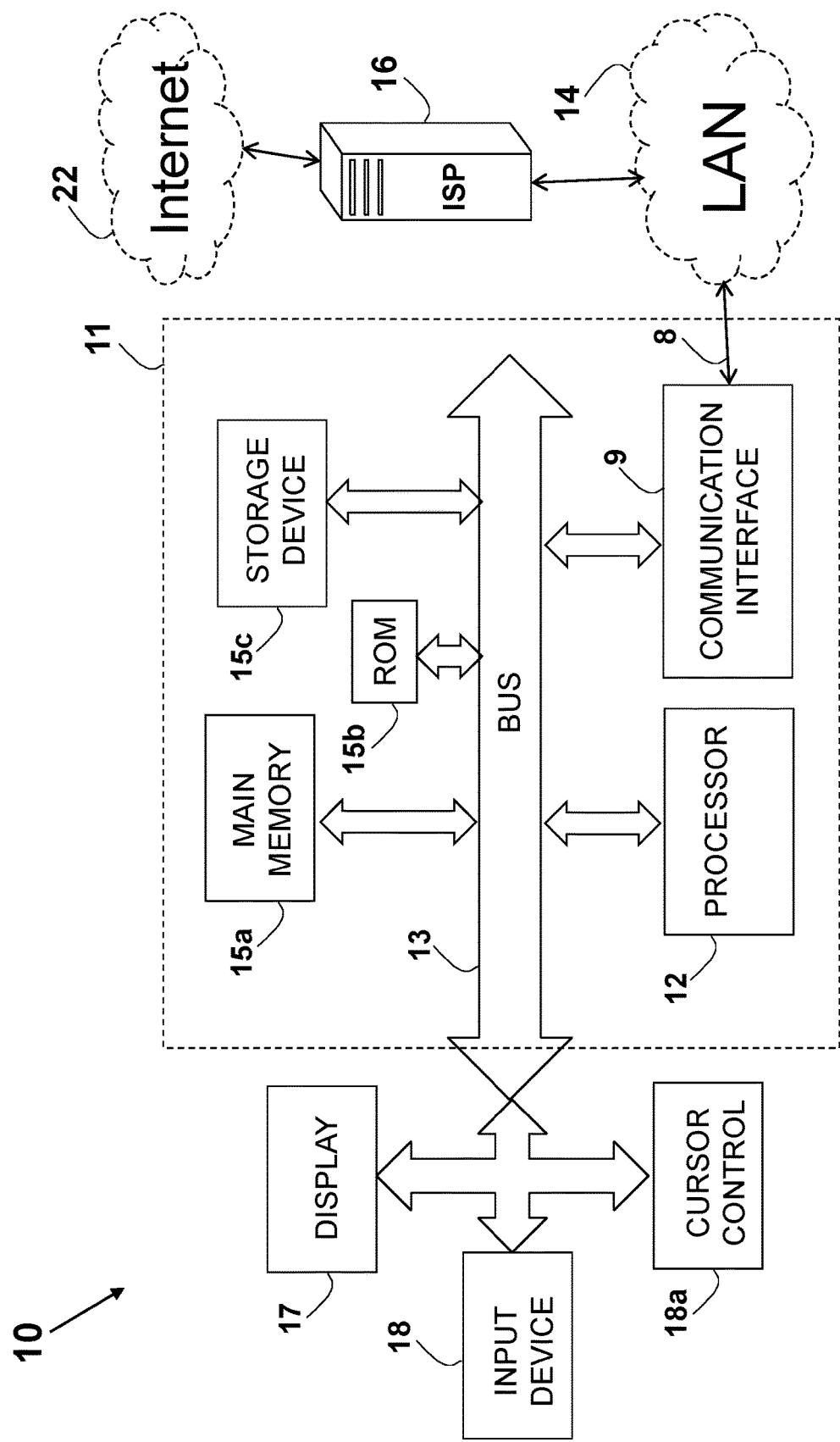
FIG. 1 illustrates schematically a block diagram of a computer connected to the Internet.
Figure 1A:
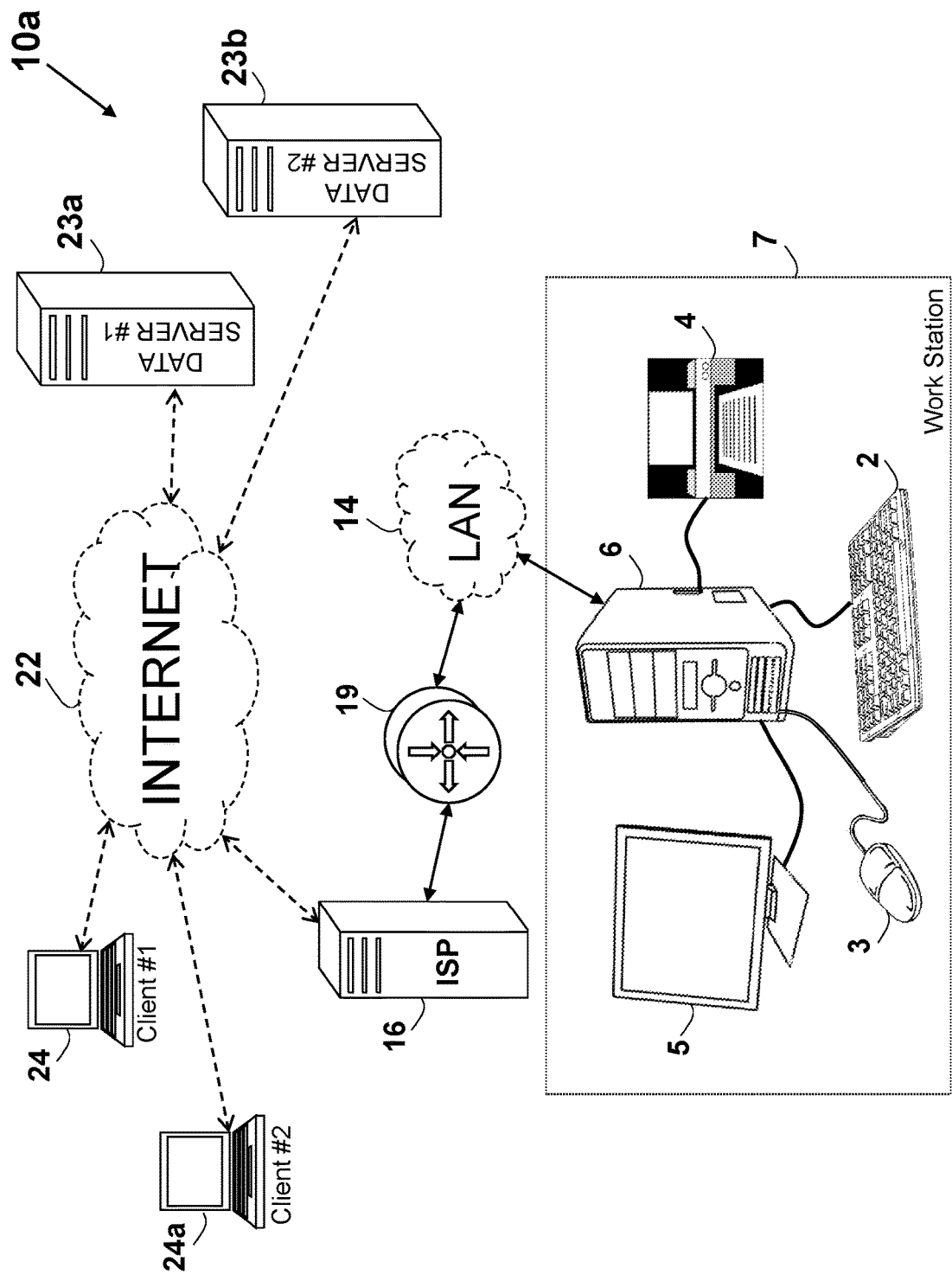
FIG. 1a illustrates schematically servers, clients, and a computer workstation connected via the Internet.
Figure 2:
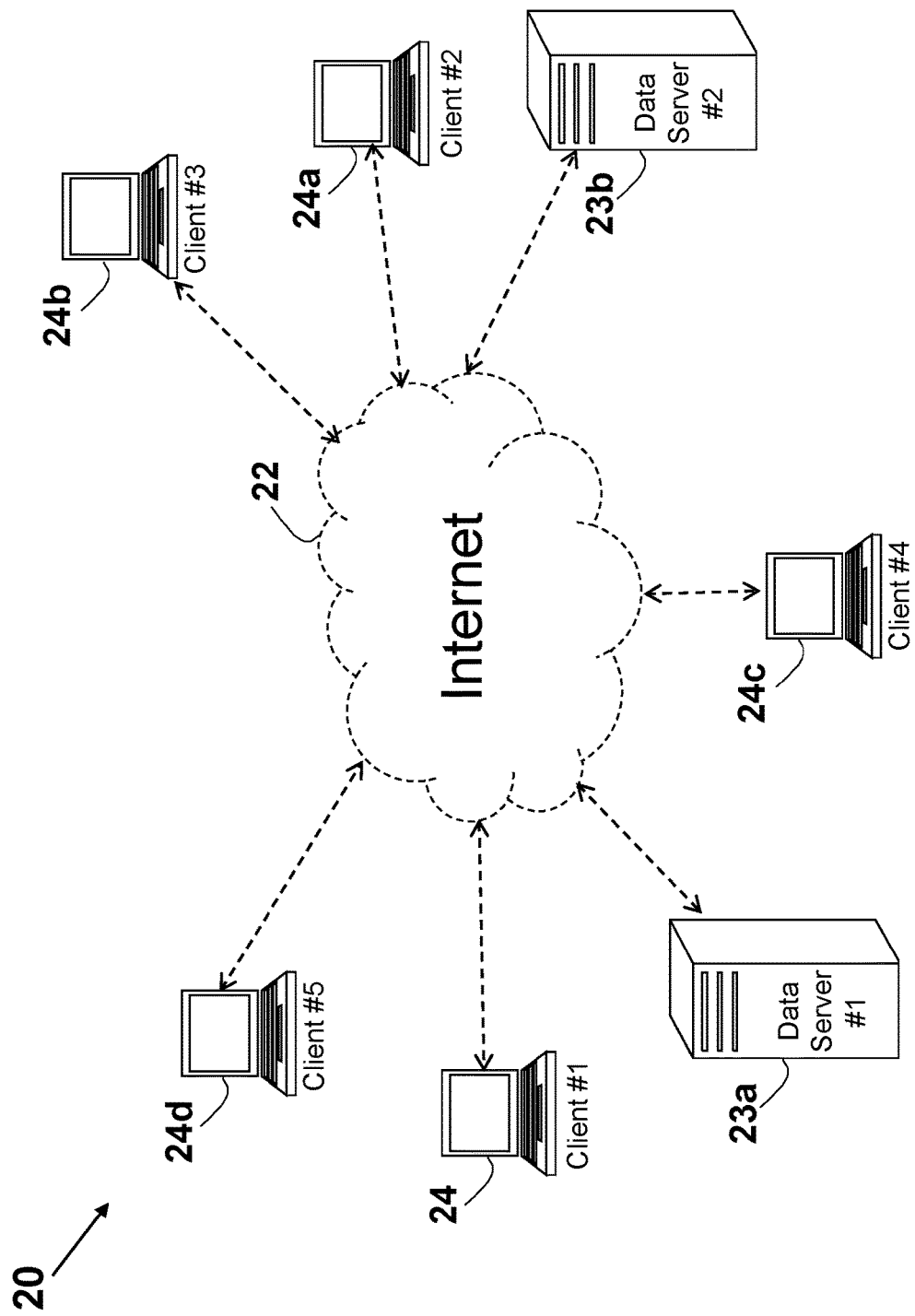
FIG. 2 illustrates schematically servers and clients connected over the Internet.
Figure 2A:
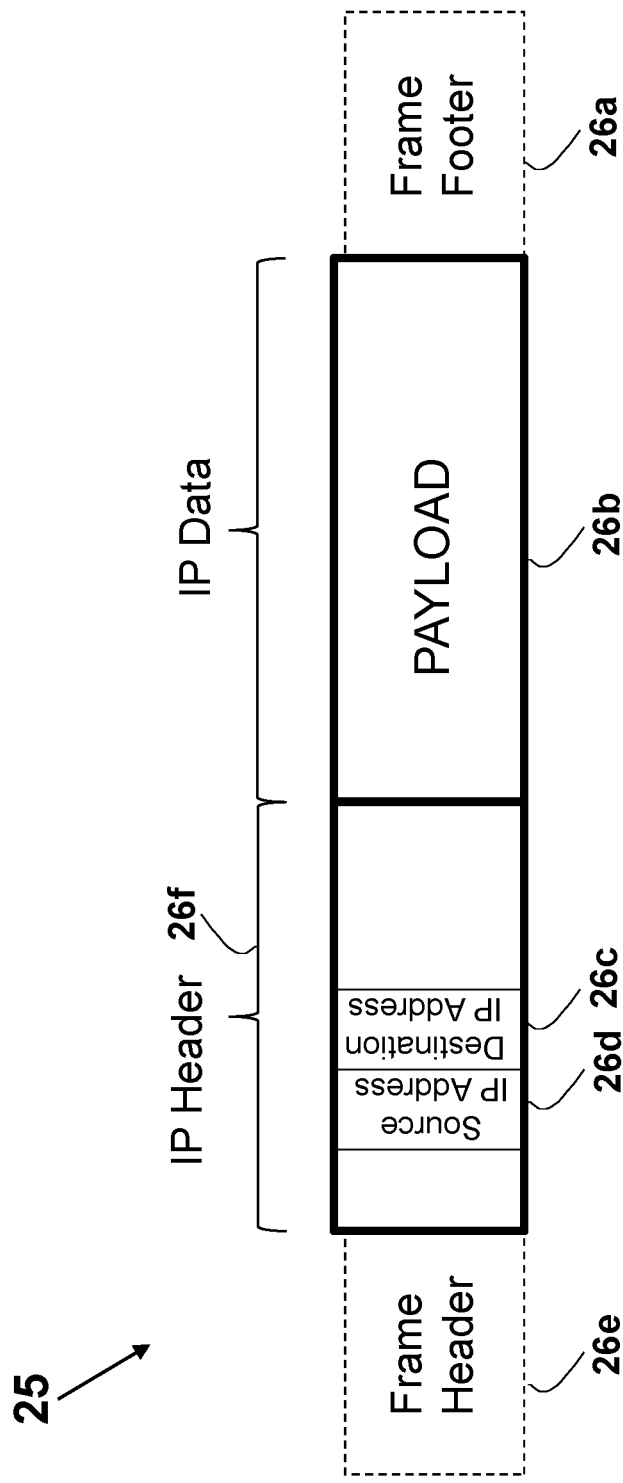
FIG. 2a illustrates schematically a structure of an IP-based packet.
Figure 3:
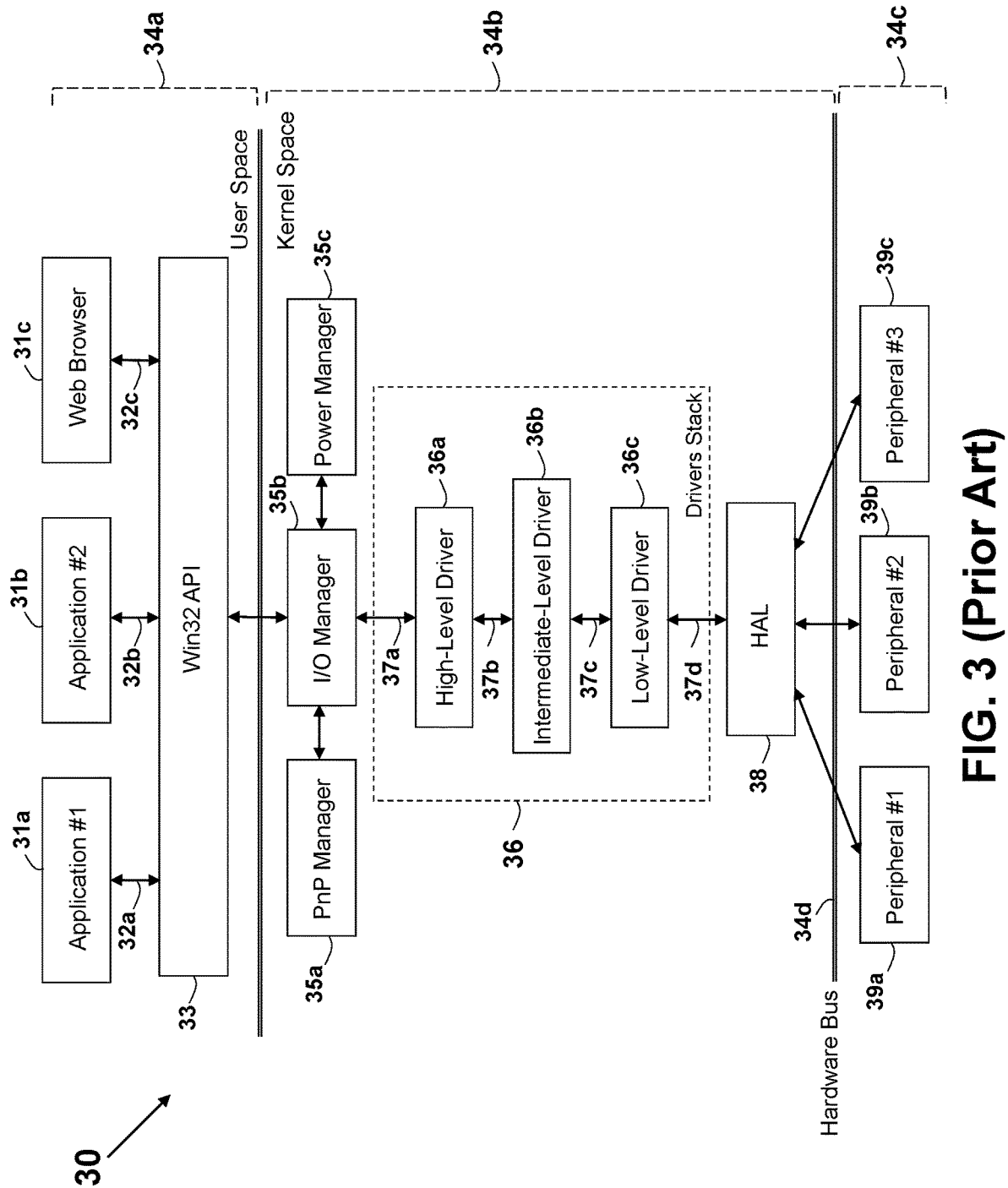
FIG. 3 illustrates schematically a simplified flow-chart of an Operating System (OS) using a WDM architecture.
Figure 3A:
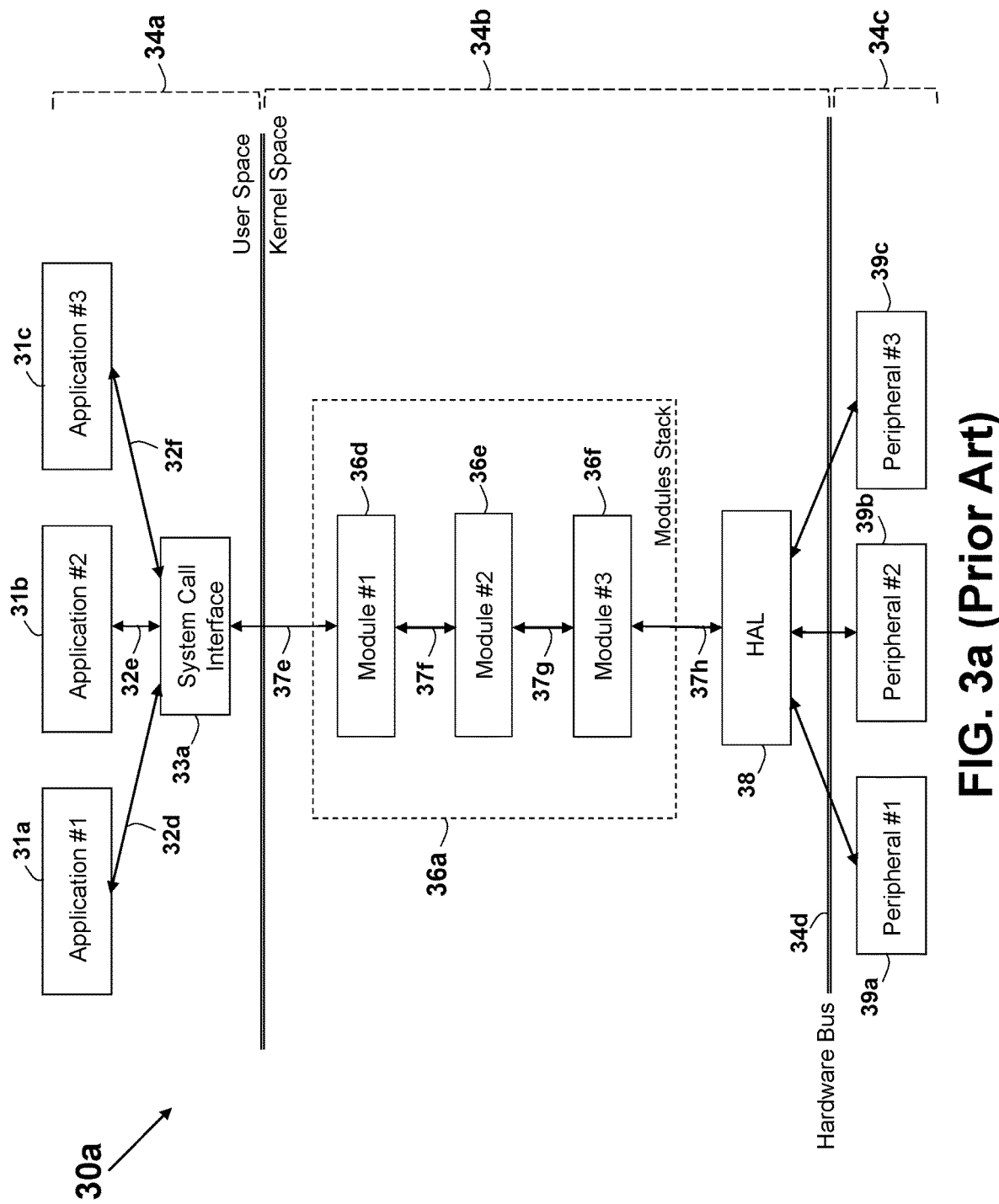
FIG. 3a illustrates schematically a simplified flow-chart of an Operating System (OS) using a Linux architecture.
Figure 4:
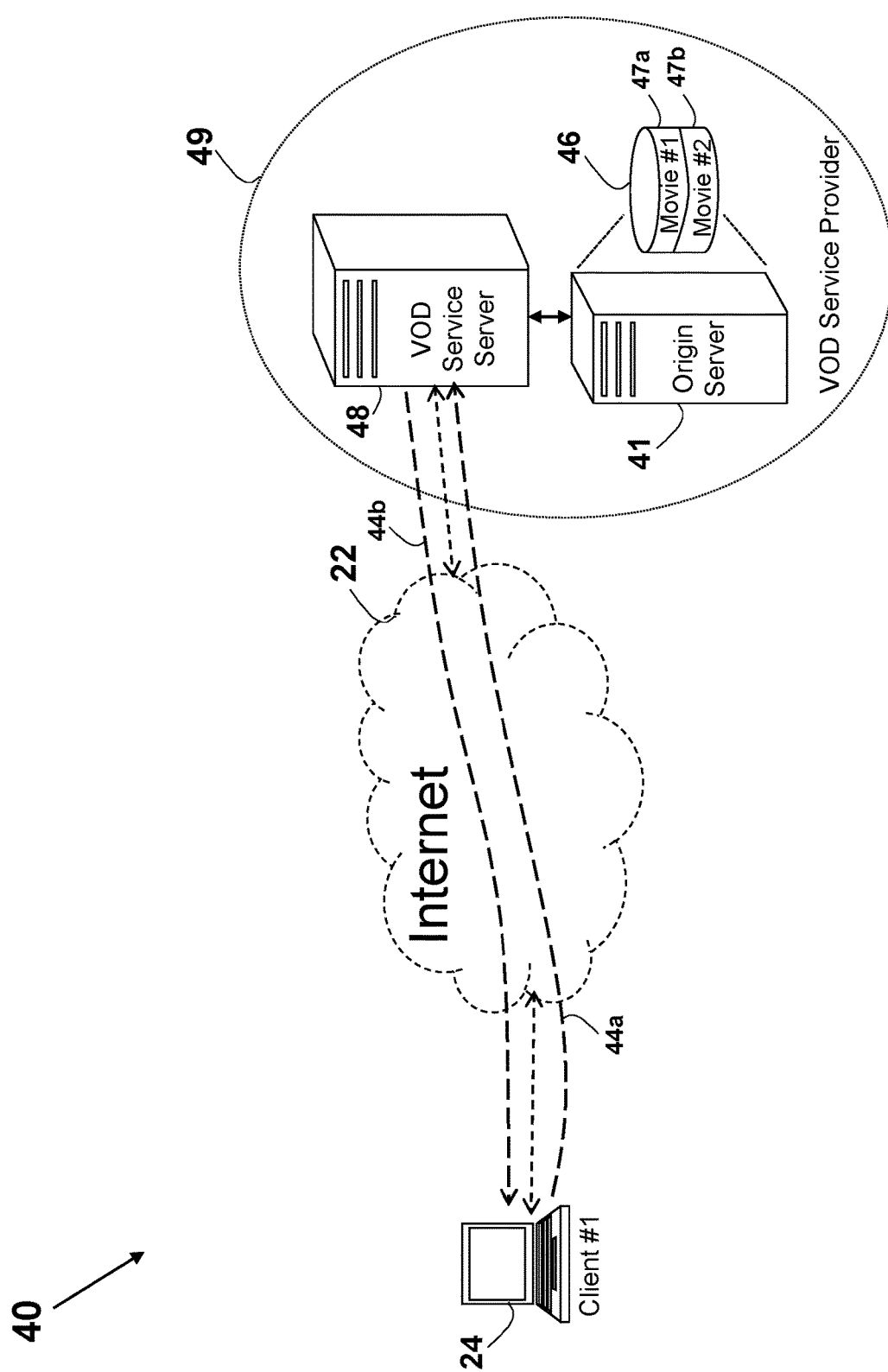
FIG. 4 depicts schematically messages exchanged over the Internet between a client device and a VOD Service Server.
Figure 4A:
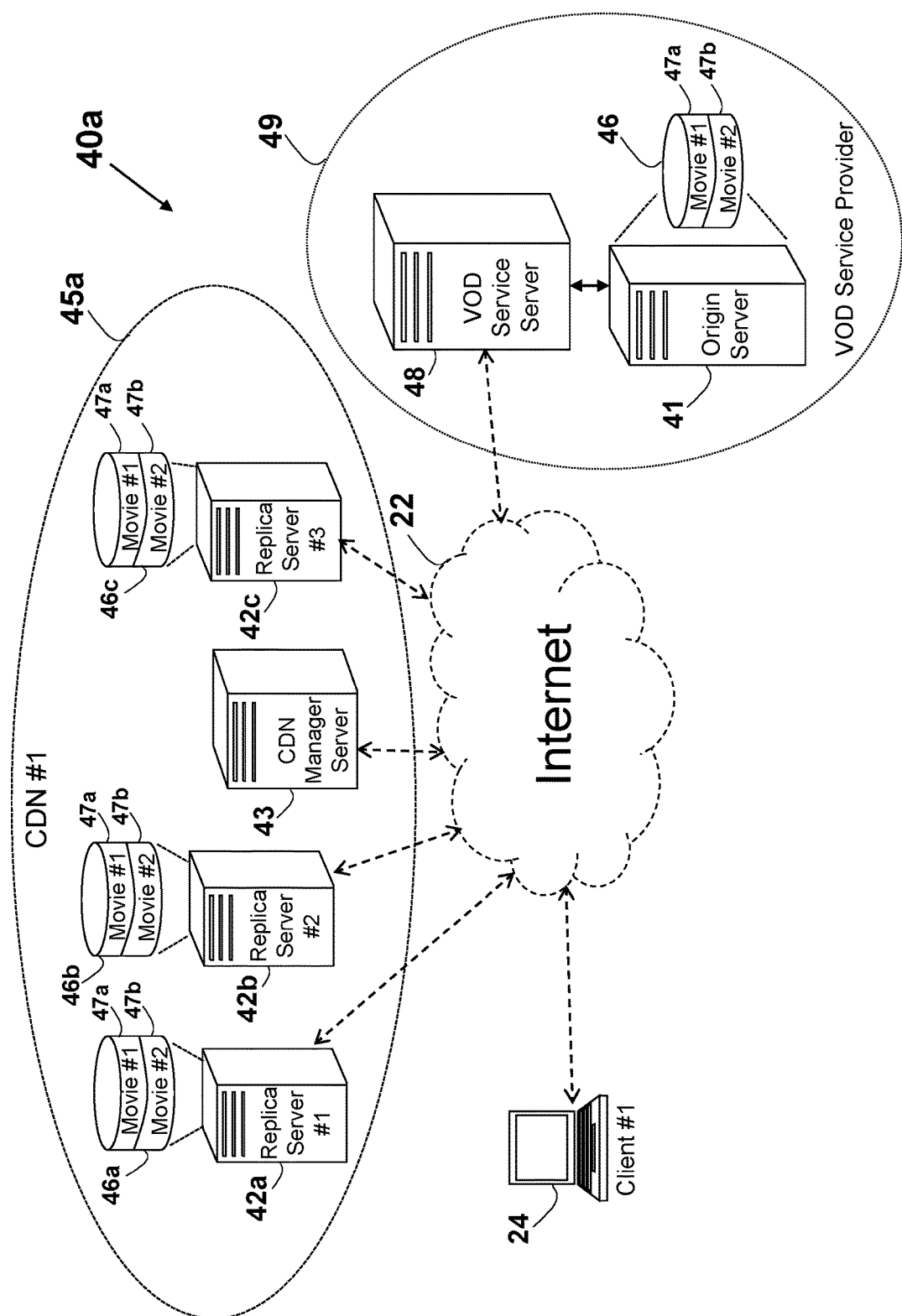
FIG. 4a depicts schematically a client device, a VOD Service Provider, and a CDN connected over the Internet.

The principles and operation of an apparatus or a method according to the present invention may be understood with reference to the figures and the accompanying description wherein identical or similar components (either hardware or software) appearing in different figures are denoted by identical reference numerals. The drawings and descriptions are conceptual only. In actual practice, a single component can implement one or more functions; alternatively or in addition, each function can be implemented by a plurality of components and devices. In the figures and descriptions, identical reference numerals indicate those components that are common to different embodiments or configurations. Identical numerical references (in some cases, even in the case of using different suffix, such as 5, 5a, 5b and 5c) refer to functions or actual devices that are either identical, substantially similar, or having similar functionality. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in the figures herein, is not intended to limit the scope of the invention, as claimed, but is merely representative of embodiments of the invention. It is to be understood that the singular forms "a," "an," and "the" herein include plural referents unless the context clearly dictates otherwise. Thus, for example, a reference to "a component surface" includes reference to one or more of such surfaces. By the term "substantially" it is meant that the recited characteristic, parameter, or value need not be achieved exactly, but that deviations or variations, including, for example, tolerances, measurement error, measurement accuracy limitations and other factors known to those of skill in the art, may occur in amounts that do not preclude the effect the characteristic was intended to provide. Any steps described herein by a computer, such as by a client device or a server device, may be performed in parallel using multitasking or multiprocessing. Any content herein may consist of, or comprise, data such as files, text, numbers, audio, voice, multimedia, video, images, music, computer programs or any other sequence of instructions, as well as any other form of information represented as a string of bits, bytes, or characters. In one example, the content may include, be a part of, or a whole of, a URL or a website page. Further, any content herein may be a single file, and may be a streaming media content, such as audio or video. In one example, any content herein may be a movie (also known as 'film'), referring to a type of visual communication which use moving pictures and sound to tell stories or inform, that are commonly designed to be shown on big screens at cinemas or movie theatres, or are sold or rented on DVD disks or video-cassette tapes, so that people can watch at home.

Figure 10:
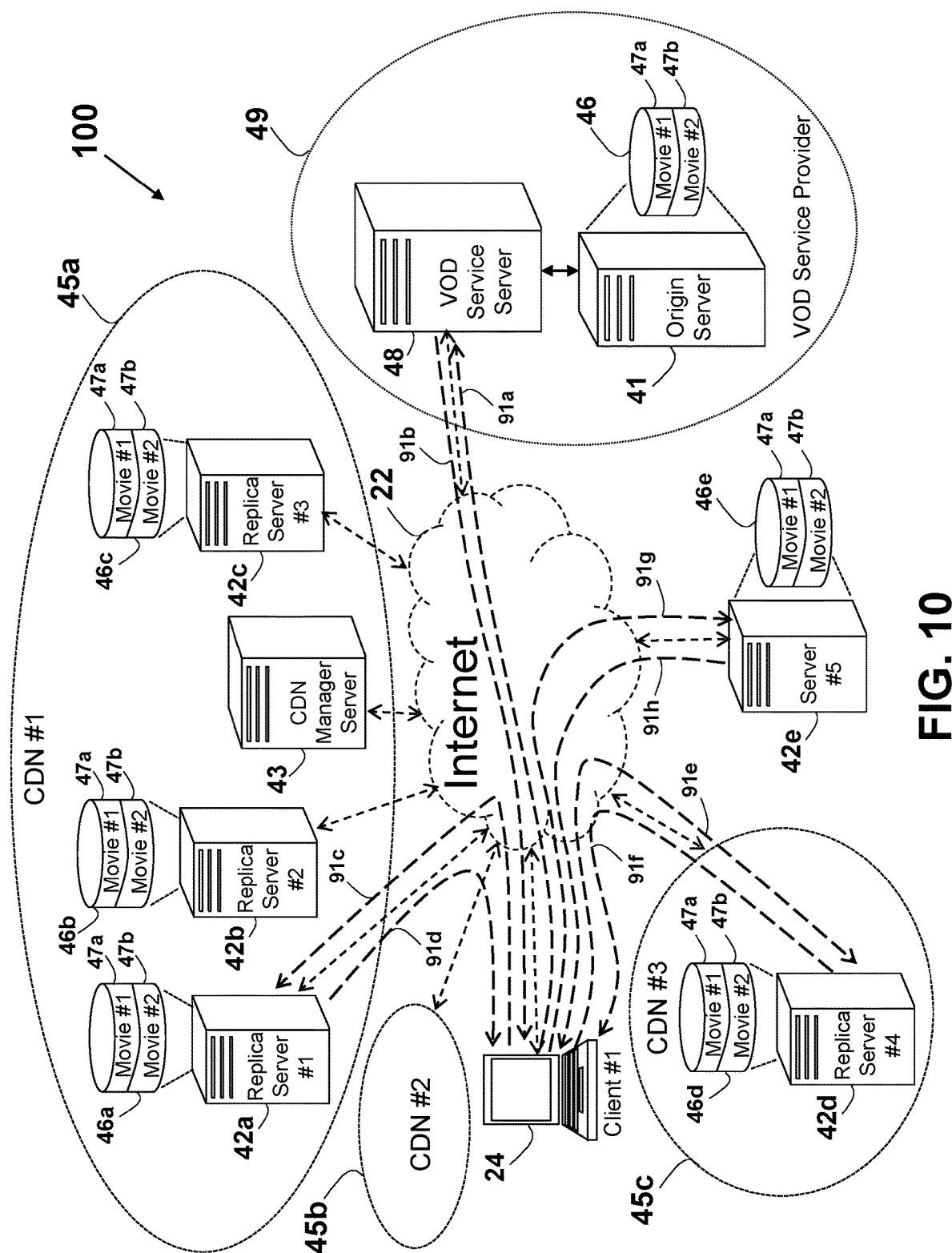
FIG. 10 depicts schematically messages exchanged over the Internet associated with a client device implementing media streaming from multiple sources.

In one example, the receiving of a content (such as a streaming media) by a client device (such as the client device #1 24) is improved by concurrently using multiple sources that store a copy of a part of, or the whole of, the requested content, and where different parts of the content are loaded from different sources. For example, the sources may be servers, either independent web servers or replica servers that are part of CDNs. Such improved may use an exemplary arrangement 100 shown in FIG. 10. A content, such as the movie #1 47a or the movie #2 47b, is stored in the storage 46 associated with the origin server 41 being part of the VOD Service Provider 49 infrastructure. Copies of part of, or the whole of, the content, are also stored in various replica servers, such as in the storage 46a associated with the Replica Server 42a, in the storage 46b associated with the Replica Server 42b, and in the storage 46c associated with the Replica Server 42c, all associated with CDN #1 45a. Additional copies are stored in other CDNs, such as in the CDN #2 45b and the CDN #3 45c. For example, copies may be stored in stored in a storage 46d associated with a replica server #4 42d being part of the CDN #3 45c infrastructure. Alternatively or in addition, copies may be stored in independent and non-CDN related servers, such as in a storage 46e associated with an independently controlled and accessed server #5 42e. The system may employ any combination of any number of CDNs (1, 2, 3, 4, or more), any number of replica servers (1, 2, 3, 4, or more), and any number of independent (or non-CDN related) servers (1, 2, 3, 4, or more). Further, the system may employ only CDNs (where the content is only fetched from the replica servers), only independent servers, or any combination thereof.

In operation, the client device #1 24 is sending a request for content (shown as a dashed-line 91a) to the VOD Service Server 48, that in response returns a list (shown as a dashed-line 91b) of the available or recommended sources to use. The sources may be explicitly identified (e.g., by IP address), or a source may be only identified as part of a Request-Routing mechanism. Typically, sources that are replica servers and are part of a CDN (such as the replica servers 42a and 42d), require a Request-Routing process for being identified, while independent servers (such as the independent server 42e) may be explicitly identified in the list.

For example, the list may suggest the use of the replica server #1 42a (being part of the CDN #1 45a), the replica server #4 42d (being part of the CDN #3 45c), and the independent server #5 42e. Then the client device #1 24 may request a first part of the content from the Replica Server #1 42a (shown as a dashed-line 91c), and in response, receives the requested part as streaming media therefrom (shown as a dashed-line 91d), while a second part of the content may be requested from the Replica Server #4 42d (shown as a dashed-line 91e) which in response transmits the requested part as streaming media back to the client device #1 24 (shown as a dashed-line 91f), and where a third part is received from the independent server #5 42e (shown as a dashed-line 91h) after sending a request to the third part (shown as a dashed-line 91g). The various requests sent to the servers, as well as the media streaming from the servers, may be consecutively performed, or preferably in parallel.

The content may include one or more files that may include any combination of text, numbers, characters, audio, voice, multimedia, video, images, music, computer programs (or any other sequence of instructions), as well as any other form of information represented as a string of bits or bytes. For example, the content may include, be a part of, or a whole of, a website page. In another example, the content includes a streaming media, such as audio or video. Further, the content may consist of a single file, such as a video file, for example, a movie in an MPEG-4 format, which may be named or identified as 'MOVIE_NAME.mp4'.

The content requested by the client device #1 24 may be partitioned into multiple parts, where any number of parts may be used. The partitioning may be in a bit, nibble (4-bits), byte (8-bits), word (multiple bytes), character, string, or file level (in the case where the content contains multiple files). The partition may be into equal length parts. Alternatively or in addition, a different length partitioning may be applied. In one example, the content itself is made of inherent or identifiable parts or segments, and the partition may make use of these parts. In one example, the content may be a website content composed of multiple webpages, and thus the partition may be such that each slice includes one (or few) webpages. Further, the partitioning may be sequential or non-sequential in the content. The partitioning may be non-overlapping, wherein each part includes a distinct part of the content. Alternatively or in addition, an overlapping partitioning may be applied, where the same portion of the content (such as one more bytes) is included in multiple parts. In a preferred scenario, the content is a single file, the partition is byte-level based, and referring to the various parts of the file is based on, compatible with, or according to, a byte serving technique of the HTTP protocol, such as by using the byte or range requests according to, compatible with, or based on, the IETF RFC 7233 entitled: "*Hypertext Transfer Protocol (HTTP/1.1): Range Requests*".

Figure 11:
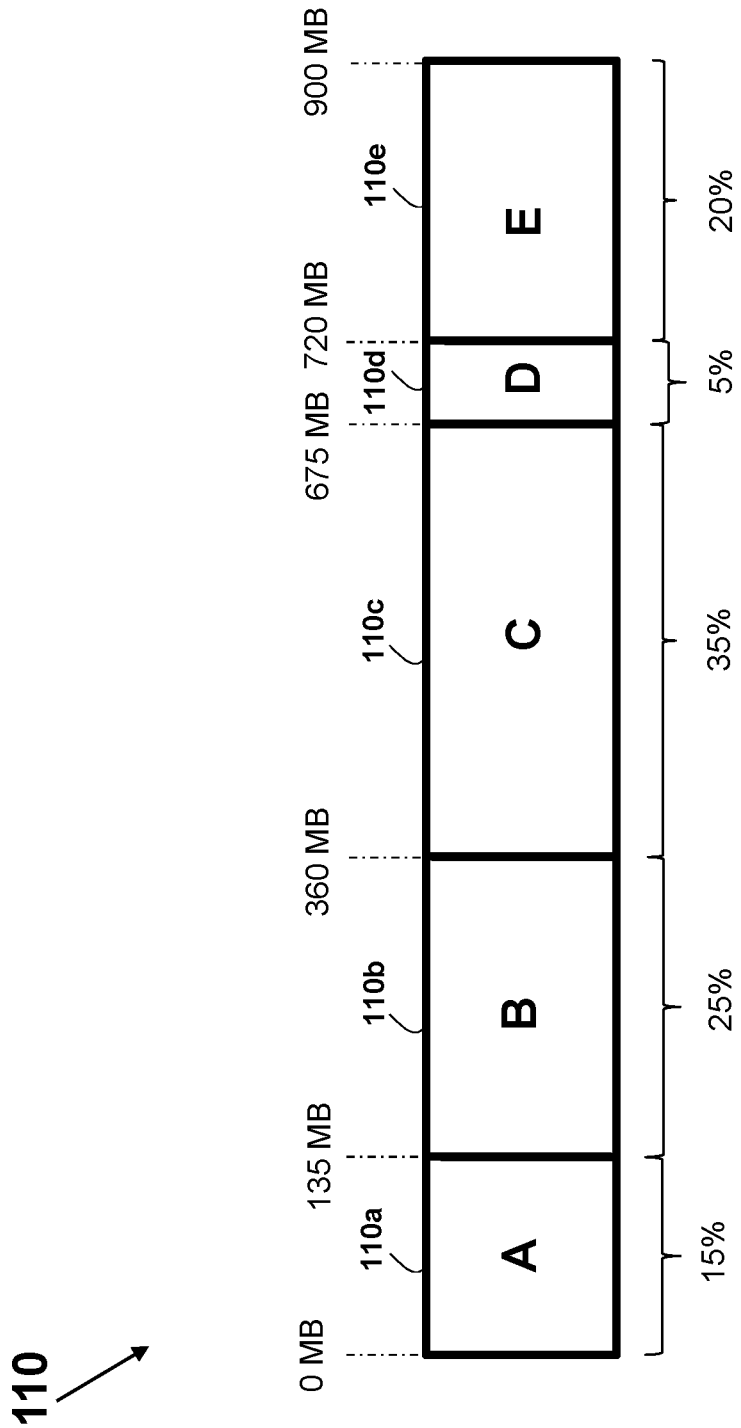
FIG. 11 illustrates schematically an example of a partitioning of content.

An example of a non-overlapping byte-level partition of a single file 110 is shown in FIG. 11. The total file is exampled as partitioned into five (5) parts, identified as a part A 110a, part B 110b, part C 110c, part D 110d, and part E 110e. The partition is into non-equal sized parts, as the part A 110a includes the first 15% of the total file, the part B 110b includes the next 25% of the total file, the part C 110a includes the following 35% of the total file, the part D 110d includes the following 5% of the total file, and the part E 110e includes the last 20% of the total file. In a case where the file 110 is fragmented and being structured or composed of multiple files, such as in HTTP Adaptive Bitrate (ABR) streaming, the file partitioning may correspond to the fragmented files, such that a partition may include a single or multiple file fragments. Alternatively or in addition, the starting or ending point of a partition may be a starting or ending point of a file fragment.

In one example, the content to be received and played is a single video file, such as a movie, where the size of the movie content (CONTENT_SIZE) may be 900 MB (MB=MegaBytes, 0.9 GB—GigaBytes). In such a case, the part A 110a includes the first 135 MB of the file, ranging from the first byte of the file (0 MB) to the last byte of the first 135 MB. Similarly, the part B 110b includes the next 225 MB of the file, ranging from the first byte after the first 135 MB to the last byte of the 360 MB of the total file, the part C 110c includes the next 315 MB of the file, ranging from the first byte after the first 360 MB to the last byte of the 675 MB of the total file. The part D 110d is of a size of 45 MB, and the part E 110e includes the last 180 MB of the file.

Assuming constant rate of the player (PLAYER_RATE) of 200 KB/s (200 KiloBytes per second, 1.6 Mb/s—Megabits per second), results in a total playing time of 4,500 second (75 Minutes), where the part A 110a provides the content for the first 675 seconds (11.25 Minutes) of playing, the part B 110b provides the content for the next 1125 seconds (18.75 Minutes) of playing, the part C 110c provides the content for the following 1575 seconds (26.25 Minutes) of playing, the part D 110d provides the content for the following 225 seconds (3.75 Minutes) of playing, and the part E 110e provides the content for the last 900 seconds (15 Minutes) of playing.

Figure 11A:
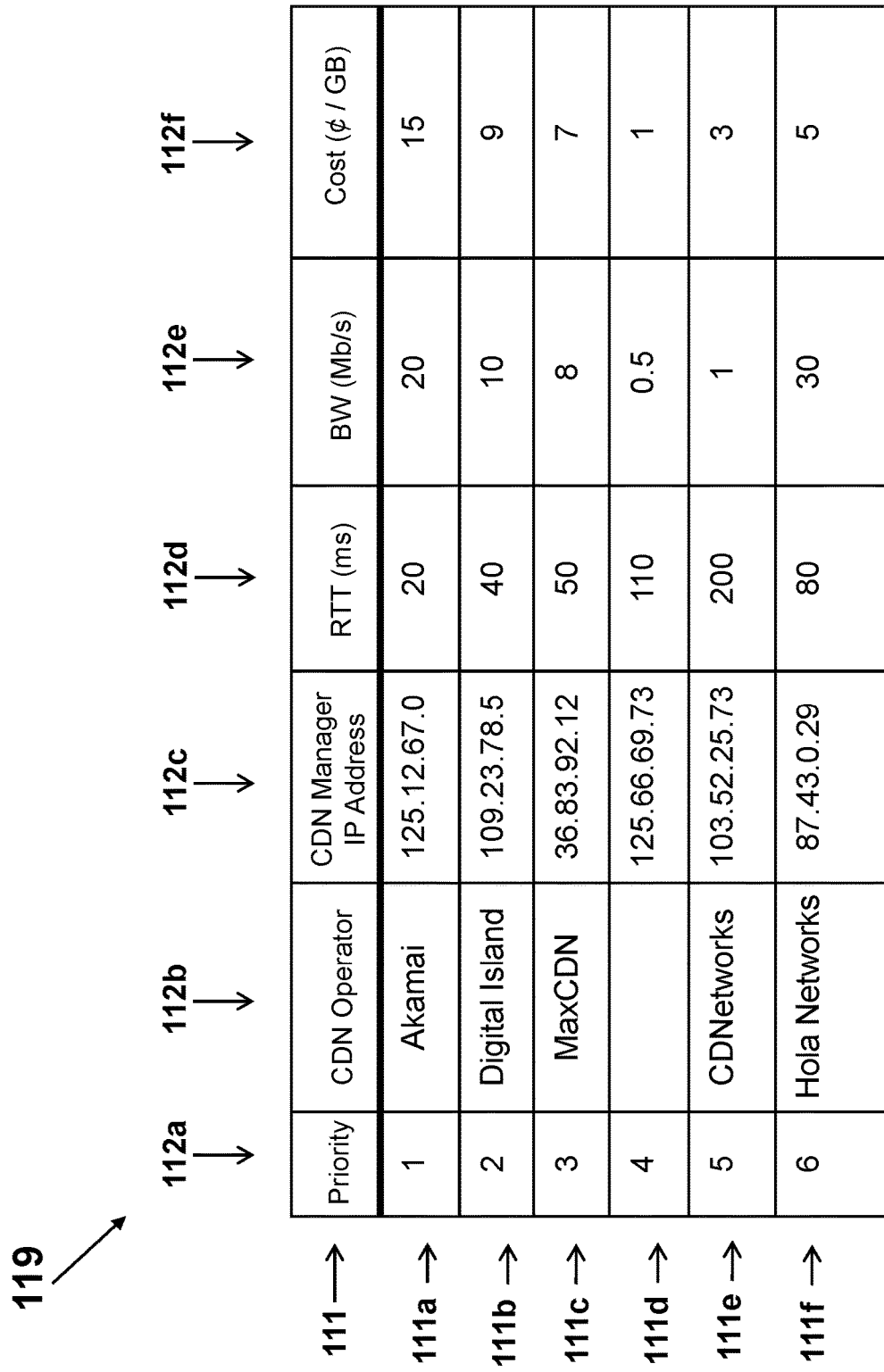
FIG. 11a illustrates schematically a table of available sources for media streaming.

An example of a sources list 119 is shown in FIG. 11a, including 6 available or preferred sources in a table form. The sources list 119 may be stored or used in the form of a database. The first row 111 describes the various columns in the table 119, namely a 'Priority' field 112a, a 'CDN Operator' field 112b, a 'CDN Manager IP Address' field 112c, a 'RTT (ms)' field 112d, a 'BW (Mb/s)' field 112e, and a 'Cost (¢/GB)' field 112f. The various sources are represented as entries that are described each in a row, such as a priority #1 source 111a, a priority #2 source 111b, a priority

3 source 111c, a priority #4 source 111d, a priority #5 source 111e, and a priority #6 source 111f. A source that is CDN based, such as a replica server in a CDN (which may correspond to the replica server #1 42a as part of the CDN #1 45a) may be identified by the name or other identification of the CDN or the CDN operator in the 'CDN Operator' column 112b, such as the CDN operator Akamai associated with source #1 111a, and the CDN operator CDNetworks associated with source #5 111e. Alternatively or in addition, a CDN may be identified by the IP address of the CDN Manager Server (such as the CDN Manager Server 43) in the 'CDN Manager IP Address' column 112c, such as the IP address 109.23.78.5 associated with source #2 111b and the IP address 87.43.0.29 associated with source #6 111f. In the case where a source is an independent server that is not a replica server or is not associated with a CDN (such as the server #5 42e), or in case where the replica server is identified or resolved, the server IP address may only be used for identification, such as the independent server shown as the source #4 111d, having an IP address of 125.66.69.73. Various performance criteria may be associated with each source, in particular performance parameters that may affect the streaming performance, such as the estimated or calculated RTT, as shown in the column 'RTT (ms)' 112d, describing the RTT associated with the source #1 111a as 20 ms (milliseconds) and the RTT associated with the source #3 111c as 50 ms (milliseconds). Similarly, a performance parameter may be the streaming bandwidth (BW), as shown in the column 'BW (Mb/s)' 112e, describing the BW associated with the source #2 111a as 10 Mb/s (Megabits per second) and the BW associated with the source #4 111d as 0.5 Mb/s. The performance data relating to the sources may be based on, compatible with, or according to, information provided from the service vendor, such as from the CDN operators, or based on previous communication sessions with the sources.

Typically, there is a fee charged for delivering content from a server, to be charged by the server owner or operator. For example, a CDN operator (or owner) typically charges for the use of the CDN infrastructure, commonly per GB delivered by a replica server that is part of the CDN. Examples of charges in cents (¢) per GB are detailed for the various sources in the 'Cost (¢/GB)' field 112f, where the most expensive source is source #1 111a (charged by Akamai, the CDN operator) charging 15 cents (¢) for each GB of content delivered, followed by the source #2 111b (typically charged by Digital Island, the CDN operator) charging 9 cents (¢) for each GB of content delivered, while the cheapest source is the source #4 that only charges 1 cents (¢) for each GB of content delivered. For example, in the case of a movie of a size of 900 MB, streaming the whole movie by the source #1 111a requires a payment of (0.9*15=) 13.5 cents, while delivering the same movie by a CDN operated by Hola Networks (source #6 111f) is associated with a total charge of only (0.9*5=) 4.5 cents.

Any number of sources may be used and may be included in the sources list 119, such as 2, 3, 4, 5, 6, or 10. Further, any number of CDNs may be included, as well as any number of independent servers. Further, few CDN managers may be identified for the same CDN operator, for example for identifying alternatives of CDNs or server farms that are operated by, or associated with, the same CDN operator or owner.

The partitioning of the content, as shown in FIG. 11, and retrieving each part from a different server, allows for cost optimization. For example, the part A 110a may be loaded from the source #1 111a, the part B 110b may be received from the source #2 111b, the part C 110c may be loaded from the source #3 111c, the part D 110d may be loaded from the source #4 111d, and the part E 110e may be received from the source #5 111e. It is noted that while exampled where each part of the content 110 is loaded from a distinct source, multiple parts may equally be loaded from the same source. For example, both part B 110b and part D 110d may be delivered from the same source, such as in the case the whole content is received from the source #1 111a, the total cost charged for the content is (0.9 GB*15¢/GB=) 13.5 cents, based on a fee of 15¢/GB as shown in column 112e in the table 119, while in the case the whole content is received from the source #2 111b, the total cost charged for the content is (0.9 GB*9¢/GB=) 8.1 cents.

The partitioning into multiple parts allows for using both expensive and cheap sources as required, thus providing cost savings. For example, the cost associated with the above partitioning can be calculated as the sum of (0.135 GB*15¢/GB=) 2.025 cents charged by source #1 111a for part A 110a, (0.225 GB*9¢/GB=) 2.025 cents charged by source #2 111b for part B 110b, (0.315 GB*7¢/GB=) 2.205 cents charged by source #3 111c for part C 110c, (0.045 GB*1¢/GB=) 0.045 cents charged by source #4 111d for part D 110d, and (0.180 GB*3¢/GB=) 0.54 cents charged by source #5 111e for part E 110e, totalizing to a fee of (2.025+2.025+2.205+0.045+0.54=) 6.84 cents, that is about 49% less of the 13.5 cents charge when using only source #1 111a and about 15.5% less of the 8.1 cents charge when using only source #2 111b, while providing the same content 110 and the same service to the client device #1 24.

The loading of a part of the content may be initiated shortly before the part is being played. Preferably, the loading may start earlier, such as immediately upon starting the content loading, the streaming start, or the playing start. Further, a separate buffer mechanism may be used with each part of the content, or with each participating source. In the example of the partition shown in FIG. 11, 5 distinct buffers may be used, each associated with a different part (and accordingly with a different source). Since a significant amount of data may be accumulated into a buffer before needed to be played, the streaming rate may be low, such as lower than the playing rate, allowing even slow streaming servers to participate in the streaming. For example, in a case where the data of part E 110e is starting to load at the beginning of the content playing or streaming, data may be accumulated in the appropriate buffer during the first 3600 seconds (60 minutes) until this part is to be played. Assuming a constant streaming rate RATE_E from the source associated with part E 110e, the total accumulated data amount is calculated as 3600*RATE_E (in Mbits), or 450*RATE_E (in MB). Assuming that the part E 110e plays at a player rate (PLAYER_RATE) of 200 KB/s (200 KiloBytes per second, 1.6 Mb/s—MegaBits per second) for playing time of 900 seconds, resulting a total content played size of 180 MB. Hence, the minimum receiving rate RATE_E is RATE_E≥180/450=0.4 Mb/s, thus any source capable of a streaming rate at or above 0.4 Mb/s may be used for receiving part E 110e therefrom, such as the source #5 111e, offering BW of 1 Mb/s. This rate is significantly below the player rate (PLAYER_RATE) of 1.6 Mb/s, yet may be used due to the long accumulated during the time before playing. Hence, using such a scheme allows the advantage of using sources that have a streaming rate capability that is equal, lower, or substantially lower than the playing rate of the media player.

Figure 11B:
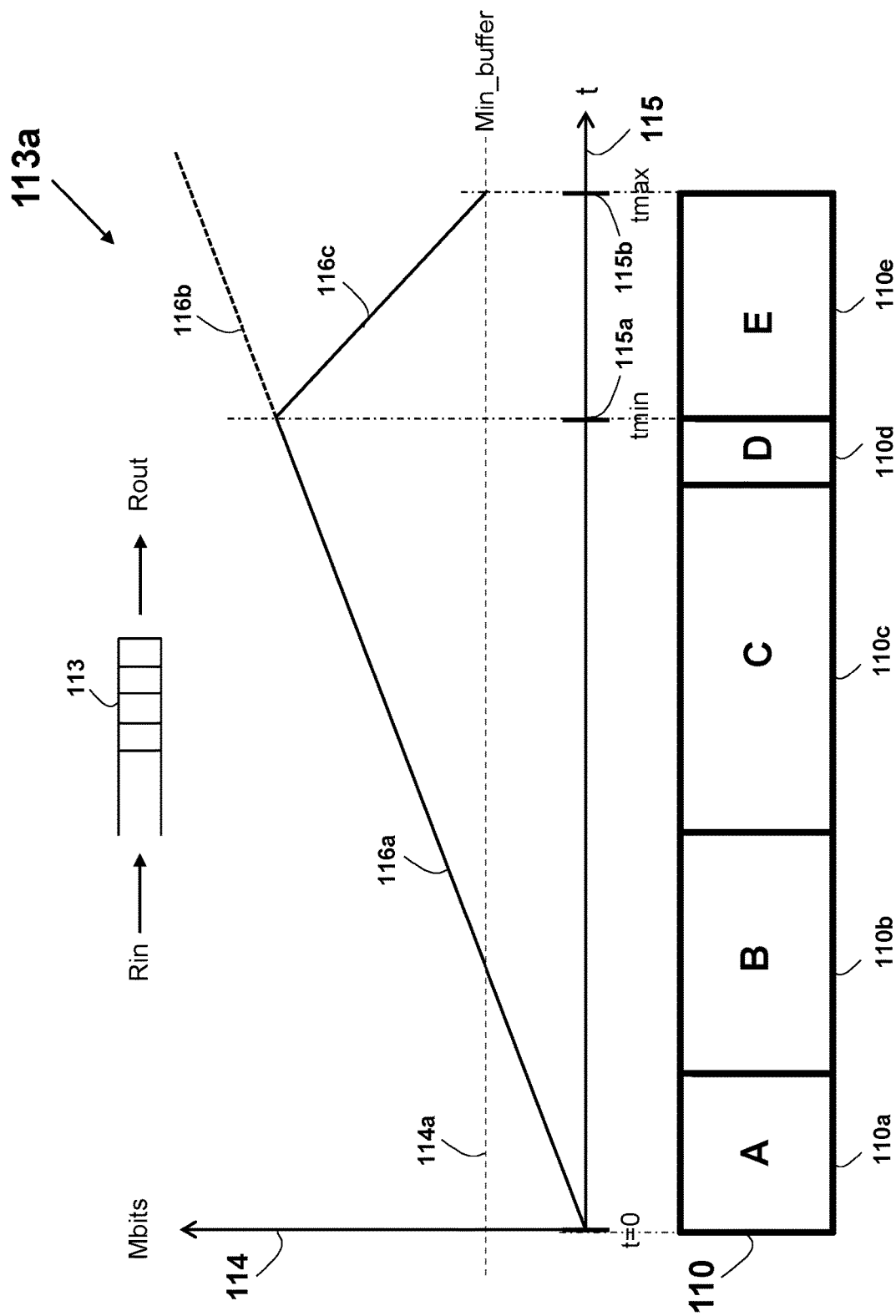
FIG. 11b illustrates schematically a partitioning of content based on a source delivery performance.

A general analysis of a general buffer 113 for handling a part of the content is shown in diagram 113a in FIG. 11b. As an example, the buffer 113 is described as the buffer storing and handling the content of part E 110*e*, such as receiving the data for this part from the source #5 111*e*, as described below. The data is received, and the buffer is filled from the source #5 111*e* at a rate of Rin (may correspond to RECEIVING_RATE above), and the content in the buffer is consumed by the media player at a rate of Rout (may correspond to PLAYER_RATE above). The graph shown includes a vertical axis 'Mbits' 114 representing the data level at the buffer 113 versus time represented in a horizontal axis 't' 115. In order to smooth fluctuations, interruptions, and other impairments in the service to allow continuous, reliable, and undisturbed service to the user, it is beneficial to have at all times a content of a minimum playing time in the buffer. For example, the buffer may store a minimum playing time of 1, 2, 3, 4, 5, 10, 15, 20, 25, or 30 seconds. Higher reserve playing time allows for compensating for longer service interruptions and more significant rate fluctuations, but requires more storage space in the buffer as well as higher filling rate Rin. The minimum reserve playing time Δt requires the buffer to have during normal playing a minimum content of Δt*Rout, shown as a Min buffer level 114, so the data may be emptied from the buffer 113 at a rate of Rout for a duration of Δt seconds.

At time point t=0, corresponding to the streaming starting point to fill the buffer 113, which may also correspond to the start of the playing of the content 110. The buffer is filled with data at a rate of Rin represented by the slope of a line 116*a*. At a time point tmin 115*a*, the buffer continues to receive data at the rate of Rin, as shown by a line 116*b*. However, in parallel to the continuous data loading, the buffer 113 is consumed (such as by a media player) at a rate Rout, resulting a net (commonly) negative slope of Rin-Rout, shown by a falling line 116*c*, until a time point tmax 115*b*, where the buffer 113 stores the minimum content level required as a reserve playing time Δt. Such mechanism guarantees that the level of the buffer 113 at all times during the playing process, from the playing start time tmin 115*a* to the playing end tmax 115*b*.

The total content received by the buffer 113 during the process may be calculated as Rin*tmax. Similarly, the total content consumed from the buffer 113 may be calculated as Rout*(tmax−tmin). Hence, the condition represented by the equation Rin*tmax−Rout*(tmax−tmin)=Δt*Rout should be satisfied, in order to obtain the minimum buffer reserve at the time point tmax 115. This equation allows for the calculation of any required parameter based on the others, such that tmax can be calculated by $$tmax = \frac{tmin - \Delta t}{\left(1 - \frac{Rin}{Rout}\right)},$$

tmin can be calculated by $$tmin = \Delta t + tmax\left(1 - \frac{Rin}{Rout}\right),$$

and Rin can be calculated by $$Rin = Rout\left(1 + \frac{\Delta t - tmin}{tmax}\right).$$

Further, feasible solution may only be obtained as long as the condition $$\frac{Rin}{Rout} > \frac{\Delta t}{tmin}$$

is satisfied. Otherwise, this source (associated with Rin) may not be used. When applied to the above example of a constant rate of the player (PLAYER_RATE) of 200 KB/s (200 KiloBytes per second, 1.6 Mb/s—Megabits per second), results in a total playing time of 4,500 second (75 Minutes) for a 900 MB content size, and assuming the last part (such as the part E 110*e*) is analyzed where tmax=4500 seconds (75 minutes), and assuming a buffer of a minimum 10 seconds (Δt=10 seconds). In the case the time point tmin is required to be at 3600 seconds after playing start (as shown in FIG. 11), then the minimum Rin can be calculated to be 40.4 MB/s (=323.5 Mb/s). Alternatively, in the case the source #5 111*e* is used having a Rin of BW=1 Mb/s, then the tmin is calculated as 1697.5 seconds.

The allocation of sources to content parts may be based on achieving the cheapest delivery cost. One scheme for sources/parts allocation may use a backwards allocation, starting from the end of the content, allowing for using lower BW sources, which are typically associated with a lower delivery cost. Such allocation example is shown as an allocation 140 in FIG. 14. A lowest available cost source is allocated to the last part of the content 110 so that the content end time point 141*a* is considered the tmax(Z) of this part Z 140*z*. If this source lowest cost source is calculated to be able to provide the allocated part, then the starting time point tmin(Z) 141*b* of the part Z 140*z* is then calculated. Next, the lowest cost source (excluding the already allocated source) is selected from the source list 119, and is allocated to the content part Y 140*y* preceding the already allocated part Z 140*z*, by assigning the calculated part Z start time tmin(Z) 141*b* as the end time tmax(Y) 141*b* of the next allocated part Y 140*y*. Assuming this source is capable of providing the required part, and then the start point of the part Y tmin(Y) 141*c* is calculated. Similarly, the next lowest cost source is selected for part X 140*x*, by using the start point of part Y tmin(Y) 141*c* as the end point of part X 140*x*, and calculating the part X 140*x* start point tmin(X) 141*d*. The process may be repeated as required until the whole content 110 is allocated, such that the starting point of a part is calculated to be t<0 or t=0 141*e*.

The above allocation may be applied to the above example of a constant rate of the player (PLAYER_RATE) of 200 KB/s (200 KiloBytes per second, 1.6 Mb/s—Megabits per second), that results in a total playing time of 4,500 second (75 Minutes) for a 900 MB content size, and assuming a buffer level of a minimum 10 seconds (Δt=10 seconds). In such an example, the end point tmax(Z) 141*a* of the content is 4,500 seconds (tmax(Z)=4,500). First source #4 111*d* is selected, being the lowest cost source in the source list 119 example, charging 1¢/GB and offering BW of 0.5 Mb/s. In this case, the calculated tmin(Z) 141*b* is tmin(Z) =3103.75 seconds, hence the total time of part Z 140*z* is 4500−3103.75=1396.25 seconds (about 31% of the total content 110), associated with a content part size of 1396.25*200 KB/s=0.27925 GB, and the associated charge is 0.27925 GB*1¢/GB=0.29925 cents. The source #5 111*e* is selected next as being the next lowest cost source, charging 3¢/GB and offering BW of 1 Mb/s, and allocated for part Y 140*y*, that precedes part Z 140*z*. The tmax(Y) 141*b* is assigned the starting time tmin(Z) of 3103.75, and then the part Y 140*y* starting point tmin(Y) 141*c* is calculated to be 1173.9 seconds (tmin(Y)=1173.9), hence the total time of part Y 140*y* is 3103.75−1173.9=1929.85 seconds (about 42.9% of the total content 110), associated with a content part size of 1929.85*200 KB/s=0.386 GB, and the associated charge is 0.386 GB*3¢/GB=1.158 cents. Similarly, next the source #6 111*f* is selected for part X 140*x*, calculated to provide a negative value of tmin(X) 141*d*, hence this source #6 may be allocated from the content start time point t=0 141*e*.

Figure 14:
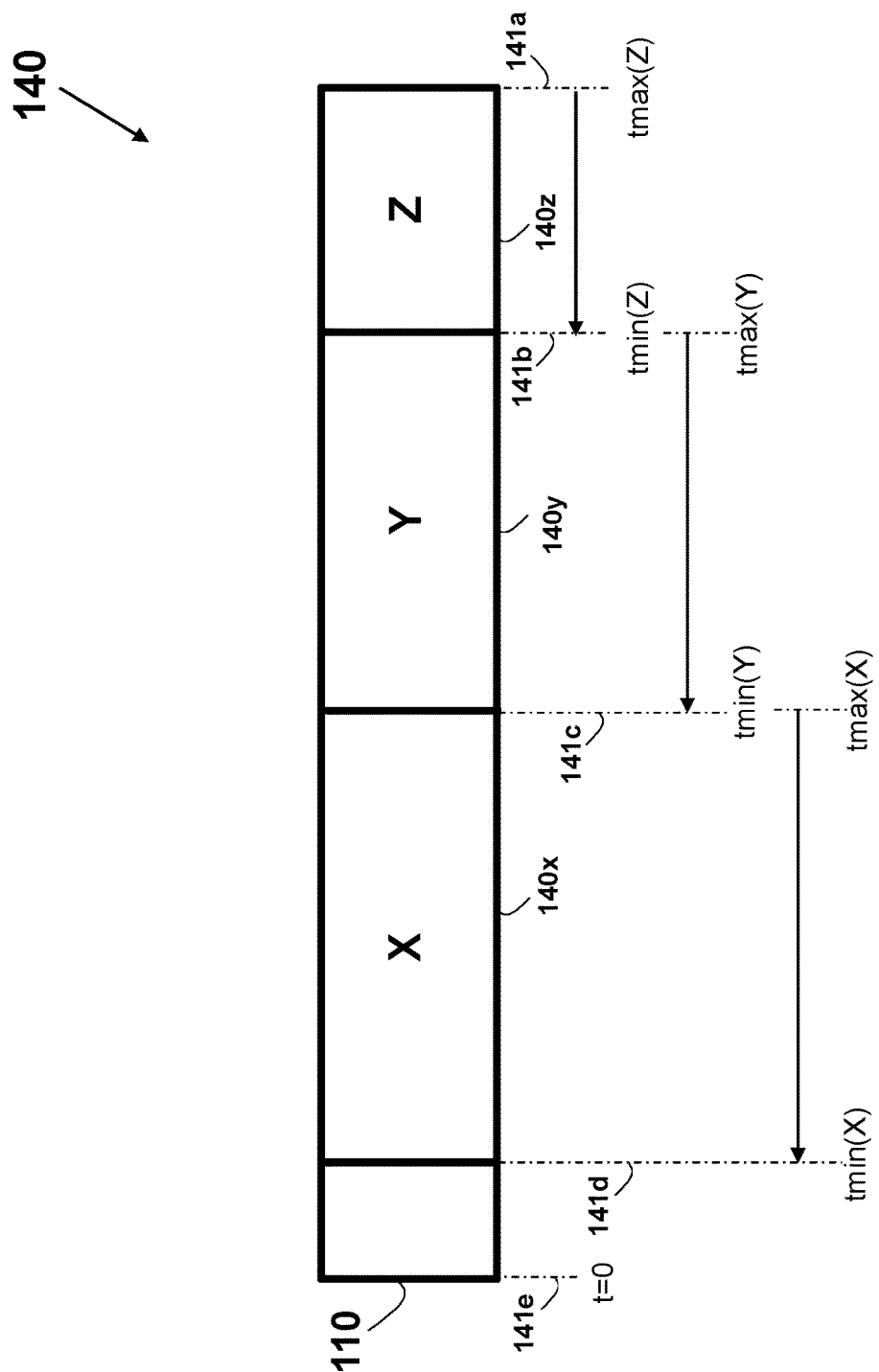
FIG. 14 illustrates schematically an example of a partitioning of content based on sources delivery performance using backward allocation scheme starting at the content end.
Figure 14A:
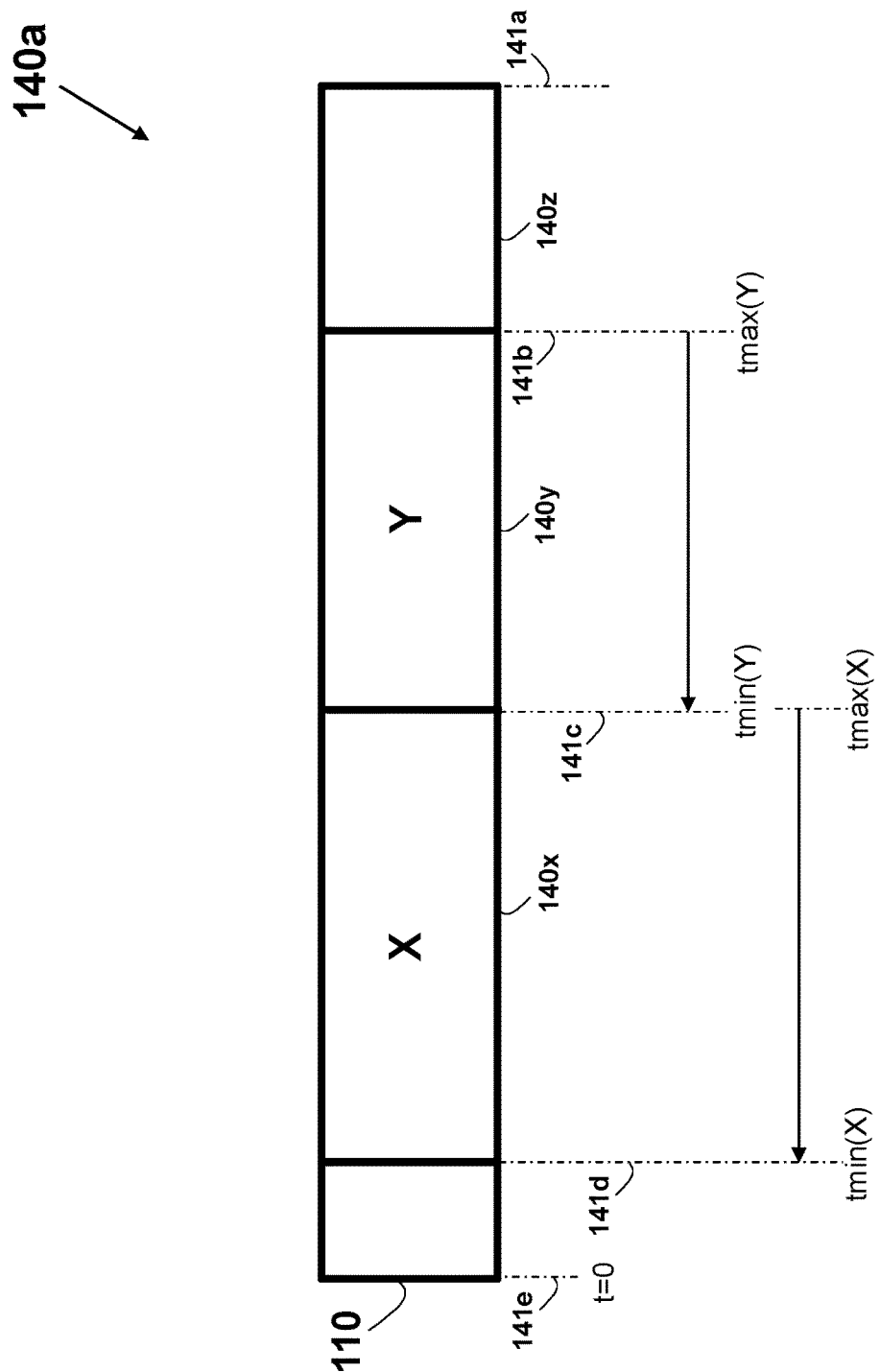
FIG. 14a illustrates schematically an example of a partitioning of content based on sources delivery performance using backward allocation scheme starting before the content end.

While the backward allocation scheme was exampled in FIG. 14 as starting from the content end time point 141*a*, a method may be equally used for allocation using as a starting a point that is not the whole content 110 end time point. For example, the process may start by allocating sources to parts that end in the time point tmax(Y) 141*b* as shown in the allocation scheme 140*a* in FIG. 14*a*. In this case, the last content 110 part may not be allocated in the beginning (t=0 141*e*) but rather later in the playing timing. In this scenario, the lowest cost source (e.g., source #4 111*d*) is first selected to provide part Y 140*y*, followed by the next lowest cost source (e.g., source #5 111*e*) that is selected to provide part X 140*x*, and continuing backwards allocation as required. The advantage of backward allocation that is not starting at the whole content 110 end time point 141*a*, is that users frequently are not watching the movie, especially a long one, to the end, hence saving the costs associated with loading part of the content that is not ultimately being played.

Figure 14B:
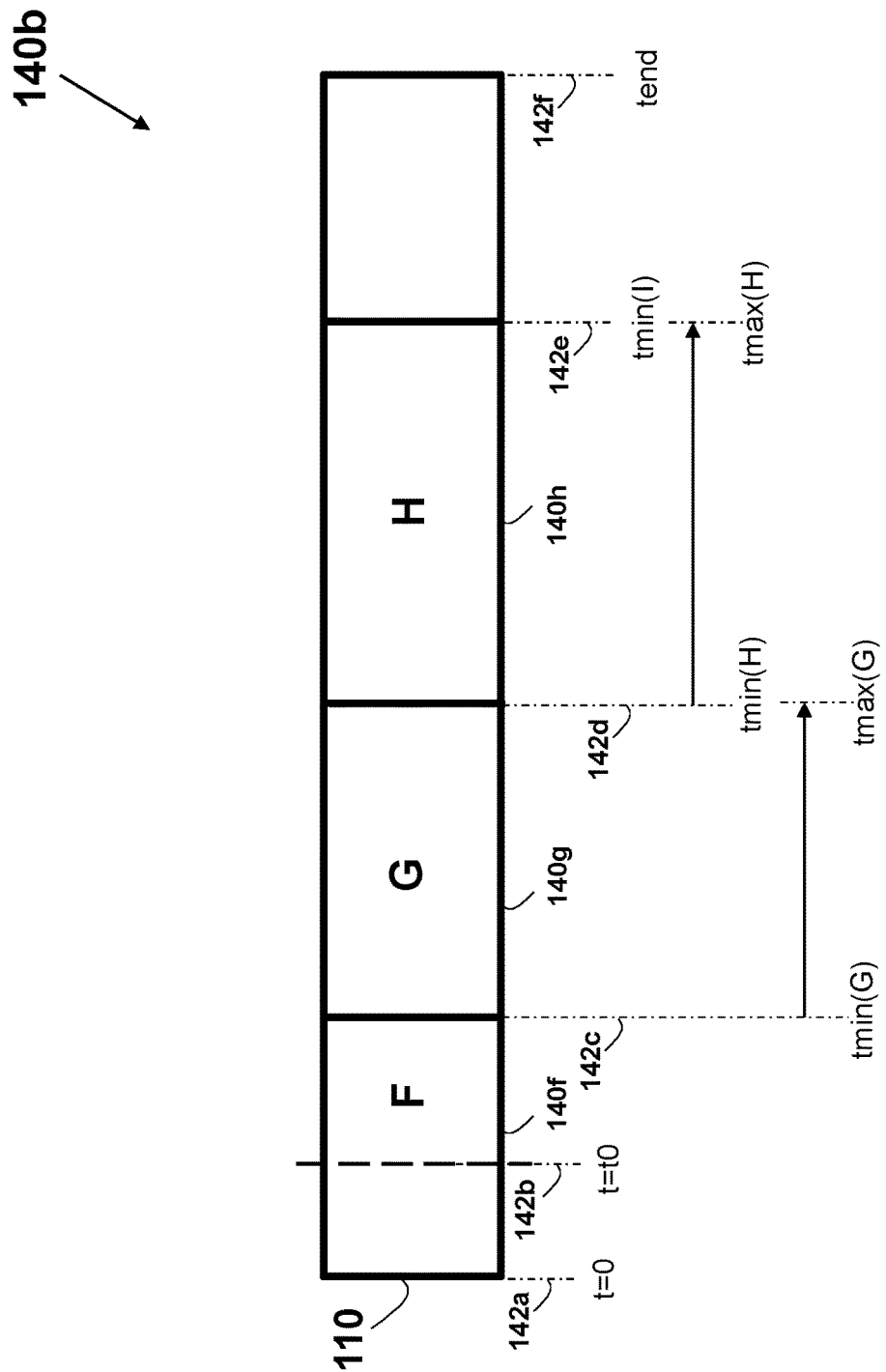
FIG. 14b illustrates schematically an example of a partitioning of content based on sources delivery performance using forward allocation scheme.

Alternatively or in addition to the backwards allocation described above, a forward allocation may equally be used, as shown in an allocation scheme 140*b* shown in FIG. 14*b*. In this example, a first source, for example the lowest cost source, is allocated to a first part F 140*f*, starting at the playing start time point t=0 142*a*, and used until tmin(G) starting point 142*c*. The next lowest cost source is used for a following content part G 140*g*, that may be used until a tmax(G) time point 142*d*, where the next source is allocated to provide part H 140*h* from tmin(H) 142*d* to a time point tmax(H) 142*e*, where another source is allocated for the following content part. The allocation scheme may be continued until the whole content 110 is fully allocated, such as until a time point tend 142*f*. Alternatively or in addition, the allocation scheme may be used for only part of the content 110, for example, only until the time point tmax(H) 142*e*.

While the allocated schemes have been exampled above regarding starting the streaming from the allocated sources at time point t=0 142*a* which is associated with the playing start, the scheme may equally apply to cases where the starting point for streaming from the various selected sources is not the playing start point t=0 142*a*, but rather any time point of the content playing, which may be current one (during content playing) or a future one, such as after a time period (e.g., 1, 2, 5, 10, 15, 20, or 30 seconds from the current playing time point). For example, an allocation scheme may be planned before the playing start (such as in the time point t=0 142*a*), but based on a futuristic time point of the playing, such as 1, 2, 5, 10, 15, 20, or 30 seconds after playing start. Similarly, the allocation scheme may be applied during a media playing, treating the current playing point as the start point for receiving data from the various selected sources. For example, an allocation scheme may use the time point t=t0 142*b* shown in the allocation scheme 140*b* as the time point for starting the receiving of content from the selected sources. In such a case, the calculations above may use t'min and t'max instead of tmin and tmax used to indicate timing points along the total content timeline, where t'min=tmin−t0, and t'max=tmax−t0, indicating the 't0' shifting in time.

Figure 14C:
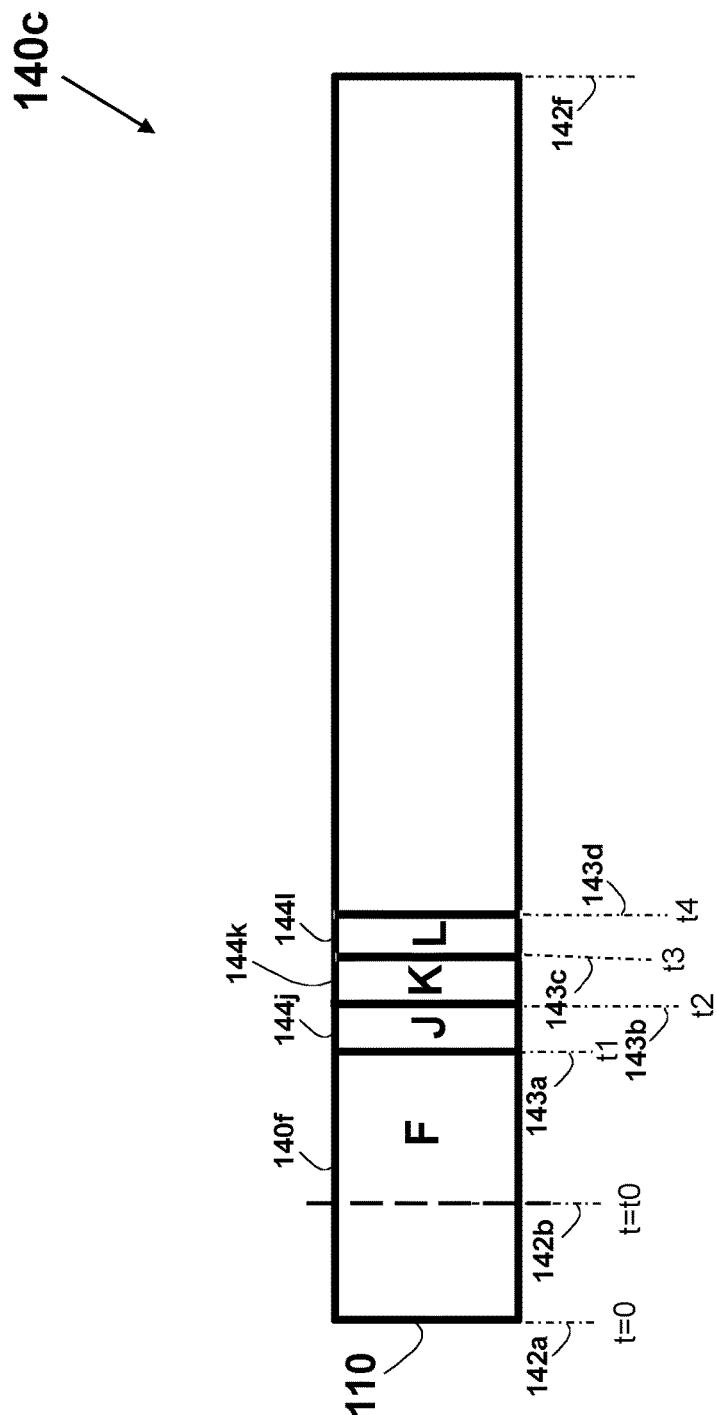
FIG. 14c illustrates schematically an example of a partitioning of content based on sources delivery performance using performance checking parts.

In one example, the BW 112*e* and the RTT 112*d* features associated with the available sources shown in the sources list 119 and used for the allocation schemes as described herein may be based on previous performance of these sources. However, the sources performance may change in time, due to overloading or excess Internet traffic along the service route. Preferably, the sources characteristics may be evaluated, estimated, monitored, or checked in real time. An example of such an allocation scheme 140*c* is shown in FIG. 14*c*. During the playing of a content part F 140*f*, one or more small checking parts are defined, such as a part J 144*j* ranging from t1 143*a* to t2 143*b*, a part K 144*k* ranging from t2 143*b* to *t*3 143*c*, and a part L 144*l* ranging from t3 143*c* to *t*4 143*d*. While 3 checking parts are exampled, any number of checking parts may be equally used, such as 1, 2, 4, or 5 parts. A source is allocated to each checking part, preferably based on the lowest cost sources, and concurrent streaming from the selected sources is performed. The checking parts may be identical or similar in size, and may be defined by playing time length, such as 1, 2, 3, 5, 10, 15, or 20 seconds, or 1, 2, 3, 5, 10, 15, or 20 minutes. Alternatively or in addition, the parts size may be based on the total size of the content 110, such as 0.1%, 0.2%, 0.3%, 0.5%, 1%, 2%, 3%, or 5% of the whole content 110 size. For example, the source #4 111*d* may be used to load part J 144*j*, the source #5 111*e* may be used to load part K 144*k*, and the source #6 111*f* may be used to load part L 144*l*. During the actual receiving or data from the sources, the actual RTT and BW are monitored, estimated, and measured, for using as part updating or later initiating an allocation scheme. Since the checking part may be relatively small, the cost associated with such a checking is relatively small. While the above allocation schemes were described as targeting lower costs associated with the content delivery, any other objective may be used.

Reducing the start-up time, such as from selecting the movie to watch until the actual playing begins, is typically required for providing a better user experience. In one example, this goal may be achieved by selecting the fastest source for a first part, such as a source having the highest BW, the lowest RTT, or a source associated with a minimum of RTT+MIN/BW (where MIN is the minimum received content size required for a reliable playing start). Alternatively or in addition, the most expensive source may first be selected, assuming that there is a correlation between cost and performance. After the playing starts, accumulating enough buffer data that allows for a minimum playing time (such as the duration Δt described above), various allocation schemes may be used in order to optimize and lower the total cost of the content 110 delivery. Since the first part, such as the part F 140*f* shown in the scheme 140*c*, that is received from the most expensive or best performance source may be relatively short in time and content size, the overall impact on the total delivery cost may be minimized. Hence, such a scheme provides for both fast start-up, as well as a total lowest cost. Further, in a case where due to a delivery problem, rate fluctuations, source overload, or any impairment that causes the buffer reserve to be below a predetermined level (such as minimum buffer level or Δt described above), there is a risk that the playing may be disturbed due to lack of data to play in the coming period. In such a case, the system may abort the use of any former allocation scheme results, and may revert to using a high performance or high reliability source, such as initiating the use of the most expensive source or the best performance available source from the sources list 119. In general, various allocation schemes may be combined before or during playing, and different schemes may be used at different times. For example, a scheme may include both backward and forwards allocations, in addition to using and allocating checking parts for evaluating sources performance, and allocating a first part to the most expensive source.

Figure 15:
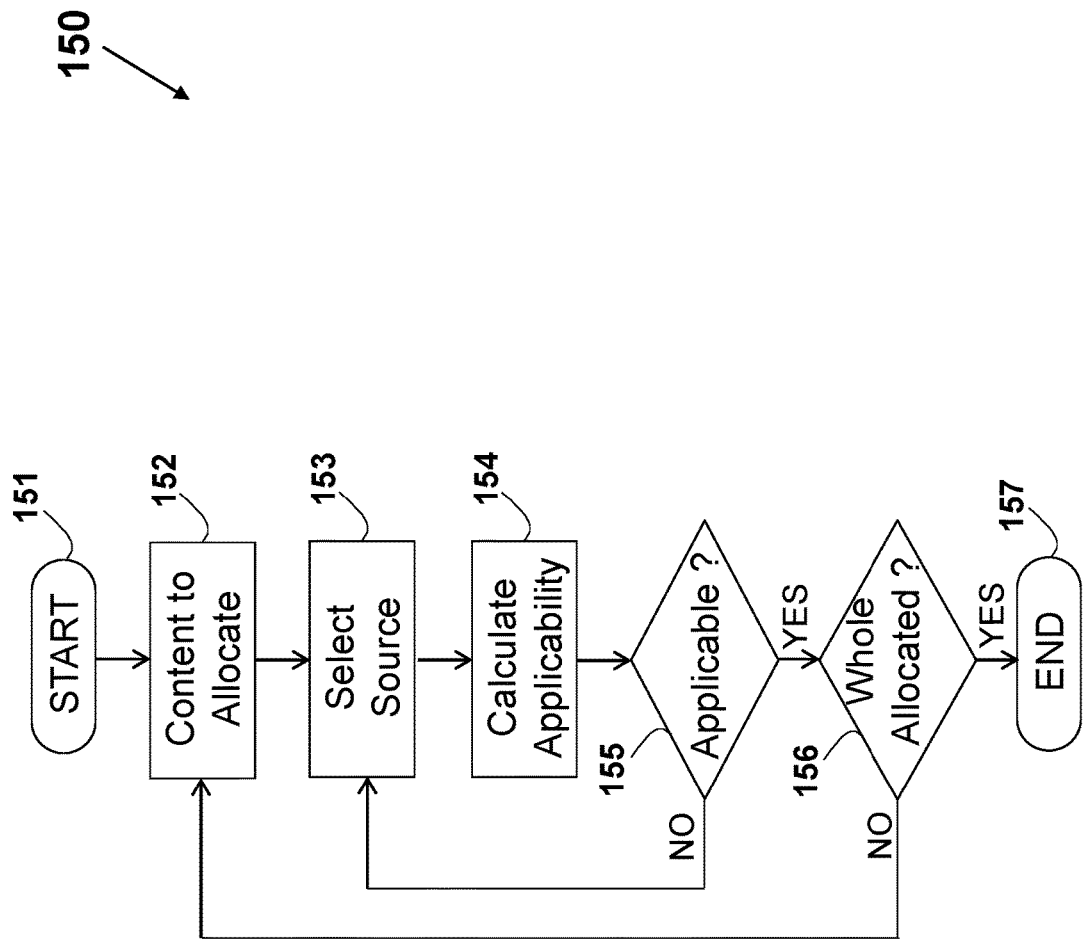
FIG. 15 illustrates schematically a simplified flow-chart of a method relating to a partitioning of content based on sources delivery performance.

A general allocation method is described as a flow chart 150 shown in FIG. 15. The method may be initiated at a "START" step 151, which may be performed before the content streaming or playing starts, or during the content playing. At a "Content to Allocate" step 152, it is determined which part of the content is to be allocated. In one example, the whole content is required to be allocated, for example before playing start, as described regarding the backward allocation scheme 140 shown in FIG. 14. Alternatively or in addition, only a portion of the whole content, such as the content 110, is selected to participate in the allocation scheme, such as only a first portion (e.g., the first 30% or 40%) or a last portion (e.g., the last 20% or 30%). Then, as part of a "Select Source" step 153 a source is selected from the available sources, such as the sources list 119, according to a pre-set criteria.

A random selection may be used, or the selection may make use of the attributes and characteristics of the available sources. For example, the cheapest to use source may be selected, the source having the highest BW, the source associated with the minimum RTT, or any combination thereof. However, the selected source may not be applicable for use, such as a source having a too low BW, so that content delivery may not be reliable enough or even be used. Hence, at a "Calculate Applicability" step 154, various calculations are made to check the applicability, such as calculating 'Wain' or 'tmax' time points, as explained above regarding allocation scheme 140 in FIG. 14. The applicability, based on pre-set criteria, is determined in an "Applicable?" step 155, where a selected source that is determined not to be applicable is dropped as a candidate, and a new source is selected in the "Select Source" step 153. In the case the selected source selected the "Select Source" step 153 is found legitimate for use, it is assigned to an appropriate part of the content. In case the whole content selected for allocation in the "Content to Allocate" step 152 is assigned by appropriate sources, as checked in a "Whole Allocated?" step 156, the process ends in an "END" step 157. However, in a case where there is a non-allocated portion of the selected content, the non-allocated part is selected for allocation, and the process is repeated starting at the "Content to Allocate" step 152. Hence, the method provides for partitioning part or whole of the content, and assigning sources to the various parts.

Figure 12:
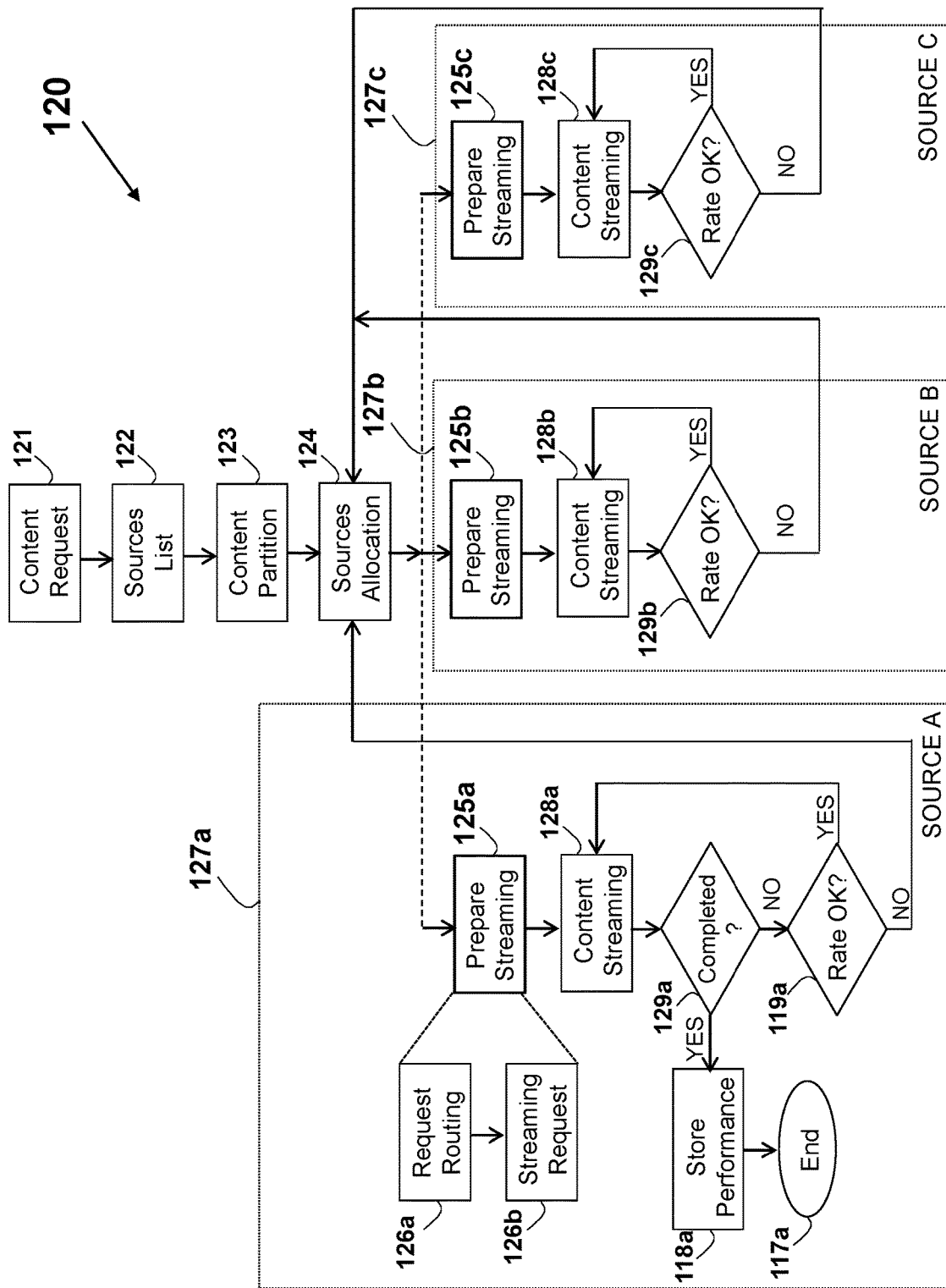
FIG. 12 illustrates schematically a simplified flow-chart of a method relating to a media streaming from multiple sources.

An example of the system operation is described in a flow chart 120 shown in FIG. 12. In a "Content Request" step 121 (which may correspond to the message 91*a* shown in the arrangement 100 in FIG. 10), the client device #1 24 sends a request for a content, such as a video file or a movie, to the VOD server 48, which returns an available sources list, such as sources list 119, to the client device #1 24 as part of a "Sources List" step 122 (which may correspond to the message 91*b* shown in the arrangement 100 in FIG. 10). The client device #1 24 may partition the content into parts as part of a "Content Partition" step 123, and assigns sources to the parts as part of a "Sources Allocation" step 124. For example, the client device may use the flow chart 150 shown in FIG. 15 for the partitioning of the content and for the sources assigning, and may use backward allocation, forward allocation, or any other partitioning, assigning, or allocation schemes. In the example shown in the flow chart 120, 3 distinct sources are used, labeled as a source A, source B, and source C. For example, the source A may correspond to the replica server #4 42*d* in arrangement 100, the source B may correspond to the replica server #1 42*a* in arrangement 100, and the source B may correspond to the server #5 42*e* in arrangement 100. While exampled regarding 3 sources, any number of sources, such as 1, 2, 4, 5, 6, 7, 8, 9, 10, 15, or 20 may equally be applied. A flow chart 127*a*, which is part of the flow chart 120, describes the operation involving source A, a flow chart 127*b*, which is part of the flow chart 120, describes the operation involving source B, and a flow chart 127*c*, which is part of the flow chart 120, describes the operation involving source C. The flow charts (such as the flow charts 127*a*, 127*b*, and 127*c*) associated with the different sources may be identical, similar, or different from each other. Further, the interaction with the various sources may be sequentially performed, or preferably in parallel. A distinct buffer is associated with each source, serving to store the allocated received data from the source and to provide the required content part when required by the media player.

The flow chart 127*a* describes the interaction with source A, and starts with a "Prepare Streaming" step 125*a*. In this step, the activities required for starting receiving data from the source A are performed, and may include a "Request Routing" step 126*a*, that may include part of, or the whole of, the corresponding "Request Routing" step 62 and "Identify Replica Server" step 63 described as part of the flow chart 60 in FIG. 6. It is noted that is the case where an independent server is used as the source A, no Request-Routing for resolving replica server identity is required to be performed since the server identity is known. Upon resolving a server identity as the source A, a streaming request is sent by the client device #1 24 to the server as part of a "Streaming Request" step 126*b*, that may include part of, or the whole of, the corresponding "Streaming Request" step 64 described as part of the flow chart 60 in FIG. 6, and may corresponds with the message 91*e* shown in arrangement 100. The resolved server, being the replica server 42*d* in this example, the server 42*d* starts the streaming of data to the client device #1 24 as part of a "Content Streaming" step 128*a*, that may include part of, or the whole of, the corresponding "Content Streaming" step 65 described as part of the flow chart 60 in FIG. 6, and may corresponds with the message 91*f* shown in arrangement 100. As long as the content part assigned to source A (as part of the "Sources Allocation" step 124) is not fully received, as checked by a "Completed?" step 129*a*, the source A continues to stream the data as part of the "Content Streaming" step 128*a*.

Any request sent by the client device #1 24 for part of, or the whole of, the content, such as a part of the "Content Request" step 121 or the "Streaming Request" step 126*b*, for example for a content in a MPEG-4 format file, may be in a form of a URL having a format of "SERVER_NAME.CDN_OPERATOR.com/FILM_NAME/IDENTIFIER.mp4 (preceded by http://). The SERVER_NAME typically relates to a CDN Manager server 43 identification, or to any other server (such as a proxy server) used to handle requests from this client device (for example, based on the relevant server location), the CDN_OPERATOR may be the CDN operator or provider name, the FILM_NAME/IDENTIFIER.mp4 is identifying the directory and file name of content itself (typically as stored in the origin server 41), such as a specific movie, and may further include identifying the specific part of the file. For example, the URL may be cdn84.akamai.com/film1/74589.mp4, where the CDN operator is Akamai, the server or CDN to use is identified as cdn84, and the movie is a file located in a directory named film1/74589.mp4.

A content part fetched from a server device, may consist of, or include, video data, such as a movie. Video data fetched via the Internet are typically identified by a set of characters, including three fields, relating to a URL domain name, a specific video identifier, and offset, relating to the viewing point in the video data itself. For example, in a video identifier such as https://www.youtube.com/watch?v=9mSb3P7cZIE?ST=1:48, the field 'https://www.youtube.com' is the URL domain, which identify the server from which the video can be fetched, the part '9mSb3P7cZIE' identifies the video data (such as a movie) as a whole, and the offset '1:48' part in the video starting point, in this example after 1 minute and 48 seconds after the video start point. The offset may be presented (as part of the video identifier) in time using another format such as #T=3M54S (denoting starting point after 3 minutes and 54 seconds) is bytes (such as B=10344, denoting a starting point after 10344 bytes), relative offset (such as in %, such as R=54.3, denoting that the starting point is after 54.3% of the total video length, such as byte 543 out of 1000 bytes sized video content), and various other methods. In the case the content to be fetched is a video data, while the video content may be located in other network elements, it may be identified differently than the requested URL or content identifier, and as such may not be easily fetched. In one example, in order to form a common method for identification of a video-related URL, the offset is detected (e.g., by the '/' symbol, or by the identifying the offset format, or both), and the URL is stored (such as in a cache) identified as the domain name and the video data identifier only, where the offset is stored as additional separate attribute. In one example, the offset presentation is normalized to a common format, which is understood by all of the network elements.

Further, a content size or length information may be used for unifying the form of the video identifier. For example, a unified scheme may include relating offset, so a video file that start at byte 345 out of 1000 total bytes, will be identified as 34.5% (345/1000), and a video file that starts after 1 minute 30 second (1:30) out of a total of 10 minutes, will be identified as 15%. Similarly, files that do not end at the video end, may also be accordingly identified. For example, a video file that starts after 2 minutes and ends after 7 minutes will be identified as 20-70%. In such a unified scheme, a network element may store (such as in a cache), or request, parts of a video file by using the common identification scheme. For example, a network element that stores the range from 1 minute to 22 minutes out of a video file, may respond to a request asking for the range of minute 15 to minute 17.

The actual rate of the data streamed from the source A is monitored, analyzed, and measured by the client device #1 24 as part of a "Rate OK?" step 119a. As long as the actual measured or estimated rate is above a defined threshold, for example, within a margin of +/−10% or 20% from the initial calculation, the source A may be considered as legitimate and available, and the streaming may continue as part of the "Content Streaming" step 128a. However, the average rate, or the fluctuations of the data rate, may exceed a pre-defined threshold. In one example, the buffer associated with the source A is monitored to ensure a sufficient reserve or a minimum buffer level, for example, a data sufficient for the next minimum defined playing time. In the case the requirement for such a minimum level (or the equivalent minimum playing time reserve) is not met, suggesting that the source A is not providing the data at the planned or required rate), the system reverts to the "Sources Allocation" step 124, for assigning an alternative source to the content part that is now played or soon to be played, preferably having much higher BW and much faster RTT, in order to allow for continuous and reliable playing of the media, to ensure uninterrupted service and user satisfaction. Alternatively or in addition, the actual measured BW checked in the "Rate OK?" step 119a is compared to the corresponding assumed BW, and a threshold based on a pre-set margin is set. For example, a margin of 10%, 25%, 30%, 40%, or 50% may be used, relating to a respective threshold of 90%, 75%, 70%, 60%, or 50% of the BW received as part of the sources list, such as the sources list 119.

In the example of source #1 111a having an assumed BW of 20 Mb/s, and assuming a margin of 10%, 25%, 30%, 40%, or 50%, the respective corresponding threshold may be 18, 15, 14, 12, or 10 Mb/s. In the case the measured BW of a source is below the pre-set threshold, the client device #1 24 may continue to use this source, assuming that the BW is sufficient for the allocated content part. Alternatively or in addition, the client device #1 24 may terminate the communication with this under-performing, and revert to select an alternative source (or sources) for part or whole of the corresponding content part. Further, information about the discrepancy between the BW list value of associated source and its actual performance may be sent to the VOD Service server 48, to the performance server 171, to the appropriate CDN Manager server associated with this source (such as the CDN Manager Server 43 in case of the Replica Server #1 42a), or to all of them.

The tasks relating to the data sourcing from the different sources A, B and C, such as in the respective flow-charts 127a, 127b, and 127c, may be executed sequentially or preferably in parallel, such as by using multitasking or multiprocessing.

The actual streaming rate, as well as the RTT and any other attributes relating to the source A performance, may be measured during the data streaming, for later use by the system. In one example, the performance of the source A is stored as part of a "Store Performance" step 118a, which may be executed after the whole content part is received from the source A. Alternatively or in addition, the performance data may be measured and stored continuously during the streaming process, and in particular if the rate associated with the source A is under performing as checked in the "Rate OK?" step 119a. The performance related data may be stored, as part of the "Store Performance" step 118a in the client device #1 24, or in any other device communicating with the client device #1 24. Upon completing the streaming of the allocated part of the content, as checked by the "Completed?" step 129a, the source A is disconnected and the streaming is ended as part of an "End" step 117a.

The handling of streaming and monitoring relating to source B is described in flow chart 127b, and the handling of streaming and monitoring relating to source c is described in flow chart 127c, respectively including a "Prepare Streaming" step 125b and a "Prepare Streaming" step 125c (corresponding to the "Prepare Streaming" step 125a of the flow-chart 127a), a "Content Streaming" step 128b and a "Content Streaming" step 128c (corresponding to the "Content Streaming" step 128a of the flow-chart 127a), and a "Rate OK?" step 129b and a "Rate OK?" step 129c (corresponding to the "Rate OK?" step 129a of the flow-chart 127a). Similarly, the flow charts relating to the source B 127b and to the source C 127c may include performance data storing as described relating to the "Store Performance" step 118a of the flow-chart 127a.

Figure 13:
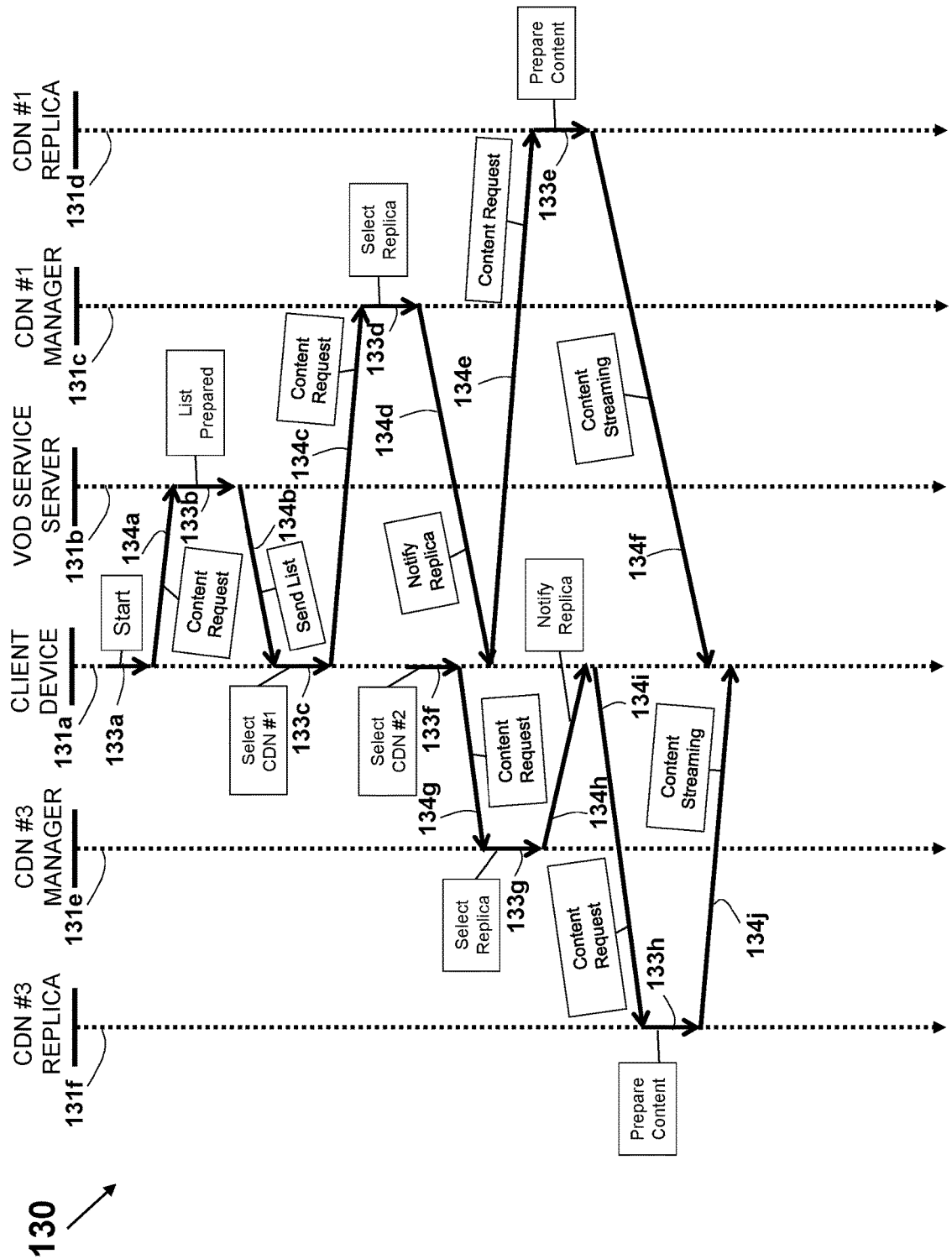
FIG. 13 illustrates schematically a timing chart of messages and states associated with media streaming over the Internet from multiple CDNs.

An example of the system operation is further described in a states and messaging timing chart 130 shown in FIG. 13, describing the operation of a client device (such as the client device #1 24) shown as a vertical dashed line 131a, a VOD service server (such as the VOD Service Server 48) shown as a vertical dashed line 131b, using a first CDN labeled as CDN #1 employing a CDN #1 Manager (such as the CDN #1 45a employing a CDN Manager Server 43) shown as a vertical dashed line 131c and a CDN #1 replica server (such as the replica server #1 42a) shown as a vertical dashed line 131d, and further using a second CDN labeled as CDN #3 (such as CDN #3 45c) employing a CDN #3 Manager shown as a vertical dashed line 131e and a CDN #3 replica server (such as the replica server #4 42d) shown as a vertical dashed line 131f. As the operation starts, the client device is in a "Start" state 133a, when the content to be loaded is determined, such as by a user, followed by sending a message "Content Request" 134a to the VOD service server 131b, which may correspond to the message "Content Request" 94a as part of the timing chart 90 and to the "Content Request" step 121 in the flow-chart 120. In response, the VOD service server 131b prepares a list of suggested available sources, such as the sources list 119, as part of a "List Prepared" state 133b, followed by sending the list in a "Send List" message 134b to the content requesting client device 131a, which may correspond to the "Sources List" step 122 in flow chart 120.

The client device 131a may partition the required content into multiple parts, and may assign selected sources to the various content part, such as based on the expected performance (e.g., BW, RTT), or cost associated with the available sources. For example, a CDN such as CDN #1 may be selected and assigned to provide one of the parts of the content as part of a "Select CDN #1" state 133c. A Request-Routing scheme (which may correspond to the "Request Routing" step 126a in the flow-chart 120) is then performed in order to resolve and identify the replica server 131d, for example an HTTP-Redirect based scheme, which may include a "Content Request" message 134c to the CDN #1 manager, which selects a replica server 131d as part of a "Select Replica" state 133d, and sends the identification of the selected replica server to use (such as CDN #1 replica 131d in the example) as a "Notify Replica" message 134d to the client device, respectively corresponding to the "Content Request" message 94c, the "HTTP Redirect" state 93d, and the "Notify Replica" message 94d in the timing chart 90. A request for streaming is then sent to resolved replica server 131d as part of a "Content Request" message 134e (corresponding to the "Content Request" message 94e of the timing chart 90 and to the "Streaming Request" step 126b in the flow-chart 120), followed by the CDN #1 replica server 131d preparing the content to be streamed as part of a "Prepare Content" state 133e corresponding to the "Prepare Content" message 93e of the timing chart 90), followed by the content part streaming as part of a "Content Streaming" message 134f (corresponding to the "Content Streaming" message 94f of the timing chart 90 and to the "Content Streaming" step 128a in the flow-chart 120. In parallel to (or after) the Request-Routing scheme and the data streaming from the CDN #1, the client device 131a may perform a Request-Routing scheme and a data streaming from one or more other CDNs, such as the CDN #3. The Request-Routing relating to CDN #3 may be similar to CDN #1 and may involve (identical or similar to CDN #1 handling) a "Select CDN #2" state 133f, followed by a "Content Request" message 134g, a "Select Replica" state 133g where CDN #3 replica 131f is selected by the CDN #3 manager 131e, and a "Notify Replica" message 134h. After resolving the replica server 131f to use, a streaming process is initiated (may be identical or similar to CDN #1 handling) starting with a "Content Request" message 134i, followed by a "Prepare Content" state 133h, and streaming as part of a "Content Streaming" message 134j. While the timing chart 130 was exampled using two sources (two CDNs—CDN #1 and CDN #3), any number of CDNs may equally be used.

Figure 13A:
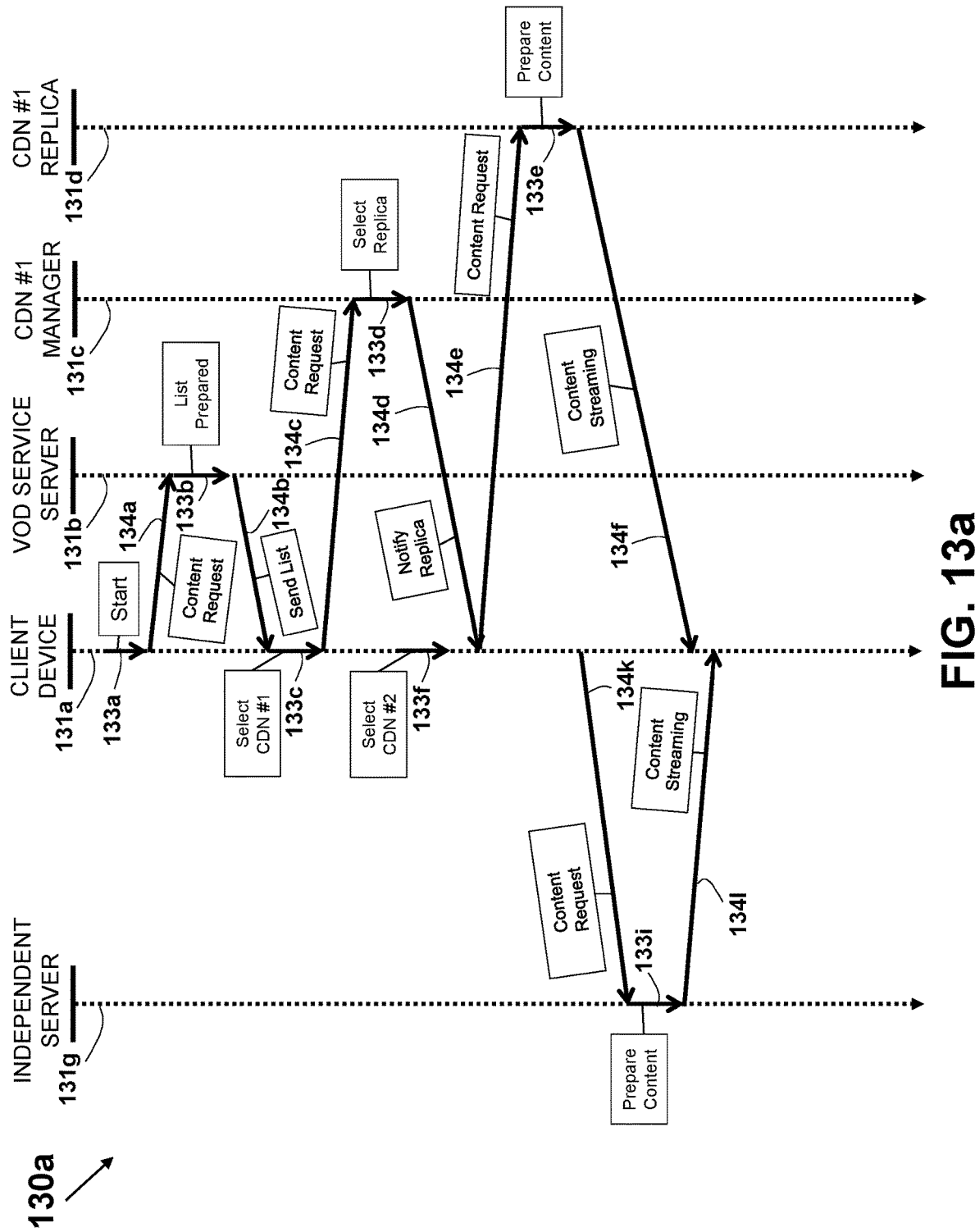
FIG. 13a illustrates schematically a timing chart of messages and states associated with media streaming over the Internet from a CDN and an independent server.

While the timing chart 130 was exampled using only CDNs, independent servers or any servers that are not part of any CDN may be equally used. A timing chart 130a in FIG. 13a illustrates an example of using a CDN (such as CDN #1 45a) in parallel to using an independent server, such as the server #5 42e. The interaction with CDN #3 is shown replaced with an independent server (such as the server #5 42e) shown as a vertical dashed line 131g. In such a case no Request-Routing mechanism is required, and upon selecting the server 131g for delivery of a content part, a "Content Request" message 134k is sent by the client device 131a, followed by preparing the content in a "Prepare Content" state 133i, and then streaming the content from the independent server 131g to the client device 131a as part of a "Content Streaming" message 134l. Similarly, multiple independent servers may be used in parallel to each other and in parallel with any number of CDNs.

The selection of sources to be used in the streaming process, or the allocation scheme used, may be based on the sources data delivery performance characteristics. In particular, the selection or the usage of the sources may be based on their total RTT or their BW (or both). The total RTT is measured from the client device point-of-view, and may be associated with the overhead before a content streaming starts, such as the time interval starting with the client device requesting a content from a server, until the streaming is actually initiated, such as when the first packet or byte of the actual content is received, and may include the server RTT via the Internet. In case of using a replica source as part of a CDN, the total RTT includes the time required for performing a Request-Routing scheme for resolving the replica server identification, and the time required to access the resolved replica server until the streaming is actually initiated, such as when the first packet or byte of the actual content is received. The RTT column 112d of the sources list 119 may refer to a server RTT, such as where an independent server is used as a source (e.g., source #4 111d), or may refer to a total RTT that includes the Request-Routing time interval in a case of using a CDN.

The latency relating to receiving a specified amount of data (labeled X) is typically based on both the total RTT and the BW, such as RTT+X/BW. For example, in a case of loading a content of 1 MB (=8 Mbits) from source #6 111f in the sources list 119, the expected latency may be calculated as (80 ms+8/30 seconds=) 346.67 ms, while using source 1 111a results in an expected latency of (20 ms+8/20 seconds=) 420 ms.

Figure 18:
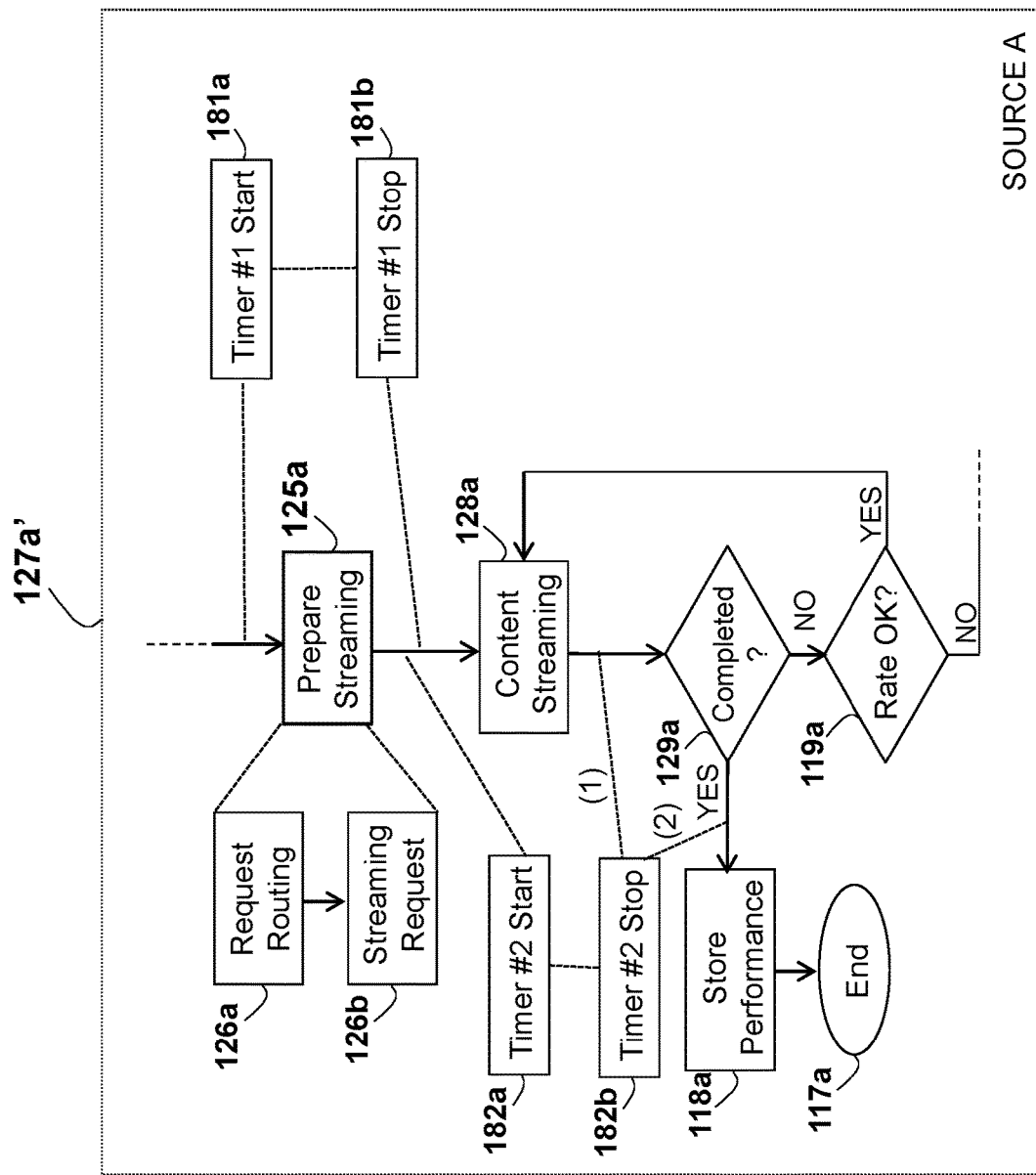
FIG. 18 illustrates schematically a simplified flow-chart of a method relating to measurement of sources delivery performance.

The sources associated content delivery performance (and associated costs) may be known or estimated before the content delivery start, such as based on performance history, and may be available to a content requesting client device (such as the client device #1 24) as part of the sources list (such as the sources list 119) obtained from the VOD Service Server 48 as described above. However, this performance data may not be updated, and may further be subject to performance fluctuations such as servers overload, excessive Internet traffic, and many other impairments. Preferably, a client device may monitor, measure, and estimate the sources actual delivery performance for updated use during the data streaming, such as described regarding the "Rate OK?" step 119a, or for later use. Measuring timing parameters of an exemplary source A is shown in a flow-chart 127a' shown in FIG. 18, corresponding to the flow-chart 127a described as a part of the flow chart 120 in FIG. 12. The actual total RTT is measured using a timer #1, which starts the time measuring upon identifying the source A as a potential source to be used, and just before the "Prepare Streaming" step 125a as part of a "Timer #1 Start" step 181a, and the time counting ends upon the "Content Streaming" step 128a, as part of a "Timer #1 Stop" step 181b. A second timer (timer #2) may be used for measuring the BW, by sizing the content received from a source (such as the source A in the example), and dividing the received data size by the elapsed streaming time for fetching this data. The timer #2 starts upon the "Content Streaming" step 128a, as a part of a "Timer #2 Start" step 182a. The timer #2 may end as a part of a "Timer #2 Stop" step 182b upon receiving any size of data, such as at any stage during the data streaming, noted by dashed line (1). Alternatively or in addition, the timer #2 may end upon completion of the receiving of the whole allocated part, noted by dashed line (2), allowing for the calculation of the average BW for this content part.

Any timer for measuring time intervals may be used to implement the timer #1 and the timer #2. The timer may be hardware based, which is typically a digital counter that either increment or decrement at a fixed frequency, which is often configurable, and which interrupts the processor when reaching zero, or alternatively a counter with a sufficiently large word size that it will not reach its counter limit before the end of life of the system. Alternatively or in addition, a software based timer may be used, for example, implemented by the processor 12, typically as a service of the operating system. Alternatively or in addition, the RTT may be measured according to, or based on, the RTT measuring scheme described in U.S. Pat. No. 8,489,724 to Ghosh entitled: "CNAME-Based Round-Trip Time Measurement in a Content Delivery Network", which is incorporated in its entirety for all purposes as if fully set forth herein. A measuring of performance characteristics using scripting and monitoring servers performance may be based on, or may use, a part or all of the teachings in U.S. Pat. No. 6,912,572 to Fischer entitled: "Server Monitoring", which is incorporated in its entirety for all purposes as if fully set forth herein.

Figure 18A:
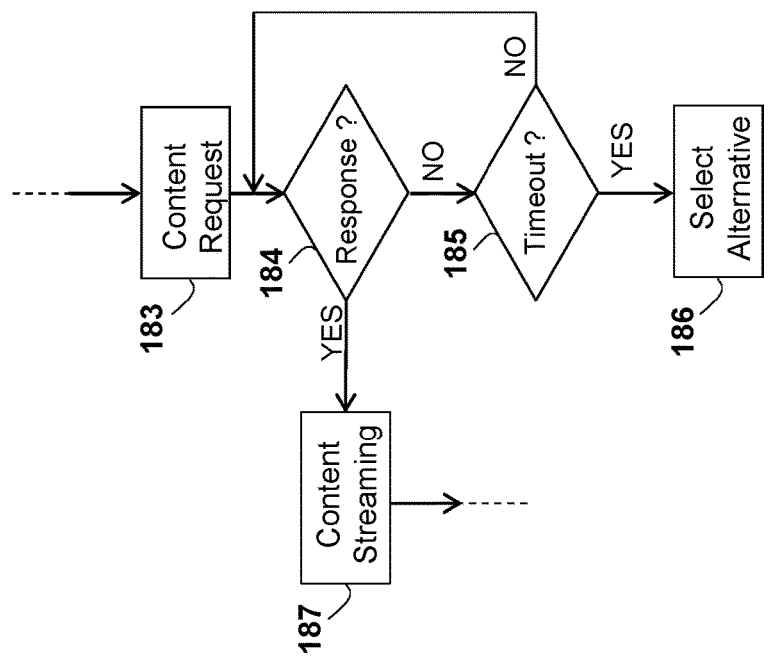
FIG. 18a illustrates schematically a part of a simplified flow-chart of a method relating to timing a server response to a content request.

In one example, a server is the sources list 119 may not be available for streaming content when requested, such as due to a failure, scheduled or unscheduled maintenance, communication problems, or any other problems associated with the capability of the server to provide the content to the client device #1 24. In such a case, the system operation may be 'frozen' or 'stuck' while trying to retrieve the content (or even any response) from the problematic server, harmfully affecting the allocation scheme, the server usage planning, or degrading the ability for continuous reliable content playing on the media player. In one example, the actual RTT is measured as part of any access to a server by the client device #1 24, as described in a flow chart 180 in FIG. 18a. A "Content Request" step 183 may correspond to any request sent by the client device #1 24 to any server, such as a request that is part of a request-routing scheme such as the "Request Routing" step 126a that corresponds to the message "Content Request" 134c in the timing diagram 130. Alternatively or in addition, the "Content Request" step 183 may correspond to any request sent by the client device #1 24 to a resolved replica server (such as the replica server #1 42a), such as part of the "Streaming Request" step 126b that may correspond to the "Content Request" message 134e in the timing chart 130, as well as to an independent server (such as server #5 42e) as part of the "Content Request" message 134k in the timing chart 130a.

In the case a response is received from the requested server, the response from the server is used, and the system proceeds as described herein, in order to stream or otherwise obtain the content from the appropriately selected source or server. Such an example is shown as a positive reply for a "Response?" step 184, that is followed by a "Content Streaming" step 187, that may correspond with the "Content Streaming" step 128a, (that may be corresponding to the "Content Streaming" message 134f in the timing chart 130). A pre-set time interval threshold is set, in order to detect a case of non-operative server as a source. As long as the time period of waiting for a response is not exceeded as checked by a "Timeout?" step 185, the system continues to wait for a proper reply from the accessed server. In the case a timeout is detected by exceeding the pre-set time period, the non-responsive server is declared as non-available source, and an alternative source is selected for use as part of a "Select Alternative" step 186. The timeout threshold may be based on the RTT associated with the used server, such as by setting a margin of 10%, 25%, 30%, 40%, or 50% of the RTT in the sources list 119. For example, a margin of 10%, 25%, 30%, 40%, or 50% may be used, relating to a respective threshold of 110%, 125%, 130%, 1400%, or 150% of the RTT (in the column 112e) received as part of the sources list, such as the sources list 119. In the example of source #5 111e having an assumed RTT of 200 ms, and assuming a margin of 10%, 25%, 30%, 40%, or 50%, the respective corresponding RTT threshold may be 220, 240, 260, 280, or 300 ms. Alternatively or in addition, the timeout threshold may set as a value (not relating to any former RTT assumption or measurement) such as a fixed value of 200, 500, 700, or 1000 ms.

Figure 16:
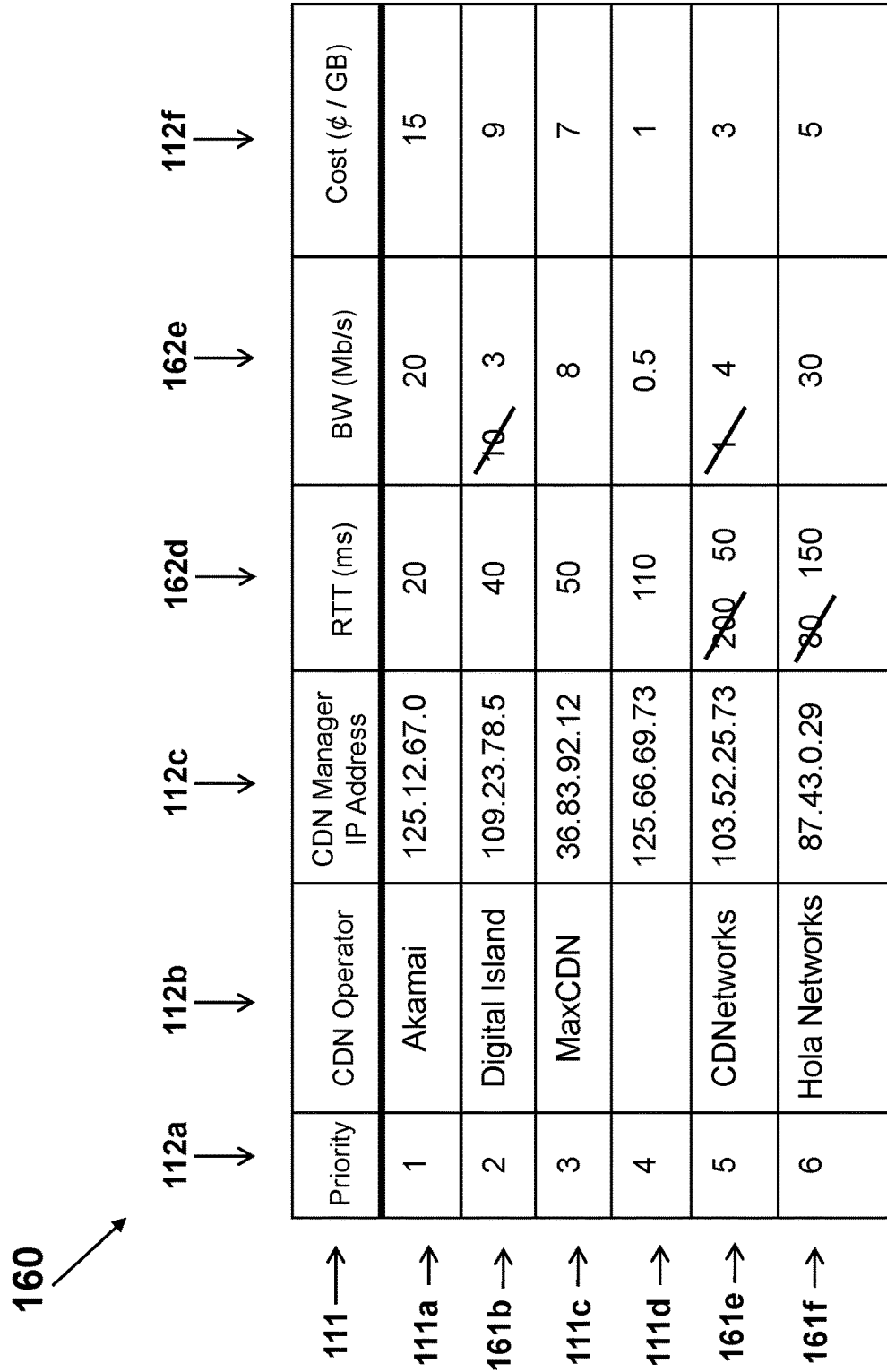
FIG. 16 illustrates schematically a table of available sources for media streaming, including updated sources delivery performance.

The measured performance values of the total RTT 112d and the BW 112e associated with the various sources may be used for updating the sources list 110. An updated sources list 160 is shown in FIG. 16, including an updated total RTT column 162d and an updated BW column 162e (respectively replacing the former RTT column 112d and the former BW column 112e). The source #2 161b updated performance (replacing the former source #2 111b values) is shown to include an updated BW of 3 Mb/s instead of the former 10 Mb/s value (shown as strike-through), the source #5 161e updated performance (replacing the former source #5 111e values) is shown to include an updated BW of 4 Mb/s instead of the former 1 Mb/s value (shown as strike-through) and an updated RTT of 50 ms instead of the former 200 ms value (shown as strike-through), and the source #6 161f updated performance (replacing the former source #6 111f values) is shown to include an updated RTT of 150 ms instead of the former 80 ms value (shown as strike-through). The performance data may be associated with a CDN, as shown in the sources list 160. Alternatively or in addition, the performance data may be associated with the specific replica server used by the CDNs. For example, in the case the replica server #3 42a of CDN #1 45a is resolved and used, the performance data may be stored associated with the CDN #1 45a, with the specific server used, namely the replica server #1 42a, or with both.

In one example, the updated sources delivery performance, as shown in the updated sources list 160, is locally stored at the client device (such as the client device #1 24)

and for future use. In such a case, upon receiving a sources list as part of the "Sources List" step 122 from the VOD Service Server 48, the client device uses the formerly stored performance data rather than the performance data received from the VOD Service Server 48. Alternatively, the VOD Service Server 48 may submit a list of only the available or recommended sources without any performance related information (e.g., only the columns 112a, 112b, 112c, and 112f), and the performance related data is obtained from the client device own storage, based on formerly stored information as part of the "Store Performance" step 118a.

Figure 17:
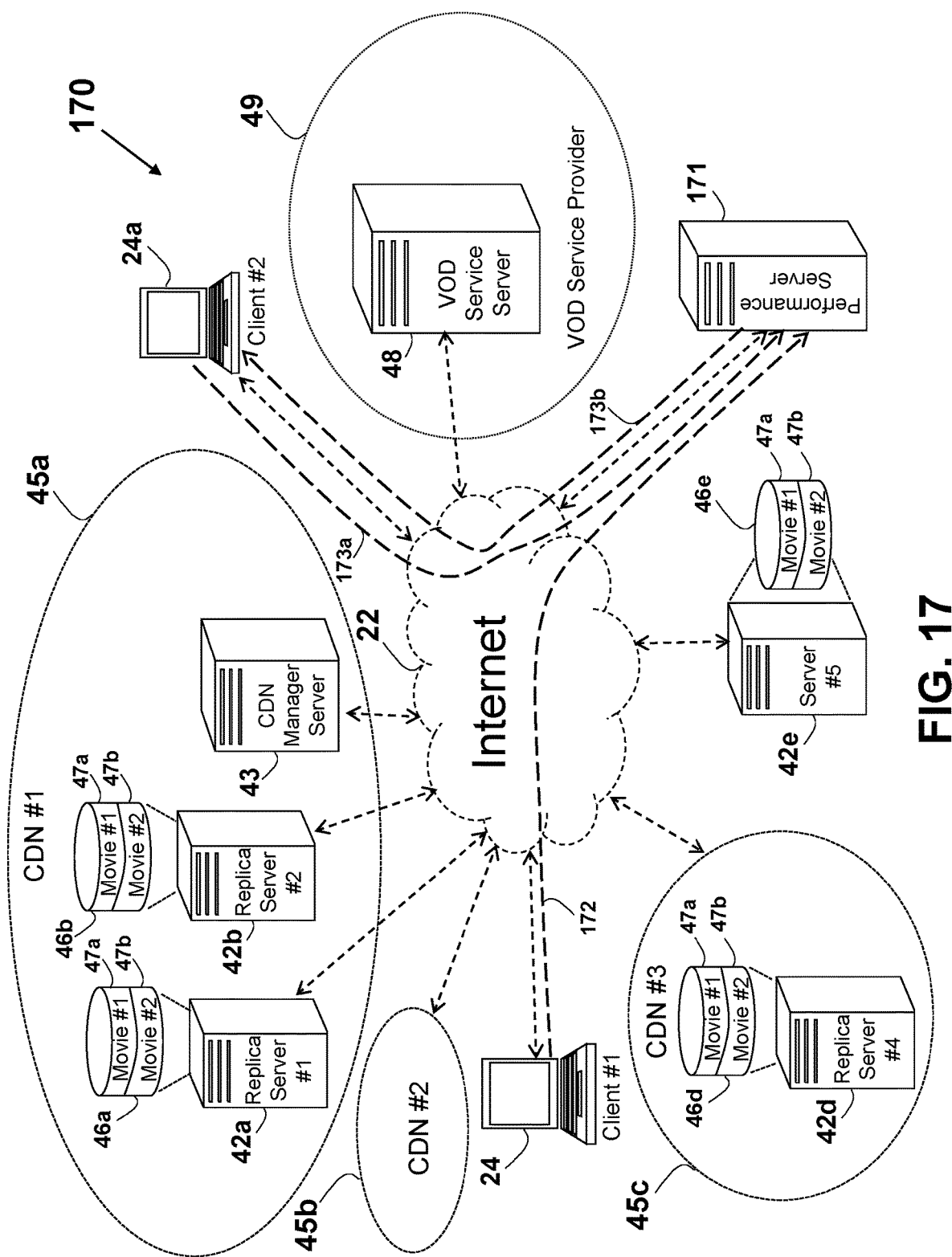
FIG. 17 depicts schematically messages exchanged over the Internet between client devices and a performance server.

Preferably, the updated performance data gathered by one client device should be available for use by other client devices. An example of an additional client, such as a client device #2 24a, is shown connected to the Internet 22 in an arrangement 170 shown in FIG. 17. The client device #2 24a may request content from the same VOD Service Provider 49, may request the same content (such as the movie #1 47a), or may wish to use the same CDNs (such as the CDN #1 45a), the same replica servers (such as the Replica Server #4 42d), or the same independent servers (such as the server #5 42e), used formerly by the client device #1 24. In such a case, a shared location may be preferably used for exchanging updated delivery performance. In one example, a performance server 171 may be used as a shared location for storing and providing updated delivery performance data.

In the arrangement 170, as part of the "Store Performance" step 118a, alternatively or in addition to local storing within the client device #1 24, the client device #1 24 sends the updated performance data, such as the updated sources list 160, to the performance server 171 to be stored thereof, shown as a message 172 in the arrangement 170. The performance server 171 thus collects the updated data from the client devices, and this performance data may be accessed by any client device, anytime. For example, upon request by the client device #2 24a for a content as part of the "Content Request" step 121 and after receiving a sources list as part of the "Sources List" step 122, the client device #2 24a sends a request for the updated performance of the available or recommended sources, shown as a message 173a, and in response the performance server 171 returns. shown as a message 173b, an updated performance values, such as total RTT and BW, for the requested sources, to be used (initially or throughout the process) by the client device #2 24a as part of the selecting sources and allocation scheme, for example as part of the "Content Partition" step 123 and the "Sources Allocation" step 124.

In one example, the performance server 171 may be a dedicated server, mainly used for the functionalities such as receiving, storing, analyzing, and providing upon request the performance data (such as total RTT or BW) associated with CDNs and servers. Alternatively or in addition, the performance server 171 (part or whole) functionalities may be integrated with any other server device, or with any other device communicating with the client devices, such as over the Internet. For example, the performance server 171 functionalities (in part of in whole) may be integrated with the VOD service server 48, so that upon providing a sources list 119 to a client device, the performance data associated with each source is updated based on data received from client devices that actually received content from these sources. Alternatively or in addition, a part of, or the whole of, the performance server 171 functionalities may be integrated with a CDN manager server, such as the CDN manager server 43 of CDN #1 45a. Similarly, part of, or the whole of, the performance server 171 functionalities may be integrated with an independent server (such as the server #5 42e) or with a replica server, such as the replica server #2 42b).

Each interaction or communication of a client device with a source or a server may be logged for future reference. The involved sources may include independent servers, replica servers, and CDNs (for example, identified by name or by a CDN manager server identifier). The logged interactions may include successful interactions, such as complete loading or streaming of an allocated content part from the source or server, attempts to use or communicate with a source or server, or a case where a source (or server) was selected and then disqualified (or de-selected) as a content source (such as due to a measured RTT exceeding a specified time interval or a BW that is below a pre-set rate). The information regarding an interaction with a source or server may be locally logged in the client device (such as the client device #1 24). Alternatively or in addition, the information regarding an interaction may be sent to be stored in a database in the VOD Service Server 48, in the performance server 171, or in both. Further, the relevant information may be transmitted to, and stored in, an appropriate CDN Manager Server (such as the CDN Manager server 43), in particular regarding replica servers associated with, managed by, or part of, the respective CDN (such as to the CDN #1 45a regarding the Replica Server #2 42b).

Information regarding an interaction with a source or server may be obtained, logged, or sent soon after the receiving, or soon after the beginning of the streaming, of data or content, from the respective source or server. In the example shown in the arrangement 113a for a source (or server) allocated to the content part E 110e, the information regarding the interaction may be collected, locally logged, or sent to another server (such as the performance server 171 as described by the message 172 in the arrangement 170) shortly after the streaming start at t=0. For example, the information may be collected during a pre-set time period, such as 100 ms, 300 ms, or 500 ms after loading start at t=0, and then locally or remotely logged. Alternatively or in addition, the information may be sent after a pre-set amount of content was actually received, such as 1 MB, 50 MB, or 100 MB. In such a case, the collected information may include a BW value based on the time period in which the pre-set amount of content was obtained. Alternatively or in addition, the information regarding the interaction may be collected, locally logged, or sent to another server (such as the performance server 171) shortly after the allocated content part was fully received at the client device. Alternatively or in addition, the information regarding the interaction may be collected, locally logged, or sent to another server (such as the performance server 171) shortly after the corresponding content part starts playing, such as shortly after the time point t=tmin 115a in the example of the content part E 110e shown in the arrangement 113a. For example, the information may be collected during a pre-set time period, such as 100 ms, 300 ms, or 500 ms after playing start at the time point t=tmin 115a, and then locally or remotely logged.

Alternatively or in addition, the information may be sent after a pre-set amount of content was actually played, such as 1 MB, 50 MB, or 100 MB of content, or alternatively after a pre-set playing time, such as 0.5, 1, 5, or 10 seconds. Alternatively or in addition, the information regarding the interaction may be collected, locally logged, or sent to another server (such as the performance server 171) shortly after the corresponding content part ends playing, such as shortly after the time point t=tmax 115b in the example of the content part E 110e shown in arrangement 113a. Alternatively or in addition, the information regarding all of the interactions with all the relevant servers (or sources) may be collected, locally logged, or sent to another server (such as the performance server 171) shortly after the whole content parts are received in full, or after the whole content is played, such as shortly after the time point t=tmax 115b in the example shown in arrangement 113a. Alternatively or in addition, the information regarding all of the interactions with all the relevant servers (or sources) may be collected, locally logged, or sent to another server (such as the performance server 171) shortly after the media player has stopped the content playing, either due to a user request, due to a media player problem, or when the user in the existing web page is involved in playing the content.

In the case where the information about an interaction is sent after the corresponding content part has been received in full, the related BW value may be calculated based on the time period in which the whole content part was actually obtained. In the case an interaction is not successful, such as when the RTT exceeds a pre-set value as determined in the "Timeout?" step 185, or when the BW is measured to be below a pre-set rate as determined in the "Rate OK?" step 119a, the information regarding such failed interaction may be sent immediately after the determination was made, or at a later stage such as upon the whole content parts are received in full, or after the whole content is played, as described above.

In one example, a client device sends the information about the interactions with the sources and servers to a server, such as the performance server 171, which logs and stores the information as part of a database stored in a memory on the server (or controlled or accessed by the server). The database may use a relational database system that may be Structured Query Language (SQL) based. The database may include a table 190 shown in FIG. 19, where each row represents an entry corresponding to an information regarding an interaction between a client device and a source (or a server), and the top row 191 shows the titles of each column in the table. The table 190 is exampled as having six entries: A first row 191a, a second row 191b, a third row 191c, a fourth row 191d, a fifth row 191e, and a sixth row 191f, each representing an entry including information about a specific interaction between a related client device and a related server.

A first column 'Date-Time' 192a describe the time relating to the interaction with the source or server, and may include the time of the first communication with the source (or server), the time of the start of the streaming of content from the source, or the time of ending the communication session with the source. Alternatively or in addition, the entry may include the time of receipt of the information in the server. The related entry time is exampled in the table 190 in a MM/DD-HH:MM format (MM—Month in the year, DD—Day of the month, HH—Hour of the day, and MM—Minutes after the hour). Any other timing format may equally be used, such as adding the year or seconds, or using a standard representation that may be according to, compatible with, or based on, the ISO 8601 or the IETF RFC 3339 standards. For example, the first interaction related information is shown in the first row 191a shows that the interaction was completed (or started) at March 7$^{th}$, on 19:35. Similarly, the second transaction information is detailed in the second row 191b and shows that the interaction was completed (or started) on March 7$^{th}$, at 19:38, and the third interaction information is in the third row 191c shows that the interaction was completed (or started) at May 14$^{th}$, on 00:05. The timing stored for any table 190 entry in the column 192a may be the local time of the client device, which is identified in a 'Client IP Address' column 192b, may be the local time of the source, for example the actual server source, which IP address is identified in a 'Resolved IP Address' column 192g, or may be the local time of the performance server 171 storing the database such as the table 190. Preferably, the stored timing information may be converted to be stored using the same time zone, or converted to a standard time, such as the Coordinated Universal Time (UTC).

The second column 'Client IP Address' 192b relates to an identification of the client device that was involved in the interaction and includes an identifier, such as an IP address of the client device. For example, the first interaction related information (shown in the first row 191a) and the second interaction related information (shown in the second row 191b), both involved a client device having an IP of 67.95.16.7, while the third interaction related information (shown in the third row 191c), the fourth interaction related information (shown in the fourth row 191d), and the fifth interaction related information (shown in the fifth row 191d) are all associated with a client device having an IP of 99.29.45.12. Alternatively or in addition, other client device identifiers may equally be used.

A third column 'Location' 192c relates to the physical location of the associated client device defined in the column 192b. For example, the city, state (where applicable) and country are described in the table 190 such as, the client device having IP address of 67.95.16.7 which is involved in the two interactions detailed in the first row 191a and the second row 191b, is physically located in Boston, Massachusetts (MA), U.S.A., while the client device having IP address of 99.29.45.12 which is involved in the three interactions detailed in the third row 191c, fourth row 191d, and the fifth row 191e, is physically located in Sidney, Australia, and the client device having IP address of 32.48.4.13 which is involved in the interaction detailed in the sixth row 191f is physically located in London, United-Kingdom (UK).

While exampled regarding city and state/country, the physical geographical location may include a country, region (such as state, province, or county), city, street address, postal/zip code, latitude, longitude, timezone, or any combination thereof. The physical location may be obtained from the client device, such as by input from the user (e.g., by using the input device 18), or by using its built-in Global Positioning System (GPS), which typically provides the latitude, longitude, and timezone of the client device location. Alternatively or in addition, the client device physical location may be estimated or determined using IP-based geolocation, either by the client device or by any involved server, such as the performance server 171. In the case the physical location is determined by the client device, it is included in the information regarding the interaction sent to be stored in the database.

A fourth column 'Content' 192d identifies the content that the client device received (or attempted to receive) from the source (or server) in the respective interaction. For example, the content may be a file or part of a file, such as a video file or a movie. In the table 190, the two interactions detailed in the first row 191a and the second row 191b involves a movie #1 (that may correspond to the movie #1 47a), the three interactions detailed in the third row 191c, fourth row 191d, and the fifth row 191e may be associated with a movie #2 (that may correspond to the movie #2 47b), and the sixth interaction detailed in the sixth row 191f may be associated with a third movie #3. For example, the content identifier may be a URL or a file name. In the case the content is a file, the entry for an interaction may further include an identification of the part of the content that was involved in the transaction, as described herein.

A fifth column 'CDN Operator' 192e and a sixth column 'CDN Manager IP Address' 192f, are used to identify the CDN source of the content defined in the 'Content' column 192d, and may respectively correspond to the 'CDN Operator' column 112b, the 'CDN Manager IP Address' column 112c of the sources list 119. The seventh column 'resolved IP Address' 192g details the replica server that actually stores the content and that was actually used, after a proper Request-Routing scheme. In the case where the source is based on a CDN (such as the CDN #1 45a or the CDN #3 45c), the CDN operator name or another identifier is detailed in the column 'Content' 192d (such as Akamai for the first entry 191a, Digital Island for the second entry 191b, and MaxCDN for the third row 191c). Further, the IP of a CDN manager server is detailed in the 'CDN Manager IP Address' column 192f (such as the CDN #1 Manager Server 43), and the replica server, typically obtained by a Request-Routing scheme, is shown in the 'Resolved IP Address' column 192g (such as the replica server #1 42a or the replica server #4 42d). In the example shown in the table 190, the second row 191b involves a CDN operator named 'Digital Island', having a CDN manager identified by an IP address 109.23.78.5, and the IP address of the resolved replica server that was used is 50.5.93.5, the fifth row 191e involves a CDN operator named 'CDNetworks', having a CDN manager identified by an IP address 103.52.25.73, and the IP address of the resolved replica server that was used is 37.52.52.63, and the sixth row 191f involves a CDN operator named 'Hola Networks', having a CDN manager identified by an IP address 87.43.0.29, and the IP address of the resolved replica server that was used is 29.0.85.46. In the case where the source is an independent server, such as the server #5 42e, only this server is identified as part of the record, such as shown for the fourth entry 191d, describing only a server (without any related CDN information) having an IP address of 125.66.69.73.

In some occasions, an attempt to retrieve information from a source or server may be unsuccessful. For example, the response from the source (due to failure to complete Request-Routing scheme, excessive RTT, or non-functioning server) may not arrive within a pre-set time interval, such as detected in the "Timeout?" step 185. Similarly, the receiving or streaming rate may be found to be too low or under a set threshold, and thus the source may not be reliably used for retrieving the content (detailed in the column 'Content' 192d) or any part thereof, as described regarding the "Rate OK?" step 119 above. Such failure to properly use, or a failed attempt to properly load from the source part or all of the data allocated to it, may be recorded as part of the database 190 in a 'Pass/Fail' column 192h. As exampled in the table 190, an attempt to use the defined source for the fifth row 191e was not successful, noted by a 'Fail' value, while all other interactions were successfully deployed.

A ninth column 'RTT (ms) 192i and a tenth column 'BW (Mb/s) 192j, which may correspond to the 'RTT (ms)' column 112d and the 'BW (Mb/s)' column 112e, are used to log the actual communication performance with the server defined in the 'Resolved IP Address' column 192g. For example, the first entry 191a records an actual RTT of 20 ms and a BW of 20 Mb/s, the fourth entry 191d records an actual RTT of 110 ms and a BW of 0.5 Mb/s, while the sixth entry 191f records an actual RTT of 80 ms and a BW of 30 Mb/s. An eleventh column 'Cost (¢/GB)' 192k may correspond to the 'Cost (¢/GB)' column 112f of the sources list 119, referring to the cost per GB delivered by the server identified in the 'Resolved IP Address' column 192g.

As described in the flow chart 120 above, in response to the "Content Request" step 121, the client device #1 24 obtains a list of available sources that may be used as part of the "Sources List" step 122, and then assign the sources in the "Sources Allocation" step 124 to the various content parts formed after the partition the content in the "Content Partition" step 123. A flow chart 193 in FIG. 19a may be used as an alternative or an addition to the first step of the flow chart 120. In one alternative, designated as an option #1, the sources list is obtained by the client device (such as the client device #1 24) from the VOD service server, such as the server 48, in a "VOD Server Sources List" step 196, which may be based on, or may consists of, the "Sources List" step 122 described herein. An arrangement 195 in FIG. 19b, as well as the arrangement 100 shown in FIG. 10 above illustrates the list request dashed line 91a, followed by the response by sending the list from the VOD Service Server 48 shown as the dashed line 91b. Alternatively or in addition, shown as an option #2 in the flow chart 193, the request for sources list is directed to the performance server 171 for inquiry that is based on the database 190, as part of a "Performance Server Sources List" step 197. Such scheme is described as the list request dashed line 194b, followed by the response by sending the list from the performance server 171 shown as the dashed line 194a. For example, if the requested content from the client device is the movie #1, two sources are available, detailed in the first entry 191a and the second entry 191b Similarly, if the requested content from the client device is the movie #2, three sources are available, detailed in the third entry 191a, the fourth entry 191d, and the fifth entry 191e.

In an option #3, both the VOD Service Server and the performance server are used for obtaining a list of potential or available sources for content. First, a sources list is obtained from the VOD service server as part of the "VOD Server Sources List" step 196 (similar to the option #1), and then the list is sent (by the client device or by the VOD Service Server) to the performance server as part of a "Performance Server Database Update" step 199. For example, the available sources may be listed by the VOD Service Server, but the associated performance characteristics of these servers are obtained from the database 190 stored in, or with, the performance server 171, enabling to associate actual and updated performance values to the sources and servers in the list.

In time, the database (such as the database 190) at the performance server 171 accumulates multiple entries from a large number of client devices, which may be used to statistically characterize, and provide relevant data values, regarding the performance of the various sources. For example, hundreds or thousands of entries may be logged in the database. Such statistics may be used in order to enable a client device, or a VOD provider to select optimally the sources to be used for streaming or retrieving specific content in a specific scenario.

The analysis of the performance characteristics of a source may be based on the raw data or the history, such as based on statistics of previous performance, and may be time-based. For example, only entries received or executed during a specified time interval may be accounted for. The history of transactions, as detailed in the table 190, may be used to estimate the source performance characteristics in an upcoming transaction relating to content loading from that source. Such performance estimation may be used as a criterion, or as one of the criteria, for prioritization, or for selecting a source for a specific content to be streamed to a specific client device at a specific time, as described regarding to table 119 above.

All the entries relating to a source in the database (such as the database 190) may be used for calculating the estimated performance. Alternatively or in addition, one or more criteria are used to ensure that only relevant entries relating to the source past performance are used, in order to obtain better or more accurate estimation. The entries that do not satisfy one or more criteria, may be deleted from the table 190, or may be associated with a lower priority to use. In one example, timing is accounted for, where 'old' or non-recent values are either ignored or less weighted in the performance estimation. For example, only a defined number of the last or recent measurements of values may be used, based on the time of the transaction as detailed in the associated entry 'Date-Time' value in the 'Date-Time' column 192a. For example, even when the table 190 includes N1 entries regarding a source, only the last N entries (N≤N1) are selected for the performance estimation. For example, the table 190 may include 200 entries (N1=200) for a source, yet only the last 70 entries (N=70) may be selected for the calculation of the estimated performance. Alternatively or in addition, a time/date threshold may be defined or set, and only entries associated with 'Date-Time' value after that threshold may be used for the RTT estimation, while entries before that threshold are ignored. For example, a time/date threshold may be set to 5/14-00:06 (of a specific year) in the table 190 shown in FIG. 19. In such a case, the first three entries relating to first three rows 191a, 191b, and 191c, are not used in any calculation being dated before 5/14-00:06 (of the specific year), while the last three entries relating to last three rows 191d, 191e, and 191f, are used in any calculation being dated after 5/14-00:06 (of the specific year). For example, the time/date threshold may be calculated based on a time interval before the calculation or the time of expected or estimated usage of the source, such as 1, 2, 3, 5, 10, 12, 15, 20, 25, 30, 50, or 100 seconds before the expected usage time, 1, 2, 3, 5, 10, 12, 15, 20, 25, 30, 50, or 100 minutes before the expected usage time, 1, 2, 3, 5, 10, 12, 15, 20, 25, 30, 50, or 100 hours before the expected usage time, or 1, 2, 3, 5, 10, 12, 15, 20, 25, 30, 50, or 100 days before the expected usage time.

Once a server is selected as a source for streaming content therefrom, such as in the "Sources Allocation" step 124 shown as part of the flow chart 120, and the selected source fails to provide the content properly, the streaming may be aborted from that source, requiring shifting to another and probably more expensive server, and may cause a break in the content displaying to the user, hence degrading the user experience. The 'Pass/Fail' column 192h in the table 190 may be used in order to avoid using, or to reduce the priority of using these problematic sources. In one example, for each source the number of the total 'Pass' values may be compared to the total number of entries in the database is calculated, and used in order to calculate a success-rate that qualifies the sources. For example, a source relating to 100 entries in the database 190, out of which 7 transactions failed as identified by a 'Fail' value in the "Pass/Fail" column 192h (such as in the fifth entry 191e), is associated with a success rate of 93%. A minimum threshold value may be defined or set, and sources having a success rate below such minimum threshold, may be deleted from the database 190, may be not used as candidates for selection, or may be associated with a lower priority to select for use. For example, the minimum threshold value may be defined as 85%, 90%, 93%, 95%, or 97%.

In one example, the former measured RTT of a source may be used to estimate the RTT (denoted as ESTIMATED_RTT) relating to streaming a specific content to a specific client device at a specific time. For example, assuming that there are N past RTTs that were measured, reported, and stored in the 'RTT' column 192i in the database 190, and are designated as $RTT_i$ (1≤i≤N). For example, the value of N may be 2, 3, 5, 10, 12, 15, 20, 30, 50, 70, or 100. The estimated RTT (ESTIMATED_RTT) may be equal to, or may be based on, the mean (average) value associated with part RTTs, calculated as:

$$\text{ESTIMATED\_RTT} = \text{MEAN}(RTT) = \text{Average}(RTT) = \overline{RTT} = \mu RTT = \sum_{i=1}^{N} \frac{RTTi}{N}$$

In addition to using a source average RTT result, the steadiness and repetitiveness of a source performance may also be important for estimation future performance. For example, a source associated with steady and repetitive RTT performance of 20-22 ms, is more likely to provide such performance in the future, while a source having a performance average of 21 ms, but associated with values ranging from 10 to 50 ms, can be less trusted for actual future performance. As such, alternatively or in addition, to the average calculation, the steadiness and repeatability of a source may be also taken into account, and the RTT estimation may be based on, or use, the standard deviation of the RTTs, that may be calculated as:

$$DEV(RTT) = \sigma RTT = \sqrt{\frac{1}{N}\sum_{i=1}^{N}(RTTi - \overline{RTT})^2}$$

A source that exhibits high value of standard deviation may be disqualified or associated with a lower priority (such as in the priority column 112a in the table 119) from being selected as a potential source of a transaction as being non-consistent and exhibiting substantially varying performance that may not be guaranteed or relied upon for future operations. In one example, a deviation threshold may be set or defined, such as 1, 2, 5, 10, 12, 15, 20, 25, 30, or 50 ms, and a source having a deviation above the defined or set threshold, may be disqualified from being selected as a potential source or may be associated with a lower priority (such as in the priority column 112a in the table 119). Alternatively or in addition, the ESTIMATED_RTT value may also be calculated based on the RTT deviation DEV (RTT). For example, the ESTIMATED_RTT may be calculated as ESTIMATED_RTT=MEAN (RTT)+DEV(RTT). Assuming the RTTi values are normally distributed, such estimated RTT value represent 68.27% of the RTT population, thus may be used to ensure that the expected RTT will be lower that the estimated one in 68.27% of the cases. Similarly, the ESTIMATED_RTT may be calculated as ESTIMATED_RTT=MEAN (RTT)+2*DEV(RTT) representing 95.45% of the measured RTT population, or may be calculated as ESTIMATED_RTT=MEAN (RTT)+3*DEV (RTT) representing 99.73% of the measured RTT population (assuming normal distribution).

All the entries relating to a source in the database (such as the database 190) may be used for calculating the estimated RTT (ESTIMATED_RTT). Alternatively or in addition, one or more criteria are used to ensure that only relevant entries relating to the source past performance are used, in order to obtain better or more accurate estimation. In one example, timing is accounted for, where 'old' or non-recent RTT values are either ignored or less weighted in the RTT estimation. For example, only a defined number of the last or recent measurements of RTTs may be used, based on the time of the transaction as detailed in the associated entry 'Date-Time' value in the 'Date-Time' column 192*a*. For example, even when the table 190 includes N1 entries regarding a source, only the last N entries (N≤N1) are selected for the RTT estimation. For example, the table 190 may include 100 entries (N1=100) for a source, yet only the last 50 entries (N=50) may be selected for the calculation of the estimated RTT. Alternatively or in addition, a time/date threshold may be defined or set, and only entries associated with 'Date-Time' value after that threshold may be used for the RTT estimation, while entries before that threshold are ignored. For example using the table 190 shown in FIG. 19, a time/date threshold may be set to 5/14-00:06 (of a specific year). In such a case, the first three entries relating to first three rows 191*a*, 191*b*, and 191*c*, are not used in any calculation being dated before 5/14-00:06 (of the specific year), while the last three entries relating to last three rows 191*d*, 191*e*, and 191*f*, are used in any calculation being dated after 5/14-00:06 (of the specific year). For example, the time/date threshold may be calculated based on a time interval before the calculation or the time of expected or estimated usage of the source, such as 1, 2, 3, 5, 10, 12, 15, 20, 25, 30, 50, or 100 seconds before the expected usage time, 1, 2, 3, 5, 10, 12, 15, 20, 25, 30, 50, or 100 minutes before the expected usage time, 1, 2, 3, 5, 10, 12, 15, 20, 25, 30, 50, or 100 hours before the expected usage time, or 1, 2, 3, 5, 10, 12, 15, 20, 25, 30, 50, or 100 days before the expected usage time.

While exampled above where all past RTT values equally affect the estimated RTT calculation, it may be assumed that recent values are more accurate or current, or otherwise are better suited to be applied to the RTT estimation than older values. For example, a source or a server may be upgraded or improved by its owner or operator. In one example, a weighted arithmetic mean (average) may be used for calculating the RTT estimation. A weighting factor $w_i$ may be associated with each $RTT_i$ value: in the example of 4 RTTi values, a weight value $w_1$ is associated with $RTT_1$ (the 'oldest' entry), a weight value $w_2$ is associated with $RTT_2$, a weight value $w_3$ is associated with $RTT_3$, and a weight value $w_4$ is associated with $RTT_4$ (the 'newest'-most recent entry). Using a weighted arithmetic mean, the estimated RTT (ESTIMATED_RTT) may be calculated as a weighted average according to:

$$\text{ESTIMATED\_RTT} = \frac{w1*RTT1 + w2*RTT2 + W3*RTT3 + w4*RTT4}{w1 + w2 + W3 + w4}$$

In the general case where a total of N RTT values is used to calculate the estimated RTT, it may be calculated as:

$$\text{ESTIMATED\_RTT} = \frac{\sum_{i=1}^{N} w(i)*RTT(i)}{\sum_{i=1}^{N} w(i)}$$

Alternatively or in addition, the estimated RTT value may be calculated using weighted geometric mean, whereby the ESTIMATED_RTT value may be equal to, or is based on, the expression:

$$\left(\prod_{i=1}^{N} RTT(i)^{W(i)}\right)^{\frac{1}{\sum_{i=1}^{N} W(i)}}.$$

Alternatively or in addition the estimated RTT value may be calculated using weighted harmonic mean, whereby the multi-image numerical value may be equal to, or is based on, the expression:

$$\frac{\sum_{i=1}^{N} W(i)}{\sum_{i=1}^{N} \frac{W(i)}{RTT(i)}}.$$

Assuming sample #1 relating to $RTT_1$ relates to the oldest entry, and that the entries are sequentially numbered so that sample #N relating to $RTT_N$ is the most recent entry in the table 190, then typically $w_1 \leq w_2 \leq \ldots \leq w_N$, so that recent entries weights more than older ones. For example, the weights may be inversely proportional to the time interval, from the entry time and the calculation time.

Alternatively or in addition, to using the entry timing information for estimating RTT, a geographical location of a source relative to a client device may be also be used. It may be assumed that a source may exhibit the same or similar performance for clients located in close proximity, such as in the same city. In the example of the first entry 191*a* in table the 190, the performance relating to communication with another client device that is also located in the same city: Boston, MA, U.S.A., is expected to be similar or the same, such as RTT of 20 ms. Hence, upon estimating the performance of a source with regard to a specific client device, the distance from this client device to former locations of client devices as detailed in the related entries, such as in the 'Location' column 192*c* in the table 190, may be used for the RTT estimation relating to the specific client device. Such a distance may be calculated or estimated by using geolocation, or any other method.

In one example, all the entries relating to a source in the database (such as the database 190) may be used for calculating the estimated RTT (ESTIMATED_RTT), either by using simple or weighted average as described above, regardless of the location of the client device of that entry. Alternatively or in addition, one or more distance criteria are used to ensure that only relevant entries relating to the source past performance are used, in order to obtain better or more accurate estimation. In one example, the geographical distance is accounted for, where 'distant' client locations related RTT values are either ignored or less weighted in the RTT estimation. For example, only entries that relate to client devices that are in the same country, region, city, postal/zip code, latitude, longitude, or Timezone of the client device associated with the RTT estimation. Alternatively or in addition, a distance value threshold may be defined or set, and only entries associated with client device location within the defined distance threshold may be used for the RTT estimation, while entries having a larger distance are ignored. For example using the table 190 shown in FIG. 19, assuming the RTT for a client device located in San-Jose, California, U.S.A., and setting a distance threshold of 5,000

Km (Kilometer), only the first two entries 191a and 191b, associated with Boston, MA, U.S.A. are in range and may be used, while the distance associated with other entries is above the threshold and thus these entries may not be used. In the case the distance threshold is increased to 9,000 Km (Kilometer), the London, UK location is also included in the range, and thus the related entry 191f may be used as well. For example, the distance threshold may be 10, 20, 30, 50, 100, 120, 150, 200, 250, 300, 500, or 1,000 Km, or may be defined to be set to 1,000, 1,200, 1,300, 2,000, 2,500, 3,000, or 5,000 Km.

All past RTT values may equally affect the estimated RTT calculation, assuming that the entries associated with locations that are geographically close to the client device for which the RTT is to be estimated, are more accurate or current, or otherwise are better suited to apply to the RTT estimation than distant locations values. In one example, a weighted arithmetic mean (average) may be used for calculating the RTT estimation. A weighted mean such as weighted arithmetic mean, weighted geometric mean, or weighted harmonic mean may be used, and a weighting factor $w_i$ may be associated with each $RTT_i$ value based on the location, where close locations are associated with higher weighting factor, while distant locations are associated with lower weighting factor.

Alternatively or in addition, the former measured BW of a source may be used to estimate the BW (denoted as ESTIMATED_BW) relating to streaming a specific content to a specific client device at a specific time. For example, assuming that there are N past BWs that were measured, reported, and stored in the 'BW' column 192j in the database 190, and are designated as $BW_i$ ($1 \leq i \leq N$). For example, the value of N may be 2, 3, 5, 10, 12, 15, 20, 30, 50, 70, or 100. The estimated BW (ESTIMATED_BW) may be equal to, or may be based on, the mean (average) value associated with part BWs, calculated as:

$$\text{ESTIMATED\_BW} = \text{MEAN}(BW) = \text{Average}(BW) = \overline{BW} = \mu BW = \sum_{i=1}^{N} \frac{BWi}{N}$$

In addition to using a source average BW result, the steadiness and repetitiveness of a source performance may also be important for estimation future performance. For example, a source associated with steady and repetitive BW performance in an 8-10 Mb/s range, is more likely to provide such performance in the future, while a source having a performance average of 9 Mb/s, but associated with values ranging from 1 to 50 Mb/s, can be less trusted for actual future performance. As such, alternatively or in addition to the average calculation, the steadiness and repeatability of a source may be also taken into account, and the BW estimation may be based on, or use, the standard deviation of the BWs, that may be calculated as:

$$DEV(BW) = \sigma BW = \sqrt{\frac{1}{N}\sum_{i=1}^{N}(BWi - \overline{BW})^2}$$

A source that exhibit high value of standard deviation may be disqualified or associated with a lower priority (such as in the priority column 112a in the table 119) from being selected as a potential source of a transaction as being non-consistent, and exhibiting substantially varying performance that may not be guaranteed or relied upon for future operations. In one example, a deviation threshold may be set or defined, such as 0.1, 0.2, 0.5, 1, 1.2, 1.5, 2, 2.5, 3, or 5 Mb/s, and a source having a deviation above the defined or set threshold, may be disqualified from being selected as a potential source or may be associated with a lower priority (such as in the priority column 112a in the table 119). Alternatively or in addition, the ESTIMATED_BW value may be calculated also based on the BW deviation DEV (BW). For example, the ESTIMATED_BW may be calculated as ESTIMATED_BW=MEAN (BW)+DEV(BW). Assuming the BWi values are normally distributed, such estimated BW value represents 68.27% of the BW population, thus may be used to ensure that the expected BW will be lower than the estimated one in 68.27% of the cases. Similarly, the ESTIMATED_BW may be calculated as ESTIMATED_BW=MEAN (BW)+2*DEV(BW) representing 95.45% of the measured BW population, or may be calculated as ESTIMATED_BW=MEAN (BW)+3*DEV (BW) representing 99.73% of the measured BW population (assuming normal distribution).

All the entries relating to a source in the database (such as the database 190) may be used for calculating the estimated BW (ESTIMATED_BW). Alternatively or in addition, one or more criteria may be used to ensure that only relevant entries relating to the source past performance are used, in order to obtain better or more accurate estimation. In one example, timing is accounted for, where 'old' or non-recent BW values are either ignored, or less weighted in the BW estimation. For example, only a defined number of the last or recent measurements of BWs may be used, based on the time of the transaction as detailed in the associated entry 'Date-Time' value in the 'Date-Time' column 192a. For example, even when the table 190 includes N1 entries regarding a source, only the last N entries (N≤N1) are selected for the BW estimation. For example, the table 190 may include 100 entries (N1=100) for a source, yet only the last 50 entries (N=50) may be selected for the calculation of the estimated BW.

Alternatively or in addition, a time/date threshold may be defined or set, and only entries associated with 'Date-Time' value after that threshold may be used for the BW estimation, while entries before that threshold are ignored. For example, using the table 190 shown in FIG. 19, a time/date threshold may be set to 5/14-00:06 (of a specific year). In such a case, the first three entries relating to first three rows 191a, 191b, and 191c, are not used in any calculation being dated before 5/14-00:06 (of the specific year), while the last three entries relating to last three rows 191d, 191e, and 191f, are used in any calculation being dated after 5/14-00:06 (of the specific year). For example, the time/date threshold may be calculated based on a time interval preceding the calculation or the time of expected or estimated usage of the source, such as 1, 2, 3, 5, 10, 12, 15, 20, 25, 30, 50, or 100 seconds before the expected usage time, 1, 2, 3, 5, 10, 12, 15, 20, 25, 30, 50, or 100 minutes before the expected usage time, 1, 2, 3, 5, 10, 12, 15, 20, 25, 30, 50, or 100 hours before the expected usage time, or 1, 2, 3, 5, 10, 12, 15, 20, 25, 30, 50, or 100 days before the expected usage time.

While the examples above, where all past BW values equally affect the estimated BW calculation, it may be assumed that recent values are more accurate or current, or otherwise are better suited to apply to the BW estimation than older values. For example, a source or a server may be upgraded or improved by its owner or operator. In one example, a weighted arithmetic mean (average) may be used for calculating the BW estimation. A weighting factor $w_i$ may be associated with each $BW_i$ value: in the example of 4 BWi values, a weight value $w_1$ is associated with $BW_1$ (the 'oldest' entry), a weight value $w_2$ is associated with $BW_2$, a weight value $w_3$ is associated with $BW_3$, and a weight value $w_4$ is associated with $BW_4$ (the 'newest'—most recent entry). Using a weighted arithmetic mean the estimated BW (ESTIMATED_BW) may be calculated as a weighted average according to:

$$\text{ESTIMATED\_BW} = \frac{w1*BW1 + w2*BW2 + W3*BW3 + w4*BW4}{w1+w2+W3+w4}$$

In the general case where a total of N BW values is used to calculate the estimated BW, it may be calculated as:

$$\text{ESTIMATED\_BW} = \frac{\sum_{i=1}^{N} w(i)*BW(i)}{\sum_{i=1}^{N} w(i)}$$

Alternatively or in addition, the estimated BW value may be calculated using weighted geometric mean, whereby the ESTIMATED_BW value may be equal to, or is based on, the expression:

$$\left( \prod_{i=1}^{N} BW(i)^{W(i)} \right)^{\frac{1}{\sum_{i=1}^{N} W(i)}}.$$

Alternatively or in addition, the estimated BW value may be calculated using weighted harmonic mean, whereby the multi-image numerical value may be equal to, or is based on, the expression:

$$\frac{\sum_{i=1}^{N} W(i)}{\sum_{i=1}^{N} \frac{W(i)}{BW(i)}}.$$

Assuming sample #1 relating to $BW_1$ relates to the oldest entry, and that the entries are sequentially numbered so that sample #N relating to $BW_N$ is the most recent entry in the table 190, then typically $w_1 \leq w_2 \leq \ldots \leq w_N$, so that recent entries weights more than the older ones. For example, the weights may be inversely proportional to the time interval from the entry time and the calculation time.

Alternatively or in addition, to using the entries timing information for estimating BW, a geographical location of a source relative to a client device may be also used. It may be assumed that a source may exhibit the same or similar performance for clients located in close proximity, such as in the same city. In the example of the first entry 191a in table the 190, the performance relating to communication with another client device that is also located in the same city: Boston, MA, U.S.A., is expected to be similar or the same, such as BW of 20 Mb/s. Hence, upon estimating the performance of a source with regard to a specific client device, the distance from this client device to former locations of client devices as detailed in the related entries, such as in the 'Location' column 192c in the table 190, may be used for the BW estimation relating to the specific client device. Such a distance may be calculated or estimated using geolocation or any other method.

In one example, all the entries relating to a source in the database (such as the database 190) may be used for calculating the estimated BW (ESTIMATED_BW), either by using simple or weighted average as described above, regardless of the location of the client device of that entry. Alternatively or in addition, one or more distance criteria are used to ensure that only relevant entries relating to the source past performance are used, in order to obtain better or more accurate estimation. In one example, the geographical distance is accounted for, where 'distant' client locations related BW values are either ignored or less weighted in the BW estimation. For example, only entries that relate to client devices that are in the same country, region, city, postal/zip code, latitude, longitude, or Timezone of the client device associated with the BW estimation. Alternatively or in addition, a distance value threshold may be defined or set, and only entries associated with client device location within the defined distance threshold may be used for the BW estimation, while entries having a larger distance are ignored. For example using the table 190 shown in FIG. 19, assuming the BW for a client device located in San-Jose, California, U.S.A., and setting a distance threshold of 5,000 Km (Kilometer), only the first two entries 191a and 191b, associated with Boston, MA, U.S.A. are in range and may be used, while the distance associated with other entries is above the threshold and thus these entries may not be used. In the case the distance threshold is increased to 9,000 Km (Kilometer), the London, UK location is also included in the range, and thus the related entry 191f may be used as well. For example, the distance threshold may be 10, 20, 30, 50, 100, 120, 150, 200, 250, 300, 500, or 1,000 Km, or may be defined to be set to 1,000, 1,200, 1,300, 2,000, 2,500, 3,000, or 5,000 Km.

All the past BW values may equally affect the estimated BW calculation. It may be assumed that entries associated with locations that are geographically close to the client device for which the BW is to be estimated, are more accurate or current, or otherwise are better suited to apply to the BW estimation than the values of distant locations values. In one example, a weighted arithmetic mean (average) may be used for calculating the BW estimation. A weighted mean such as weighted arithmetic mean, weighted geometric mean, or weighted harmonic mean may be used, and a weighting factor $w_i$ may be associated with each $BW_i$ value based on the location, where close locations are associated with higher weighting factor, while distant locations are associated with lower weighting factor.

According to various available statistics, content is not consumed evenly throughout a day, but there are peak hours for content consuming, typically 19.00-24.00. Commonly, content servers are working in near full capacity or are over-loaded during these peak times, and may be under-loaded during other times of the day. Hence, it is assumed that a source performance is similar during similar times in the day. Hence, the Time-of-Day (ToD), relating to the hour and minute (and may also include the exact second) in the day, as part of the 'Date-Time' column 192a in the table 190, may be used in order to better estimate the performance of a source, relating to the time-zone of the requesting client device location or of the source location, where the location may be based on timing submitted by the related device (such as the client device or the source server), or may be based on geolocation. In one example, the weighting factors $w_i$ (for calculating ESTIMATED_RTT, ESTIMATED_BW, or both) may be based on an entry time of day, where same or similar times of day are associated with higher weighting factors, while entries associated with timings that are distinct or remote times of day are associated with lower weighting factors.

For example, assuming a content request from a client device on 20.00 in a day in a time-zone, such as U.S. Eastern Standard Time (EST). An entry in the database 190 may relate to a source in the U.S. West-Coast using Pacific Standard Time (PST) on 18.00, relating to 21.00 EST, hence translating into 1 hour difference, and weighted using a weight factor w(1 hour). Similarly, another entry may involve a summary of a transaction from a source at a time that is translated to 01:00 EST, hence translated to 5 hours difference, and involves using the weight factor w(5 hours). Similarly, an entry relating to content streaming at 08:00 EST may be used with a weight factor of w(12 hours), and an entry relating to content streaming at 11:00 EST may be used with a weight factor of w(9 hours). Entries are weighted according to their distance from the request time so that w(1 hour)≥w(5 hours)≥w(9 hours)≥w(12 hours). In one example, the weighting may be proportional to the time interval, such as w(X hours)=12−X, where the most time distant entry (12 hours) is associated with w=0, an entry associated with a delay of 4 hours may be associated with w=12−4=8, and no time difference entry may be associated with the maximum weighting factor of w=12. Similarly, the content streaming activity is typically increased during a weekend, and as such, a day-of-week factor may be used as an alternative or in addition to the time-of-day factor, for calculating the weighting factors $w_i$, and for estimating the RTT or the BW for a source for a specific content request by a specific client device.

Figure 19:
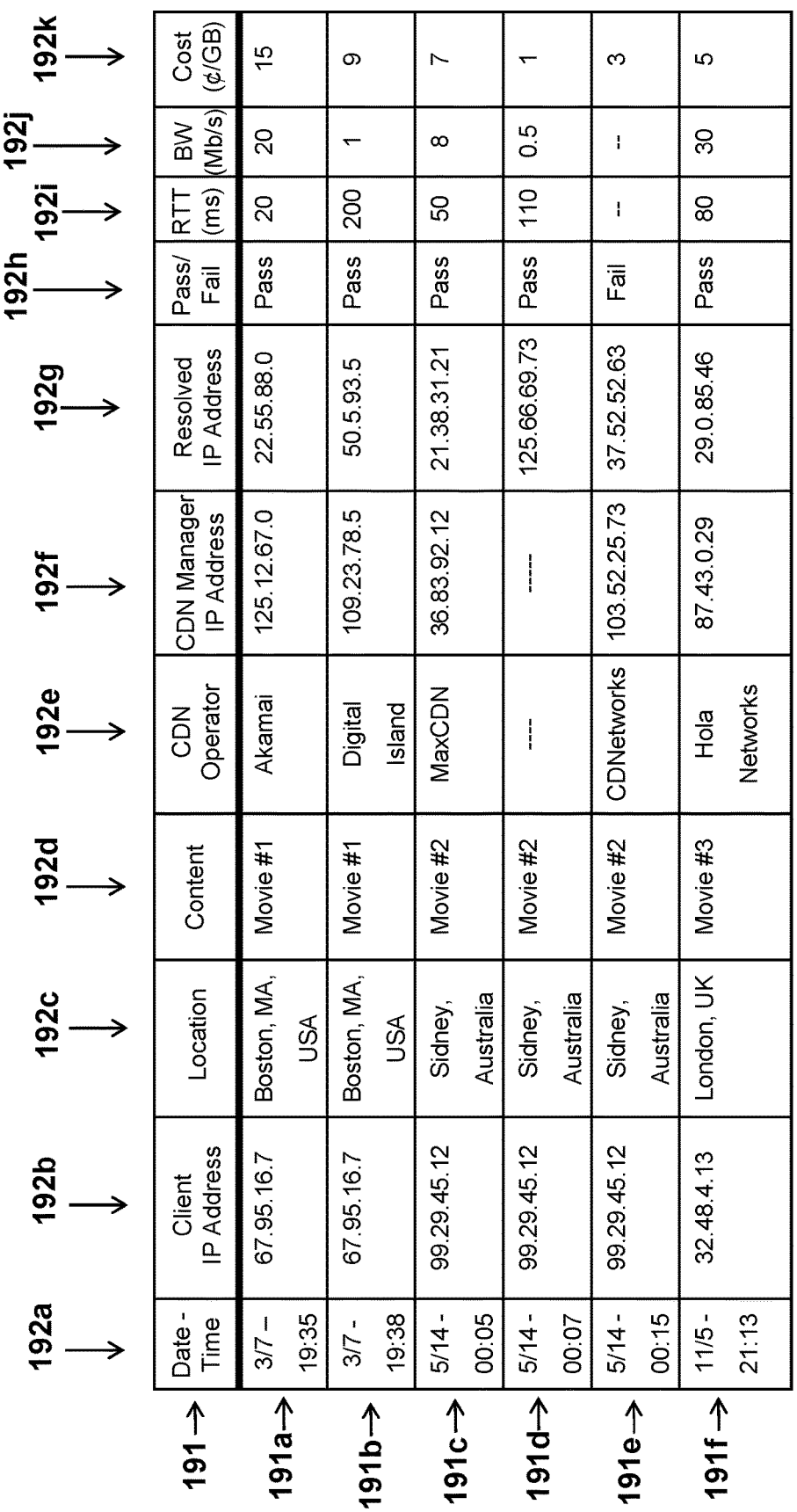
FIG. 19 illustrates schematically a table of collected data relating to content retrieving by various client devices.
Figure 19A:
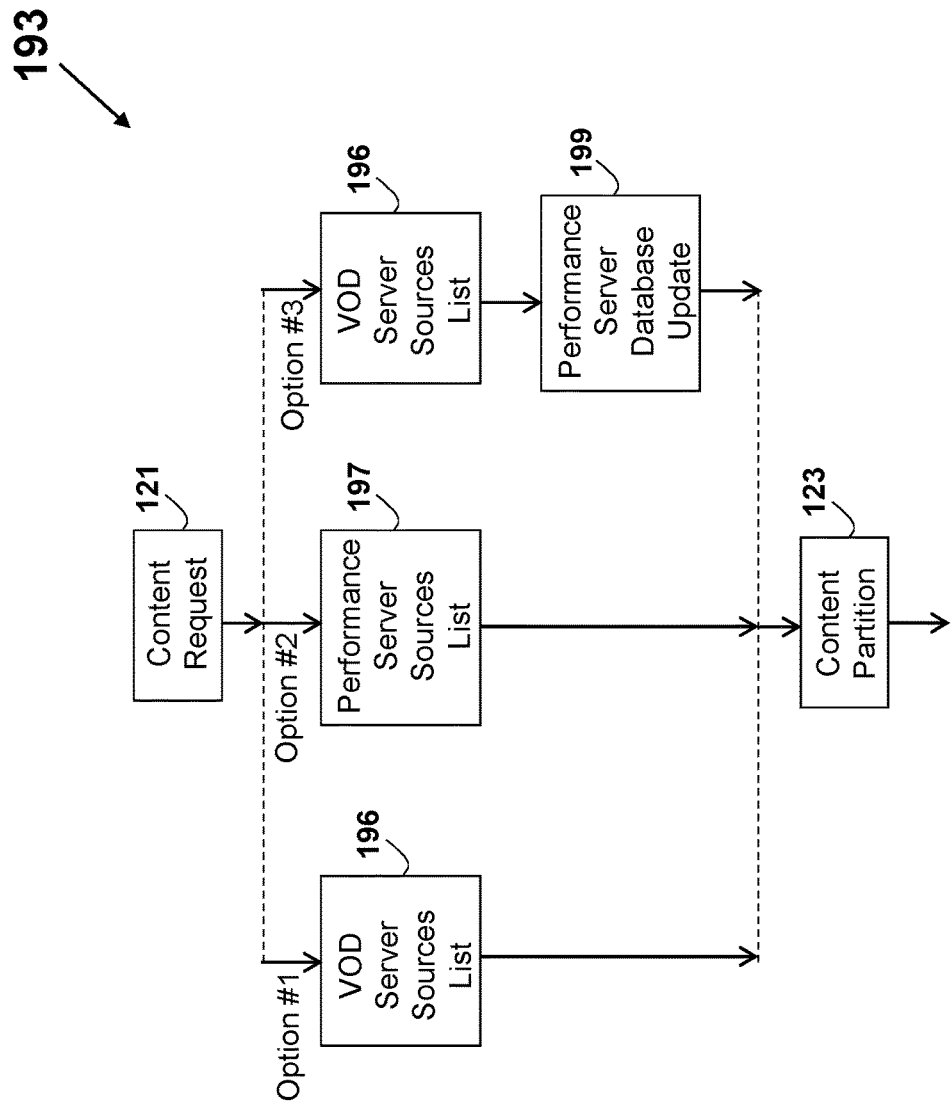
FIG. 19a illustrates schematically a part of a simplified flow-chart of a method relating to using a table of collected data relating to content retrieving by various client devices.
Figure 19B:
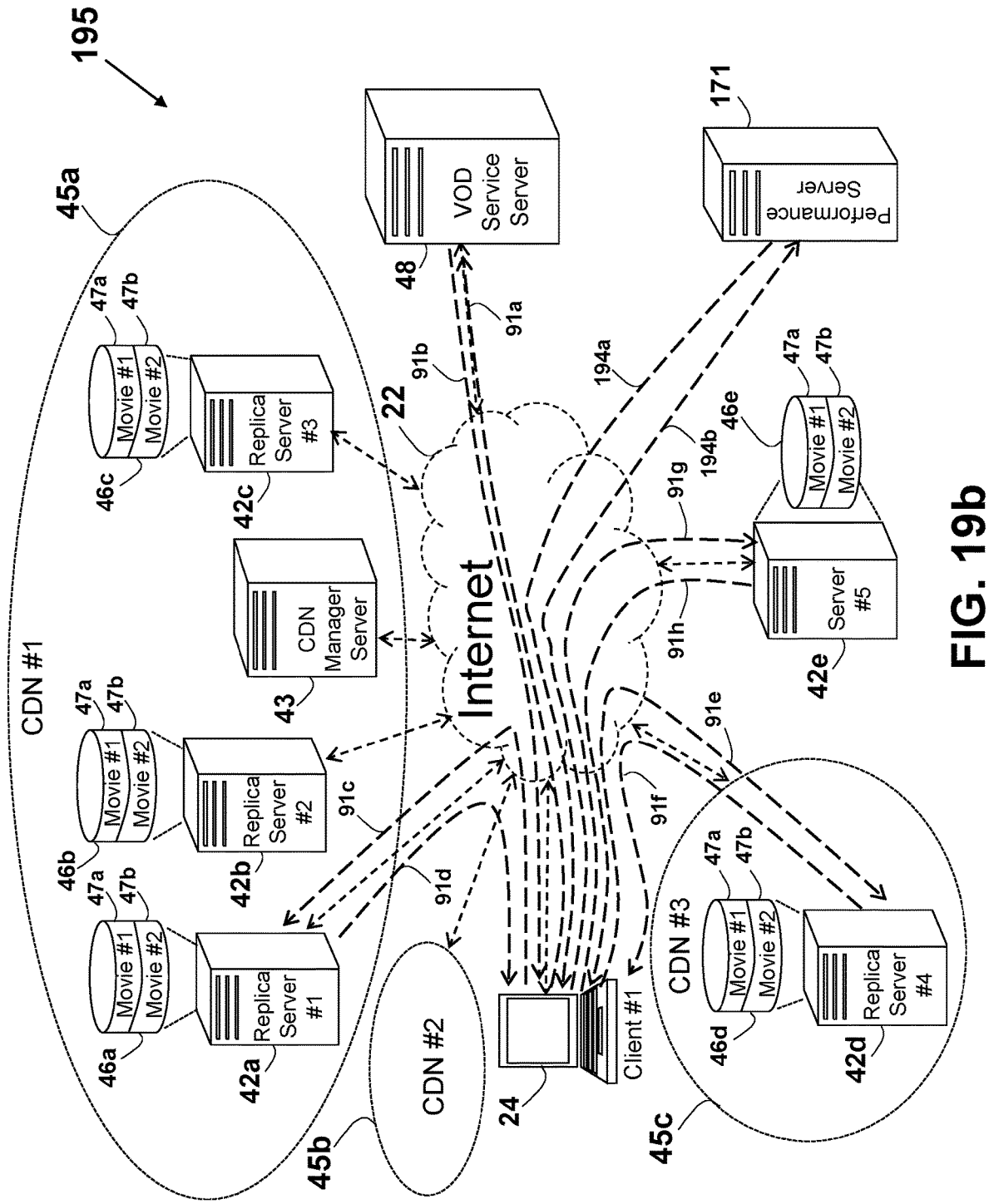
FIG. 19b depicts schematically messages exchanged over the Internet relating to a client device using a table of collected data stored in a performance server.
Figure 19C:
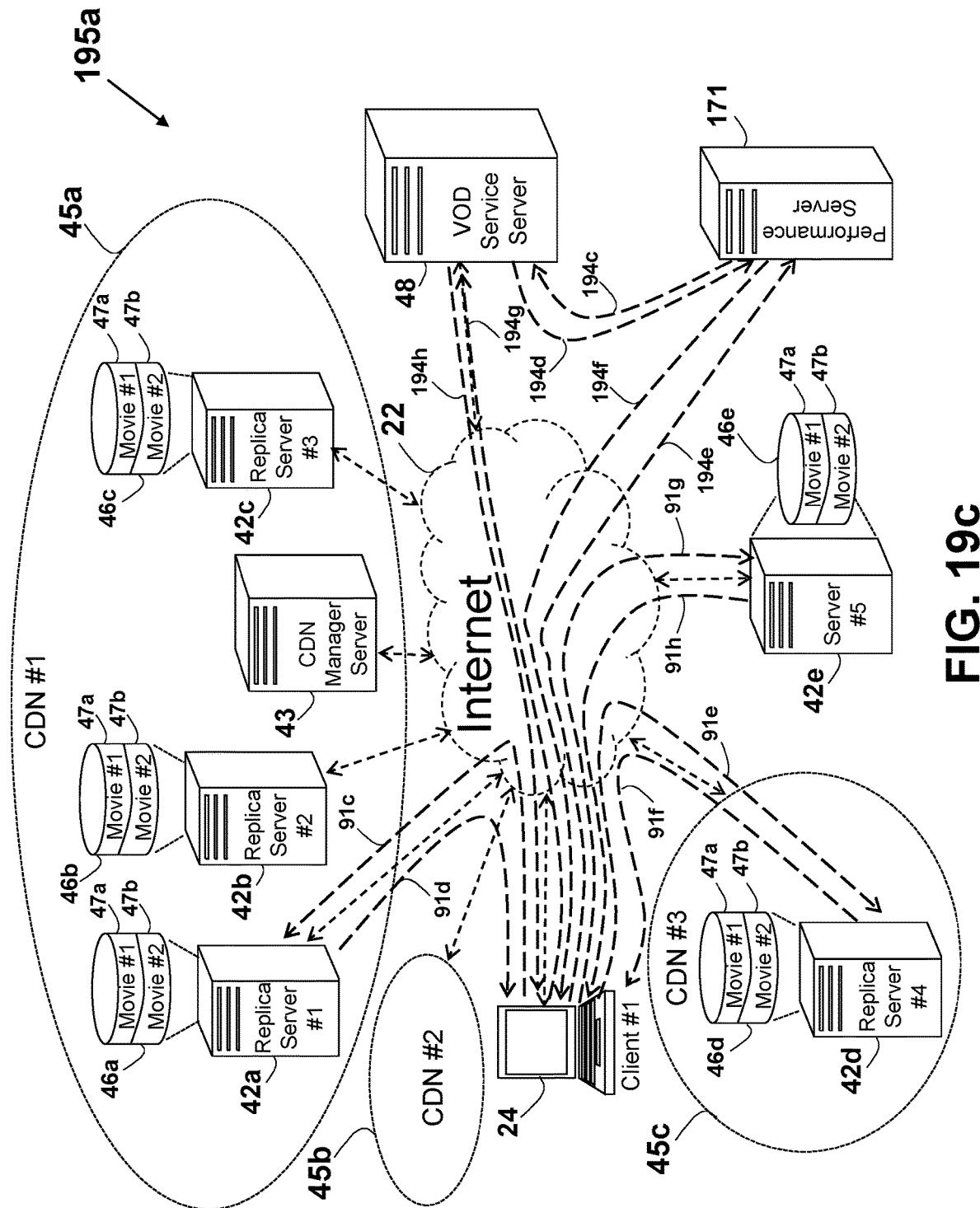
FIG. 19c depicts schematically messages exchanged over the Internet relating to a VOD service server using a table of collected data stored in a performance server.
Figure 19D:
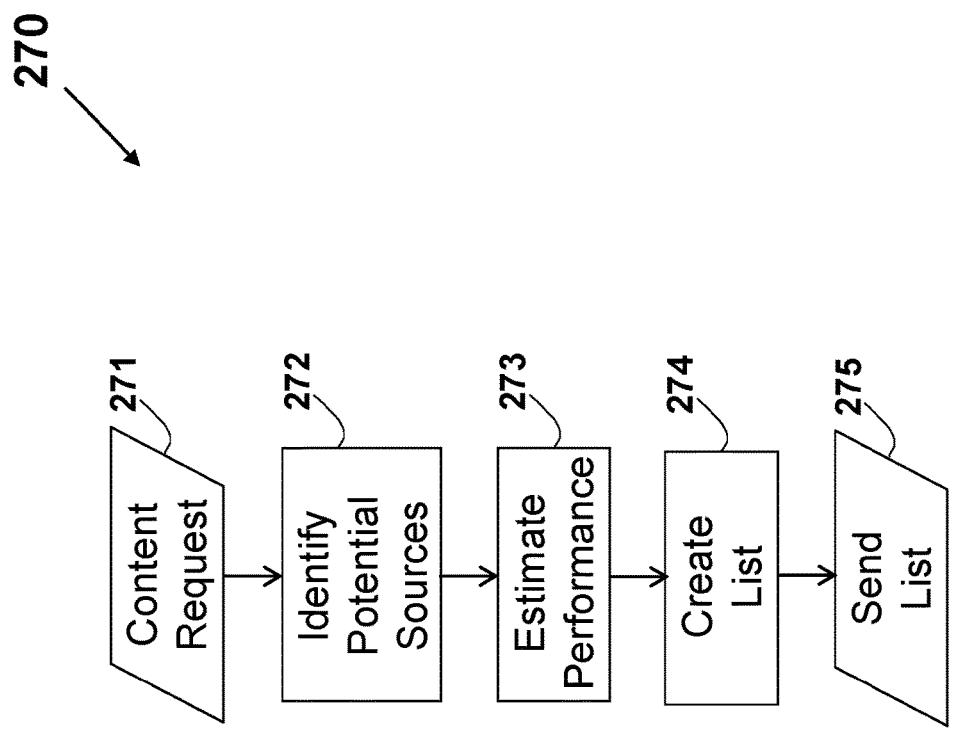
FIG. 19d illustrates schematically a part of a simplified flow-chart of a method relating to producing a sources list using a table of collected former transactions data.

A database that includes an actual or measured performance of sources, such as the table 190 shown in FIG. 19, may be used for forming a list of best or optimal source candidates in a specific scenario of a client device requesting streaming of specific content, such as the table 119 shown in FIG. 11a, created for example by a flow chart 270 shown in FIG. 19d. A content is identified for streaming in or by a client device, as part of a "Content Request" step 271, which may correspond to the "Content Request" step 121 in flow chart 120. As part of an "Identify Potential Sources" step 272, all (or plurality of) the available sources that may be used for streaming the requested content to the requesting client device, are identified. Such candidates may include replica or independent servers that are known to be operative and contain, or to have access to, the requested content for streaming. In one example, the database 190 is searched for entries regarding former transactions that include streaming or otherwise providing the requested content, and the sources associated with these entries are identified as potential sources for the same content. Next, as part of an "Estimate Performance" step 273, the data relating to the former actually measured performance of each of these potential sources is statistically (or deterministically) analyzed. Such analysis may include estimating the performance of these potential sources for the specific scenario, involving streaming the specific content to the specific requesting client device at the specific time of the content request, such as by calculating the ESTIMATED_RTT, the ESTIMATED_BW, and the probability of successful transfer ('Pass' rate). Various criteria may be applied to the estimated communication characteristics (such as the estimated RTT or BW), and only sources that satisfy these criteria may be selected to form the sources list as part of a "Create List" step 274. In one example, a table such as the table 119 shown in FIG. 11a is created, detailing the recommended sources to be used. For example, each source may be associated with the estimated RTT (ESTIMATED_RTT) as the RTT values in the column 112d, and with the estimated BW (ESTIMATED_BW) as the BW values in the column 112e. Further, the calculated statistics or any other data from the database 190 may be used to set priorities for using the sources by the client device, shown as the 'Priority" column 112a in the table 119. The sources formed in the "Create List" 274 is then sent as part of a "Send List" step 275, which may correspond to the "Sources List" step 122 in flow chart 120, to be used by the requesting client device for selecting sources for streaming the requested content therefrom.

The flow chart 270 shown in FIG. 19d may be performed, in full or in part, by a client device (such as the client device #1 24), may be performed, in full or in part, by a VOD service server (such as the VOD Service Server 48), or may be performed, in full or in part, by the performance server 171. In one example, the client device, the VOD service server, and the performance server, are cooperatively executing the flow chart 270, where each of the devices is performing one or more of the steps of the flow chart 270, or part or all of one or more of the step thereof. In the case where the flow chart 270, in full or in part, is performed by the client device such as the client device #1 24, the "Content request" 271 includes identifying the requested content by the client device #1 24, followed by the "Identify Potential Sources" 272 that includes sending the requested content identification and the client device #1 24 identification and location to the performance server 171, shown as a dashed line 194e in the arrangement 195a, and in response, receiving the database (such as the database 190) from the performance server 171, shown as the dashed line 194f in the arrangement 195a, to be further analyzed by the client device #1 24.

Alternatively or in addition, the flow-chart 270 may, in full or in part, be performed by the VOD Service server such as the VOD service server 48, as illustrated in an arrangement 195a in FIG. 19c. The "Content request" 271 may include receiving the requested content from the client device #1 24, shown as a dashed line 194g in the arrangement 195a, followed by the "Identify Potential Sources" 272 that includes sending the requested content identification and the client device #1 24 identification and location to the performance server 171, shown as a dashed line 194d in the arrangement 195a, and in response, receiving the database (such as the database 190) from the performance server 171, shown as the dashed line 194c in the arrangement 195a, to be further sent and analyzed by the client device #1 24, shown as the dashed line 194h in the arrangement 195a. Alternatively or in addition, after receiving the requested content identification, either from the client device #1 24 as shown in the messaging line 194e, or from the VOD service server 48 as shown in the messaging line 194d, the analysis of the database 190 as part of the "Identify Potential Sources" step 272, the "Estimate Performance" step 273, the "Create List" step 274, or all of these steps, is performed by the performance server 171, and the sources list formed as part of the "Create List" step 274 is sent as part of the "Send List" step 275 to either the client device #1 24 as shown in the messaging line 194f in the arrangement 195a, or to the VOD Service Server 48 as shown in the messaging line 194c in the arrangement 195a, for later sending to client device #1 24 as shown in the messaging line 194h.

Figure 20:
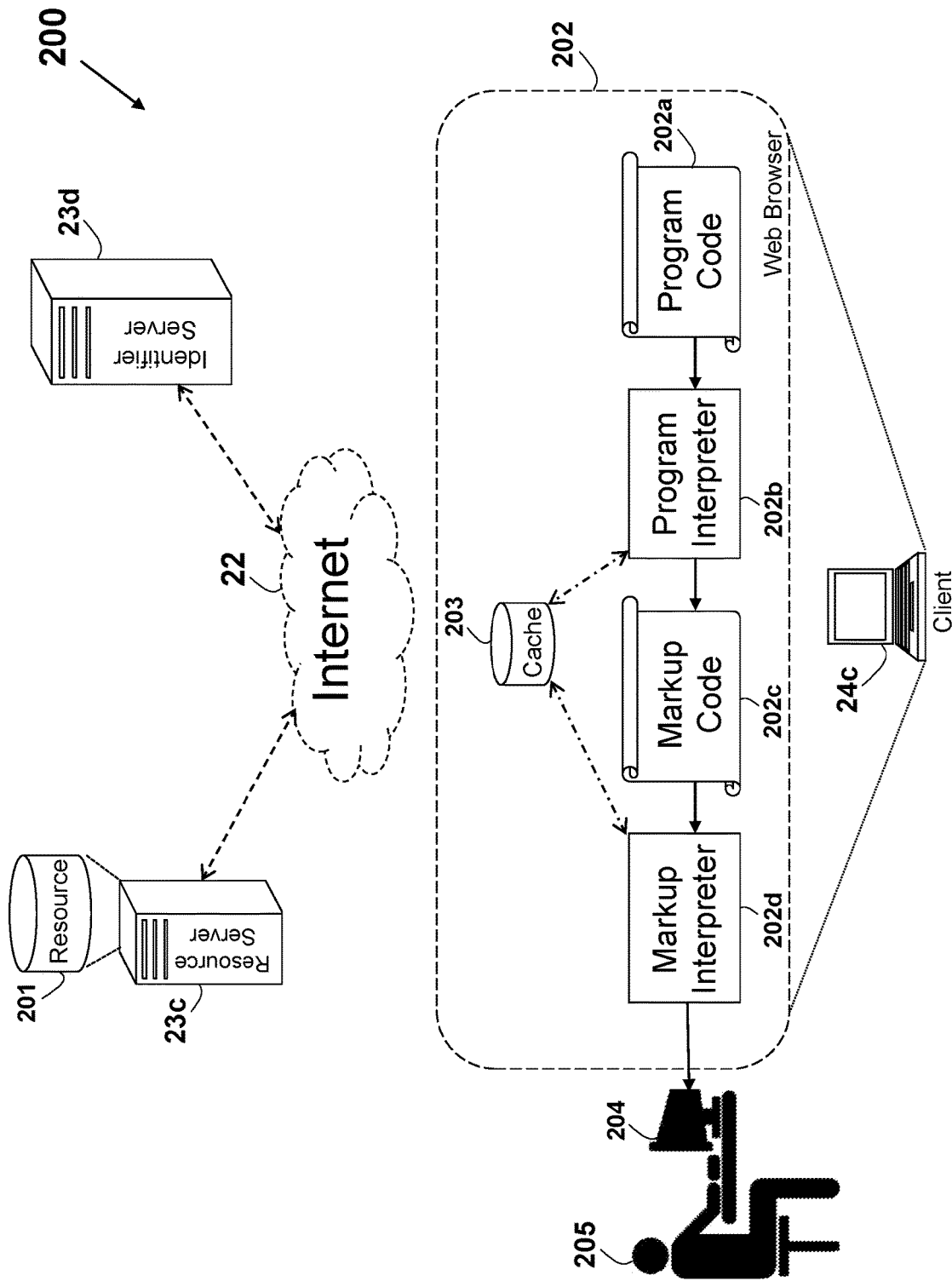
FIG. 20 illustrates schematically a functional block diagram of a web server and a resource accessible over the Internet by the web browser.

A general scheme of fetching and using a resource is described in an arrangement 200 shown in FIG. 20. A resource 201 is stored, controlled, accessed, managed, or otherwise available via a Resource Server 23c. The resource 201 or the resource server 23c are identified by an identifier that is stored, controlled, accessed, managed, or otherwise available via an identifier server 23d. For example, the resource 201 may be the movie #1 46a, and the Resource Server 23c may be a replica or an independent server storing the movie, such as the server #5 42e or the replica server #2 42b. The identifier server 23d may correspond to the performance server 171, the VOD service server 48, or the CDN manager server 43, which may provide the identifier (such as the URL or IP address) of the movie or the server storing the movie.

A client device, such as the client device 24c is used or operated by a user 205 that accesses the client device via a display 204, which may correspond to the display 17 or the screen 5, and is including, storing, operating, or using a web browser program 202, which may correspond to the web browser 31c, and may include various components and functionalities shown in FIG. 20. The web browser 202 typically includes a User Interface (UI) component that handles the interactions with the user 205 and may provide standard features such as preferences, printing, downloading, visual page-loading progress, and toolbars. Commonly, markup code 202c is used to direct the operation of the web browser 202, and may use, or be based on, a markup language such as Hypertext Markup Language (HTML), Extensible Hypertext Markup Language (XHTML), CoXML, SGML, Scalable Vector Graphics (SVG), Cascading Style Sheets (CSS), and Extensible Markup Language (XML). A Markup Interpreter component 202d, which is typically part of the rendering engine, parse and interpret the markup code 202c, and generates a layout that is displayed by the UI component to the user 205, such as presenting visual data via the display 204. Typically, the markup interpreter 202d use the markup code 202c to render, layout, or modify a DOM (such as by applying a CSS scheme) that is used for graphically displaying the information.

A communication over the web, such as communication over the Internet 22 with servers such as the resource server 23c or the identifier server 23d, is handled by the web browser 202 using a networking component. The networking component (not shown) provides the required functionalities for retrieving URLs using HTTP or FTP, and further handles many aspects of the communications such as security, character set translations and MIME type resolution. The networking component further uses a cache 203 storing recently retrieved resources. The cache may be implemented as using a volatile memory, such as a RAM that may correspond to the main memory 15a, or may use a non-volatile memory, such as a hard disk that may correspond to the storage device 15c. Commonly, any received resource is stored by the web browser 202 in the cache 203.

A program code 202a includes further instructions to be executed by the client device processor, or as part of the web browser 202 operation, usually after compilation. The program code 202a may be based on, compatible with, or according to, any programming language or environment, such as Objective-C, C/C++, Fortran, COBOL, Java, or PASCAL. In one example, a scripting support language may be used, such as Perl, REXX (on IBM mainframes), JavaScript, ActionScript, Tcl/Tk, Adobe Flash player, or VBScript. A program interpreter 202b, which is typically a part of the rendering engine, parses, interprets, and executes the markup code 202c. In the case of using scripting, a script (such as a script text) is generated, and is embedded in, and affects the markup code 202c. For example, the markup code 202c may be HTML based (preferably CSS styled) using tags (and their attributes), and the program interpreter 202b, based on the program code 202a, embed or inject a newly generated script as tags into the markup code 202a, thus affecting the behavior of the HTML web pages. The scripting may be a server-side or a client-side scripting.

Figure 20A:
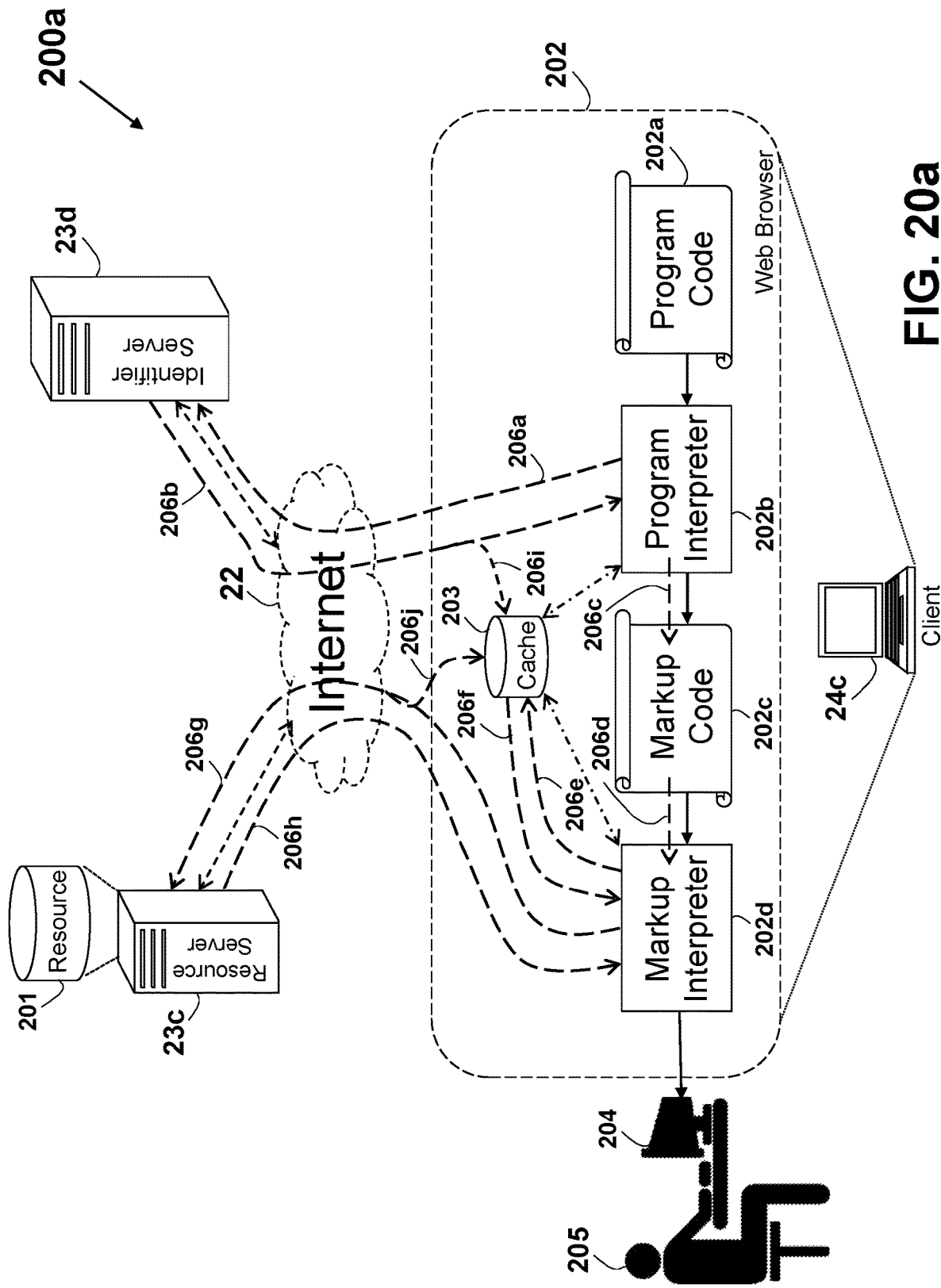
FIG. 20a depicts schematically messages exchanged internally and over the Internet relating to retrieving a resource by a web browser.
Figure 23:
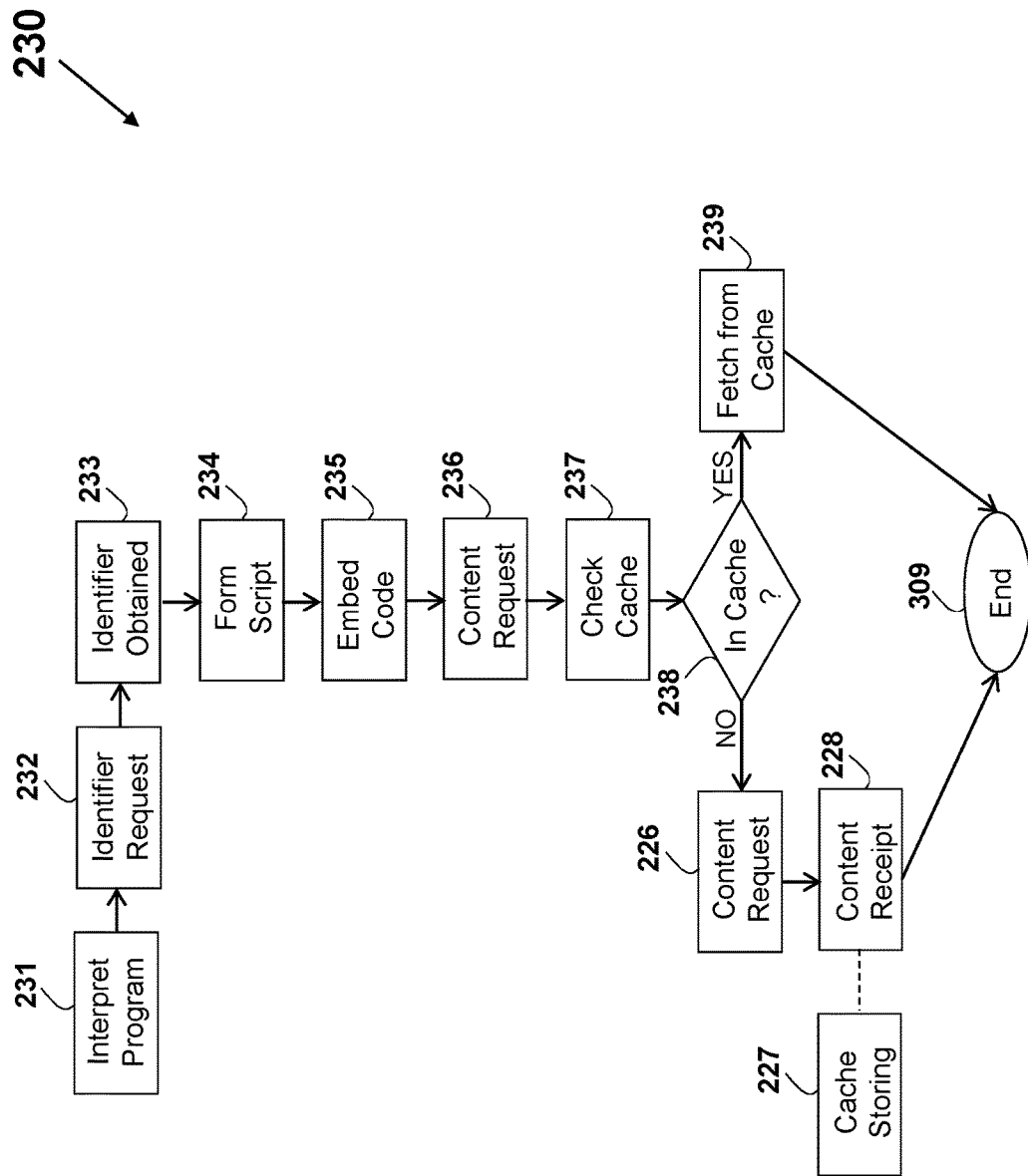
FIG. 23 illustrates schematically a simplified flow-chart of a method relating to retrieving a resource by a web browser.

A typical session of retrieving a resource 201 identified by the identifier server 23d, is described in a flow chart 230 in FIG. 23 and is shown as an arrangement 200a in FIG. 20a. As part of executing the program code 202a in an "Interpret Program" step 231, the program interpreter 202b (being part of the web browser 202) in an "Identifier Request" step 232 sends a request message 206a to the identifier server 23d, and as part of an "Identifier Obtained" step 233 receives a response message 206b that includes the resource 201 identifier, typically the resource 201 URI (such as URL or URN). As part of the web browser 202 operation, a copy 206i of the received message 206b is also stored in the cache 203. As part of a "Form Script" step 234 a script is formed including the resource 201 identifier, and the resource 201 identifier including script is then injected, such as by a script 206c formed to the markup code 202c, as part of a "Embed Code" step 235, to be interpreted as a new code 206d by the markup interpreter 202d. As part of the modified markup code 202c (that may be read as text 206d), the markup interpreter 202d is seeking for the resource 201 based on its identifier as part of a "Content Request" step 236, and first use the resource 201 identifier, and check for the availability of the resource 201 in the local cache 203, as part of a "Check Cache" step 237 shown as the dashed line 206e. If the resource 201 is indeed stored in the cache 203 (for example, since it was recently retrieved) as determined in an "In Cache?" step 238, the resource 201 content is read locally from the cache 203, as part of a "Fetch from cache" step 239 as shown by the message 206f, and the session is completed in an "End" step 309. If the resource 201 is not stored in the cache 203, as indicated by the cache 203 response 206f, the markup interpreter 202d, using its networking functionality, send a request message 206g to the server 23c using the resource 201 identifier as part of a "Content Request" step 226. In response, the resource server 23c, as part of a "Content Receipt" step 228 returns as message 206h the resource 201 to the client device 24c, so it can be used or presented (or played) to the user 205. A copy 206j of the retrieved resource 201 is also stored in the cache 203 as part of the automatic and normal web browser 202 operation in a "Cache Storing" step 227, for future use when and if required. In one example, the markup code 202c is HTML text that is interpreted by an HTML parser as part of the markup interpreter 202d. A non-active tag such as <img> may be initially used in the HTML code 202c as a placeholder, and is then replaced, as part of the text insertion 206c, with a tag such as <img SRC=S1>, where S1 is the resource 201 identifier (such as the resource 201 URL or URN), causing (by the reading 206d) the HTML interpreter 202d to retrieve the resource 201 over the Internet 22 from the resource identifier 23c.

The resource 201 may not be available using its identifier due to an error, or due to a non-current identifier. Further, the resource server 23c may be overloaded, non-operative (e.g., due to maintenance), or there may be communication problem associated with the resource server 23c networking. In the case where there is no timely response 206h from the resource server 23c to the resource 201 request 206g, the web browser 202 may stop its operation ('freeze'), with or without presenting an error message to the user 205, thus requiring the user 205 to interfere or interact with the normal or required flow of system operation, hence reducing the QoE of the user 205.

Figure 21:
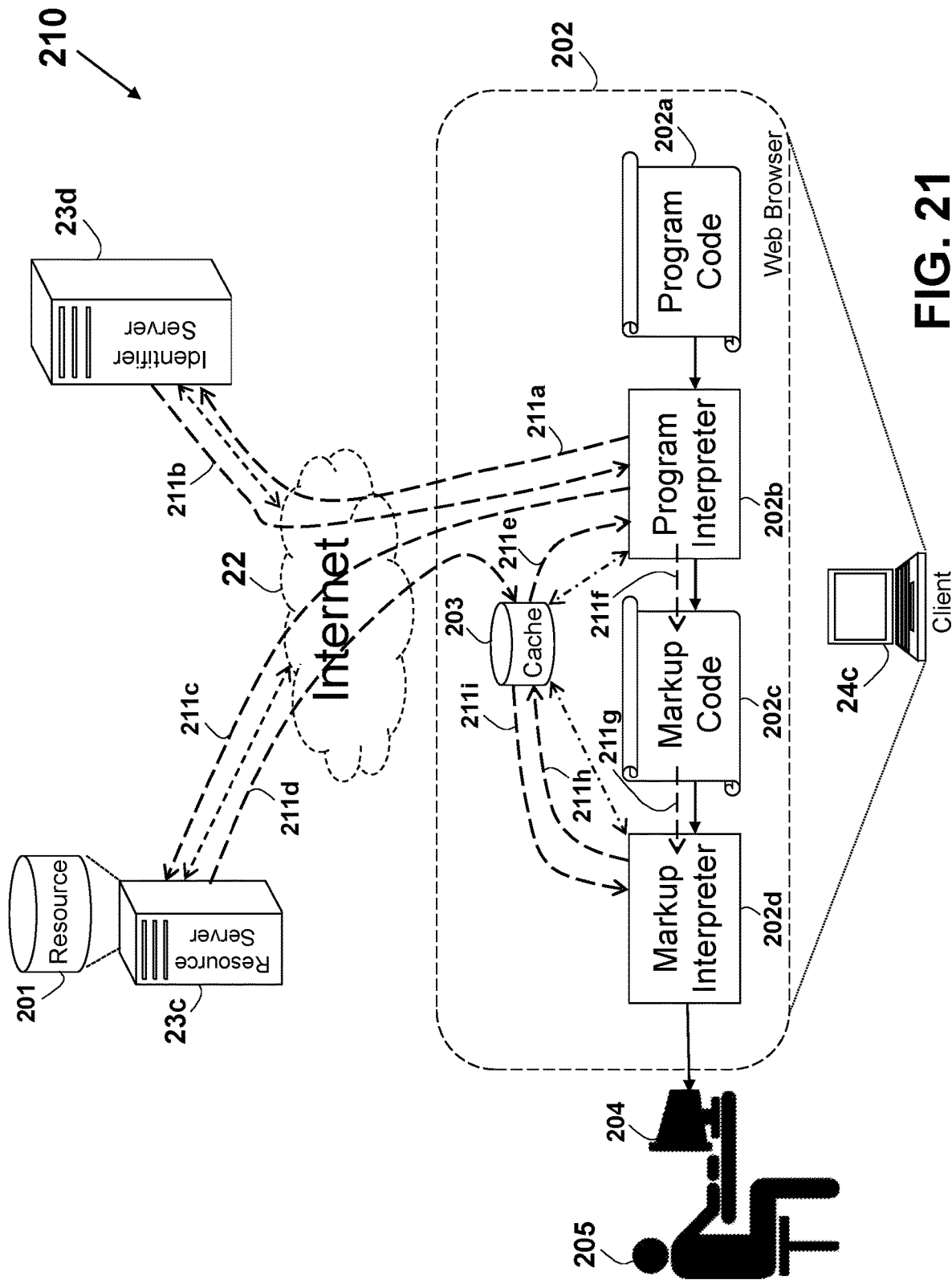
FIG. 21 depicts schematically messages exchanged internally and over the Internet relating to retrieving a resource locally from a cache memory by a web browser.
Figure 24:
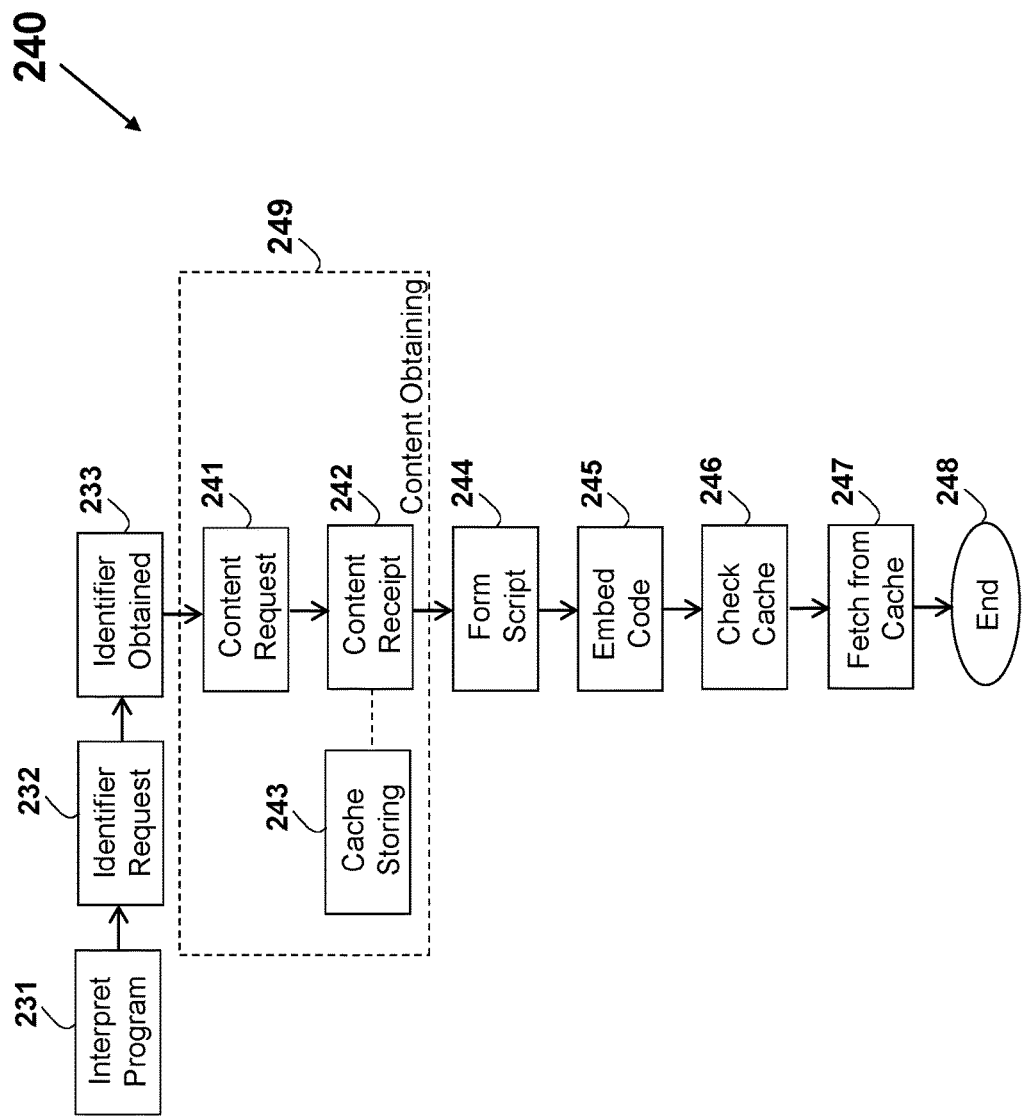
FIG. 24 illustrates schematically a simplified flow-chart of a method relating to retrieving a resource locally from a cache memory by a web browser.

In one example, it may be beneficial to check the resource 201 availability or accessibility before actually injecting the script or text, or otherwise modifying the markup code 202c to be executed by the markup interpreter 202d. Such an example is described in a flow chart 240 shown in FIG. 24 and in an arrangement 210 shown in FIG. 21. Similar to the description regarding arrangement 200a, the web browser 202 sends the resource 201 identifier request 211a (corresponding to the message 206a) to the identifier server 23d, which in response, return the identifier in a response message 211b (corresponding to the message 206b), corresponding to the "Interpret Program" step 231, the "Identifier Request" step 232 and the "Identifier Obtained" step 233. The program interpreter 202b, executing the program code 202a, sends a request for the resource 201, using the resource 201 identifier received from the identifier server 23d, for example, by using AJAX or XMLHttpRequest (XHR). The resource is obtained by the web browser 202 as part of a sub-flow-chart 249, that starts with a "Content Request" step 241, where a request for the resource 201 is sent to the resource server 23c, followed by a "Content Receipt" step 242 in which the resource 201 is then loaded from the resource server 23c as a message 211e. Further, a copy of the resource is stored in the cache 203 as part of the web browser 202 normal and common networking handling scheme, as part of a "Cache Storing" step 243 shown as message 211d. The content 201 identifier is then embedded as part of an "Embed Code" step 245 (corresponding to the "Embed Code" step 235 in the flow-chart 230) as a message, script, or text 211f in the markup code 202c as part of a "Form Script" step 244 (corresponding to the "Form Script" step 234 in the flow-chart 230) similar to the code change 206c in the arrangement 200a.

Upon reading the embedded resource 201 identifier 211g in the markup code 202c, the markup interpreter 202d first approaches the cache as part of a "Check Cache" step 246 (corresponding to the "Check Cache" step 237 in the flow-chart 230) by sending a request 211h to the cache 203 for checking for the resource 201 availability. Since a copy of the resource was indeed stored in the cache 203 as part of the resource 201 retrieval step 211d, the markup interpreter 202d may fetch the resource 201 in a "Fetch from Cache" step 247 as a message 211i from the cache 203, obviating the need for accessing the resource server 23c again, and completing the process in an "End" step 248. Such a mechanism allows for exchanging a resource, such as the resource 201 between the program interpreter 202b and the markup interpreter 202d by injecting the resource identifier and using the cache 203 as a shared storage, where the resource is retrieved by the program interpreter 202b, and is used by the markup interpreter 202d. In the case where the resource 201 was not properly or not completely loaded into the cache 203, no code injection 211f is performed. Since the injected script or code 211g is only embedded in the markup code 202c upon successful full retrieval of the resource 201, the availability of the resource 201 in the cache 203 is guaranteed, so that 'freezing' or other impairments in the markup interpreter 202d operation are avoided.

Figure 22:
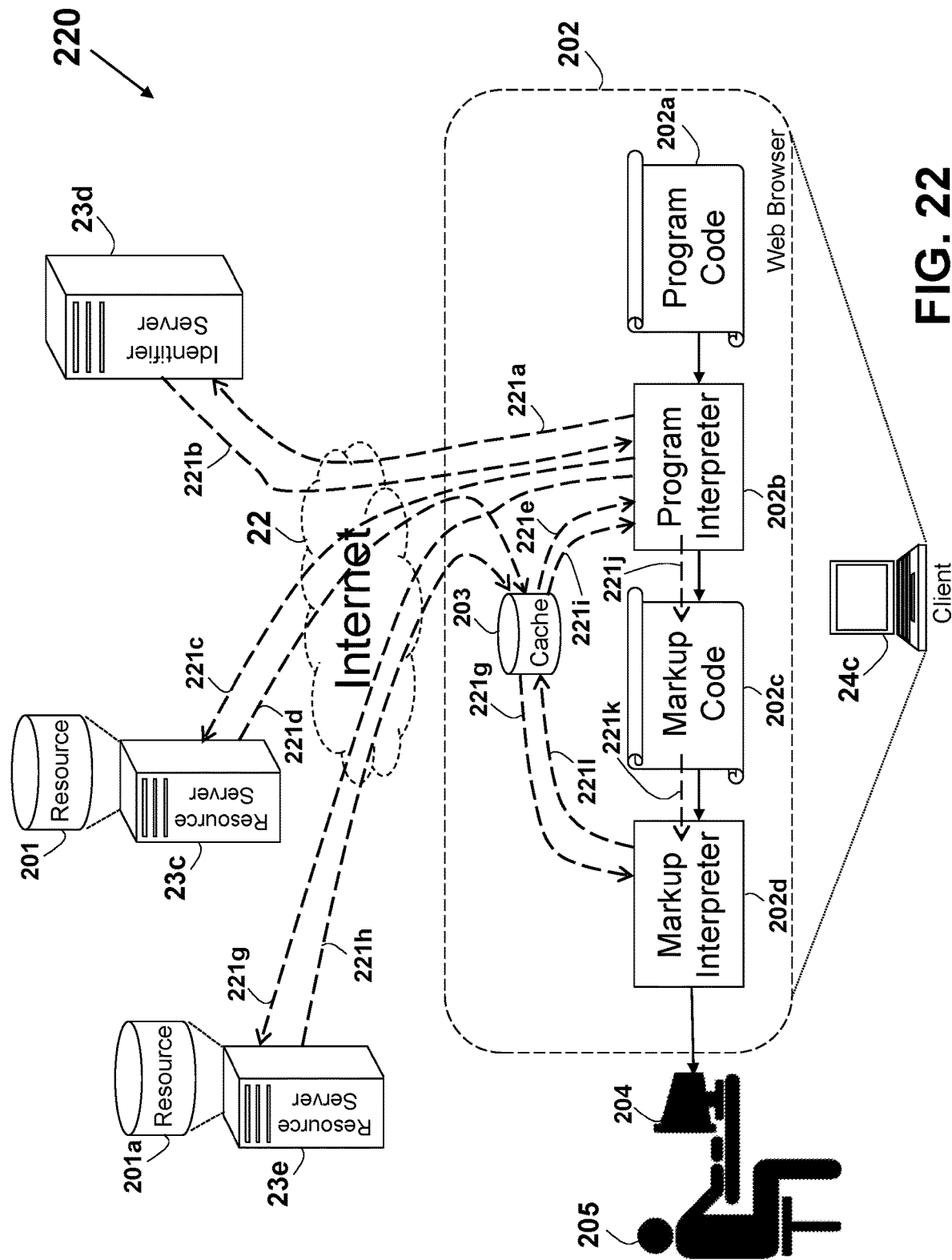
FIG. 22 depicts schematically messages exchanged internally and over the Internet relating to retrieving a resource locally from a cache memory by a web browser using concurrently retrieving two copies of the resource.
Figure 25:
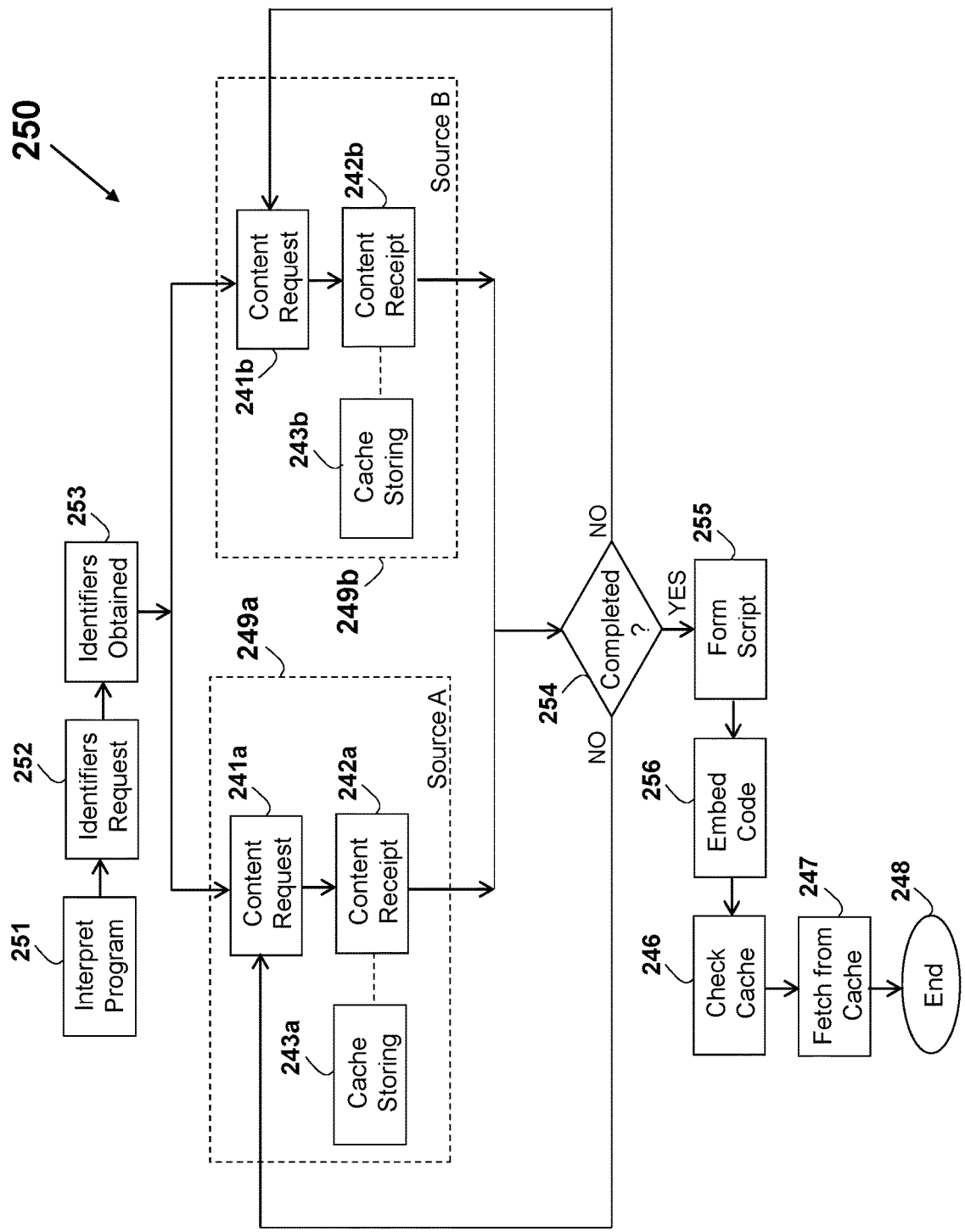
FIG. 25 illustrates schematically a simplified flow-chart of a method relating to retrieving a resource locally from a cache memory by a web browser using concurrently retrieving two copies of the resource.

Further, alternative resources (such as multiple copies) may be similarly handled, allowing for reduced retrieving time and robust resource obtaining operation. An example of using two copies is described in an arrangement 220 in FIG. 22 and in a flow chart 250 shown in FIG. 25. In this scenario, there is another identical (or similar) copy of the resource 201, denoted as a resource 201a, that is stored, controlled, accessed, or otherwise obtained via a resource server 23e. Similar to the flow chart 240, the program code 202a is interpreted as part of a "Interpret Program" step 251, corresponding to the "Interpret Program" step 231, followed by sending a message request 221a as part of an "Identifiers Request" step 252, corresponding to the "Identifier Request" step 231. In this step, the request is for both resources (copies 201 and 201a) identifiers, that are received as part of an "Identifiers Obtained" step 253 shown as the message 221b that corresponds to the "Identifier Obtained" step 233.

As shown in the flow chart 250, the resource copies 201 and 201a are obtained in parallel from the two respective resource servers 23c and 23e, each using the same (or similar) 'Content Obtaining" flow chart 249 described in the flow chart 240. Requesting and obtaining the resource 201 from the resource server 23c is shown as the flow chart 249a (Source A), including a "Content Request" step 241a (shown as a dashed line 221c), a "Content Receipt" step 242a (shown as a dashed line 221e), and a "Cache Storing" step 243a (shown as a dashed line 221d), respectively corresponding to the "Content Request" step 241, a "Content Receipt" step 242, and a "Cache Storing" step 243 of the flowchart 240. In parallel, Requesting and obtaining the resource 201a from the resource server 23e is shown as the flow chart 249b (Source B), including a "Content Request" step 241b (shown as a dashed line 221g), a "Content Receipt" step 242b (shown as a dashed line 221i), and a "Cache Storing" step 243a (shown as a dashed line 221h), respectively corresponding to the "Content Request" step 241, a "Content Receipt" step 242, and a "Cache Storing" step 243 of the flowchart 240. Hence, both resource copies 201 and 201a are individually identified and are stored in the cache 203 when retrieved from the respective servers.

As part of a "Completed?" step 254, the web browser 202 checks for completion of retrieving of one of the resources. The resource retrieving continues by performing the respective flow charts fort source A 249a and for source B 249b, until one of the resources is properly and completely retrieved. In such a case, the other source (regarding which of the resource retrievings is not yet completed) may be stopped to save computer resources, such as processing power or memory space. In a "Form Script" step 255 that corresponds to the "Form Script" step 244 of the flow chart 240, the identifier of the resource that was properly and completely loaded is embedded in the script as part of an "Embed Code" step 156, that corresponds to the "Embed Code" step 245. For example, if the resource 201a is the first to be fully loaded from the resource server 23e, the identifier of this resource 201a is included in the script 221j that is embedded in, or injected to, the markup code 202c. Upon reading the updated markup code 221k, the markup interpreter 202d, as part of a "Check cache" step 246 retrieves the loaded resource 201a from the cache 203 shown as messages 2211 and 221g (respectively corresponding to messages 211h and 211i in the arrangement 210), similar to the operation described above.

In addition to the reduced latency by parallel retrieving of the resource from two sources and identifying and using the faster one, such a scheme allows for more robust and higher reliability of operation. In the case where one of the sources is problematic, such as being non-responsive, overloaded, or under networking problems, the other source may be used for the resource retrieving, thus allowing proper operation flow from the user point of view. While exampled regarding two sources, three, four, five, or any other number of sources may equally be used.

Replica servers, such as the replica server #1 42a, the replica server #2 42b, and the replica server #4 42d, are typically dedicated servers that are primarily used, designed, and operated for the purpose of content delivery, such as being part of a CDN, and are commonly optimized for content streaming to client devices. Such servers typically include large memory and large cache for storing content, support HTTP serving, and are connected using high-bandwidth connections to the Internet 22. These servers are optimized and structured, in both their hardware and their software, for the primary purpose of effectively and reliably serving as streaming content source as part of a CDN. However, independent servers that are not part of a CDN, such as the independent server #5 42e as described herein, may be equally used, as dedicated servers for content delivery (such as streaming content). As described herein, even servers that are not optimized for content delivery, in general, and for content streaming in particular, may be used as part of the content delivery arrangement. For example, even servers that provide a relatively low bandwidth (BW), such as supporting bandwidth that is below a requesting client device data rate, or servers that are associated with relatively high RTT, may be used for obtaining part of (or whole of) a content, such as a movie (for example the movie #1 47a). Furthermore, the arrangement or the system herein may recover from a failure to deliver content, and commonly such recovery is neither noticed nor recognized by the content consuming user.

In one example, a content may be obtained, such as by using streaming, from a server that is not dedicated or not optimized for content delivery. For example, such a non-dedicated server may not be part of a CDN, and may be designed, set, optimized, or operated for providing a primary service to various client devices. While such a non-dedicated server may be primarily used for the primary service, when the server is under-utilized, the idling resources (software or hardware) or any other surplus capacity may be used for offering content delivery services, such as content streaming facilities, functioning and operating similar to the independent server #5 42e. The operator or owner of the server #6 282 may charge a fee for the content delivery service, as described in the "Cost (¢/GB)" column 112f in the table 119, allowing the profiting from, and better utilization of, the server #6 282 operation, using the existing infrastructure and effectively without any additional operational costs (CAPEX or OPEX). Since the costs associated with utilizing the idling resources is minimal, the operation may be profitable even for relatively low cost, hence allowing the VOD Service provider 49, or the content-consuming client device (such as the client device #1 24) to consume content at a relatively low-price.

Figure 28:
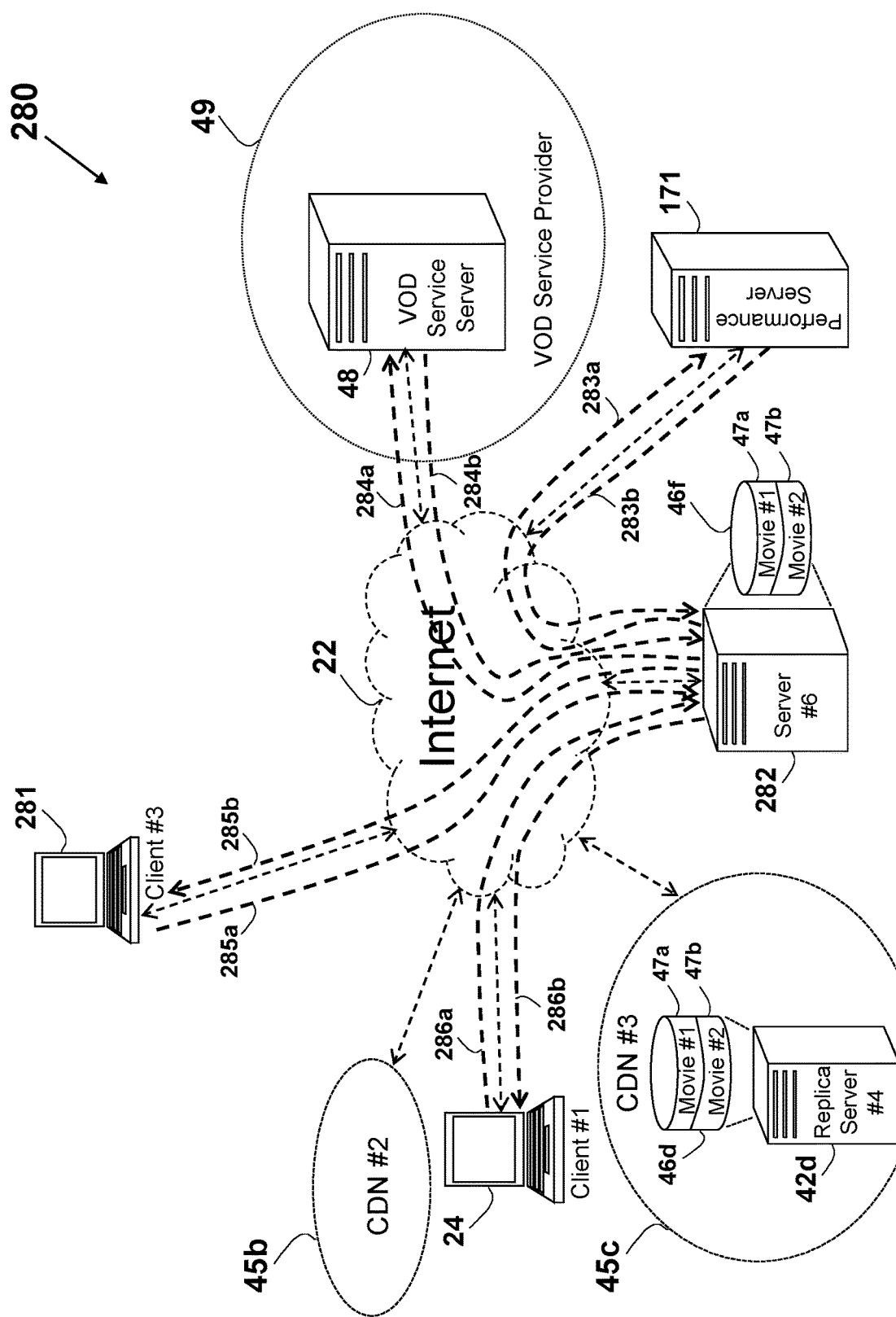
FIG. 28 depicts schematically messages exchanged over the Internet relating to using a dual-functionality non-dedicated server.

An example of such a non-dedicated server #6 282 is described as part of an arrangement 280 shown in FIG. 28. The non-dedicated server #6 282 may serve multiple or various client devices, such as a client device #3 281, representing one of multiple client devices using the primary service that provides the defined primary service over the Internet 22, typically using a conventional server—client scheme. For example, the primary service may involve requests and other data that is sent from the client device #3 281 to the non-dedicated server #6 282 shown as a messaging line 285a, that may respond to the client device #3 281 by sending responses, messages, and other data as part of the primary service, shown as a messaging line 285b.

Figure 26:
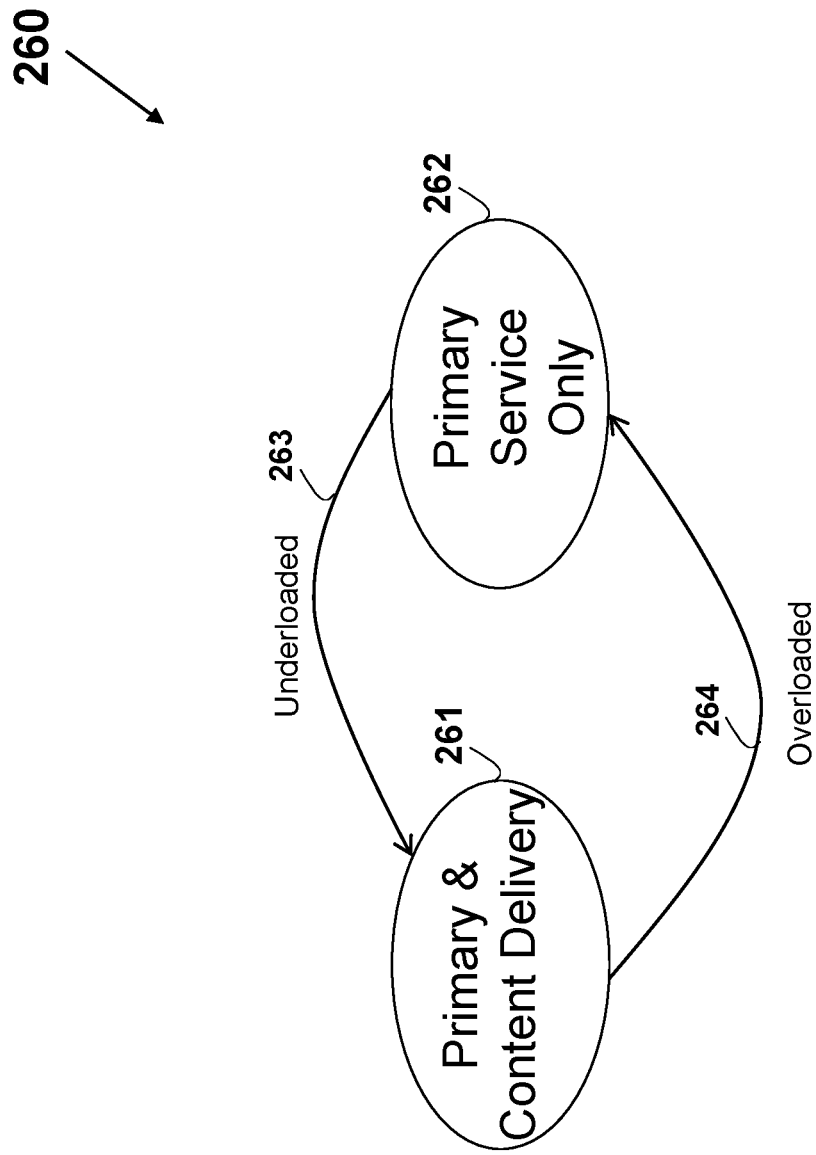
FIG. 26 illustrates schematically a states diagram of a dual-functionality non-dedicated server.

An example of a state diagram 260 of the non-dedicated server #6 282 is illustrated in FIG. 26. In a "Primary Service Only" state 262, the non-dedicated server #6 282 is occupied only in its primary service to client devices (or to other servers), such as serving the client device #3 281 by exchanging messages (which may include requests, responses, or any other information as part of the primary service) such as the request message 285a or the response message 285b. In this "Primary Service Only" state 262, the non-dedicated server #6 282 is dedicated to performing the primary service, and is not part of any content delivery arrangement, and in particular, not any content streaming (unless such content delivery is an inherent part of the primary service of the non-dedicated server #6 282). In one example, the non-dedicated server #6 282 is in such state at least part of, or most of the operating time, such as part or most of the hours in a day, or part or most of the days in a week. In general, the non-dedicated server #6 282 priority is to reliably and timely provide the primary service to the requesting or using client devices (or other servers). Upon detecting that capacity is available and that the non-dedicated server #6 282 is at underloaded condition, the non-dedicated server #6 282 may shift, depicted as an 'Underloaded' line 263, to a "Primary & Content Delivery" state 261. In this state, while the non-dedicated server #6 282 continues to use its resources, mainly provides the primary service to the primary service client devices (such as the client device #3 281), any available capacity is used for simultaneously providing content delivery services (such as content streaming), similar to a replica server (such as the replica server #4 42d) or to the independent server #5 42e. The two services, namely, the primary service and the content delivery service, are concurrently provided, such as by using multi-tasking or multi-user schemes, or providing any other scheme of distinct services at the same time, for example, any scheme supported by the server operating system used as part of the non-dedicated server #6 282 operation. Upon detecting that additional capacity is not available, and that the non-dedicated server #6 282 may be in an overloaded condition, for example may not reliably or effectively, provide the primary service, the non-dedicated server #6 282 may revert, depicted as an 'Overloaded' line 264, to a "Primary Service Only" state 262, and either halt any content delivery activities, or while finalizing any content delivery activity that already have been initiated, avoid starting any new sessions, involving any content delivery.

Figure 27:
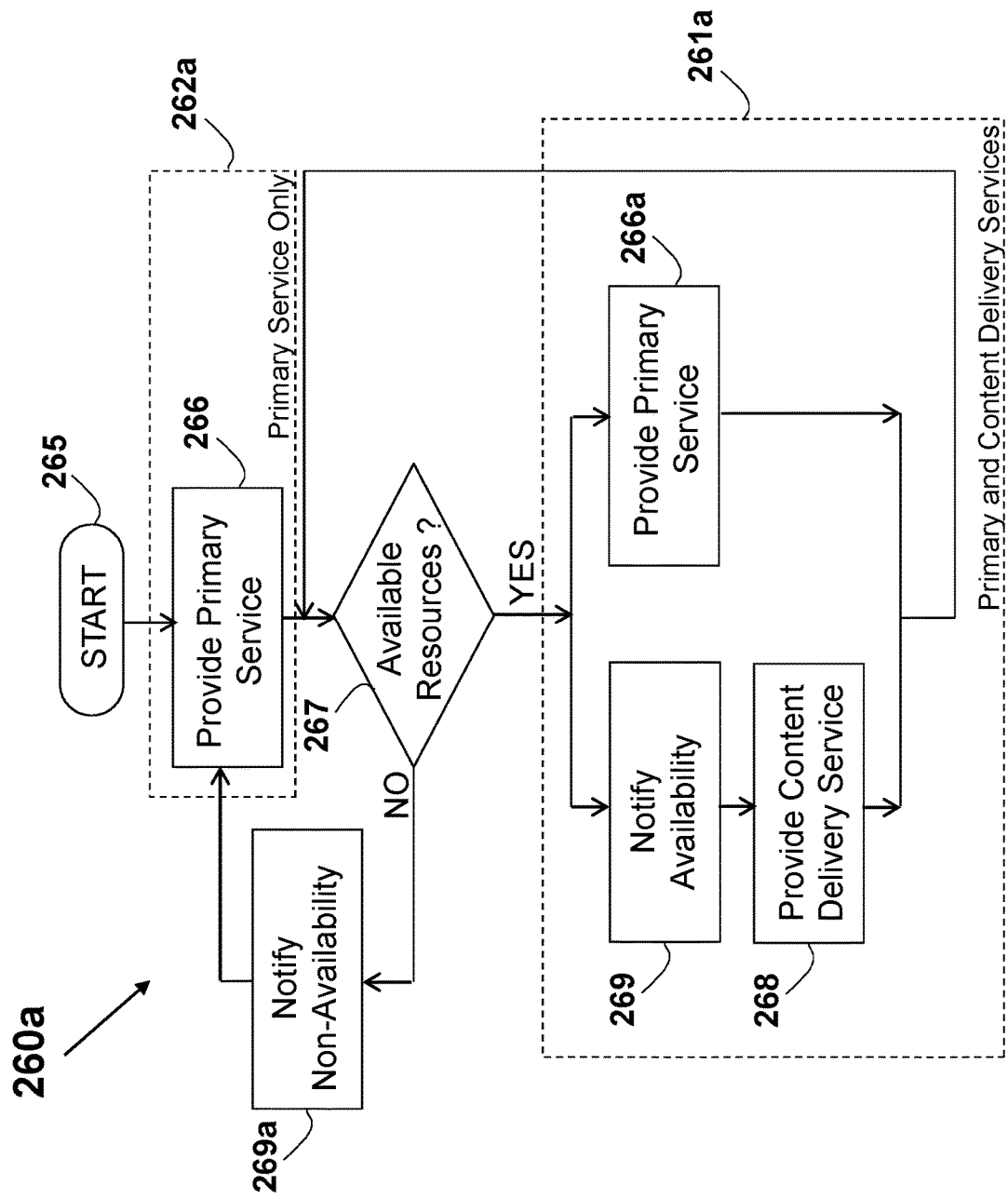
FIG. 27 illustrates schematically a simplified flow-chart of a method relating to a dual-functionality non-dedicated server.

The non-dedicated server #6 282 operation may follow a flow chart 260a illustrated in FIG. 27. After start-up phase and upon being fully operational as part of a 'START' step 265, the non-dedicated server #6 282 enters the 'Primary Service Only' state 262a (corresponding to the 'Primary Service Only' state 262 in the state diagram 260), and provides the primary service to the primary service requesting client devices as part of a "Provide Primary Service" step 266. Periodically or continuously, the non-dedicated server #6 282 checks the status and the utilization level of the various resources, such as memory space, CPU power, bandwidth, or all of them, as part of a "Available Resources?" step 267. For example, a threshold level may be set, such as a relative utilization (versus the total available capacity) for each of hardware (or software, or both) resources. In a case where there is no available spare capacity, or not enough spare capacity (or not available enough to support any reliable or effective content delivery service), such as where the relative utilization of one or all of the measured utilizations is above the threshold, the non-dedicated server #6 282 reverts to the 'Primary Service Only' state 262a, and continues to only provide and support the primary functionality.

In a case where available capacity or resources was detected as part of the "Available Resources?" step 267, such as detecting idling resources, and where such available capacity may be used for content delivery service, the non-dedicated server #6 282 may shift to the "Primary and Content Delivery Services" state 261a (corresponding to "Primary & Content Delivery" state 261). In this state, in addition to providing the primary service as part of a "Provide Primary Service" step 266a, which may be identical to the "Provide Primary Service" step 266, the non-dedicated server #6 282 concurrently provide content delivery services as part of a "Provide Content Delivery Service" step 268. For example, the non-dedicated server #6 282 may provide the full functionality described regarding the independent server #5 42e, such as streaming content to requesting client devices. For example, in response to request for a content (such as the movie #2 47b stored in the memory 46f of the non-dedicated server #6 282) from the client device #1 24, shown as a messaging line 286a, the non-dedicated server #6 282 streams the requested content to the client device #1 24 shown as a messaging line 286b in the arrangement 280. As long as there are available resources to support both the primary service and the content delivery service, both services are concurrently provided to client devices. However, when it is determined as part of the "Available Resources?" step 267 that the utilization may degrade or otherwise affect the primary service, the content delivery service is withheld, and the non-dedicated server #6 282 reverts to only provide the primary service.

In order to use the content delivery service available by the non-dedicated server #6 282 as part of the "Provide Content Delivery Service" step 268, the content delivery arrangement is required to be notified about such availability, so that client devices may access the non-dedicated server #6 282 for content request, to be followed by obtaining the requested content from the non-dedicated server #6 282. In one example, upon determining by the non-dedicated server #6 282 that content delivery service may be available, the non-dedicated server #6 282 notifies the system regarding its availability for content delivery, as part of a "Notify Availability" step 269, for example in order to be included in a sources list (such as the sources list 119), in a history database (such as the history table 190), in both, or in any other mechanism that notify client devices or any servers in the system that such content service is available from this non-dedicated server. Such notification may include any of the characteristics in the sources list 119 or in the history table 190, such as the non-dedicated server #6 282 identification (such as its IP address, as shown in the column 112c of the table 119), the non-dedicated server geographical location (such as the 'Location' column 192 in the table 190), an estimated RTT (corresponding to the column 112d in the table 119), an estimated BW (corresponding to the column 112e in the table 119), the requested price for the service (corresponding to the column 112f in the table 119), or the content stored or otherwise available from this non-dedicated server (corresponding to the column 192d in the table 190). Similarly, upon determining that no surplus resources may be available for content delivery service, an appropriate message is sent as part of a "Notify Non-Availability" step 269a, for example, in order to exclude or suspend the non-dedicated server #6 282 as a possible source in a sources list (such as the sources list 119), in a history database (such as the history table 190), in both, or in any other mechanism that notify client devices, or any servers in the system that such content service cease to be available by this non-dedicated server.

In one example, the availability notification sent as part of the "Notify Availability" step 269, the non-availability notification sent as part of the "Notify Non-Availability" step 269a, or both notifications are transmitted as a message 284a to the VOD Service Server 48, and may be acknowledged as a message 284b shown in the arrangement 280. In such a scheme, the VOD Service Server 48 may include the non-dedicated server #6 282 identification as part of a sources list (such as the sources list 119) only upon the time period associated with its availability, such as starting upon receiving an availability notification (sent as part of the "Notify Availability" step 269) until receiving a non-availability notification (sent as part of the "Notify Non-Availability" step 269a). Alternatively or in addition, the availability notification sent as part of the "Notify Availability" step 269, the non-availability notification sent as part of the "Notify Non-Availability" step 269a, or both notifications are transmitted as a message 283a to the Performance Server 171, and may be acknowledged as a message 283b shown in the arrangement 280. In such a scheme, the Performance Server 171 may include the non-dedicated server #6 282 identification as part of a list of the sources history (such as the table 190), or designate this source as available as potential source, only upon the time period associated with its availability, such as starting upon receiving an availability notification (sent as part of the "Notify Availability" step 269) until receiving a non-availability notification (sent as part of the "Notify Non-Availability" step 269a). Alternatively or in addition, the availability notification sent as part of the "Notify Availability" step 269, the non-availability notification sent as part of the "Notify Non-Availability" step 269a, or both, may be sent to one or more client devices. For example, a non-availability notification (sent as part of the "Notify Non-Availability" step 269a) may be sent to a client device that is streaming content from the non-dedicated server #6 282, allowing this client device to timely cease trying to load content from the non-dedicated server #6 282, and to shift to use an alternative source.

The functionality of the non-dedicated server #6 282 may be integrated, in part or in full, to any other server, such as the VOD Service Provider 48, where the primary service is handling and managing the VOD service. Alternatively or in addition, the functionality may be integrated, in part or in full, in the performance server 171, where the primary service is to store, manage, or manipulate the various content servers performance history. Alternatively or in addition, the non-dedicated server #6 282 may be a DNS server, where DNS is the primary service, or may be a DHCP server, where DHCP is the primary service. Similarly, the non-dedicated server #6 282 may be a web server, an FTP server, a mail server, or a database server, or any combination thereof.

In one example, the resource checked as part of the "Available Resource?" step 267 is an availability of a processor time or power. A CPU time (also known as CPU power or process time). A CPU time (typically measured in clock ticks or seconds) is the amount of time for which a processor (such as a Central Processing Unit (CPU)) is used for processing instructions of a computer program or operating system, as opposed to being idling and not being used by any task or program. It is commonly useful to measure the CPU time as a ratio (such as in percentage) of the processor capacity, namely a CPU usage or CPU utilization. For example, a processor idling 10% of a time-period is considered to have 90% CPU usage or utilization during that period. Some operating systems employ an idle task during idling, typically hard-coded into the OS scheduler, which is executed by the processor when there is nothing for the processor to do. While typically, the CPU time or utilization is measured using a service provided by the Operating System (OS), non-OS programs, and hardware-based solutions may as well be used. Various techniques for measuring CPU time or utilization are described in U.S. Pat. No. 6,711,526 to Cooper entitled: "Operating System-Independent Method and System of Determining CPU Utilization", in U.S. Pat. No. 6,845,456 to Menezes et al. entitled: "CPU Utilization Measurement Techniques for Use in Power Management", in U.S. Pat. No. 7,412,354 to Lee et al. entitled: "Method for Measuring Quantity of Usage of CPU", and in U.S. Pat. No. 7,886,302 to Kadashevich entitled: "System and Method for Tracking Processing Unit Usage", which are all incorporated in their entirety for all purposes as if fully set forth herein.

In one example, the CPU power availability as part of the "Available Resources?" step 267 is determined using a threshold associated with CPU (or any other relevant processor) utilization. For example, the utilization threshold may be set to 30%, where in case of measuring or detecting a CPU utilization under 30%, it is assumed that the CPU may support the additional task of content delivery without degrading or affecting the primary service ('YES' in determining resources availability in the flow-chart 260a), and the non-dedicated server #6 282 may shift to the "Primary and Content Delivery Services" state 261a to concurrently provide a content delivery service in addition to the primary service. Similarly, upon detecting or measuring a CPU utilization above 30%, it is assumed that the primary service may be degraded or affected (NO' in determining resources availability in the flow-chart 260a), and thus the non-dedicated server stops the support of the additional task of content delivery. Similarly, a CPU utilization threshold of 20%, 25%, 35%, 40%, 45%, 50%, 55%, 60%, or 70% may equally be used. Further, the measurement of the CPU time or utilization may be based on average measured over a set time period, such as 10 ms, 100 ms, 500 ms, 1 second, 5 seconds, 10 seconds, 100 seconds, 500 seconds, 1 hour, 5 hours, or 10 hours.

Alternatively or in addition to using CPU usage (or any other processor functionalities) as the resource to be checked for availability, an available memory may be used as a criterion for availability, such as a volatile or a non-volatile memory, for example a cache allocated memory, or any other memory required for the content delivery service operation or functionality. An available memory capacity threshold may be used, such as 500 MB, where in case of measuring or detecting an available memory for use above 500 MB, it is assumed that the available memory may support the additional task of content delivery without degrading or affecting the primary service ('YES' in determining resources availability in the flow-chart 260a), and the non-dedicated server #6 282 may shift to the "Primary and Content Delivery Services" state 261a to concurrently provide a content delivery service in addition to the primary service. Similarly, upon detecting or measuring an available memory space that is below 500 MB, it is assumed that there may be degrading or affecting of the primary service (NO' in determining resources availability in the flow-chart 260a), and thus the non-dedicated server stops the support of the additional task of content delivery. Similarly, an available memory space threshold of 100 MB, 200 MB, 500 MB, 1 GB, 2 GB, 5 GB, 10 GB, 20 GB, 50 GB, 100 GB, 200 GB, 500 GB, 1 TB, 2 TB, 5 TB, 10 TB, 20 TB, 50 TB, 100 TB, 200 TB, or 500 TB may equally be used. Alternatively or in addition, the available memory space may be measured as a ratio (such as percentage) of the total relevant memory space, namely a memory usage or memory utilization, and a memory utilization threshold may be used, such as 20%, 25%, 30%, 35%, 40%, 45%, 50%, 55%, 60%, or 70%, where a memory may be considered available when the memory utilization is below the memory utilization threshold that is used. Further, the measurement of the available memory space may be based on average, measured over a set time period, such as 10 ms, 100 ms, 500 ms, 1 second, 5 seconds, 10 seconds, 100 seconds, 500 seconds, 1 hour, 5 hours, or 10 hours.

Alternatively or in addition to using CPU usage (or any other processor functionalities), memory usage, or both as the resource to be checked for availability, an available bandwidth—BW (such as for connecting to the Internet 22) may be used as a criterion for availability. An available BW capacity threshold may be used, such as 500 Mb/s, where in case of measuring or detecting an available bandwidth for use above 500 Mb/s, it is assumed that the available BW may support the additional task of content delivery without degrading or affecting the primary service ('YES' in determining resources availability in the flow-chart 260a), and the non-dedicated server #6 282 may shift to the "Primary and Content Delivery Services" state 261a to concurrently provide a content delivery service in addition to the primary service. Similarly, upon detecting or measuring an available BW that is below 500 Mb/s, it is assumed that there may be degrading or affecting the primary service (NO' in determining resources availability in the flow-chart 260a), and thus the non-dedicated server stops the support of the additional task of content delivery. Similarly, an available BW space threshold of 10 Mb/s, 20 Mb/s, 50 Mb/s, 100 Mb/s, 200 Mb/s, 500 Mb/s, 1 Gb/s, 2 Gb/s, 5 Gb/s, 10 Gb/s, 20 Gb/s, 50 Gb/s, 100 Gb/s, 200 Gb/s, 500 Gb/s, 1 Tb/s, 2 Tb/s, 5 Tb/s, or 10 Tb/s may equally be used. Alternatively or in addition, the available BW threshold may be measured as a ratio (such as percentage) of the total relevant BW, namely a BW usage or BW utilization, such as 70%, that corresponds to a 30% available BW that represents BW available of 3 Mb/s in a total of 10 Mb/s BW connection. A BW utilization threshold may be used, such as 20%, 25%, 30%, 35%, 40%, 45%, 50%, 55%, 60%, or 70%, where a BW may be considered available when the BW utilization is below the BW utilization threshold that is used. Further, the measurement of the available BW may be based on average usage of BW measured over a set time period, such as 10 ms, 100 ms, 500 ms, 1 second, 5 seconds, 10 seconds, 100 seconds, 500 seconds, 1 hour, 5 hours, or 10 hours.

Figure 29:
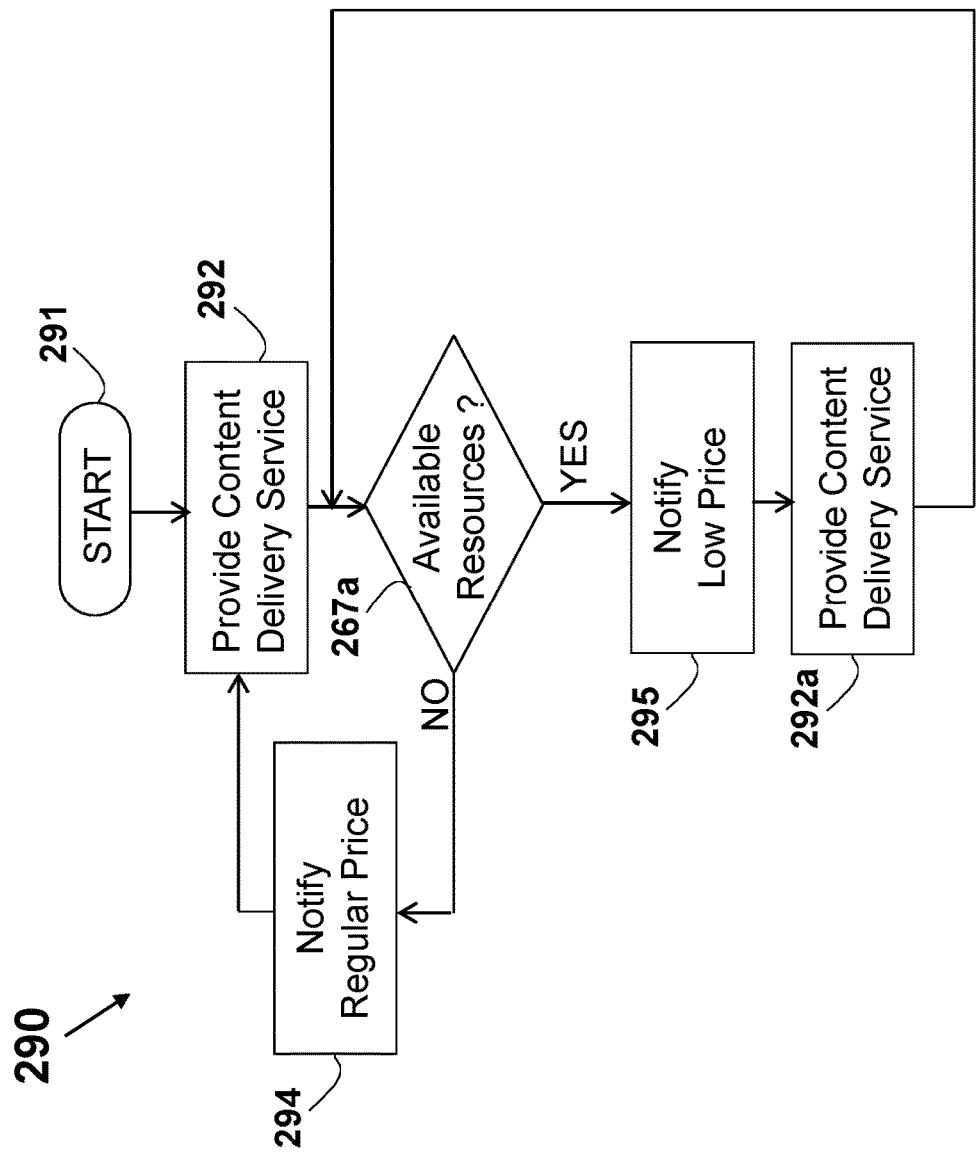
FIG. 29 illustrates schematically a simplified flow-chart of a method relating to a content delivery server charging multiple prices.
Figure 29A:
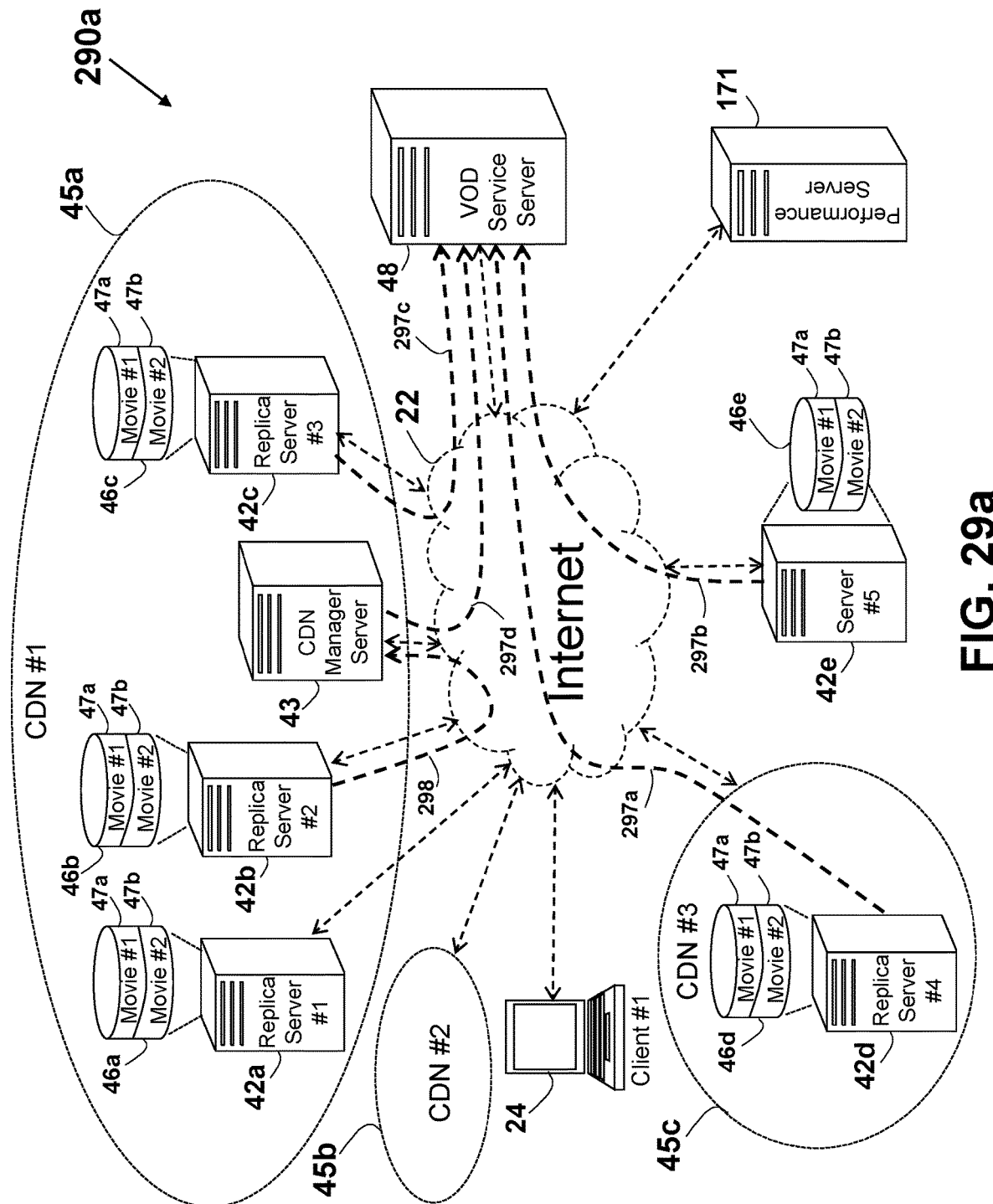
FIG. 29a depicts schematically messages exchanged over the Internet relating to notifying price changes by content delivery servers to a VOD service provider.

The cost charged by the various content delivery servers, typically per the amount of delivered content, may be a fixed cost that is set by the content delivery service provider, owner, or operator, and is paid by a VOD service provider for the delivery service to a client device. Alternatively or in addition, a content delivery server provider, owner, or operator, may periodically, continuously, or from time to time, change the price charged for content delivery. A price change is preferably notified to potential users or buyers of the content delivery service, such as notification to the VOD service server 48, as illustrated in an arrangement 290a in FIG. 29a. An independent content server, such as the server #5 42e or the server #6 282, may notify a new or an updated price of the respective independent server to the VOD Service Server 48 over the Internet 22 shown as a messaging line 297b. Similarly, a replica server, such as the replica server #3 42c (of the CDN #1 45a) and the replica server #4 42d (of the CDN #3 45c), may notify a new or an updated price of the respective replica server to the VOD Service Server 48 over the Internet 22 shown as respective messaging lines 297c and 297a. In one example, a replica server is managed by a corresponding CDN manager server, which manages the prices of a specific replica server or of the whole replica servers of the CDN. For example, the replica server #2 of CDN #1 45a may notify its status or a new price to the CDN #1 CDN manager server 43 over a messaging line 298, which in turn notify the VOD Service Server 48 over the Internet 22 shown as a respective a messaging line 297d. A CDN manager server may handle one, few, or all of the replica servers in the CDN, and may thus notify a new pricing of one, few, or all of the replica servers in the CDN. The new prices received by the VOD service server 48 are used for updating the costs in the 'Cost' column 112f in the table 119, thus affecting the sources and costs included in the table 119, or the selection of content servers to be used or selected by a client device, for example as part of the "Sources Allocation" step 124 in the flow-chart 120. Alternatively or in addition, the new prices received by the VOD service server 48 may be used for updating the costs in the 'Cost' column 192k in the table 190, thus affecting the sources and costs in the table 190, or the selection of content servers to be used or selected by a client device, for example as part of the "Identify Potential Sources" step 272 in the flow-chart 270.

Figure 29B:
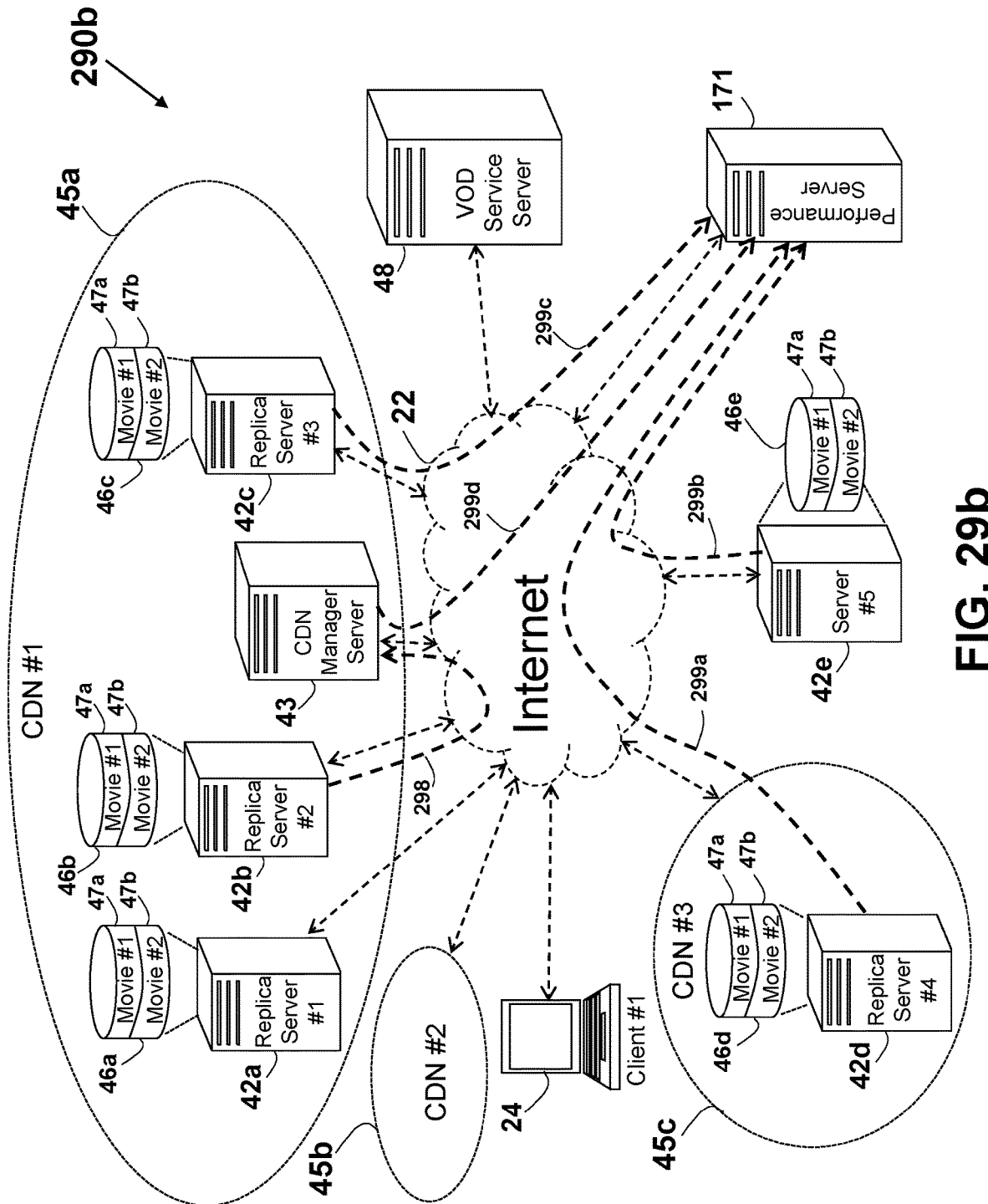
FIG. 29b depicts schematically messages exchanged over the Internet relating to notifying price changes by content delivery servers to a performance server.

Alternatively or in addition, a price change may be notified to the performance server 171, as illustrated in an arrangement 290b in FIG. 29b. An independent content server, such as the server #5 42e or the server #6 282, may notify a new or an updated price of the respective independent server over the Internet 22 to performance server 171 shown as a messaging line 299b. Similarly, a replica server, such as the replica server #3 42c (of the CDN #1 45a) and the replica server #4 42d (of the CDN #3 45c), may notify a new or an updated price of the respective replica server to the performance server 171 over the Internet 22 shown as respective messaging lines 299c and 299a. In one example, a replica server is managed by a corresponding CDN manager server, which manages the prices of a specific replica server or of the whole replica servers of the CDN.

For example, the replica server #2 of CDN #1 45a may notify its status or a new price to the CDN #1 CDN manager server 43 over a messaging line 298, which in turn, notifies the performance server 171 over the Internet 22 shown as a respective a messaging line 299d. A CDN manager server may handle one, few, or all of the replica servers in the CDN, and may thus notify a new pricing of one, few, or all of the replica servers in the CDN. The received new prices are then used for updating the costs in the 'Cost' column 112f in the table 119, thus affecting the sources and costs included in the table 119, or the selection of content servers to be used or selected by a client device, for example as part of the "Sources Allocation" step 124 in the flow-chart 120. Alternatively or in addition, the new prices received by the performance server 171 may be used for updating the costs in the 'Cost' column 192k in the table 190, thus affecting the sources and costs in the table 190, or the selection of content servers to be used or selected by a client device, for example as part of the "Identify Potential Sources" step 272 in the flow-chart 270. Alternatively or in addition, the price changes may be notified to client devices, such as the client device #1 24.

In one example, the requested price associated with a content delivery by a content server (that may be a replica or independent server), may be based on the server load at one time. In a case where there is a surplus in the content server capacity, and some or all of the content server resources are idling, reducing content delivery price increases the revenue, without any substantial CAPEX or OPEX increase. In such a case, a pricing handling by a content server may follow a flow chart 290 shown in FIG. 29. In one example, it is assumed that the content server service is associated with two distinct prices: a regular price, and a low price that is lower than the regular price. Upon operation start as part of a "START" step 291, a regular price is used, and notified in a "Notify Regular Price" step 294 to the a user or BW buyer, such as the VOD service server 48 as shown in the arrangement 290a or the performance server 171 as shown in the arrangement 290b.

The content server provides the content delivery service as described herein as part of the "Provide Content Delivery Service" step 292. In an "Available Resources?" step 267a, which corresponds to the "Available Resources?" step 267 of the flow-chart 260a, the utilization of the content delivery resources of the server are checked. In the case where there is no surplus of resources capacity, the regular price is maintained. However, in a case where the content server is substantially underloaded, and may provide substantial content delivery service, the low-price will be offered for the content delivery service for attracting more content delivery service, which traffic can be charged. Upon detecting or measuring a low utilization, the low price is used, and the new low price is notified in a "Notify Low Price" step 295 to the a user or BW buyer, such as the VOD service server 48 as shown in the arrangement 290a or the performance server 171 as shown in the arrangement 290b. The content delivery service continues with low price charging at a "Provide Content Delivery Service" step 292a, which corresponds to the "Provide Content Delivery Service" step 292. While two prices are exampled, any number of prices may be used, based on the resources availability or utilization. Further, a continuous pricing scheme may be used, such as a price that is a function of (or otherwise dependent upon) the available bandwidth.

Figure 30:
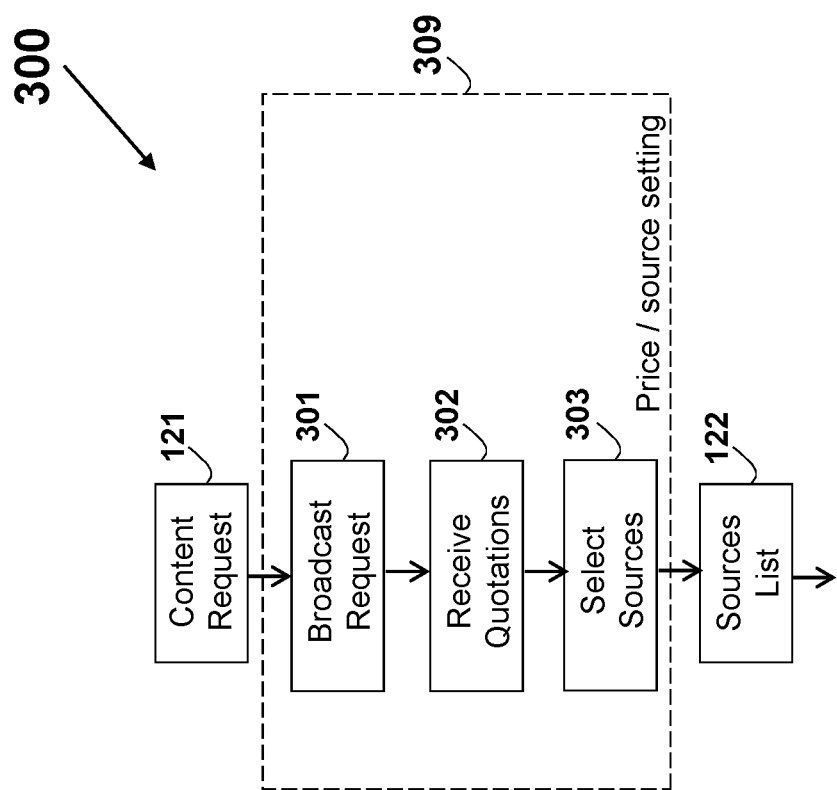
FIG. 30 illustrates schematically a simplified flow-chart of a method relating to a bidding scheme for a content delivery service.
Figure 30A:
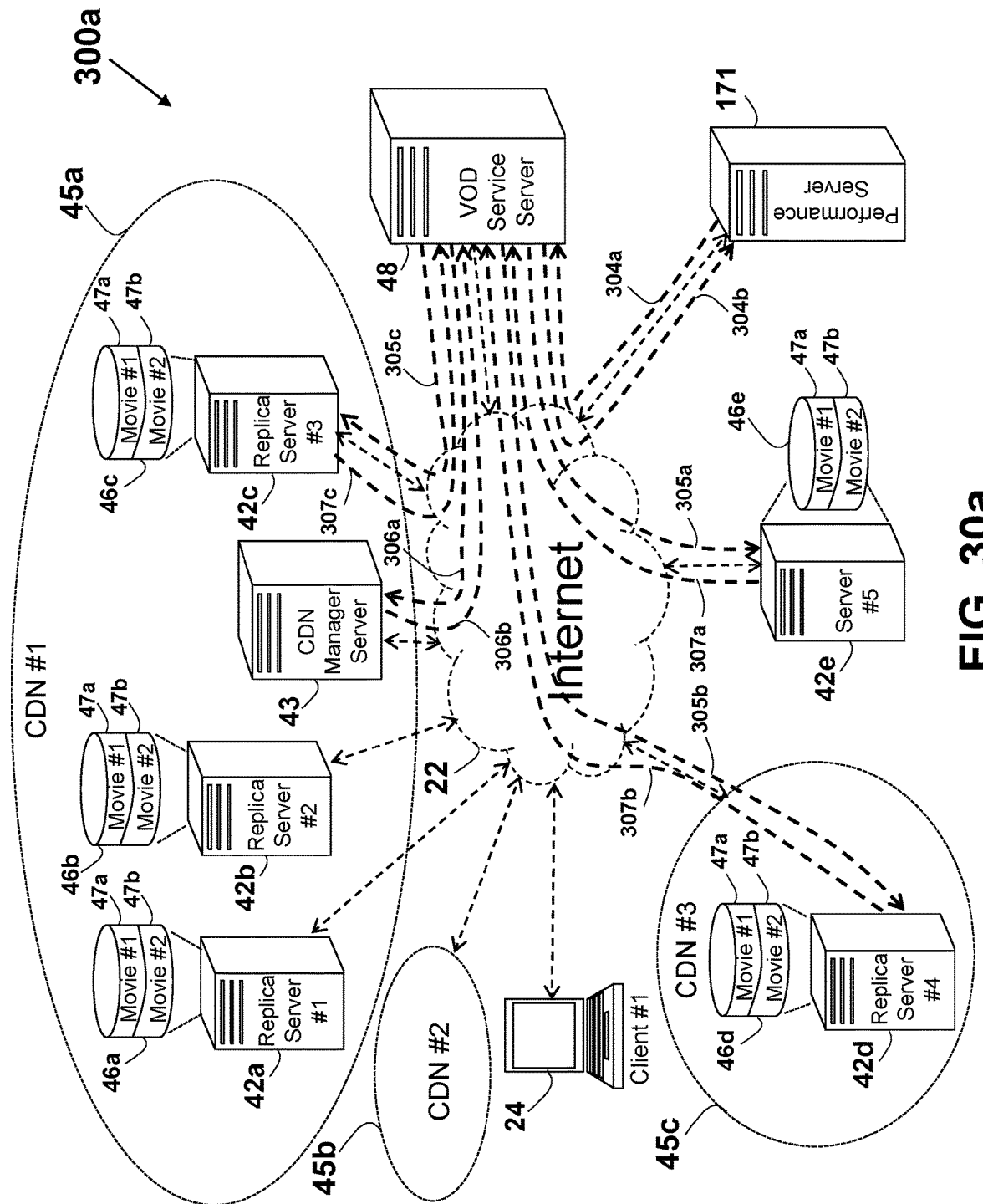
FIG. 30a depicts schematically messages exchanged over the Internet relating to a bidding scheme for a content delivery service.

In the example shown in the flow-chart 260a, a content delivery server price for content delivery may change from time to time based on resources availability. Alternatively or in addition, a price setting scheme may be employed associating in real-time a distinct price with each transaction of content delivery to a client device. For example, any content delivery process may be preceded by a mechanism to set a distinct price, a distinct vendor, or both. Such a mechanism is exampled in a flow chart 300 shown in FIG. 30, employing a "Price/source setting" sub-flow chart 309, to be executed between the "Content Request" step 121 and the "Sources List" step 122 described in the flow chart 120 shown in FIG. 12, that may employ an exemplary arrangement 300a shown in FIG. 30a.

In such a scheme, upon receiving by a VOD service server (such as the VOD service server 48) a content request from a requesting client device as part of the "Content Request" step 121, such as from the client device #1 24 as part of the "Content Request" message 134a in the messaging chart 130 (that may correspond to the message line 91b in the arrangement 100), the "Price/source setting" flow chart 309 is initiated. The VOD service server 48 sends a quotation request, which is based on the request received from the requesting client device, to all potential, relevant, or available content servers that may be used to deliver the requested content to the requesting client device. In the example shown in the arrangement 300a, the request is sent over a message line 305a to the independent server #5 42e, over a message line 305b to the replica server #4 42d, and over a message line 305c to the replica server #3 42c. The broadcasted request may include an identification of the requested content, an identification of the requesting client device, a geographical location of the requesting client device, or any combination thereof.

Each of the content servers, which received the quotation requests for content, and is available and interested in delivering the requested content to the requesting client device, responds by providing a quotation to the VOD service server 48 as part of a "Receive Quotations" step 302. In the example shown in the arrangement 300a, the quotation is sent to the VOD service server 48 over a message line 307a from the independent server #5 42e, over a message line 307b from the replica server #4 42d, and over a message line 307c from the replica server #3 42c. A quotation response typically comprises a price for the delivery of the specific requested content to the specific requesting client device, and may further be time-limited, such as valid for a limited time period, (i.e., 10, 20, 50, 100, 200, or 300 ms), and expires afterwards, for allowing the content server to free resources that may have been allocated for this specific content delivery session. Based on the receive quotation, the VOD service server 48 may select one or multiple servers as sources for delivering the requested content to the requesting client device as part of a "Select Sources" step 303, and include the selected sources in a sources list (such as the table 119 in FIG. 11a), to be further handled. The mechanism described in the flow chart 300 allows content servers to change their pricing dynamically and in real-time, for example, according to the availability of resources as described in the flow chart 290. Further, the VOD service provider 48 may, as part of the "Select Sources" step 303, notify the non-selected sources regarding their non-selection status, allowing these sources to reduce or otherwise improve their quotations in subsequent bids.

In the example shown in the arrangement 300a, the VOD service server 48 directly communicates with both independent servers, such as the independent server #5 42e and the non-dedicated server #6 282, and replica servers, such as the replica server #4 42d and the replica server #3 42c. Alternatively or in addition, replica servers that are part of a CDN (such as the CDN #1 45a) are not directly approached by the VOD service server 48, but are rather used and managed via a respective CDN manager server, such as the CDN manager server 43 that is managing and controlling part of all of the replica servers of the CDN #1 45a. Such approach allows a CDN provider to load-balance and to centralize the control and management of the CDN. In such a scenario, the VOD service server 48 communicates only with the CDN manager server 43, such as by sending a quotation request as part of the "Broadcast Request" step 301 illustrated as a message line 306a. As part of the "Receive Quotations" step 302, the CDN manager server 43 replies with the availability and quotations regarding one or multiple replica servers (such as the replica server #1 42a, the replica server #2 42b, and the replica servers #3 42c), illustrated as a message line 306b in the arrangement 300a. While exampled above regarding the VOD service server 48 broadcasting the quotation request as part of the "Broadcast Request" step 301, receiving the quotations from the applicable content servers as part of the "Receive Quotations" step 302, and selecting sources based on the received quotations as part of the "Select Sources" step 303, part or all of the steps and functionalities may be performed by the performance server 171, by a client device such as the requesting client device (such as the client device #1 24), or by any other device, which may be a client or server device, and may be partially or in full dedicated for the purpose of executing the "Price/source setting" flow chart 309.

The VOD service server sends a request for quotation as part of the "Broadcast Request" step 301 to a list identifying a group of content servers that may potentially serve for delivery of the requested content to the requesting client device. In one example, the list of sources that are offered to quote is based on former performance that is stored in the performance server 171. In this example, upon receiving a request for content as part of the "Content Request" step 121, the VOD service server 48, as part of the "Broadcast Request" step 301, sends a request for a list to the performance server 171, denoted as a message line 304a in the arrangement 300a. In response, the performance server 171 prepares and sends the list, denoted as a message line 304b in the arrangement 300a, identifying the group of content servers that may potentially serve for delivery of the requested content to the requesting client device, to be approached for quotation by the VOD service server 48. Such a list may be prepared according to the flow chart 270 shown in FIG. 19d, and may be based on the history of content delivery performance of the relevant sources.

The "Price/source setting" flow chart 309 in general, and the selecting of sources as part of the "Select Sources" step 303, may use a reverse auction mechanism, where the goods being auctioned relates to the service of delivering the requested content to the requesting client device, offered up for bids by various content delivery sources as part of the "Broadcast Request" step 301, such as to independent content delivery servers, replica servers as part of CDNs, or CDNs by CDN manager servers, which participate in the bidding process by quoting a price for the service, as part of the "Receive Quotations" step 302. In such a reverse auction mechanism, the VOD service server 48 selects, as part of the "Select Sources" step 303, the sources associated with the lowest quotations, hence reducing the VOD provider cost for the content delivery transaction. By revealing the competing quotations bids in real time to every participating supplier (potential source), reverse auctions promote "information transparency", and allows sources to improve their future quotations. Alternatively or in addition, a 'sealed first-price auction' or 'blind auction' (also known as a First-Price Sealed-Bid auction (FPSB)) mechanism may be used, where all relevant sources (bidders) simultaneously submit sealed bids so that no bidder knows the bid of any other participant. Alternatively or in addition, a 'Dutch auction' mechanism may be employed. In such a scenario, the sets a minimum price for the transaction, and the first one or more sources that accept this minimum price are selected. In the case where there are not enough sources that accept the price, this minimum price is raised by the VOD service server 48 by forming another bidding sequence, until enough sources are available for the "Select Sources" step 303.

According to one or more of the methods and systems described herein, the requested content is partitioned into multiple parts, and the client device #1 24 obtains the different parts in parallel from different replica servers. In the example shown in FIG. 11, the content 110 is split into five segments denoted as part 'A' 110a to part 'E' 110e. In one example, a content is split into two parts only, as shown regarding a content 310 shown in FIG. 31. In this scheme, the content 310 is split into two parts, the beginning of the content designated as Init 310a, and the rest of the content 310 designated as Rest 310z. The Init part 310a starts at the beginning of the content 310, and is substantially a small part of the whole content 310, such as 0.1%, so that for a content having a total of 900 MB data, the size of the Init part 310a is 900 KB.

The size of the Init part 310a may be less than 0.01%, 0.02%, 0.03%, 0.05%, 0.07%, 0.1%, 0.2%, 0.3%, 0.5%, 0.7%, 1%, 2%, 5%, 7%, or 10% of the total content size. Alternatively or in addition, the size of the Init part 310a may be higher than 0.01%, 0.02%, 0.03%, 0.05%, 0.07%, 0.1%, 0.2%, 0.3%, 0.5%, 0.7%, 1%, 2%, 5%, 7%, or 10% of the total content size. Further, the size of the Init part 310*a* may correspond to playing time of less than 0.1, 0.2, 0.5, 0.7, 1, 2, 5, 7, 10, 15, 20, 25, 30, 35, or 50 seconds. Alternatively or in addition, the size of the Init part 310*a* may be higher than 0.1, 0.2, 0.5, 0.7, 1, 2, 5, 7, 10, 15, 20, 25, 30, 35, or 50 seconds. Similarly, the size of the Init part 310*a* may be less than 100 KB, 200 KB, 300 KB, 500 KB, 1 MB, 1.5 MB, 2 MB, 3 MB, 4 MB, or 5 MB. Alternatively or in addition, the size of the Init part 310*a* may be higher than 100 KB, 200 KB, 300 KB, 500 KB, 1 MB, 1.5 MB, 2 MB, 3 MB, 4 MB, or 5 MB. In a case where the file 310 is stored, provided, or otherwise available as fragmented and is structured or composed of multiple files, such as in HTTP Adaptive Bitrate (ABR) streaming, the file partitioning may correspond to the fragmented files, such that the Init 310*a* part may include one, two, or any number of the first to be played file fragments. Alternatively or in addition, the ending point of the Init 310*a* part may be a starting or ending point of a file fragment. Assuming the Init 310*a* size is 0.1% of the total content 310 size, the memory size required to store a content 310 may alternately be used to store 1000 Init 310*a* parts.

Figure 32:
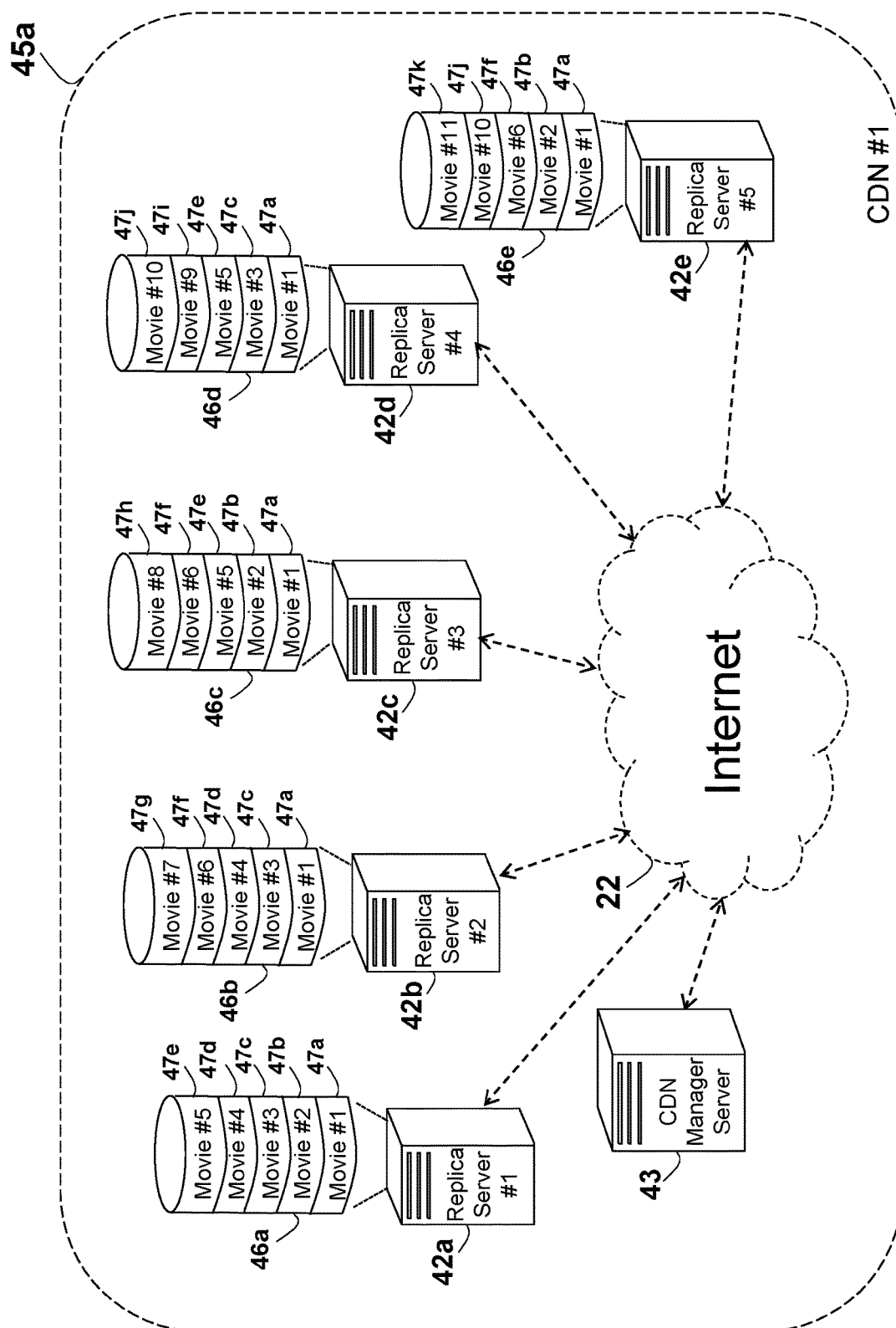
FIG. 32 depicts schematically a prior-art CDN connected over the Internet.

Typically, replica servers in CDNs load and store in their memory content requested by clients, and since in many cases users watch the whole content, such as the whole movie, in time the replica servers store full content requested by customers assigned to stream content from the respective replica servers. Hence, after some operational time, in the case the same content (such as the movie #1 47*a*) is requested by few customers in different locations assigned to respective different replica servers, multiple copies of the same content will be cached into the respective replica servers. An example of a state the CDN #1 45*a* after some operational time (a 'snapshot') is shown in FIG. 32. At this time, the replica server #1 42*a* stores the movie #1 47*a*, the movie #2 47*b*, a movie #3 47*c*, a movie #4 47*d*, and a movie #5 47*e*, the replica server #2 42*b* stores the movie #1 47*a*, the movie #3 47*c*, the movie #4 47*d*, a movie #6 47*f*, and a movie #7 47*g*. The replica server #3 42*c* stores the movie #1 47*a*, the movie #2 47*b*, the movie #5 47*e*, the movie #6 47*f*, and a movie #8 47*h*, the replica server #4 42*d* stores the movie #1 47*a*, the movie #3 47*c*, the movie #5 47*e*, a movie #9 47*i*, and a movie #10 47*j*, and the replica server #5 42*e* stores the movie #1 47*a*, the movie #2 47*b*, the movie #6 47*f*, the movie #10 47*j*, and a movie #11 47*k*.

The content storing by the CDN #1 45*a* exampled in FIG. 32 is inefficient, since multiple copies of the same content are stored in multiple replica servers. For example, the movie #1 47*a* is stored in the cache memory 46*a* of the replica server #1 42*a*, in the cache memory 46*b* of the replica server #2 42*b*, in the cache memory 46*c* of the replica server #3 42*c*, in the cache memory 46*d* of the replica server #4 42*d*, and in the cache memory 46*e* of the replica server #5 42*e*. Similarly, the movie #3 47*c* is stored in the cache memory 46*a* of the replica server #1 42*a*, in the cache memory 46*b* of the replica server #2 42*b*, and in the cache memory 46*d* of the replica server #4 42*d*. Since a storage size is inherently limited in a replica server, storing redundant copies means that other content that may be required is not stored, and thus a 'cache miss' will happen upon a request of the other content. Further, the multiple copies of the same content were downloaded from the origin server causing multiple and redundant data transfer activities.

Figure 31:
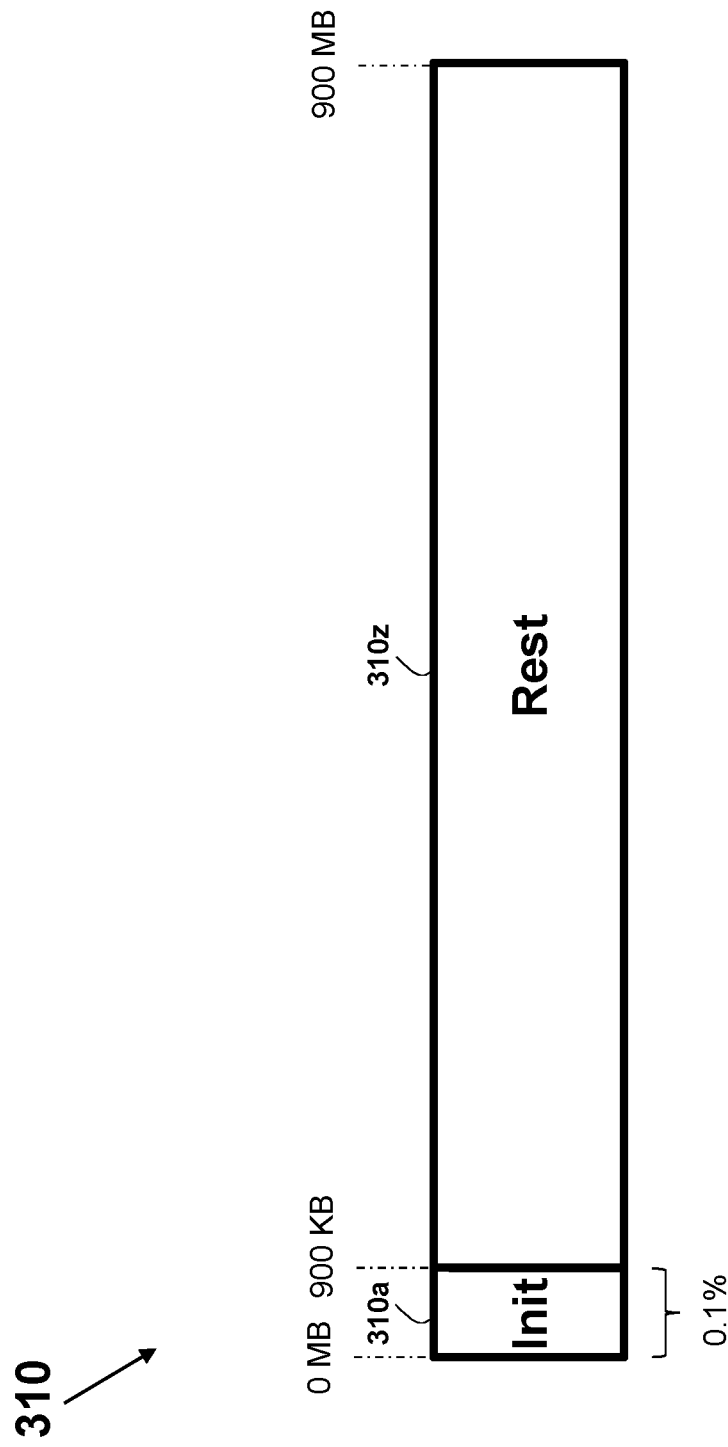
FIG. 31 illustrates schematically an example of a partitioning of content into two parts.
Figure 33:
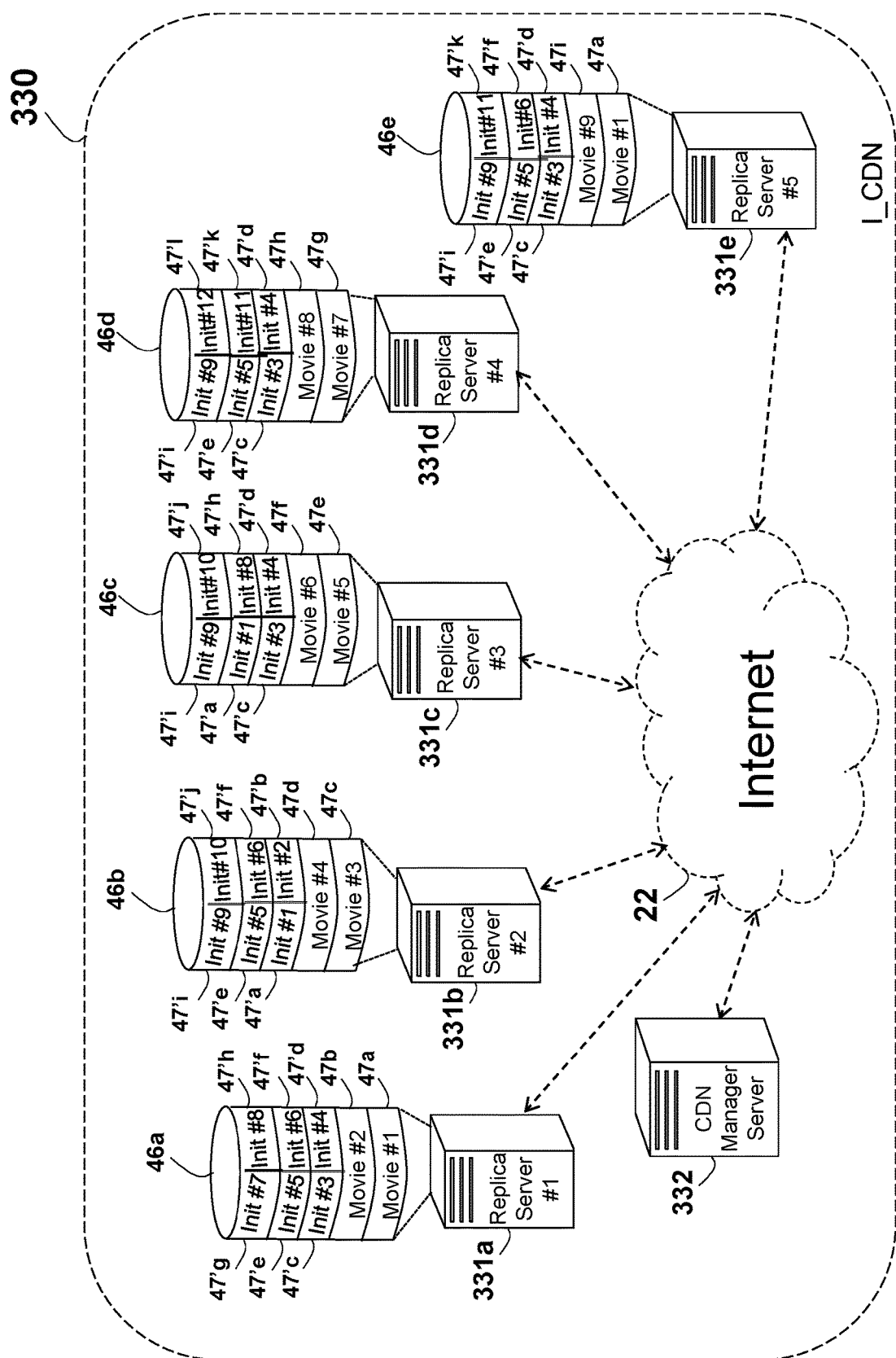
FIG. 33 depicts schematically an improved CDN connected over the Internet using two-parts partitioning of content.

An improved CDN, designated as I_CDN 330 is shown in FIG. 33, which is based on the partitioning of a content such as the content 310 into the Init part 310*a* and the Rest part 310*z*, as shown in FIG. 31. The I_CDN 330 is managed by a CDN Manager Server 332, which corresponds to the CDN Manager Server 43, and includes multiple replica servers, such as a replica server #1 331*a*, a replica server #2 331*b*, a replica server #3 331*c*, a replica server #4 331*d*, and a replica server #5 331*e*, respectively comprising the cache memories 46*a*, 46*b*, 46*c*, 46*d*, and 46*e*. The I_CDN 330 is designed to have minimum number of complete copies of a content in the I_CDN 330, preferably a single copy, but two, three or any other number may as well be obtained, and to store in the replica servers multiple Init parts of the content files. Preferably, in most cases of content requests, a replica server, selected for example based on physical proximity to the client device 24, provides only the Init part 310*a* of the requested content 310 to the client device 24, thus providing fast start up, and in parallel the Rest part 310*z* of the content is downloaded from the replica server that stores the full copy of the requested content. In one example, the Init 310*a* parts stored in a cache memory of a replica server occupies at least 1%, 5%, 10%, 15%, 20%, 25%, 30%, 35%, 40%, 45%, 50%, 55%, 65%, 70%, 75%, 80%, 85%, 90%, or 95% of the total available memory space of the cache memory.

The cache memory 46*a* that is part of the replica server #1 331*a* stores at one point in time the complete copy of the movie #1 47*a*, the complete copy of the movie #2 47*b*, an Init #3 47'*c* (consisting of the Init part 310*a* of the complete copy of the movie #3 47*c*), an Init #4 47'*d* (consisting of the Init part 310*a* of the complete copy of the movie #4 47*d*), an Init #5 47'*e* (consisting of the Init part 310*a* of the complete copy of the movie #5 47*e*), an Init #6 47'*f* (consisting of the Init part 310*a* of the complete copy of the movie #6 47*f*), an Init #7 47'*g* (consisting of the Init part 310*a* of the complete copy of the movie #7 47*g*), and an Init #8 47'*h* (consisting of the Init part 310*a* of the complete copy of the movie #8 47*h*). The cache memory 46*b* that is part of the replica server #2 331*b* stores at that one point in time the complete copy of the movie #3 47*c*, the complete copy of the movie #4 47*d*, an Init #1 47'*a* (consisting of the Init part 310*a* of the complete copy of the movie #1 47*a*), an Init #2 47'*b* (consisting of the Init part 310*a* of the complete copy of the movie #2 47*b*), the Init #5 47'*e* (consisting of the Init part 310*a* of the complete copy of the movie #5 47*e*), the Init #6 47'*f* (consisting of the Init part 310*a* of the complete copy of the movie #6 47*f*), an Init #9 47'*i* (consisting of the Init part 310*a* of the complete copy of the movie #9 47*i*), and an Init #10 47'*j* (consisting of the Init part 310*a* of the complete copy of the movie #10 47*j*).

The cache memory 46*c* that is part of the replica server #3 331*c* stores at that one point in time the complete copy of the movie #5 47*e*, the complete copy of the movie #6 47*f*, the Init #3 47'*c* (consisting of the Init part 310*a* of the complete copy of the movie #3 47*c*), the Init #4 47'*d* (consisting of the Init part 310*a* of the complete copy of the movie #4 47*d*), the Init #1 47'*a* (consisting of the Init part 310*a* of the complete copy of the movie #1 47*a*), the Init #8 47'*h* (consisting of the Init part 310*a* of the complete copy of the movie #8 47*h*), the Init #9 47'*i* (consisting of the Init part 310*a* of the complete copy of the movie #9 47*i*), and the Init #10 47'*j* (consisting of the Init part 310*a* of the complete copy of the movie #10 47*j*). The cache memory 46*d* that is part of the replica server #4 331*d* stores at that one point in time the complete copy of the movie #7 47*g*, the complete copy of the movie #8 47*h*, the Init #3 47'*c* (consisting of the Init part 310*a* of the complete copy of the movie #3 47*c*), the Init #4 47'*d* (consisting of the Init part 310*a* of the complete copy of the movie #4 47*d*), the Init #5 47'*e* (consisting of the Init part 310a of the complete copy of the movie #5 47e), a Init #11 47'k (consisting of the Init part 310a of the complete copy of the movie #11 47k), the Init #9 47'i (consisting of the Init part 310a of the complete copy of the movie #9 47i), and a Init #12 47'l (consisting of the Init part 310a of the complete copy of a movie #12 47l).

The cache memory 46e that is part of the replica server #5 331e stores at that one point in time the complete copy of the movie #1 47a, the complete copy of the movie #9 47i, the Init #3 47'c (consisting of the Init part 310a of the complete copy of the movie #3 47c), the Init #4 47'd (consisting of the Init part 310a of the complete copy of the movie #4 47d), the Init #5 47'e (consisting of the Init part 310a of the complete copy of the movie #5 47e), the Init #6 47'f (consisting of the Init part 310a of the complete copy of the movie #6 47f), the Init #9 47'i (consisting of the Init part 310a of the complete copy of the movie #9 47i), and the Init #11 47'k (consisting of the Init part 310a of the complete copy of the movie #11 47k).

As exampled in FIG. 33, with the exception of the movie #1 47a that is stored in both the replica server #1 331a and the replica server #5 331e, each of the complete copies of the other movies, such as the movie #2 47b and the movie #5 47e, is stored in a single replica server, such as the replica server #1 331a storing the full copy of the movie #2 47b and the replica server #3 331c storing the full copy of the movie #5 47e. However, the Init parts of the movies are preferably stored in multiple replica servers, such as the Init #5 part 47'e that is stored in the replica servers #1 331a, #2 331b, #4 331d, and #5 331e. It is noted that since the Init size is substantially smaller that the size of the complete copy of a content, storing and downloading the Init parts does not require large amount or resources associated with downloading and storing these content parts. In operation, in a case where a request for a content, such as a movie, is assigned to a replica server storing a complete copy of that content, then the full copy is streamed from the assigned replica server. However, in the case where only the Init part of the requested content 310 is available at the assigned replica server, and a full copy is stored in another replica server in the I_CDN, the initial part (Init 310a) of the requested content is first streamed to the client device from the assigned replica server, and the rest (Rest 310z) of the content is downloaded from the replica server storing the complete copy.

Figure 34:
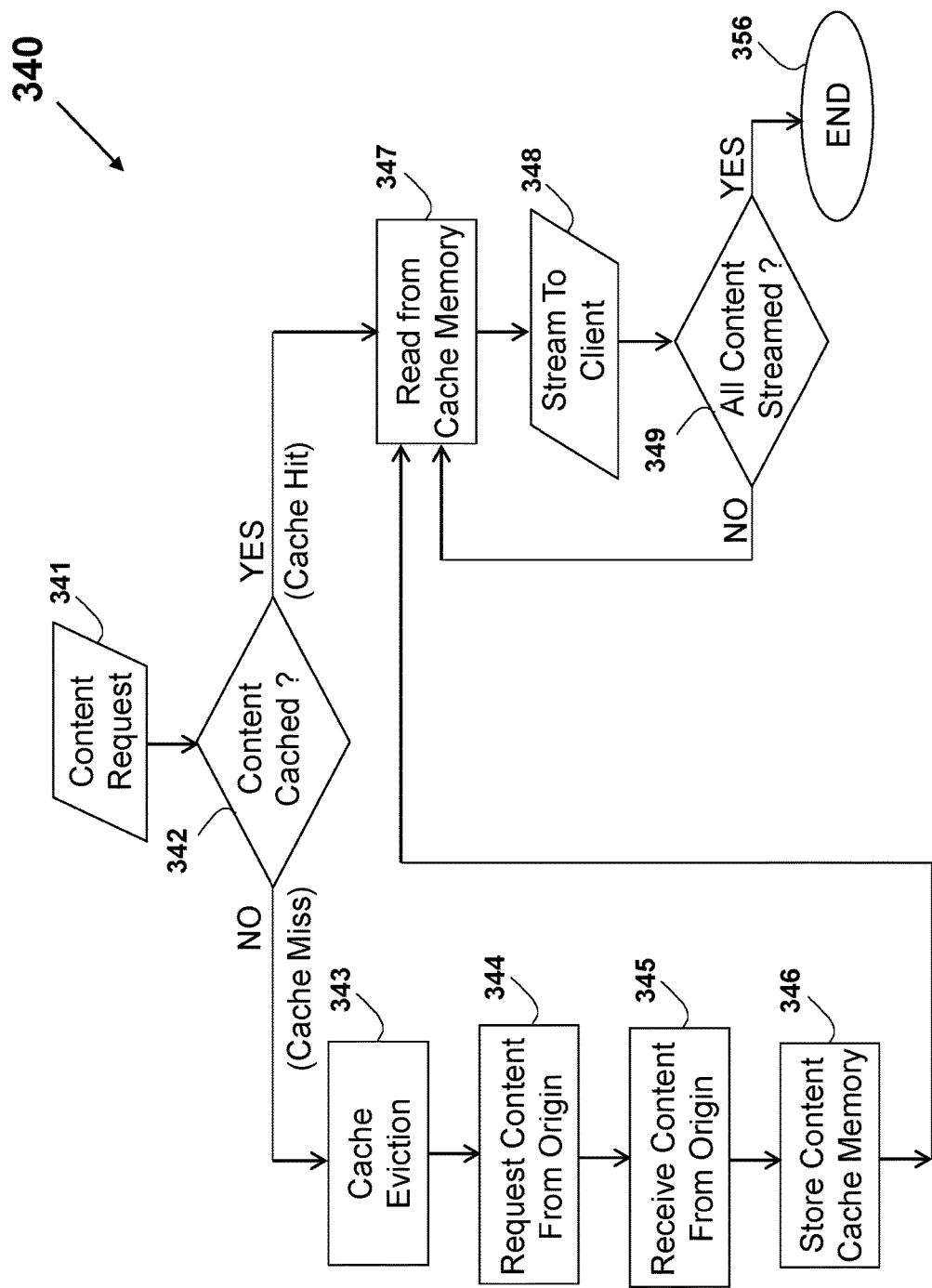
FIG. 34 illustrates schematically a simplified flow-chart of a method of a prior-art replica server.

A schematic operation of a typical replica server, such as the replica server #1 42a that is part of the CDN #1 45a, is shown as a flow chart 340 in FIG. 34. At a "Content Request" step 341, the request for content is received from a client device, such as the client device #1 24, and this step may correspond to the "Streaming Request" step 64 that is part of the flow chart 60 shown in FIG. 6 (and to the message line 51c shown in the arrangement 50 in FIG. 5). Typically, the content identified in the request from the client device #1 24 refers to the complete content item. For example, if the content is a movie, the request typically identify the complete movie as the requested content to stream.

At a "Content cached?" step 342, the replica server check for the availability of the content requested in the "Content Request" step 341 in the memory, such as the cache memory. In a case where the requested content (such as a movie) is stored in the cache memory in full (designated as 'Cache Hit), the content is read from the cache memory as part of a "Read from Cache Memory" step 347, and is streamed to the requesting client device as part of a "Stream to Client" step 348, that may corresponds to the "Content Streaming" step 65 of the flow chart 60 shown in FIG. 6 (and to the message line 51d shown in the arrangement 50 in FIG. 5). The streaming process continues until the whole requested content is streamed (or until the client device stops the streaming process), based on the checking made as part of an "All Content Streamed?" step 349. Upon concluding the streaming, the replica server completed the handling of the request and rests at an "END" step 356.

Figure 5:
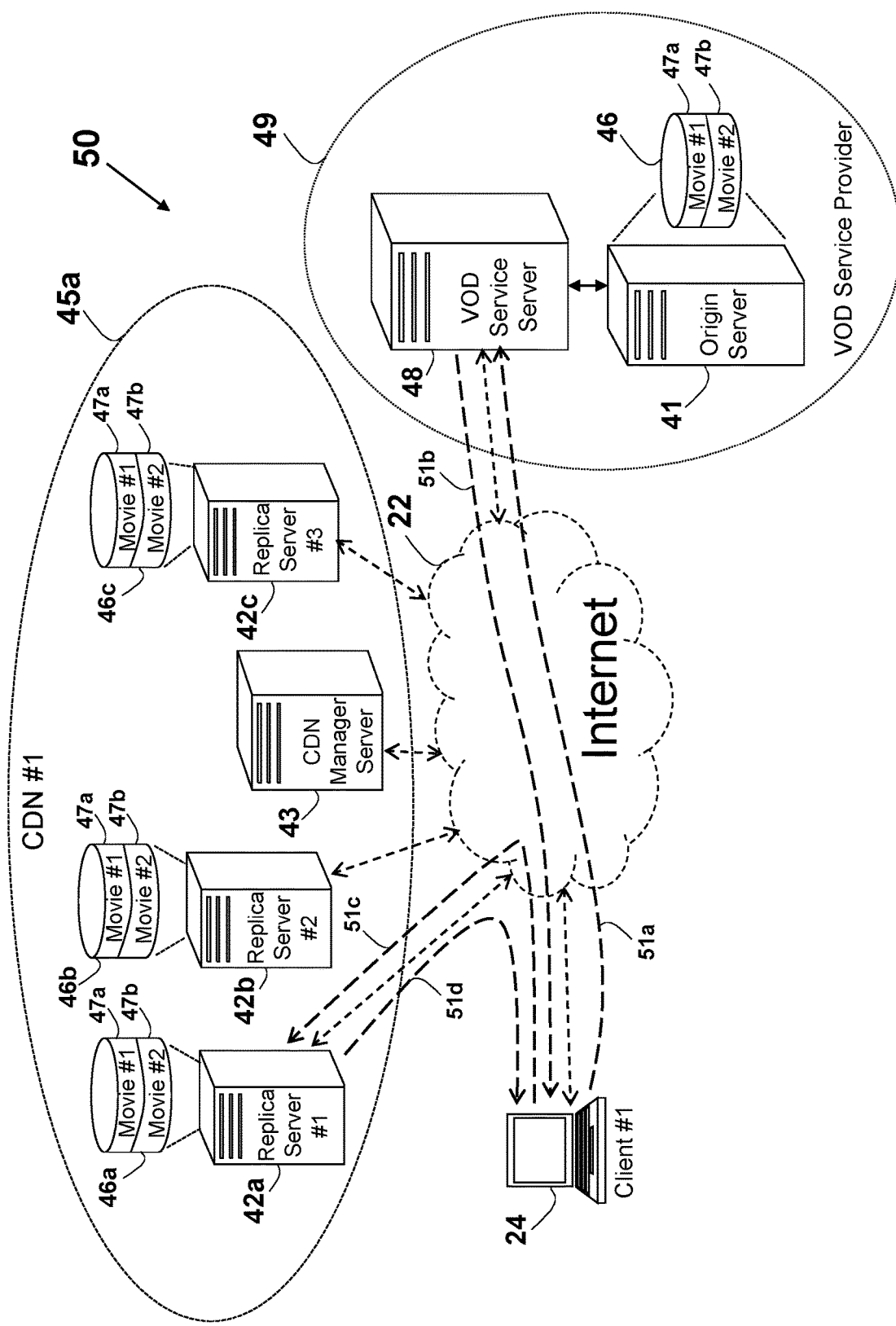
FIG. 5 depicts schematically messages exchanged over the Internet between a client device, a VOD Service Provider, and a CDN.

In a case where the requested content (such as a movie) is not found in the cache memory in full (or in part) (designated as 'Cache Miss'), the replica server starts a process of fetching the requested content from an origin server, such as the origin server 41 that is part of the arrangement 50 shown in FIG. 5. Since the cache memory in the replica server is commonly full, so first, at a "Cache Eviction" step 343, a memory space is required to be prepared for receiving the requested content from the origin server. Any cache eviction scheme may be used as part of the "Cache Eviction" step 343, such as Beladys algorithm, Least Recently Used (LRU), Most Recently Used (MRU), Pseudo-LRU (PLRU), Random Replacement (RR), Least Frequently Used (LFU), First-In-First-Out (FIFO), or any combination thereof. Since the content items are typically stored in the cache memory as full and complete data items (such as a single file), the cache eviction scheme typically clears and evict from the cache memory complete content items or files, such as complete movies, in order to vacate space for incoming content items. At a "Request Content From Origin" step 344, a request for the content that is requested by the client device is sent to the origin server storing such content, and in response, the content is received from the origin server as part of a "Receive Content From Origin" step 345. The received content is stored, using the memory space vacated as part of the "Cache Eviction" step 343, as part of a "Store Content Cache Memory" step 346. Then the requested content may be read and streamed to the requesting client device, as described for the case of 'Cache Hit' above.

Figure 35:
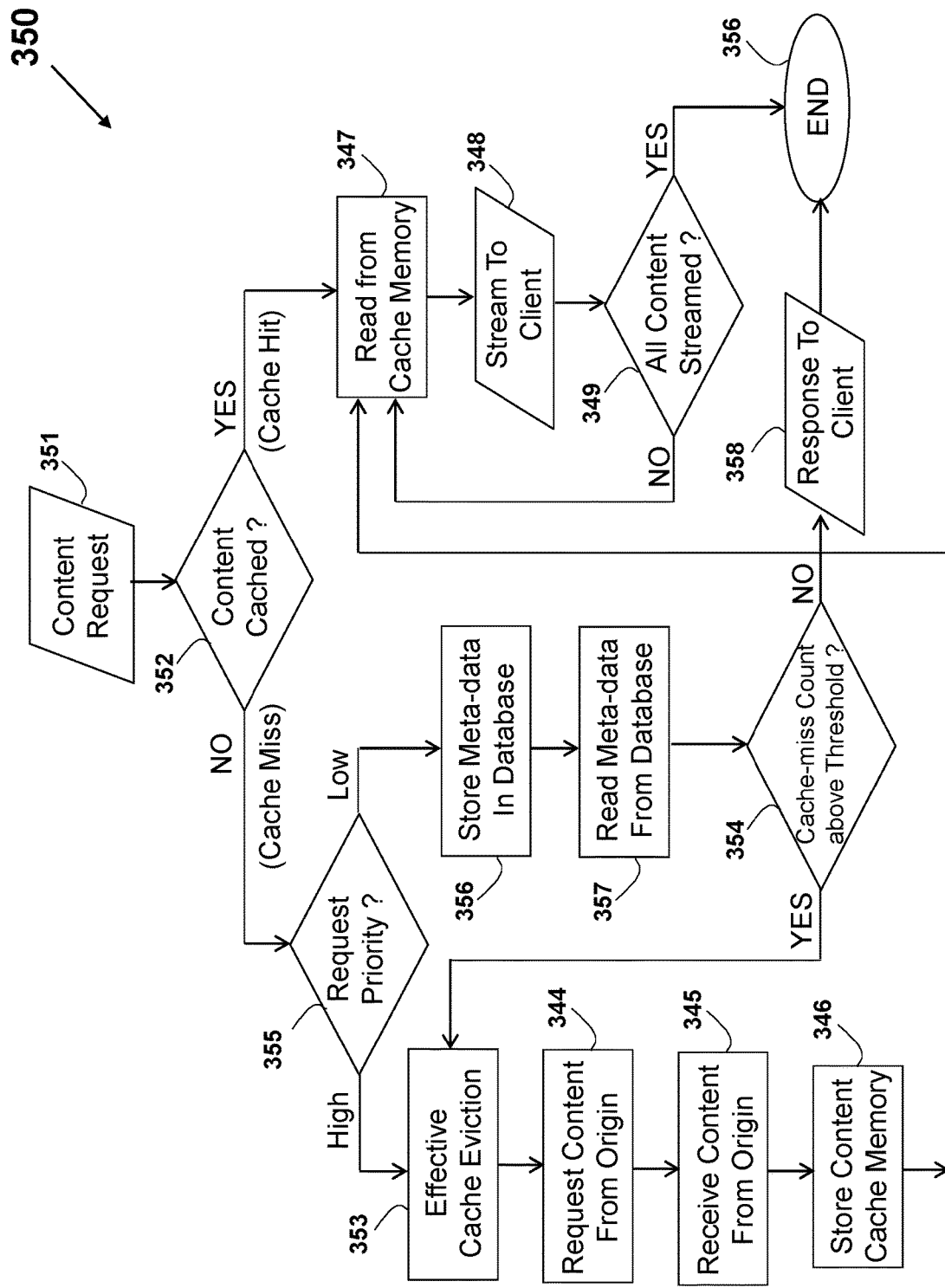
FIG. 35 illustrates schematically a simplified flow-chart of a method of a replica server that is a part of an improved CDN connected over the Internet using two-parts partitioning of content.

A schematic operation of an improved replica server, such as the replica server #1 331a that is part of the I_CDN 330 as shown in FIG. 33, is shown as a flow chart 350 in FIG. 35. Similar to the flow chart 340, at a "Content Request" step 351, the request for content is received from a client device, such as the client device #1 24, and this step may correspond to the "Streaming Request" step 64 that is part of the flow chart 60 shown in FIG. 6 (and to the message line 51c shown in the arrangement 50 in FIG. 5). In addition to referring to the whole content item, such as the content 110 shown in FIG. 11, in the request from the client device #1 24 as described regarding the "Content Request" step 341, the client device may request only part of the content, such as the part 'A' 110a or the part 'B' 110b, as described herein. In one example, the two-parts partitioning of the content 310 as shown in FIG. 31 is used. Hence, a client device may typically request the Init part 310a or the Rest part 310z. Next, similar to the "Content cached" step 342 of the flow chart 340, the improved replica server check for the immediate availability of the requested content (either in whole or part thereof), as part of a "Content Cached?" step 352, and upon such availability (or lack thereof) decides between the "Cache Miss" or "Cache Hit" scenarios. In one example, in the case where a whole content item 310 is requested as part of the "Content Request" step 351 and only the Init part 310a is available in the improved replica server cache memory, a "Cache Hit" decision may be applied, since while the available Init part 310a is streamed, the requesting client device may in parallel approach and fetch the Rest part 310z from another replica server that stores the whole content item 310. Due to the substantially small size of the Init part 310*a* (versus the while content 310), the improved replica server may store substantially large number of Init parts of many content items, and thus the 'Cache-Hit' ratio (versus total requests) is higher than the case of a regular replica server implementing the flow chart 340.

Figure 6:
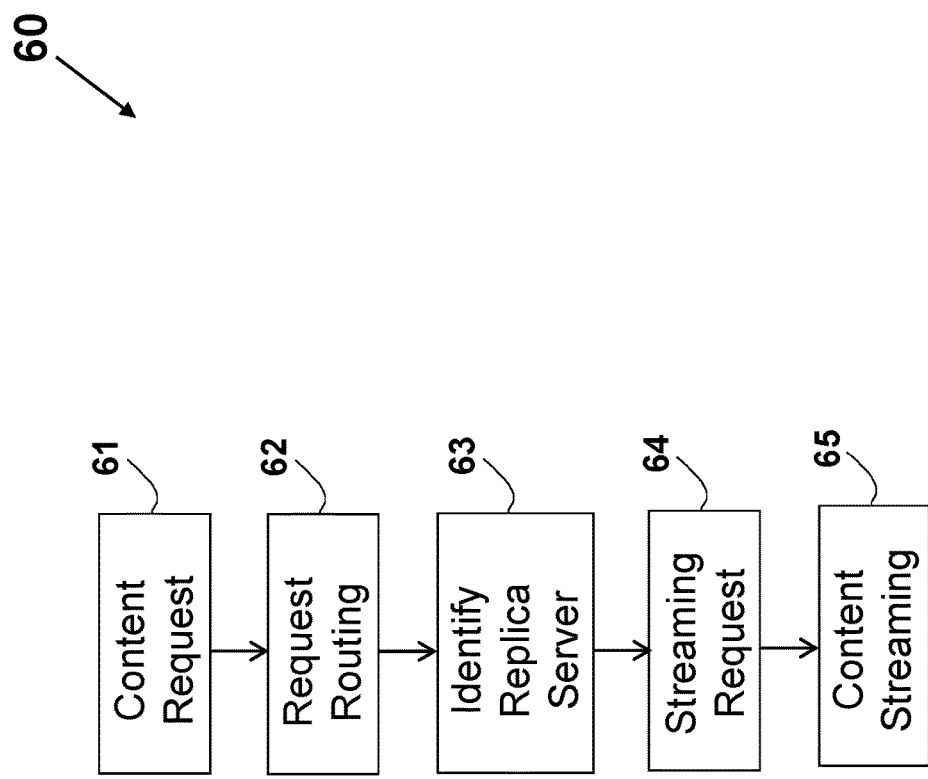
FIG. 6 illustrates schematically a simplified flow-chart of a method relating streaming content from a CDN to a client device.
Figure 7:
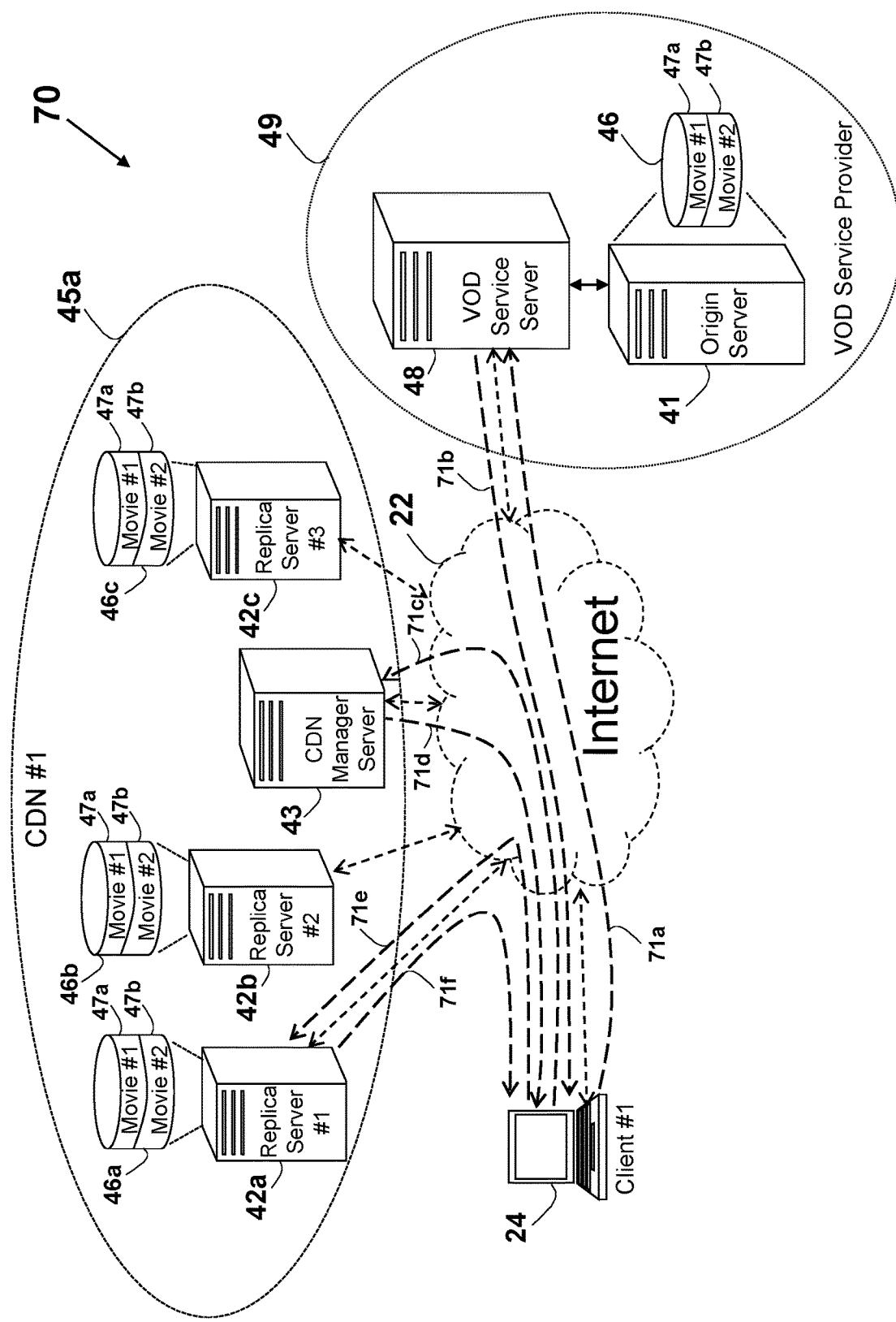
FIG. 7 depicts schematically messages exchanged over the Internet between a client device, a VOD Service Provider, and a CDN connected over the Internet using HTTP-Redirect based Request-Routing scheme.
Figure 7A:
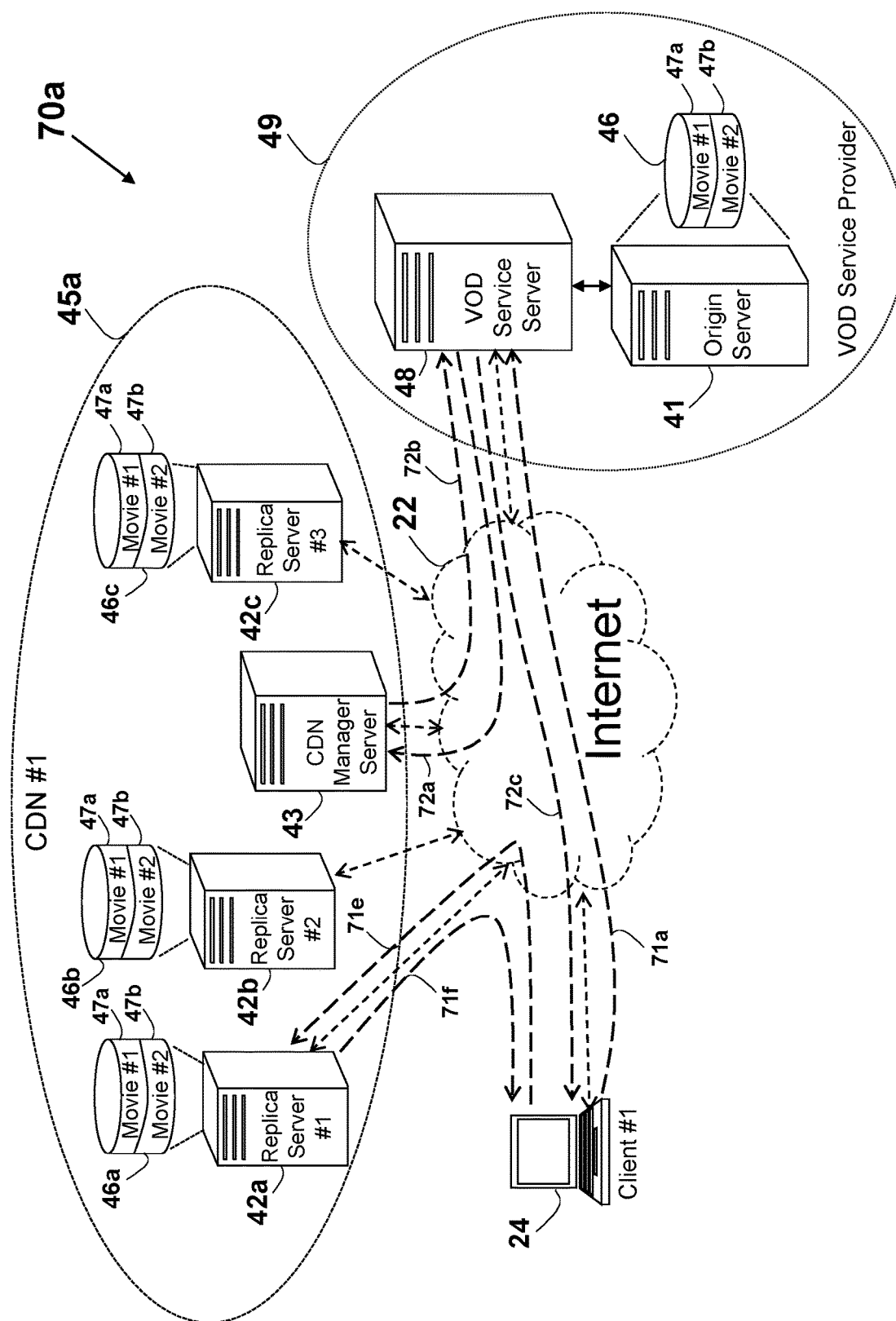
FIG. 7a depicts schematically messages exchanged over the Internet between a client device, a VOD Service Provider, and a CDN connected over the Internet using CDN-Redirect based Request-Routing scheme.
Figure 7B:
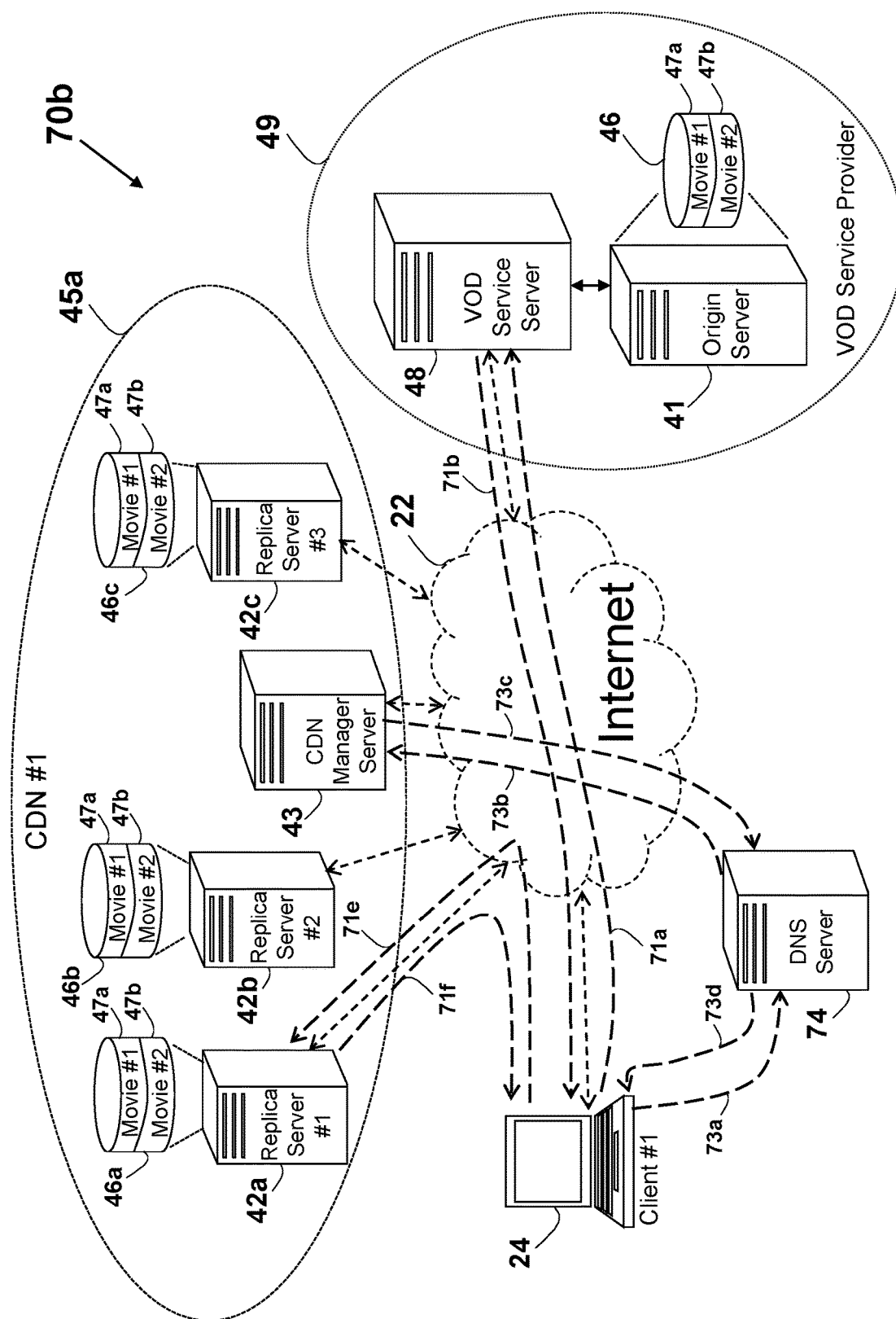
FIG. 7b depicts schematically messages exchanged over the Internet between a client device, a VOD Service Provider, and a CDN connected over the Internet using DNS-Redirect based Request-Routing scheme.
Figure 8:
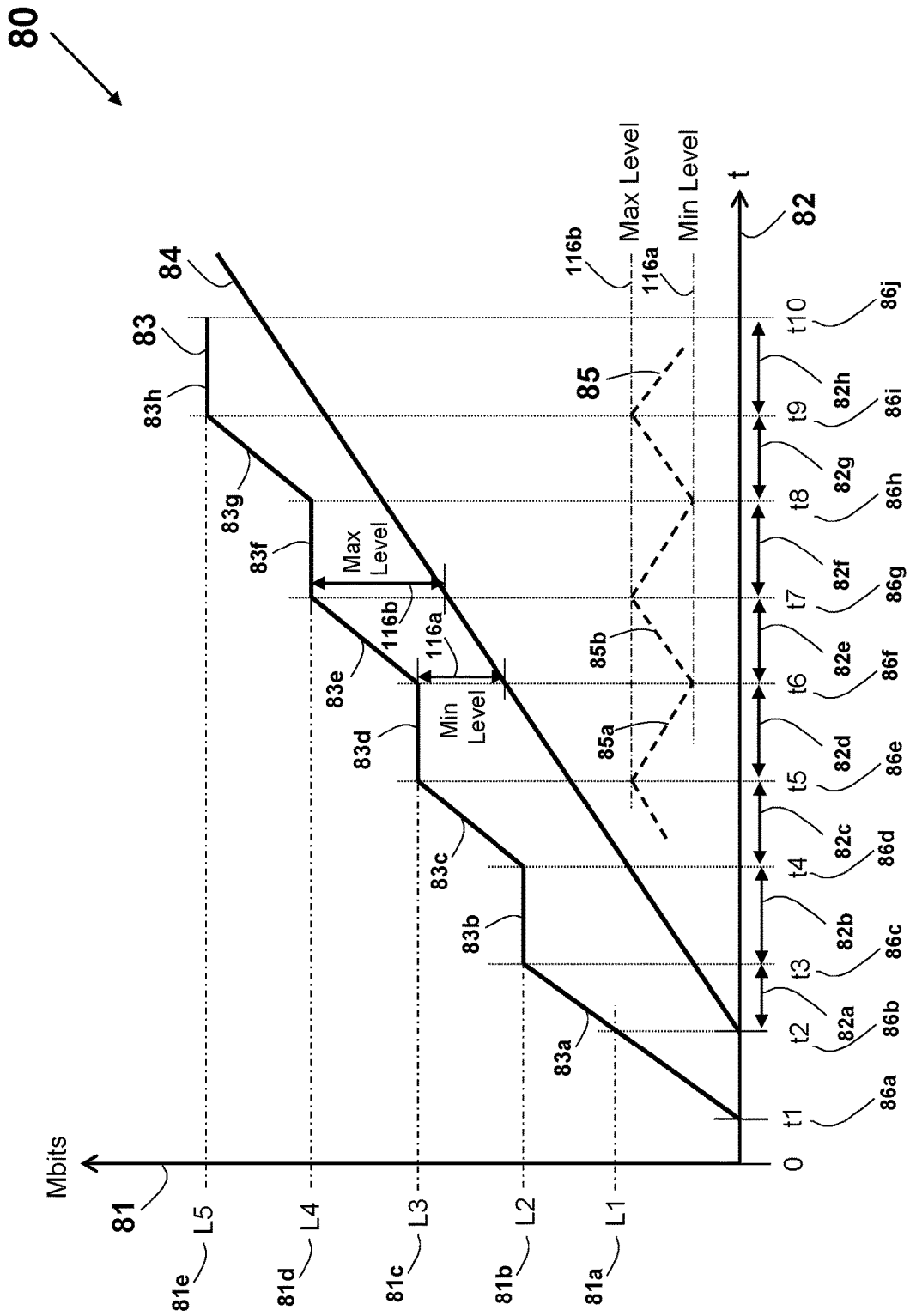
FIG. 8 depicts schematically a buffer operation in a streaming media arrangement.
Figure 9:
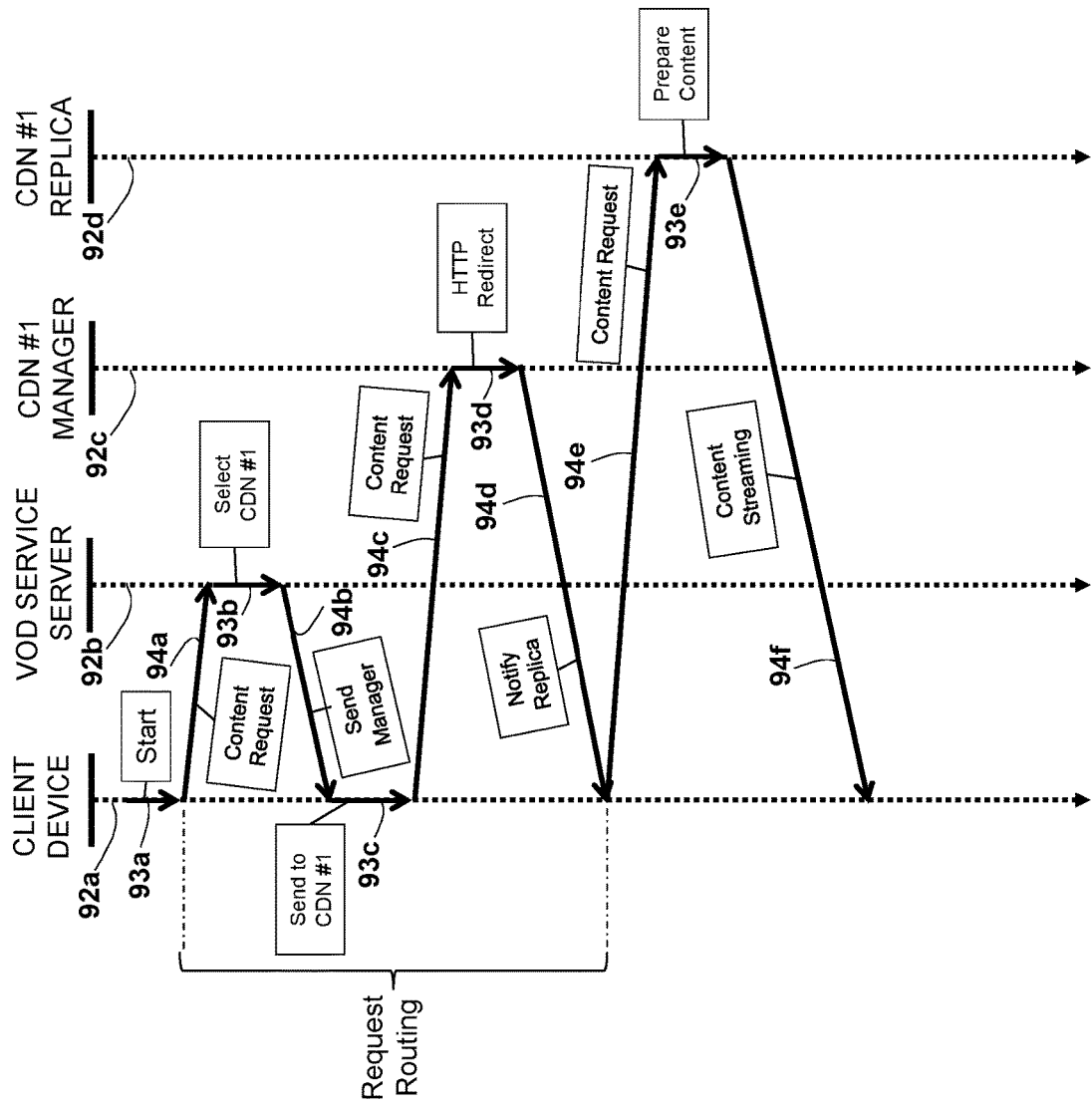
FIG. 9 illustrates schematically a timing chart of messages and states associated with media streaming over the Internet from a single source.

Similar to the 'Cache Hit' scenario described in the flow chart 340, the requested content (or part thereof) is read from the cache memory as part of the "Read from Cache Memory" step 347, and is streamed to the requesting client device as part of the "Stream to Client" step 348, that may corresponds to the "Content Streaming" step 65 of the flow chart 60 shown in FIG. 6 (and to the message line 51*d* shown in the arrangement 50 in FIG. 5). The streaming process continues until the whole requested content is streamed (or until the client device stops the streaming process), based on the checking made as part of the "All Content Streamed?" step 349. Upon concluding the streaming, the replica server completed the handling of the request and rests at the "END" step 356.

Typically, replica server that process a content request from a client device provides the requested content either immediately from the local cache memory ('cache hit') or by obtaining the content from a respective origin server ('cache miss'), as described in the flow-chart 340 in FIG. 34. The approaching of the origin server for obtaining the requested content consumes various resources, such as the bandwidth and cost associated with the traffic and communication with the origin server. Further, the downloading and storing of the requested content in the cache memory of the replica server consumes a storage space that may be used for other contents that may be used for other client devices. In a preferred example, the content request from the client device as part of the "Content Request" step 351 may further contain a priority level, such as 'high' and 'low' levels, associated with the requested content. When receiving 'high' level request, the improved replica server is required to fulfil the request, even if the requested content is not locally stored in the cache memory ('cache miss') and is needed to be obtained from the respective origin server. When receiving a 'low' level request, the improved replica server is required to fulfil the request only if the requested content is locally stored in the cache memory ('cache hit'). In the case where the requested content is not locally stored in the cache memory ('cache miss') and is needed to be obtained from the respective origin server, the client device is so notified and may use another replica server for fetching the requested content. For example, the client device may approach another replica server associated with the same CDN, or may select another CDN, such as the next in priority in the sources table 119 shown in FIG. 11*a*, or based on the performance data base 190 shown in FIG. 19.

Upon determining a 'cache miss' when checked as part of the "Content Cached?" step 352, the improved replica sever checks as part of a "Request Priority?" step 355 the priority level of the request that was received as part of the "Content Request" step 351. In case of 'High' priority level, the improved replica server continues to fetch the requested content from the respective origin server, similar to the actions taken by a regular replica server as described in the flow-chart 340 shown in FIG. 34. First, a storage space is vacated in order to prepare storage space for the content to be obtained, as part of an "Effective Cache Eviction" step 353. In contrast to regular cache eviction where files or contents are deleted (evicted) in full, for any content 310, the improved replica server an "Effective Cache Eviction" step 353 only deletes the Rest part 310*z*, while retaining the Init part 310*a*. Since typically the Init part 310*a* is a substantially small part of the whole content, the retaining of it does not affect the cache eviction scheme or the available storage space for storing the newly obtained content. For example, assuming that all content items 310 are of the same size and that the Init part 310*a* is 0.1% of the total content size, then evicting a single content item suffices for storing 1000 Init parts. Any cache eviction scheme may be used as part of the "Effective Cache Eviction" step 353, such as Beladys algorithm, Least Recently Used (LRU), Most Recently Used (MRU), Pseudo-LRU (PLRU), Random Replacement (RR), Least Frequently Used (LFU), First-In-First-Out (FIFO), or any combination thereof.

Upon vacating cache storage as part of the "Effective Cache Eviction" step 353, a request for the content that is requested by the client device is sent to the origin server storing such content as part of the "Request Content From Origin" step 344, and in response the content is received from the origin server as part of the "Receive Content From Origin" step 345. The received content is stored, using the memory space vacated as part of the "Cache Eviction" step 343, as part of the "Store Content Cache Memory" step 346. Then the requested content may be read and streamed to the requesting client device, as described for the case of 'Cache Hit' above.

The improved replica server manages and stores a 'cache-miss' database that includes information regarding the 'cache-miss' events that were not fulfilled by retrieving the requested content from a respective origin server. Upon determining a low priority in case of 'cache-miss' (checked as part of the "Content Cached?" step 352), based on the checking as part of a "Request Priority?" step 355, the event details is stored in the database, as part of a "Store Meta-data In Database" step 356. For example, the meta-data of the requested content is stored, along with the identification of the requesting client device, and the time of request. Next, the improved replica server checks the database to detect former 'cache-miss' events involving the same requested content, as part of a "Read Meta-data From Database" step 357. A response to the requesting client device is sent as part of a "Response To Client" step 358, completing the handling of the content request and resting in the "END" step 356.

The response to the requesting client device as part of the "Response To Client" step 358 contain the notification of 'cache-miss', and may further include the information obtained from the 'cache-miss' database regarding former requests for the same content. For example, the identification of the client devices that formerly requested the same content, and the timing of that requests may be provided to the requesting client device.

Figure 36:
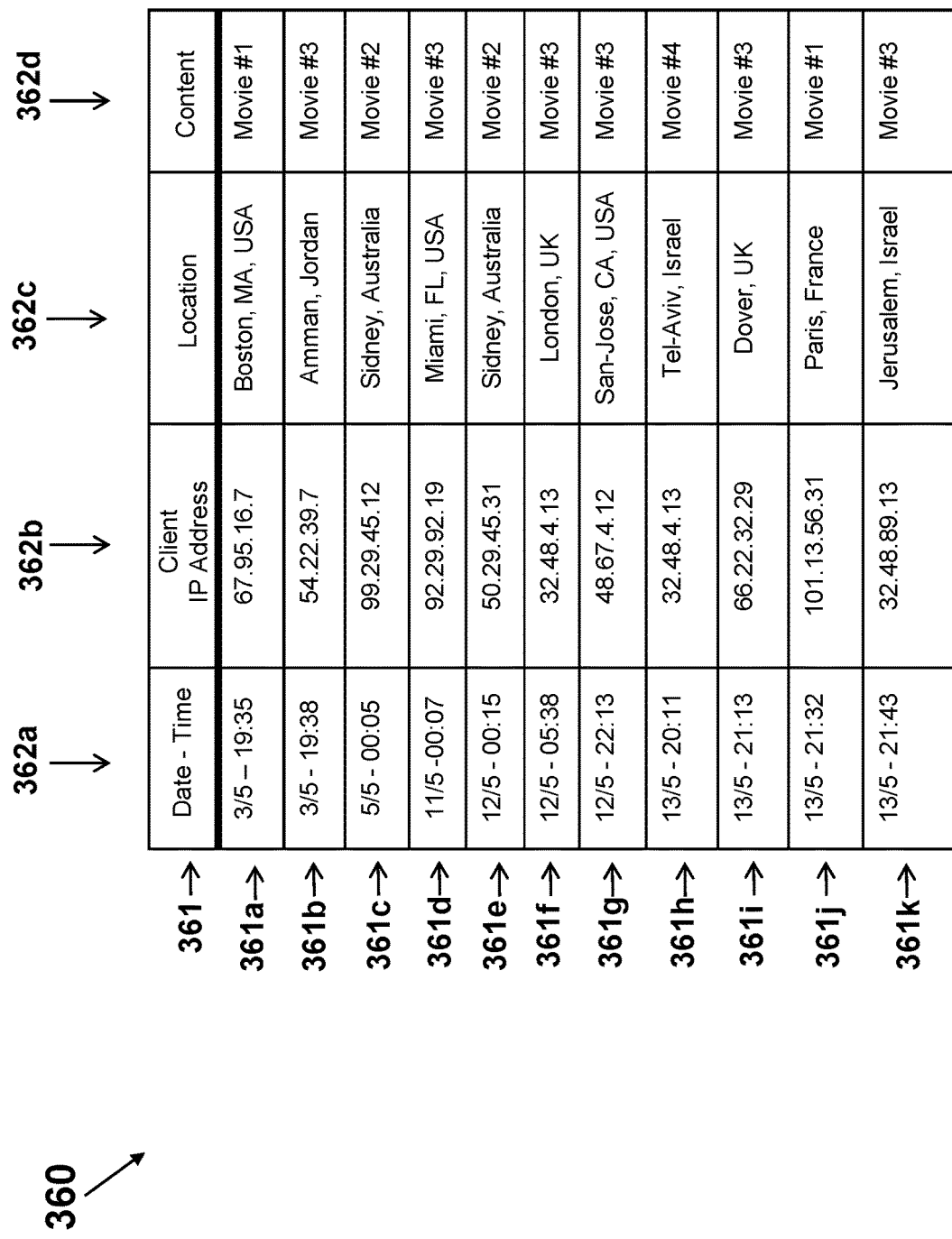
FIG. 36 illustrates schematically a simplified table of collected cache-miss events.

An example of a 'cache-miss' database is a table 360 shown in FIG. 36. As shown by a title row 361, the first column 'Date-Time' 362*a* represent the time involving the cache-miss event, such as the time when the content request arrived to the improved replica server (such as in the "Content Request" step 351), the time when cache-miss was determined (such as during the "Content Cached?" step 352, the time when cache-miss response was sent to the requesting client device (such as in the "Response To Client" step 358), or any other time during the execution of the flow chart 350 by the improved replica server. The second column 'Client IP Address' 362*b* identifies the requesting client (such as by its IPv4 address) and may correspond to the respective column 192*b* of the table 190 shown in FIG. 19, the third column 'Location' is associated with the location of the requesting client device, and may correspond to the respective column 192*c* of the table 190 shown in FIG. 19.

The fourth column 'Content' 362*d* identifies the requested content by the client device, and may correspond to the respective column 192*d* of the table 190 shown in FIG. 19.

Each row of the table 360 represent a cache-miss event recorded as part of the "Store Meta-data In Database" step 356. Eleven events are examples, identified as 361*a* to 361*k*. For example, the fourth recorded cache-miss event 361*d* involves the client address having an IP of 92.29.92.29 located at Miami, Florida, USA, and the cache-miss event related to the movie #3 occurred on 11/5 at 00:07. Similarly, the tenth recorded cache-miss event 361*j* involves the client address having an IP of 101.13.56.31 located at Paris, France, and the cache-miss event related to the movie #1 occurred on 13/5 at 21:32.

Upon the cache-miss event associated with the tenth row 361*j*, the improved replica server may identify as part of the "Read Meta-data From Database" step 357 that the same requested content, namely the movie #1 as shown in the 'Content' column 362*d*, was formerly requested as part of the first row cache-miss event 361*a*, and as such may notify the requesting client device as part of the response sent as part of the "Response To Client" step 358, the former requesting client identification (namely IP address of 67.95.16.7) and the time of the former request (namely 3/5—19.35). Similarly, upon the cache-miss event associated with the eleventh row 361*k*, the improved replica server may identify as part of the "Read Meta-data From Database" step 357 that the same requested content, namely the movie #3 as shown in the 'Content' column 362*d*, was formerly requested as part of the ninth row cache-miss event 361*a* and in seventh row cache-miss event 361*g*, and as such may notify the requesting client device as part of the response sent as part of the "Response To Client" step 358, the former requesting clients identification and the time of the former requests.

It is preferred to minimize the number of cache-miss events, due to the induced start-up delay, and the cost of overhead and resources associated with any 'cache-miss' event. Hence, in a case where the same content is repeatedly requested and not-fulfilled due to 'cache-miss' and low priority level, it may be preferred to forecast that this content will be repeatedly requested in the future, and thus downloading it for avoiding or minimizing future 'cache-miss' events. In the example of the table 360 shown in FIG. 36, there are six occurrences of 'cache-miss' events relating to movie #3, namely in the second event 361*b*, the fourth event 361*d*, the sixth event 361*f*, the seventh event 361*h*, the ninth event 361*i*, and in the eleventh event 361*k*. In such a case, it may be beneficial to download the movie #3 from the origin server expecting future requests for that content.

In order to evaluate the need and benefit from downloading missing content after cache-miss event, a sliding window of examination time-period is determined, during which the number of cache-miss events for a specific content is counted. The examination period may be less than the last 1, 5, 10, 50, 100, 150, 200, 250, 300, 350, 400, 450, or 500 seconds, less than the last 1, 5, 10, 50, 100, 150, 200, 250, 300, 350, 400, 450, or 500 minutes, less than the last 1, 5, 10, 50, 100, 150, 200, 250, 300, 350, 400, 450, or 500 hours, less than the last 1, 5, 10, 50, 100, 150, 200, 250, 300, 350, 400, 450, or 500 days, or less than the last 1, 5, 10, 50, or 100 weeks. Alternatively or in addition, the examination period may be more than the last 1, 5, 10, 50, 100, 150, 200, 250, 300, 350, 400, 450, or 500 seconds, more than the last 1, 5, 10, 50, 100, 150, 200, 250, 300, 350, 400, 450, or 500 minutes, more than the last 1, 5, 10, 50, 100, 150, 200, 250, 300, 350, 400, 450, or 500 hours, more than the last 1, 5, 10, 50, 100, 150, 200, 250, 300, 350, 400, 450, or 500 days, or more than the last 1, 5, 10, or 50 weeks.

A cache-miss count threshold may be further defined for the sliding window of examination time-period. Only when the threshold is exceeded by the number of actual cache-miss event during this period, the content is downloaded from the respective origin server. The threshold may be equal or above 2, 3, 4, 5, 8, 10, 12, 15, 20, 25, 30, 35, 40, 45, or 50, or may be below 3, 4, 5, 8, 10, 12, 15, 20, 25, 30, 35, 40, 45, 50 or 60.

For example, assuming the threshold is 3 and the examination time period is 3 days. Upon the eleventh cache-miss occurrence 361*k*, since there are 4 cache-miss events during the last 3 days, namely the ninth event 361*i*, the seventh event 361*g*, the sixth event 361*f*, and the fourth event 361*d*, the threshold of 3 is exceeded, and the required content, the movie #3, is downloaded and streamed to the requesting client (identified by IP address of 32.48.89.13), and this 'cache-miss' event is rectified as 'cache-hit'. In such a case, all the events involving the request of that content are deleted from the table 360. In the case where the threshold is set to be 4 or more, it is not exceeded, and the movie #3 is not downloaded to the improved replica server. Similarly, if the examination time period is only 1 or 2 days, the threshold of 3 is nor exceeded, and the movie #3 is not downloaded to the improved replica server. The mechanism of counting the cache-miss occurrences during a set time-window is applied by a "Cache-miss Count above Threshold?" step 354. At this step, the number of cache-miss events in the defined time-period is counted and compared to a set threshold. In a case where the threshold is exceeded, then downloading the requested content is initiated by executing the "Effective Cache Eviction" step 353, similar to following the high priority path as described above.

By leveraging one or more of the methods and systems described herein, consumers, VOD providers, CDN operators, or others may attain CAPEX or OPEX savings, providing a higher user QoE by delivering high-quality, or high fidelity undisturbed robust service, with reduced response delays. Further, the content delivery performance may be improved even during peak consumption or network congestion periods.

The selection of the sources to be used herein, or the priorities assigned to them, may be based on the available communication attributes or their history, such as total RTT and BW, as described above. Other performance characteristics may equally be used in addition or as alternatives, such as an available bandwidth or throughput, lower communication errors or packet loss, lower hops to destination, or lower transfer delay time. Further, the system may use Bit Error Rate (BER), Received Signal Strength Indicator (RSSI), Packet Loss Ratio (PLR), Cyclic Redundancy Check (CRC) and other indicators or measures associated with the communication channel associated with a potential source, and may be based on, use, or include the methodology and schemes described in RFC 2544 entitled: "*Benchmarking Methodology for Network Interconnect Devices*", and ITU-T Y.1564 entitled: "*Ethernet Service Activation Test Methodology*", which are both incorporated in their entirety for all purposes as if fully set forth herein. Measuring, storing, and using delivery performance data is described in U.S. Patent Application Publication No. 2015/0067819 to Shribman et al., entitled: "System and Method for Improving Internet Communication by Using Intermediate Nodes", which is incorporated in its entirety for all purposes as if fully set forth herein.

Each of the devices denoted herein as servers, such as the Origin Server 41, the VOD Service Server 48, the performance server 171, the CDN Manager Servers, such as the CDN manager Server 43, the independent server #5 42e, and the Replica servers, such as the Replica Server #1 42a and the Replica Server #4 42d, may typically function as a server in the meaning of client/server architecture, providing services, functionalities, and resources, to other devices (clients), commonly in response to the clients' request. Each of the server devices may further employ, store, integrate, or operate a server-oriented operating system, such as the Microsoft Windows Server® (2003 R2, 2008, 2008 R2, 2012, or 2012 R2 variant), Linux™ (or GNU/Linux) variants (such as Debian based: Debian GNU/Linux, Debian GNU/kFreeBSD, or Debian GNU/Hurd, Fedora™, Gentoo™, Linspire™, Mandriva, Red Hat® Linux available from Red Hat, Inc. headquartered in Raleigh, North Carolina, U.S.A., Slackware®, SuSE, or Ubuntu®), or UNIX®, including commercial UNIX® variants such as Solaris™ (available from Oracle Corporation headquartered in Redwood City, California, U.S.A.), AIX® (available from IBM Corporation headquartered in Armonk, New York, U.S.A.), or Mac™ OS X (available from Apple Inc. headquartered in Cupertino, California, U.S.A.), or free variants such as FreeBSD®, OpenBSD, and NetBSD®. Alternatively or in addition, each of the devices denoted herein as servers, may equally function as a client in the meaning of client/server architecture.

Devices that are not denoted herein as clients, such as client devices (such as the client device #1 24 and the client device #2 24a), may typically function as a client in the meaning of client/server architecture, commonly initiating requests for receiving services, functionalities, and resources, from other devices (servers or clients). Each of the these devices may further employ, store, integrate, or operate a client-oriented (or end-point dedicated) operating system, such as Microsoft Windows® (including the variants: Windows 7, Windows XP, Windows 8, and Windows 8.1, available from Microsoft Corporation, headquartered in Redmond, Washington, U.S.A.), Linux, and Google Chrome OS available from Google Inc. headquartered in Mountain View, California, U.S.A. Further, each of the these devices may further employ, store, integrate, or operate a mobile operating system such as Android (available from Google Inc. and includes variants such as version 2.2 (Froyo), version 2.3 (Gingerbread), version 4.0 (Ice Cream Sandwich), Version 4.2 (Jelly Bean), and version 4.4 (KitKat), iOS (available from Apple Inc., and includes variants such as versions 3-7), Windows® Phone (available from Microsoft Corporation and includes variants such as version 7, version 8, or version 9), or Blackberry® operating system (available from BlackBerry Ltd., headquartered in Waterloo, Ontario, Canada). Alternatively or in addition, each of the devices that are not denoted herein as a server, may equally function as a server in the meaning of client/server architecture.

The method and system described herein, allows for a client device (such as the Client device #1 24 in FIG. 5 or the client device #2 24a in FIG. 17) to effectively fetch content from a server (such as the replica server #1 42a or the independent server #5 42e). The method and system may be used by the client device for supporting an application, such as a web browser application, when the application is requesting a content from the Internet, in general, and from a data server in particular. In one example, the client device uses a communication-related application to be used by the application when no 'client' application is present, such as HTTP stack handling application. The request from the requesting application to the communication-related application is intercepted and routed to be handled as part of the 'client' application or process. Such interception may be in the form of a filter driver (or any other intermediate driver), enabling the interception as part of the OS kernel. Alternatively or in addition, the interception may be in the form of extension or a plug-in of the requesting application, such as a browser plug-in or a browser extension in the case where the application is a web browser. Alternatively or in addition, the interception of the request may use hooking of the requesting application, or of the communication-related application. Alternatively or in addition, the application and the steps described herein may communicate using an Inter-Process Communication (IPC), such as a file sharing, a signal, a socket, a pipe, a message queue, a shared memory, a semaphore, or memory mapped file. In Windows environment, the IPC may be based on a clipboard, a Component Object Model (COM), data copy, a DDE protocol, or mailslots.

Examples of web browsers include Microsoft Internet Explorer (available from Microsoft Corporation, headquartered in Redmond, Washington, U.S.A.), Google Chrome which is a freeware web browser (developed by Google, headquartered in Googleplex, Mountain View, California, U.S.A.), Opera™ (developed by Opera Software ASA, headquartered in Oslo, Norway), and Mozilla Firefox® (developed by Mozilla Corporation headquartered in Mountain View, California, U.S.A.). The web-browser may be a mobile browser, such as Safari (developed by Apple Inc. headquartered in Apple Campus, Cupertino, California, U.S.A), Opera Mini™ (developed by Opera Software ASA, headquartered in Oslo, Norway), and Android web browser.

Any streaming herein may be based on, may be using, or may be according to, progressive download or adaptive bit-rate streaming that may be based on, may be using, may be compatible with, or may be according to, Dynamic Adaptive Streaming over HTTP (DASH), HTTP Live Streaming (HLS), or HTTP Dynamic Streaming (HDS).

Any memory, storage, database, or cache mentioned herein may consist of, comprise, use, or be included in, the local cache as described in U.S. Pat. No. 8,135,912 to the Shribman et al., entitled: "System and Method of Increasing Cache Size".

The steps described herein may be sequential, and performed in the described order. For example, in a case where a step is performed in response to another step, or upon completion of another step, the steps are executed one after the other. However, in the case where two or more steps are not explicitly described as being sequentially executed, these steps may be executed in any order, or may be simultaneously performed. Two or more steps may be executed by two different network elements, or in the same network element, and may be executed in parallel using multiprocessing or multitasking.

A tangible machine-readable medium (such as a storage) may have a set of instructions detailing part (or all) of the methods and steps described herein stored thereon, so that when executed by one or more processors, may cause the one or more processors to perform part of, or all of, the methods and steps described herein. Any of the network elements may be a computing device that comprises a processor and a computer-readable memory (or any other tangible machine-readable medium), and the computer-readable memory may comprise computer-readable instructions such that, when read by the processor, the instructions causes the processor to perform the one or more of the methods or steps described herein.

Any device or network element herein may comprise, consists of, or include a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, a non-mobile or a non-portable device. Further, any device or network element herein may comprise, consist of, or include a major appliance (white goods) and may be an air conditioner, dishwasher, clothes dryer, drying cabinet, freezer, refrigerator, kitchen stove, water heater, washing machine, trash compactor, microwave oven and induction cooker. The appliance may similarly be a 'small' appliance such as TV set, CD or DVD player, camcorder, still camera, clock, alarm clock, video game console, HiFi or home cinema, telephone or answering machine.

The term 'host' or 'network host' is used herein to include, but not limited to, a computer or other device connected to a computer network, such as the Internet. A host may consist of, be based on, include, or be included, in the work-station 7, the computer system 10, or the computer 11. A network host may offer information resources, services, and applications to users or other nodes on the network, and is typically assigned a network layer host address. Computers participating in networks that use the Internet Protocol Suite may also be called IP hosts, and computers participating in the Internet are called Internet hosts, or Internet nodes. Internet hosts and other IP hosts have one or more IP addresses assigned to their network interfaces. The addresses are configured either manually by an administrator, automatically at start-up by means of the Dynamic Host Configuration Protocol (DHCP), or by stateless address autoconfiguration methods. Network hosts that participate in applications that use the client-server model of computing are classified as server or client systems. Network hosts may also function as nodes in peer-to-peer applications, in which all nodes share and consume resources in an equipotent manner.

The arrangements and methods described herein may be implemented using hardware, software or a combination of both. The term "software integration" or any other reference to the integration of two programs or processes herein, is used herein to include, but not limited to, software components (e.g., programs, modules, functions, processes, etc.) that are (directly or via another component) combined, working or functioning together or form a whole, commonly for sharing a common purpose or set of objectives. Such software integration can take the form of sharing the same program code, exchanging data, being managed by the same manager program, executed by the same processor, stored on the same medium, sharing the same GUI or other user interface, sharing peripheral hardware (such as a monitor, printer, keyboard and memory), sharing data or a database, or being part of a single package. The term "hardware integration" or integration of hardware components is used herein to include, but not limited to, hardware components that are (directly or via another component) combined, working or functioning together or form a whole, usually for sharing a common purpose or set of objectives. Such hardware integration can take the form of sharing the same power source (or power supply) or sharing other resources, exchanging data or control (e.g., by communicating), being managed by the same manager, physically connected or attached, sharing peripheral hardware connection (such as a monitor, printer, keyboard and memory), being part of a single package or mounted in a single enclosure (or any other physical collocating), sharing a communication port, or used or controlled using the same software or hardware. The term "integration" herein is used to include as applicable, but not limited to, software integration, hardware integration, or any combination thereof.

Any networking protocol may be utilized for exchanging information between the network elements (e.g., clients or servers) within the network (such as the Internet). For example, it is contemplated that communications can be performed using TCP/IP. Generally, HTTP and HTTPS are utilized on top of TCP/IP as the message transport envelope. The system described hereinafter is suited for both HTTP/HTTPS, message-queuing systems, and other communications transport protocol technologies. Furthermore, depending on the differing business and technical requirements of the various partners within the network, the physical network may embrace and utilize multiple communication protocol technologies. As used herein, the term "request" includes, but is not limited to, a message describing an operation to be carried out in the context of a specified resource, such as HTTP GET, POST, PUT, and HEAD commands, and the term "response" includes, but is not limited to, a message containing the result of an executed request, such as an HTML document or a server error message. A request may be an explicit web request that is initiated manually by the user, or may be an implicit request that is initiated by a web client and is transparent to the user, as an ancillary event corresponding to an explicit web request.

As used herein, the terms "program", "programmable", and "computer program" are meant to include any action or any sequence of human or machine cognizable steps that perform a function, including any part of, or whole of, any flow chart herein. Such programs are not inherently related to any particular computer or other apparatus, and may be rendered in virtually any programming language or environment including, for example, Objective-C, C/C++, Fortran, JavaScript, Flash, COBOL, PASCAL, assembly language, scripting language, script, markup languages (e.g., HTML, SGML, XML, VoXML), and the likes, as well as object-oriented environments such as the Common Object Request Broker Architecture (CORBA), Java™ (including J2ME, Java Beans, etc.) and the likes, as well as in firmware or other implementations. Alternatively or in addition, any action or any sequence or human or machine cognizable steps that perform a function, including any part of, or whole of, any flow chart herein, may be interpreted by a script, such as a client-side or a server-side script. Generally, program modules include routines, programs, objects, components, data structures, etc., that performs particular tasks or implement particular abstract data types. The term "application program" (also referred to as 'application', 'software application', or 'application software') is used herein to include, but not limited to, a computer program designed to perform a specific function directly for a user, or for another application program.

Application software is typically a set of one, or more programs designed to carry out operations for a specific application. Commonly, an application software is dependent on system software that manages and integrates computer capabilities, but does not directly perform tasks that benefit the user, such as an operating system, to execute. Examples of types of application software may include accounting software, media players, and office suites. Applications may be bundled with the computer and its system software, or may be published separately, and further may be developed and coded as a proprietary, or as an open-source software. Most applications are designed to help people perform an activity. Any program or application herein may consist of, may include, or may be included in an application such as application #1 31a, and may use, interact, or communicate with an operating system such as the operating system 30 or 30a, described above.

The terms "task" and "process" are used generically herein to describe any type of running programs, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of reading the value, processing the value—the value must be obtained prior to processing it, although some of the associated processing may be performed prior to, concurrently with, and/or after the read operation).

Where certain process steps are described in a particular order or where alphabetic and/or alphanumeric labels are used to identify certain steps, the embodiments are not limited to any particular order of carrying out such steps. In particular, the labels are used merely for convenient identification of steps, and are not intended to imply, specify or require a particular order for carrying out such steps. Furthermore, other embodiments may use more or less steps than those discussed herein. They may also be practiced in distributed computing environments where tasks are performed by remote processing devices that are linked through a communications network.

In a distributed computing environment, program modules may be located in both local and remote memory storage devices. Any single step, group of steps, or a flow chart herein may be realized as a computer program in a centralized fashion, in one computer system or in a distributed fashion where different elements are spread across several interconnected computer systems. Any kind of computer system, or other apparatus adapted for carrying out the methods described herein, is suited to perform the functions described herein. A typical centralized implementation could include a general purpose computer system with a computer program that, when being loaded and executed, will control the computer system, and carry out the methods described herein.

Computer program or application in the present context means any expression, in any language, code or notation, of a set of instructions intended to cause a system having an information processing capability to perform a particular function either directly or after either, or both of the following a) conversion to another language, code or notation; b) reproduction in a different material form. Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems. Some portions of the above description present the techniques described herein in terms of algorithms and symbolic representations of operations on information. These algorithmic descriptions and representations are used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

The corresponding structures, materials, acts, and equivalents of all means plus function elements in the claims below are intended to include any structure, or material, for performing the function in combination with other specifically claimed elements. The description of the present invention has been presented for purposes of illustration and description, but is not intended to be exhaustive or limited to the invention in the form disclosed. The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art to which the present invention is directed upon review of the present disclosure.

All publications, standards, patents, and patent applications cited in this specification are incorporated herein by reference as if each individual publication, patent, or patent application were specifically and individually indicated to be incorporated by reference and set forth in its entirety herein.

The invention claimed is:

1. A method for use with first, second, and third identical copies of a content, the first copy is identified by a first content identifier and stored in a first web server, the second copy is identified by a second content identifier and stored in a second web server, and the third copy is identified by a third content identifier and stored in a third web server, wherein the content comprises at least a first part identified by a first Uniform Resource Locator (URL), a second part identified by a second URL, and a third part identified by a third URL, the method comprising:

operating, by a client device, a web browser;

identifying, by the client device, the first, second, and third content parts;

sending, using the web browser in the client device to the first web server over the Internet, a first Hypertext Transfer Protocol (HTTP) request that includes the first URL;

receiving, by the client device from the first web server over the Internet, in response to the sending of the first HTTP request, the first content part of the first copy;

sending, using the web browser in the client device to the second web server over the Internet, a second HTTP request that includes the second URL;

receiving, by the client device from the second web server over the Internet, in response to the sending of the second HTTP request, the second content part of the second copy;

sending, using the web browser in the client device to the third web server over the Internet, a third HTTP request that includes the third URL;

receiving, by the client device from the third web server over the Internet, in response to the sending of the third HTTP request, the third content part of the third copy; and combining, by the web browser in the client device, the received first, second, and third content parts to form at least part of the content.

2. The method according to claim 1, wherein the content comprises a streaming media data.

3. The method according to claim 2, further comprising playing, by a media player in the web browser at the client device, the formed at least part of the content.

4. The method according to claim 2, wherein the receiving each of the respective first, second, and third content part by the client device, comprises streaming, from the respective web server to the client device over the Internet, the respective first, second, and third content part.

5. The method according to claim 4, wherein the streaming is based on, using, or according to, a Hypertext Transfer Protocol (HTTP), Real-time Transport Protocol (RTP), Real Time Streaming Protocol (RTSP), Real-Time Transport Control Protocol (RTCP), User Datagram Protocol (UDP), Transmission Control Protocol (TCP), or any combination thereof.

6. The method according to claim 4, wherein the streaming is based on, uses, or is according to, a progressive download.

7. The method according to claim 4, wherein the streaming is based on, uses, or is according to, an adaptive bit-rate streaming.

8. The method according to claim 7, wherein the streaming is based on, uses, or is according to, a Dynamic Adaptive Streaming over HTTP (DASH), HTTP Live Streaming (HLS), HTTP Dynamic Streaming (HDS), or any combination thereof.

9. The method according to claim 4, wherein each of the web servers responds to HTTP requests received over the Internet.

10. The method according to claim 9, wherein a communication of the client device with each of the web servers is based on, or uses, a respective HTTP persistent connection.

11. The method according to claim 9, wherein a communication of the client device with each of the web servers is based on, or uses, a respective TCP/IP protocol or connection.

12. The method according to claim 1, wherein the first, second, and third content parts are non-overlapping.

13. The method according to claim 1, wherein the web browser consists of, comprises, or is based on, Microsoft Internet Explorer, Google Chrome, Opera™, or Mozilla Firefox®.

14. The method according to claim 1, wherein the web browser is a mobile web browser.

15. The method according to claim 14, wherein the mobile web browser consists of, comprises, or is based on, Safari, Opera Mini™, or Android web browser.

16. The method according to claim 1, wherein the content comprises a streaming media data, the method further comprising playing, by a media player that is part of the web browser, the formed at least part of the content.

17. The method according to claim 1, wherein the client device executes instructions that include, or are based on, a client-side scripting.

18. The method according to claim 17, wherein the scripting uses a dynamic programming language that supports dynamic typing, first-class functions, functional programming, or any combination thereof.

19. The method according to claim 1, wherein each of the first, second, and third web servers is identified in the Internet using a respective Internet Protocol (IP) address.

20. The method according to claim 1, wherein each of the first, second, and third web servers is a replica server that is part of a first Content Distribution Network (CDN) that is operated, controlled, or managed by a first CDN operator.

21. The method according to claim 1, wherein the sending of the second HTTP request is performed during the receiving of the first content part, and wherein the sending of the third HTTP request is performed during the receiving of the second content part.

22. The method according to claim 1, wherein each of the URLs is in a format of XXX.YYY.com/ZZZ/UUU.mmm, wherein the XXX identifies the respective web server, the ZZZ identifies a directory including the requested content, and the UUU.mmm identifies a requested file in a directory.

23. The method according to claim 1, further comprising, by the client device, partitioning the content into at least the distinct first, second, and third content parts.

24. The method according to claim 23, wherein the partitioning is into 3, 4, 5, 6, 7, 8, 9 or 10 distinct content parts.

25. The method according to claim 24, wherein any byte of the content is included in at least one of the distinct content parts.

26. The method according to claim 24, wherein any byte of the content is included in only one of the distinct content parts.

27. The method according to claim 24, wherein the partitioning is sequential in the content.

28. The method according to claim 24, wherein the partitioning is non-sequential in the content.

29. The method according to claim 24, wherein at least two of the content parts are of equal size.

* * * * *